(12) United States Patent
Shilovitzky et al.

(10) Patent No.: US 12,544,451 B2
(45) Date of Patent: Feb. 10, 2026

(54) INTRACELLULAR DELIVERY COMPOSITIONS

(71) Applicant: BIOND BIOLOGICS LTD., Misgav Industrial Park (IL)

(72) Inventors: Orit Shilovitzky, Haifa (IL); Lilach Chen Zeltsburg, Nahariya (IL); Rozi Ravit Uzan Gueta, Haifa (IL); Ayala Lewkowicz, Kibbutz Kfar Szold (IL); Yossi Gottfried, Kiryat Tivon (IL); Rotem Faygenboim-Ornai, Tal-El (IL); Motti Hakim, Kibbutz Gazit (IL); Yair Sapir, Manof (IL); Ilana Mandel, Manof (IL); Tehila Ben-Moshe, Tel Aviv (IL); Avidor Shulman, Rakefet (IL)

(73) Assignee: BIOND BIOLOGICS LTD., Misgav Industrial Park (IL)

(*) Notice: Subject to any disclaimer, the term of this patent is extended or adjusted under 35 U.S.C. 154(b) by 0 days.

(21) Appl. No.: 18/381,344

(22) Filed: Oct. 18, 2023

(65) Prior Publication Data

US 2024/0148886 A1 May 9, 2024

Related U.S. Application Data

(63) Continuation of application No. PCT/IL2022/050411, filed on Apr. 20, 2022.

(60) Provisional application No. 63/177,144, filed on Apr. 20, 2021.

(51) Int. Cl.
| | |
|---|---|
| C07K 16/00 | (2006.01) |
| A61K 47/59 | (2017.01) |
| A61K 47/64 | (2017.01) |
| C07K 14/765 | (2006.01) |
| C07K 16/32 | (2006.01) |

(52) U.S. Cl.
CPC .......... *A61K 47/643* (2017.08); *A61K 47/595* (2017.08); *C07K 14/765* (2013.01); *C07K 16/32* (2013.01); *C07K 2317/622* (2013.01)

(58) Field of Classification Search
CPC .. A61K 47/643; A61K 47/595; C07K 14/765; C07K 16/32; C07K 2317/622
See application file for complete search history.

(56) References Cited

U.S. PATENT DOCUMENTS

| | | | |
|---|---|---|---|
| 9,493,545 B2 | 11/2016 | Finnis | |
| 2003/0138944 A1 | 7/2003 | Yamada et al. | |
| 2011/0305751 A1 | 12/2011 | Gaillard | |
| 2018/0055944 A1 | 3/2018 | Yuefeng et al. | |
| 2020/0363051 A1* | 11/2020 | Ma | F21S 9/022 |

FOREIGN PATENT DOCUMENTS

| | | |
|---|---|---|
| EP | 3385285 A1 | 10/2018 |
| JP | 2007159429 A | 6/2007 |
| JP | 2012-517235 A | 8/2012 |
| JP | 2024-515689 A | 4/2024 |
| WO | 2005113793 A1 | 12/2005 |
| WO | 2008044798 A1 | 4/2008 |
| WO | 2013177421 A2 | 11/2013 |
| WO | 2017120536 A1 | 7/2017 |
| WO | 2019132579 A2 | 7/2019 |
| WO | 2022224257 A1 | 10/2022 |

OTHER PUBLICATIONS

Sadeqzadeh et al, J Controlled Release 156: 85-91, 2011, IDS #29, filed on Jan. 10, 2024 (Year: 2011).*
Rhaese et al, J Control Release 92: 199-208, 2003 (Year: 2003).*
Spada et al, Mol Pharmaceutics, 18: 1862-94, published Mar. 2021 (Year: 2021).*
Mohammad-Beigi et al, J Nanopart Res 17:167, 2015, IDS #7 filed on Jan. 10, 2024 (Year: 2015).*
Chiu SJ, Ueno NT, Lee RJ. Tumor-targeted gene delivery via anti-HER2 antibody (trastuzumab, Herceptin) conjugated polyethylenimine. J Control Release. Jun. 18, 2004;97(2):357-69. doi: 10.1016/j.jconrel.2004.03.019. PMID: 15196762.
Didenko VV, Ngo H, Baskin DS. Polyethyleneimine as a transmembrane carrier of fluorescently labeled proteins and antibodies. Anal Biochem. Sep. 15, 2005;344(2):168-73. doi: 10.1016/j.ab.2005.06.011. PMID: 16095551; PMCID: PMC1853266.
Carrabino S, Di Gioia S, Copreni E, Conese M. Serum albumin enhances polyethylenimine-mediated gene delivery to human respiratory epithelial cells. J Gene Med. Dec. 2005;7(12):1555-64. doi: 10.1002/jgm.799. PMID: 16028303.
Chen, JL., Peng, SW., Ko, WH. et al. An efficient and low toxic human serum albumin conjugated polyethylenimine nano-sized complex for gene delivery. J Nanopart Res 16, 2593 (2014). https://doi.org/10.1007/s11051-014-2593-x.
Di Gioia, S., Rejman, J., Carrabino, S., Copreni, E., Palmieri, L., & Conese, M. (2006). 180. Transfection Efficiency of Albumin-Containing DNA/Polyethylenimine Complexes in Primary Human Respiratory Epithelial Cells and In Vivo in the Murine Airways. Molecular Therapy, 13, S70. doi:10.1016/j.ymthe.2006.08.204.
Lu JM, Liang Z, Liu D, Zhan B, Yao Q, Chen C. Two Antibody-Guided Lactic-co-Glycolic Acid-Polyethylenimine (LGA-PEI) Nanoparticle Delivery Systems for Therapeutic Nucleic Acids. Pharmaceuticals (Basel). Aug. 25, 2021;14(9):841. doi: 10.3390/ph14090841. PMID: 34577541; PMCID: PMC8470087.

(Continued)

*Primary Examiner* — Lei Yao
(74) *Attorney, Agent, or Firm* — The Roy Gross Law Firm, LLC; Roy D. Gross

(57) ABSTRACT

Protein conjugates comprising a protein carrier comprising polyethylenimine, a payload that interacts with an intracellular target and a linker are provided. Pharmaceutical composition comprising the protein conjugates as well as methods of using and producing the protein conjugates are also provided.

12 Claims, 48 Drawing Sheets
(30 of 48 Drawing Sheet(s) Filed in Color)
Specification includes a Sequence Listing.

(56) References Cited

OTHER PUBLICATIONS

Mohammad-Beigi, H., Shojaosadati, S.A., Morshedi, D. et al. Preparation and in vitro characterization of gallic acid-loaded human serum albumin nanoparticles. J Nanopart Res 17, 167 (2015). https://doi.org/10.1007/s11051-015-2978-5.
D. Wang, A. S. Narang, M. Kotb, A. O. Gaber, D. D. Miller, S. W. Kim, and R. I. Mahato. Novel Branched Poly (Ethylenimine)-Cholesterol Water-Soluble Lipopolymers for Gene Delivery. Biomacromolecules 2002 3 (6), 1197-1207 DOI: 10.1021/bm025563c.
Wang M, Zhi D, Wang H, Ru Y, Ren H, Wang N, Liu Y, Li Y, Li H. TAT-HSA-α-MSH fusion protein with extended half-life inhibits tumor necrosis factor-α in brain inflammation of mice. Appl Microbiol Biotechnol. Jun. 2016;100 (12):5353-61. doi: 10.1007/s00253-015-7251-4. Epub Jan. 27, 2016. PMID: 26816094.
Guo X, Wei X, Jing Y, Zhou S. Size Changeable Nanocarriers with Nuclear Targeting for Effectively Overcoming Multidrug Resistance in Cancer Therapy. Adv Mater. Nov. 4, 2015;27(41):6450-6. doi: 10.1002/adma.201502865. Epub Sep. 24, 2015. PMID: 26401989.
Meyer M, Zintchenko A, Ogris M, Wagner E. A dimethylmaleic acid-melittin-polylysine conjugate with reduced toxicity, pH-triggered endosomolytic activity and enhanced gene transfer potential. J Gene Med. Sep. 2007;9(9):797-805. doi: 10.1002/jgm.1075. PMID: 17628028.
Rozema DB, Ekena K, Lewis DL, Loomis AG, Wolff JA. Endosomolysis by masking of a membrane-active agent (EMMA) for cytoplasmic release of macromolecules. Bioconjug Chem. Jan.-Feb. 2003;14(1):51-7. doi: 10.1021/bc0255945. PMID: 12526692.
Bernkop-Schnürch A. Strategies to overcome the polycation dilemma in drug delivery. Adv Drug Deliv Rev. Nov.-Dec. 2018;136-137:62-72. doi: 10.1016/j.addr.2018.07.017. Epub Jul. 29, 2018. PMID: 30059702.
McConnell KI, Shamsudeen S, Meraz IM, Mahadevan TS, Ziemys A, Rees P, Summers HD, Serda RE. Reduced Cationic Nanoparticle Cytotoxicity Based on Serum Masking of Surface Potential. J Biomed Nanotechnol. Jan. 2016;12 (1):154-64. doi: 10.1166/jbn.2016.2134. PMID: 27301181; PMCID: PMC4970519.
Liu M, Huang Y, Hu L, Liu G, Hu X, Liu D, Yang X. Selective delivery of interleukine-1 receptor antagonist to inflamed joint by albumin fusion. BMC Biotechnol. Sep. 25, 2012;12:68. doi: 10.1186/1472-6750-12-68. PMID: 23006786; PMCID: PMC3505484.
Kratz F. Albumin as a drug carrier: design of prodrugs, drug conjugates and nanoparticles. J Control Release. Dec. 18, 2008;132(3):171-83. doi: 10.1016/j.jconrel.2008.05.010. Epub May 17, 2008. PMID: 18582981.
Um, W., et al. (2019). A Comparative Study on Albumin-binding Molecules for Targeted Tumor Delivery through Covalent and Noncovalent Approach. Bioconjugate Chemistry. doi: 10.1021/acs.bioconjchem.9b00760.
Wunder A, Müller-Ladner U, Stelzer EH, Funk J, Neumann E, Stehle G, Pap T, Sinn H, Gay S, Fiehn C. Albumin-based drug delivery as novel therapeutic approach for rheumatoid arthritis. J Immunol. May 1, 2003;170(9):4793-801. doi: 10.4049/jimmunol.170.9.4793. PMID: 12707361.
Yazaki PJ, Kassa T, Cheung CW, Crow DM, Sherman MA, Bading JR, Anderson AL, Colcher D, Raubitschek A. Biodistribution and tumor imaging of an anti-CEA single-chain antibody-albumin fusion protein. Nucl Med Biol. Feb. 2008;35(2):151-8. doi: 10.1016/j.nucmedbio.2007.10.010. PMID: 18312824; PMCID: PMC3195408.
Kabayama, H., Takeuchi, M., Tokushige, N et al. An ultra-stable cytoplasmic antibody engineered for in vivo applications. Nat Commun 11, 336 (2020). https://doi.org/10.1038/s41467-019-13654-9.
Futami, J., et al. (2005). Intracellular delivery of proteins into mammalian living cells by polyethylenimine-cationization. Journal of Bioscience and Bioengineering, 99(2), 95-103. doi: 10.1263/jbb.99.95.

Merlot AM, Kalinowski DS, Richardson DR. Unraveling the mysteries of serum albumin-more than just a serum protein. Front Physiol. Aug. 12, 2014;5:299. doi: 10.3389/fphys.2014.00299. PMID: 25161624; PMCID: PMC4129365.
Miyamura S, Imafuku T, Anraku M, Taguchi K, Yamasaki K, Tominaga Y, Maeda H, Ishima Y, Watanabe H, Otagiri M, Maruyama T. Comparison of Posttranslational Modification and the Functional Impairment of Human Serum Albumin in Commercial Preparations. J Pharm Sci. Mar. 2016;105(3):1043-9. doi: 10.1016/j.xphs.2015.12.015. PMID: 26928399.
Sadowsky JD, et al. Development of Efficient Chemistry to Generate Site-Specific Disulfide-Linked Protein- and Peptide-Payload Conjugates: Application to THIOMAB Antibody-Drug Conjugates. Bioconjug Chem. Aug. 16, 2017;28 (8):2086-2098. doi: 10.1021/acs.bioconjchem.7b00258. Epub Jul. 13, 2017. PMID: 28636382.
Pillow TH, Sadowsky JD, Zhang D, Yu SF, Del Rosario G, Xu K, He J, Bhakta S, Ohri R, Kozak KR, Ha E, Junutula JR, Flygare JA. Decoupling stability and release in disulfide bonds with antibody-small molecule conjugates. Chem Sci. Jan. 1, 2017;8(1):366-370. doi: 10.1039/c6sc01831a. Epub Aug. 22, 2016. PMID: 28451181; PMCID: PMC5365059.
Andrea LJ Marschall, Congcong Zhang, André Frenzel, Thomas Schirrmann, Michael Hust, Franck Perez & Stefan Dubel (2014) Delivery of antibodies to the cytosol, mAbs, 6:4, 943-956, DOI: 10.4161/mabs.29268.
Futami M, Watanabe Y, Asama T, Murata H, Tada H, Kosaka M, Yamada H, Futami J. Uniformly cationized protein efficiently reaches the cytosol of mammalian cells. Bioconjug Chem. Oct. 17, 2012;23(10):2025-31. doi: 10.1021/bc300030d. Epub Sep. 25, 2012. PMID: 22989361.
Kim JS, Park JY, Shin SM, Park SW, Jun SY, Hong JS, Choi DK, Kim YS. Engineering of a tumor cell-specific, cytosol-penetrating antibody with high endosomal escape efficacy. Biochem Biophys Res Commun. Sep. 18, 2018;503 (4):2510-2516. doi: 10.1016/j.bbrc.2018.07.008. Epub Jul. 4, 2018. PMID: 30208519.
Sadeqzadeh E, Rahbarizadeh F, Ahmadvand D, Rasaee MJ, Parhamifar L, Moghimi SM. Combined MUC1-specific nanobody-tagged PEG-polyethylenimine polyplex targeting and transcriptional targeting of tBid transgene for directed killing of MUC1 over-expressing tumour cells. J Control Release. Nov. 30, 2011;156(1):85-91. doi: 10.1016/j.jconrel.2011.06.022. Epub Jun. 24, 2011. PMID: 21704663.
B. Saqafi & F. Rahbarizadeh (2019) Polyethyleneiminepolyethylene glycol copolymer targeted by anti-HER2 nanobody for specific delivery of transcriptionally targeted tBid containing construct, Artificial Cells, Nanomedicine, and Biotechnology, 47:1, 501-511, DOI: 10.1080/21691401.2018.1549063.
Jauset T, Beaulieu ME. Bioactive cell penetrating peptides and proteins in cancer: a bright future ahead. Curr Opin Pharmacol. Aug. 2019;47:133-140. doi: 10.1016/j.coph.2019.03.014. Epub Apr. 29, 2019. PMID: 31048179.
Weill CO, Biri S, Erbacher P. Cationic lipid-mediated intracellular delivery of antibodies into live cells. Biotechniques. Jun. 2008;44(7):Pvii-Pxi. doi: 10.2144/000112832. PMID: 18540862.
Cleal K, He L, Watson PD, Jones AT. Endocytosis, intracellular traffic and fate of cell penetrating peptide based conjugates and nanoparticles. Curr Pharm Des. 2013;19(16): 2878-94. doi: 10.2174/13816128113199990297. PMID: 23140451.
Hong CW, Zeng Q. Tapping the treasure of intracellular oncotargets with immunotherapy. FEBS Lett. Jan. 21, 2014;588 (2):350-5. doi: 10.1016/j.febslet.2013.10.025. Epub Oct. 30, 2013. PMID: 24184114.
Kang, H.J., Choe, W., Kim, B.M et al. IgG Fc-binding peptide (FcBP)-tat conjugate as a smart antibody carrier into live cells. Macromol. Res. 23, 876-881 (2015). https://doi.org/10.1007/s13233-015-3118-x.
Choi DK, Bae J, Shin SM, Shin JY, Kim S, Kim Ys. A general strategy for generating intact, full-length IgG antibodies that penetrate into the cytosol of living cells. MAbs. 2014;6(6):1402-14. doi: 10.4161/mabs.36389. PMID: 25484049; PMCID: PMC4622575.
Muller S, Zhao Y, Brown TL, Morgan AC, Kohler H. TransMabs: cell-penetrating antibodies, the next generation. Expert Opin Biol Ther. Feb. 2005;5(2):237-41. doi: 10.1517/14712598.5.2.237. PMID: 15757385.

(56) References Cited

OTHER PUBLICATIONS

Pei D, Buyanova M. Overcoming Endosomal Entrapment in Drug Delivery. Bioconjug Chem. Feb. 20, 2019;30 (2):273-283. doi: 10.1021/acs.bioconjchem.8b00778. Epub Dec. 19, 2018. PMID: 30525488; PMCID: PMC6501178.

Lv J, Fan Q, Wang H, Cheng Y. Polymers for cytosolic protein delivery. Biomaterials. Oct. 2019;218:119358. doi: 10.1016/j.biomaterials.2019.119358. Epub Jul. 15, 2019. PMID: 31349095.

Ray M, Lee YW, Scaletti F, Yu R, Rotello VM. Intracellular delivery of proteins by nanocarriers. Nanomedicine (Lond). Apr. 2017;12(8):941-952. doi: 10.2217/nnm-2016-0393. Epub Mar. 24, 2017. PMID: 28338410; PMCID: PMC5829369.

Sarisozen, C., & Torchilin, V. P. (2016). Intracellular Delivery of Proteins and Peptides. Drug Delivery, 576-622. doi:10.1002/9781118833322.ch23.

Singh K, Ejaz W, Dutta K, Thayumanavan S. Antibody Delivery for Intracellular Targets: Emergent Therapeutic Potential. Bioconjug Chem. Apr. 17, 2019;30(4):1028-1041. doi: 10.1021/acs.bioconjchem.9b00025. Epub Mar. 18, 2019. PMID: 30830750; PMCID: PMC6470022.

Slastnikova TA, Ulasov AV, Rosenkranz AA and Sobolev AS(2018) Targeted intracellular delivery of antibodies: The state of the art. Front. Pharmacol. 9:1208. doi:10.3389/fphar.2018.01208.

Marschall AL, Frenzel A, Schirrmann T, Schungel M, Dübel S. Targeting antibodies to the cytoplasm. MAbs. Jan.-Feb. 2011;3(1):3-16. doi: 10.4161/mabs.3.1.14110. Epub Jan. 1, 2011. PMID: 21099369; PMCID: PMC3038006.

Weidle UH, Maisel D, Brinkmann U, Tiefenthaler G. The translational potential for target validation and therapy using intracellular antibodies in oncology. Cancer Genomics Proteomics. Nov.-Dec. 2013;10(6):239-50. PMID: 24336633.

Varkouhi AK, Scholte M, Storm G, Haisma HJ. Endosomal escape pathways for delivery of biologicals. J Control Release. May 10, 2011;151(3):220-8. doi: 10.1016/j.jconrel.2010.11.004. Epub Nov. 13, 2010. PMID: 21078351.

Fortune, J., & Klibanov, A. (2011). Attaching Anti-ACE Antibody to Polyethylenimine Does Not Enhance Specificity of In Vivo PEI-Mediated Gene Delivery. Open Journal of Pharmacology, 1-2.

V. M. Guillem and S. F. Aliño. (2004) Transfection pathways of nonspecific and targeted PEI-polyplexes. Gene Ther Mol Biol vol. 8, 369-384.

Boussif O, Lezoualc'h F, Zanta MA, Mergny MD, Scherman D, Demeneix B, Behr JP. A versatile vector for gene and oligonucleotide transfer into cells in culture and in vivo: polyethylenimine. Proc Natl Acad Sci U S A. Aug. 1, 1995;92 (16):7297-301. doi: 10.1073/pnas.92.16.7297. PMID: 7638184; PMCID: PMC41326.

Qian Z, LaRochelle JR, Jiang B, Lian W, Hard RL, Selner NG, Luechapanichkul R, Barrios AM, Pei D. Early endosomal escape of a cyclic cell-penetrating peptide allows effective cytosolic cargo delivery. Biochemistry. Jun. 24, 2014;53(24):4034-46. doi: 10.1021/bi5004102. Epub Jun. 11, 2014. PMID: 24896852; PMCID: PMC4075989.

Maier K, Martin I, Wagner E. Sequence defined disulfide-linked shuttle for strongly enhanced intracellular protein delivery. Mol Pharm. Dec. 3, 2012;9(12):3560-8. doi: 10.1021/mp300404d. Epub Nov. 19, 2012. PMID: 23140475.

Austin CD, Wen X, Gazzard L, Nelson C, Scheller RH, Scales SJ. Oxidizing potential of endosomes and lysosomes limits intracellular cleavage of disulfide-based antibody-drug conjugates. Proc Natl Acad Sci U S A. Dec. 13, 2005;102 (50):17987-92. doi: 10.1073/pnas.0509035102. Epub Dec. 1, 2005. PMID: 16322102; PMCID: PMC1298180.

Herce, H., Schumacher, D., Schneider, A. et al. Cell-permeable nanobodies for targeted immunolabelling and antigen manipulation in living cells. Nature Chem 9, 762-771 (2017). https://doi.org/10.1038/nchem.2811.

Kaiser PD, Maier J, Traenkle B, Emele F, Rothbauer U. Recent progress in generating intracellular functional antibody fragments to target and trace cellular components in living cells. Biochim Biophys Acta. Nov. 2014;1844(11):1933-1942. doi: 10.1016/j.bbapap.2014.04.019. Epub May 2, 2014. PMID: 24792387.

Sánchez-Navarro, M., Teixidó, M. & Giralt, E. Just passing through. Nature Chem 9, 727-728 (2017). https://doi.org/10.1038/nchem.2837.

Bruce VJ, Lopez-Islas M, McNaughton BR. Resurfaced cell-penetrating nanobodies: A potentially general scaffold for intracellularly targeted protein discovery. Protein Sci. Jun. 2016;25(6):1129-37. doi: 10.1002/pro.2926. Epub Apr. 4, 2016. PMID: 26991318; PMCID: PMC4941773.

Li et al. Nanobody against the E7 oncoprotein of human papillomavirus 16. Molecular Immunology, 109, 12-19. doi:10.1016/j.molimm.2019.02.0.

Guillard et al. Structural and functional characterization of a DARPin which inhibits Ras nucleotide exchange. Nat Commun 8, 16111 (2017). https://doi.org/10.1038/ncomms16111.

PCT International Search Report for International Application No. PCT/IL2022/050411, mailed Jul. 15, 2022, 5pp.

PCT Written Opinion for International Application No. PCT/IL2022/050411, mailed Jul. 15, 2022, 5pp.

PCT International Preliminary Report on Patentability for International Application No. PCT/IL2022/050411, issued Oct. 24, 2023, 6pp.

Edwards et al. "The Remarkable Flexibility of the Human Antibody Repertoire; Isolation of Over One Thousand Different Antibodies to a Single Protein, BLyS" J. Mol. Biol. 2003, 334, 103-118.

Leger et al., "Identification of CJC-1131-albumin bioconjugate as a stable and bioactive GLP-1(7-36) analog" Bioorganic & Medicinal Chemistry Letters 14 (2004) 4395-4398.

Lloyd et al., "Modelling the human immune response: performance of a 10″ human antibody repertoire against a broad panel of therapeutically relevant antigens" Protein Engineering, Design & Selection vol. 22 No. 3, pp. 159-168, 2009.

Mok et al., "pH-Sensitive siRNA Nanovector for Targeted Gene Silencing and Cytotoxic Effect in Cancer Cells" molecular Pharmaceutics vol. 7, No. 6, 1930-1939, 2010.

Rhaese et al., "Human serum albumin-polyethylenimine nanoparticles for gene delivery" Journal of Controlled Release 92 (2003) 199-208.

Thibaudeau et al., "Synthesis and Evaluation of Insulin-Human Serum Albumin Conjugates" Bioconjugate Chem. vol. 16, No. 4, pp. 1000-1008, 2005.

Zhu et al., "Application of virus targeting nano-carrier drug delivery system in virus-induced central nervous system diseases treatment" ACS Applied Materials & Interfaces, 2019, vol. 11, No. 21, pp. 19006-19016, DOI: 10.1021/acsami.9b06365.

Huang et al., "Polyethylenimine modified with 2,3-dimethylmaleic anhydride potentiates the antitumor efficacy of conventional chemotherapy", Materials Science and Engineering C 102: 558-568, 2019. doi: 10.1016/j.msec.2019.04.081. Epub Apr. 26, 2019. PMID: 31147028.

* cited by examiner

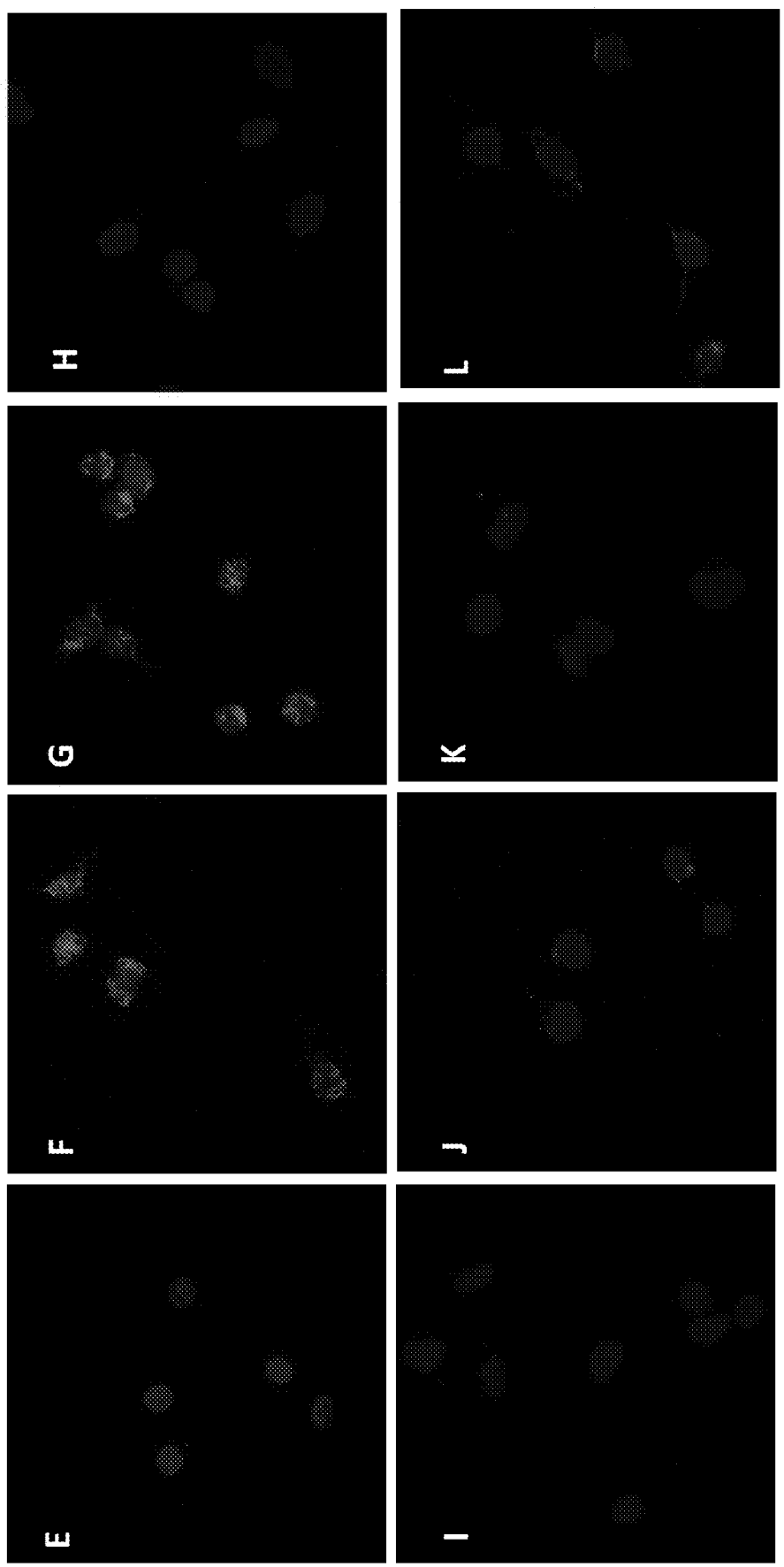
Figure 5E-L

NT — No treatment
D — Darpin
0 — Darpin-HSA- 0
R — Ras Inhibitor
H — HSA PEI-8
I — Irrelevant VHH-HSA PEI -8
B1 — Darpin-HSA PEI-8 (Bacth 1)
B2 — Darpin-HSA PEI-8 (Batch 2)

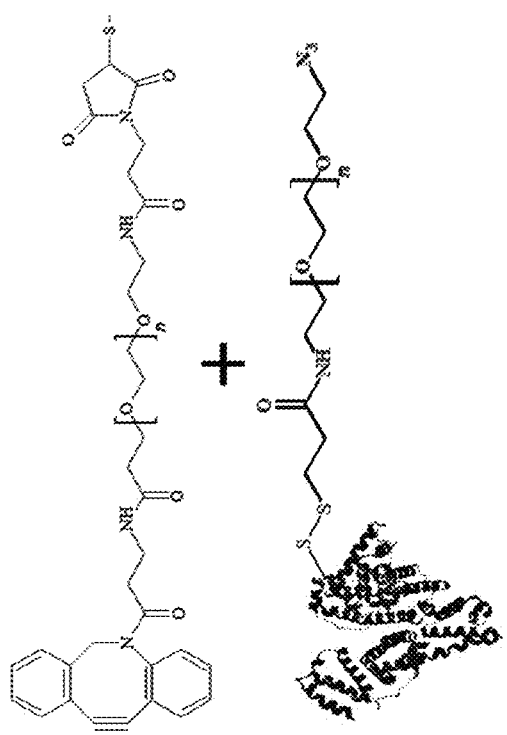
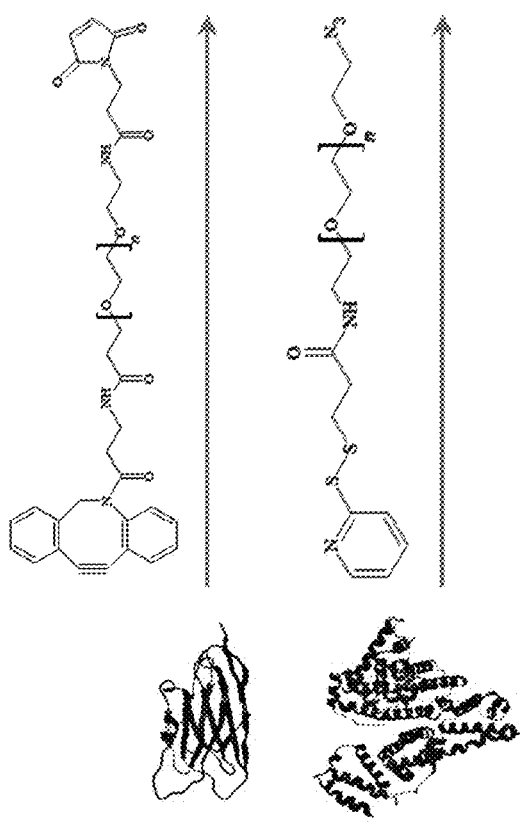
Figure 36 continued_1

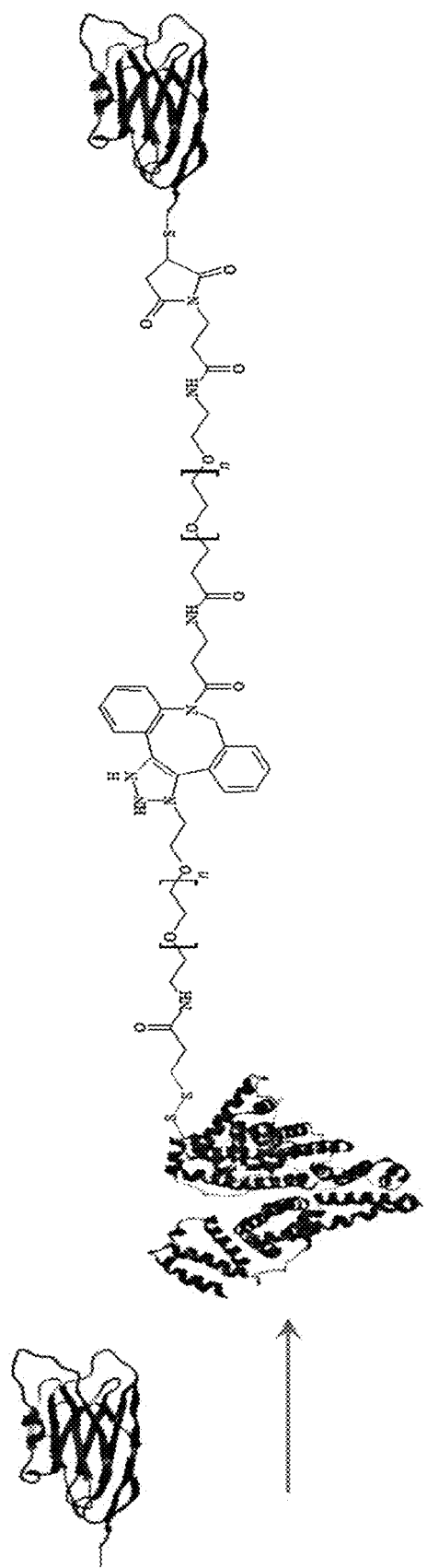
Figure 36 continued_1

INTRACELLULAR DELIVERY COMPOSITIONS

CROSS REFERENCE TO RELATED APPLICATIONS

This application is a Bypass Continuation of PCT Patent Application No. PCT/IL2022/050411 having International filing date of Apr. 20, 2022, which claims the benefit of priority of U.S. Provisional Patent Application No. 63/177,144, filed on Apr. 20, 2021, the contents of which are hereby incorporated by reference in their entirety.

REFERENCE TO AN ELECTRONIC SEQUENCE LISTING

The contents of the electronic sequence listing (BDB-P-013-US.xml; Size: 26,139 bytes; and Date of Creation: Oct. 12, 2023) is herein incorporated by reference in its entirety.

FIELD OF INVENTION

The present invention is in the field of protein intracellular delivery.

BACKGROUND OF THE INVENTION

In the search of new and potent therapeutic targets, especially in the field of oncology, it is very difficult to target intracellular targets, in particular targets that are deemed "undruggable". Such targets cannot be targeted by small-molecule drugs, mainly because the required therapeutic intervention involves interfering with protein-protein interactions, where small molecule drugs have not been able to exhibit efficacy and/or sufficient selectivity. While such targets and biological processes are classically and efficiently addressed by biologic agents, e.g., monoclonal antibodies, receptors, interleukins, and their derivatives and combinations, such agents cannot easily enter living cells, especially cellular compartments that are clinically relevant, such as the cytoplasm, nucleus, ER, etc. This is because the outer cell membrane is impermeable to protein-based molecules.

In cases where protein-based molecules are internalized to living cells by a natural endocytosis-based mechanism, this protein-based molecule will enter the endosomal pathway, which leads it to lysosomal degradation. Therefore, this route is naturally only relevant to the treatment of lysosomal disorders or to antibody-drug conjugates (ADC). In the former, the therapeutic protein-based agent is aimed to exert its activity in endosomes or lysosomes and is generally designed or is naturally suited to withstand the conditions of the endosome/lysosome. In the latter, the antibody is used purely for targeting/delivery of a small-molecule drug to specific cells, and lysosomal degradation of the antibody carrier releases the small-molecule drug, usually a cellular toxin.

However, if the protein is itself the therapeutic and not merely a targeting moiety, the technology of the invention should further enable what is known as "endosomal escape". This crucial step frees the therapeutic biologic from the vesicles of the different stages of the endosomal pathway, i.e., early or late endosomes and lysosomes, in order to avoid catabolism of the therapeutic agent by this cellular machinery.

Following a successful escape from the endosomes, the therapeutic agent is released to the cell's cytoplasm. However, the cytoplasm is a crowded environment and not hospitable to most biologic therapeutic agents that are employed currently, e.g., monoclonal antibodies and their derivatives. The therapeutic biologic must be efficiently dispersed in the cytoplasm in order to locate and engage its therapeutic target or, alternatively, reach a target intracellular organelle, such as the nucleus, endoplasmic reticulum (ER), mitochondria, etc.

The most potent biologic agents that are designed and clinically used to block protein-protein interactions or that can be used as agonists, are based on antibodies, mainly monoclonal antibodies or their derivatives, such as Fabs, scFvs and their combinations. All these agents structurally and functionally depend on disulfide bonds, either intra or inter-chain. These di-sulfide bonds are instable in the reducing environment of the cytoplasm. This reducing environment, a result of the high concentration of reducing agents, most prominent of these is glutathione, causes the reduction of the disulfide bridges in such therapeutic agents causing them to lose their structure and hence their ability to engage their target. An efficient intracellular delivery technology should thus utilize cytoplasmic stable agents or offer some method of protecting the delivered agents from this reducing environment.

Beyond this, an intracellular delivery technology must have an adequate pharmacokinetic and pharmacodynamic behavior, enabling the efficient delivery of its therapeutic payload to various organs and tissues throughout the living body.

One of the classical and most researched intracellular delivery techniques involves the use of enhanced positive charge of a payload. The most classical approach evolved from the understanding of intracellular uptake mechanisms employed by viruses. The latter employ positively charged peptides, rich with Arginine and Lysine amino acids, such as the famous HIV-derived TAT peptide (RKKRRQRRR (SEQ ID NO: 16)). This approach yielded numerous cell-penetrating peptides (CPPs) with different charges, amino acid sequences, additional modifications and structures (linear, cyclic, etc.) that were fused or chemically conjugated to a variety of payloads or used to decorate various nanoparticles. While CPPs exhibit the ability to internalize into cells, their endosomal escape efficiency is still debated, and their overall efficiency seems to be insufficient to be used in real pharmaceutical applications.

More efficient methods of delivering protein-based therapeutics into the cytoplasm of cells beyond standard CPPs and with improved biodistribution and pharmacodynamics is greatly needed.

SUMMARY OF THE INVENTION

The present invention provides protein conjugates comprising a protein carrier comprising polyethyleneimine, a payload that interacts with an intracellular target and a linker linking them. Pharmaceutical compositions comprising the protein conjugates as well as methods of using and producing the protein conjugates are also provided.

According to a first aspect, there is provided a protein conjugate, comprising:
 a. a protein carrier covalently bound to a plurality of polyethyleneimine (PEI) moieties;
 b. a payload that interacts with an intracellular target; and
 c. a linker bound to the protein carrier and to the payload via a covalent bond;

wherein the payload is devoid of a disulfide bond that when cleaved diminishes interaction with the intracellular target and wherein the protein conjugate is not a fusion protein.

According to another aspect, there is provided a protein conjugate, comprising:
a. HSA covalently bound to a plurality of polyethyleneimine (PEI) moieties and characterized by a positive zeta potential of at least 8 mV;
b. a single domain antibody; and
c. a linker bound to the HSA and to the single domain antibody via a covalent bond;
and wherein the protein conjugate is not a fusion protein.

According to another aspect, there is provided a method of producing a protein conjugate capable of binding an intracellular target, the method comprising:
a. providing a payload that binds the intracellular target and is devoid of a disulfide bond that when cleaved diminishes binding to the intracellular target;
b. providing a protein carrier covalently bound to a plurality of PEI moieties;
c. covalently linking the selected payload to the selected protein carrier via a linker to produce a protein conjugate;
d. determining stability of the linker in human blood, plasma or serum; and
e. selecting a protein conjugate comprising a linker that is stable in the human blood, plasma or serum;
thereby producing a protein conjugate capable of binding an intracellular target.

According to another aspect, there is provided a protein conjugate produced by a method of the invention.

According to another aspect, there is provided a pharmaceutical composition, comprising a protein conjugate of the invention and a pharmaceutically acceptable carrier, excipient or adjuvant.

According to another aspect, there is provided a method of binding an intracellular target, the method comprising contacting a cell expressing the intracellular target with a protein conjugate of the invention or a pharmaceutical composition of the invention, wherein the biological payload binds the intracellular target, thereby binding the intracellular target.

According to another aspect, there is provided a method of binding an intracellular target, the method comprising:
a. producing a protein conjugate capable of binding the intracellular target by a method of the invention; and
b. contacting a cell expressing the intracellular target with the produced protein conjugate;
thereby binding the intracellular target.

According to some embodiments, the PEI is a linear PEI or a branched PEI having a molecular weight of less than 2000 Daltons.

According to some embodiments, the plurality of PEI moieties comprises between 3 and 90 molecules.

According to some embodiments, the payload is an antigen binding molecule that binds the intracellular target.

According to some embodiments, the antigen binding molecule is selected from a single chain antibody, a single domain antibody, a variable heavy homodimer (VHH), a nanobody, an immunoglobulin novel antigen receptor (IgNAR), a designed ankyrin repeat protein (DARPin) and an antibody mimetic protein.

According to some embodiments, the antigen binding molecule is selected from a VHH and a DARPin.

According to some embodiments, the protein carrier is a plasma endogenous protein.

According to some embodiments, the protein carrier is at least 60 KDa in size.

According to some embodiments, the protein carrier is selected from human serum albumen (HSA), fibrinogen, IgG, green fluorescent protein (GFP) and a designed ankyrin repeat protein (DARPin).

According to some embodiments, the protein carrier is HSA.

According to some embodiments, the protein carrier is HSA, and wherein the protein carrier comprises between 3 and 10 PEI molecules.

According to some embodiments, the linker comprises a biocompatible polymer.

According to some embodiments, the biocompatible polymer comprises polyethylene glycol (PEG).

According to some embodiments, the linker comprises a bio-cleavable bond.

According to some embodiments, the bio-cleavable bond comprises a disulfide bond.

According to some embodiments, the linker is substantially stable in blood for at least 24 hours.

According to some embodiments, stable comprises less than 25% cleavage in blood after 24 hours.

T According to some embodiments, the bio cleavable bond is sterically hindered.

According to some embodiments, the HSA comprises the amino acid sequence of SEQ ID NO: 1, or a fragment or homolog thereof comprising cysteine 34 (C34).

According to some embodiments, the linker is bound to the HSA via a disulfide bond.

According to some embodiments, the linker is bound to the C34 of HSA.

According to some embodiments, the disulfide bond is proximal to the C34.

According to some embodiments, the proximal is at a distance from the C34 ranging from 5 to 15 angstroms.

According to some embodiments, the linker is a peptide linker.

According to some embodiments, the linker is selected from SEQ ID NO: 4-15.

According to some embodiments, the protein carrier is devoid of DNA.

According to some embodiments, the biological payload does not bind a cell surface protein.

According to some embodiments, the protein carrier covalently bound to a plurality of PEI moieties is characterized by a positive zeta potential of at least 8 mV.

According to some embodiments, the HSA comprises between 3 and 10 PEI molecules.

According to some embodiments, the protein conjugate further comprises a detectable tag, optionally wherein the tag is conjugated to the biological payload.

According to some embodiments, the protein conjugate is a blood-stable conjugate.

According to some embodiments, the protein conjugate is a cell-penetrating conjugate.

According to some embodiments, the determining is performed before formation of the protein conjugate or after formation of the protein conjugate.

According to some embodiments, the method comprises confirming binding of the biological payload to the intracellular target.

According to some embodiments, the protein carrier bound to a plurality of PEI moieties is characterized by a positive zeta potential of at least 8 mV.

According to some embodiments, the protein carrier comprises HSA.

According to some embodiments, the protein carrier is covalently bound to at least 3 molecules of PEI.

According to some embodiments, the method further comprises contacting the selected protein conjugate to a cell and confirming the biological payload enters a cytoplasm of the cell.

According to some embodiments, stable comprises less than 25% cleavage in blood after 24 hours and unstable comprises at least 50% cleavage in the cytoplasmic conditions after 24 hours.

According to some embodiments, the linker comprises a biocompatible polymer.

According to some embodiments, the covalently linking is via a click reaction.

According to some embodiments, the payload is covalently bound to a linker comprising a first reactive group; and wherein the protein carrier is covalently bound to a linker comprising a second reactive group having reactivity to the first reactive group.

According to some embodiments, the covalently linking is by reacting the first reactive group with the second reactive group, thereby covalently linking the payload and the protein carrier.

According to some embodiments, the linker comprises a bio-cleavable bond.

According to some embodiments, covalently linking comprises disulfide bond formation.

According to some embodiments, (i) the payload is covalently bound to a linker capable of generating a disulfide bond with a cysteine of the protein carrier; or (ii) the protein carrier is covalently bound to a linker capable of generating a disulfide bond with a cysteine of the payload, and wherein bound is optionally via a disulfide bond.

According to some embodiments, the method further comprises determining stability of the linker in cytoplasmic conditions and selecting a protein conjugate comprising a linker that is unstable in the cytoplasmic conditions.

According to some embodiments, the pharmaceutical composition is formulated for systemic administration.

According to some embodiments, the method is a method of detecting an intracellular target and the protein conjugate comprises a detectable tag, and wherein the method further comprises detecting the detectable tag.

According to some embodiments, the method is a method of modulating the intracellular target and wherein the payload is an agonist or antagonist of the intracellular target.

According to some embodiments, the cell is in a subject and wherein the contacting comprises administering the protein conjugate to the subject.

According to some embodiments, the method is a method of treating a condition in a subject in need thereof, wherein the condition is treatable by modulation of the intracellular target.

According to some embodiments, the condition is cancer, the intracellular target is oncogenic and the biological payload is an antagonist.

According to some embodiments, the contacting is not in the presence of an agent other than the carrier protein designed to induce penetration of the protein conjugate to the cell.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5A-5M: (5A, 5C) Line graphs of apoptosis as measured by red Annexin V fluorescence in A375 cells treated with (5A) 1 µM of or (5C) 3 µM of the various agents. (5B, 5D) Bar graph quantification and normalization of the red fluorescence per cell titer in (5B) 5A and (5D) 5C. (5E-5L) Confocal microscopy images of A375 cells stained with an anti-VHH antibody following a 2 hour incubation with (5E) 1C5-Hel20-LC; (5F) 1C5-Hel20-LC-S—S-HSA-PEI×3.5; (5G) 1C5-Hel20-LC-HSA-PEI×3.5; (5H) 1C5-Hel20-LC-S—S-PEG12-CO—NH-PEI600; (5I) 1C5-Hel20-LC-PEG8-CO—NH-PEI600; (5J) 1C5-Hel20-LC-S—S-PEG12-CO—NH-PEI1800; (5K) 1C5-Hel20-LC-PEG8-CO—NH-PEI1800; (5L) 1C5-Hel20-LC-r-CO—NH-PEI1800. Anti-VHH antibodies—Red; Nuclear staining—Blue. (5M) Line graph of caspase 3/7 positive cell apoptosis events over time in A375 cells treated with various agents.

FIG. 13A represents PEI-modified carrier bound to two VHH molecules via a PEG linker. FIGS. 13B-D schematically represent an exemplary protein conjugate, wherein the PEG-based linker is covalently bound to the carrier via S—S bond. The PEG-based linker is further conjugated to a Cysteine of the VHH molecule (13B) via a disulfide bond (C1), (13C) via a conjugation product of maleimide and the cysteine (C2), (13D) or by a click reaction of dibenzyl cyclooctyne (DBCO) and azide (C3).

DETAILED DESCRIPTION OF THE INVENTION

Figure 1:
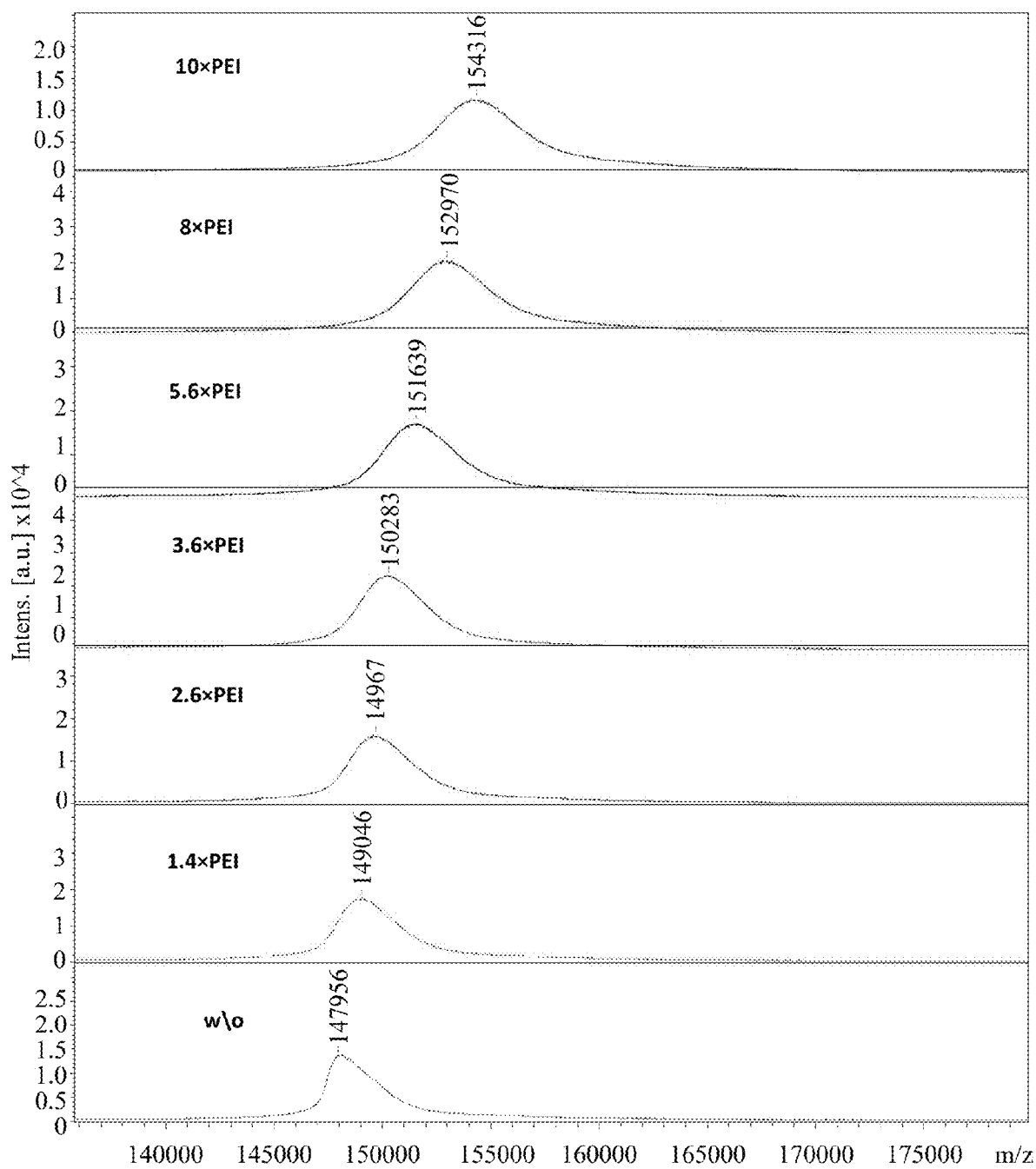
FIG. 1: MALDI-ToF spectra of non-modified and PEI-modified mouse IgG at various modification levels.

The present invention, in some embodiments, provides a protein conjugate, comprising a protein carrier covalently bound to a cell penetrating moiety; a payload; and a linker bound to the protein carrier and to the payload via a covalent bond.

In some embodiments, the protein carrier is a protein with a long serum half-life. In some embodiments, the protein carrier is a protein found in blood. In some embodiments, the carrier protein comprises a molecular weight of at least 60 kDa. In some embodiments, the carrier protein comprises a molecular weight of at least 65 kDa. In some embodiments, the carrier protein comprises a molecular weight of at least 70 kDa. In some embodiments, the carrier protein comprises a molecular weight of less than 200, 190, 180, 170, 160, 150, 140, 130, 120, 110, 100, 95, 90, 85, 80, 75, or 70 kDa. Each possibility represents a separate embodiment of the invention. In some embodiments, the carrier protein comprises an isoelectric point of at most 7. In some embodiments, the protein carrier is a human protein. In some embodiments, the protein carrier is albumin. In some embodiments, the albumin is serum albumin. In some embodiments, the serum albumin is human serum albumin (HSA). In some embodiments, the protein carrier is human serum albumin (HSA).

In some embodiments, the protein carrier is covalently bound to one or more cell penetrating moieties. In some embodiments, the protein carrier is covalently bound to a single cell penetrating moiety. In some embodiments, the protein carrier is covalently bound to a plurality of cell penetrating moieties.

In some embodiments, the cell penetrating moiety comprises a cell-internalizing molecule. In some embodiments, the cell penetrating moiety is configured to internalize the protein conjugate of the invention into the cell. In some embodiments, the cell penetrating moiety is configured to induce or enhance cellular internalization of the protein conjugate of the invention. In some embodiments, the cell penetrating moiety is configured to enhance cell penetration or internalization of the protein conjugate of the invention, compared to a control (e.g., protein conjugate without the cell penetrating moiety).

In some embodiments, enhance is by at least 20%, at least 50%, at least 100%, at least 1000%, at least 10000%, at least 100000%, including any range between, compared to a control. Each possibility represents a separate embodiment of the invention.

In some embodiments, the cell penetrating moiety of the invention comprises an alkyl amine, a cationic polymer, or a combination thereof. In some embodiments, the cell penetrating moiety comprises a cationic polymer. In some embodiments, the cell penetrating moiety comprises an alkyl amine.

In some embodiments, the cationic polymer comprises a plurality of amine groups. In some embodiments, the cationic polymer comprises a primary amine group, a secondary amine group, a tertiary amine group, or any combination thereof. In some embodiments, the cationic polymer is capable of undergoing ionization (positive ionization) within a solution having a pH value below the pKa value of the amine group of the cationic polymer. In some embodiments, the cationic polymer is capable of undergoing protonation within a solution having a pH value below the pKa value of the amine group of the cationic polymer.

In some embodiments, at least 50% by weight of the cationic polymer is positively charged (or protonated) within a solution having a pH value below the pKa value of the amine group of the cationic polymer. In some embodiments, the cationic polymer undergoes multiple protonation within a solution, resulting in a plurality of positive surface charges, wherein the solution is as described herein.

In some embodiments, the cationic polymer comprises a polyamine. In some embodiments, the cationic polymer comprises polyethyleneimine (PEI). In some embodiments, the polyamine comprises primary amines. In some embodiments, the polyamine comprises secondary amines. In some embodiments, the polyamine comprises tertiary amines. In some embodiments, the polyamine comprises primary, secondary and tertiary amines. Polyamines are well known in the art and include for example polyethyleneimine and polypropyleneimine to name but a few.

In some embodiments, the cationic polymer of the invention is or comprises polyethyleneimine (PEI).

In some embodiments, the PEI comprises a linear PEI. In some embodiments, the PEI comprises a branched PEI. In some embodiments, the PEI (e.g., branched or linear PEI) is characterized by a number average molar mass (Mn) of less than 5000 Da, less than 4000 Da, less than 3000 Da, less than 2000 Da, less than 1500 Da, less than 1000 Da, less than 800 Da, including any range between.

In some embodiments, the cell penetrating moiety of the invention is characterized by MW (e.g., an average molecular weight) of between 100 and 2000 Da, between 200 and 5000 Da, between 200 and 3000 Da, between 500 and 5000 Da, between 500 and 2000 Da, between 500 and 3000 Da, between 100 and 300 Da, between 300 and 400 Da, between 400 and 500 Da, between 500 and 600 Da, between 600 and 700 Da, between 700 and 1000 Da, including any range between.

In some embodiments, the PEI is characterized by Mn of between 100 and 2000 Da, between 200 and 5000 Da, between 200 and 3000 Da, between 500 and 5000 Da, between 500 and 2000 Da, between 500 and 3000 Da, between 100 and 300 Da, between 300 and 400 Da, between 400 and 500 Da, between 500 and 600 Da, between 600 and 700 Da, between 700 and 1000 Da, including any range between.

In some embodiments, the cell penetrating moiety of the invention comprises a branched PEI characterized by Mn of between 500 and 700 Da, or between 500 and 2000 Da.

In some embodiments, the protein carrier comprises a plurality of cell penetrating moieties covalently bound thereto. In some embodiments, the plurality of cell penetrating moieties comprises between 2 and 100, between 3 and 100, between 3 and 90, between 4 and 100, between 4 and 90, between 4 and 10, between 4 and 40, between, 4 and 20, between 20 and 100, between 20 and 40, between 40 and 60, between 60 and 100, between 6 and 100, between 6 and 20 between 6 and 40, between 6 and 50, between 4 and 15, between 3 and 15, between 3 and 10, between 3 and 8, between 4 and 8, between 6 and 10, including any range between.

In some embodiments, the protein carrier comprises a plurality of PEI molecules covalently bound thereto. In some embodiments, the protein carrier comprises between 3 and 10 PEI molecules, between 3 and 5 PEI molecules, between 5 and 8 PEI molecules, between 8 and 10 PEI molecules, between 10 and 15 PEI molecules, between 15 and 20 PEI molecules covalently bound thereto, including any range between.

In some embodiments, the protein carrier comprises a size of at least 20, 25, 30, 35, 40, 45, 50, 55, 60, 65, 70, 75, or 80 KDa. Each possibility represents a separate embodiment of the invention. In some embodiments, the protein carrier comprises a size of at least 50 KDa. In some embodiments, the protein carrier comprises a size of at least 60 KDa. In some embodiments, the protein carrier comprises a size of at least 65 KDa.

In some embodiments, the protein carrier is a blood endogenous protein. In some embodiments, the protein is naturally found in blood. In some embodiments, blood is plasma. In some embodiments, the blood is mammalian blood. In some embodiments, the mammal is humans. In some embodiments, the blood endogenous protein is an albumin. In some embodiments, the blood endogenous protein is a globulin. In some embodiments, the blood endogenous protein is a fibrinogen. In some embodiments, the globulin is an immunoglobulin (Ig). In some embodiments, the Ig is IgG. In some embodiments, the Ig is IgA. In some embodiments, the Ig is IgM. In some embodiments, the blood endogenous protein is selected from HSA, fibrinogen, and IgG. In some embodiments, the blood endogenous protein is not a clotting protein. Blood endogenous proteins are well known in the art and include, for example, Prealbumin (transthyretin), Alpha 1 antitrypsin, Alpha-1-acid glycoprotein, Alpha-1-fetoprotein, alpha2-macroglobulin, Gamma globulins, Beta-2 microglobulin, Haptoglobin, Ceruloplasmin, Complement component 3, Complement component 4, C-reactive protein (CRP), Lipoproteins, (chylomicrons, VLDL, LDL, HDL), Transferrin, Prothrombin, and maltose binding protein (MBP) to name but a few. In some embodiments, the protein carrier is selected from human serum albumin (HSA), fibrinogen, IgG, a fluorescent protein (GFP) and a designed ankyrin repeat protein (DARPin). In some embodiments, the fluorescent protein is selected from green (GFP), red (RFP), blue (BFP) and yellow (YFP). In some embodiments, the fluorescent protein is GFP. In some embodiments, the protein carrier is HSA. In some embodiments, the protein carrier is fibrinogen. In some embodiments, the protein carrier is IgG.

In some embodiments, the protein carrier is or comprises HSA. In some embodiments, the protein carrier comprises a PEI modified HSA. In some embodiments, the protein conjugate comprises a payload bound to the protein carrier via a linker, wherein the linker is as described herein, and wherein the protein carrier is or comprises HSA covalently bound to (or modified by) between 3 and 20, between 3.5 and 20, between 3 and 10, between 3.5 and 10, between 3 and 8, between 3.5 and 8, between 3 and 5, between 5 and 8, between 8 and 10, between 10 and 15, between 3 and 10, between 3 and 15, between 4 and 20, between 4 and 10, between 3.5 and 6, between 3.5 and 15, between 3.5 and 8, between 3.5 and 12, between 3 and 12, between 3 and 17, between 3.5 and 17, between 3.5 and 15, between 4 and 8, between 6 and 10 PEI molecules, including any range between. In some embodiments, the number of PEI molecules described herein represents an average value. In some embodiments, the PEI molecules are characterized by an average MW of between 100 and 2000 Da, between 200 and 5000 Da, between 200 and 3000 Da, between 500 and 5000 Da, between 500 and 2000 Da, between 500 and 3000 Da, between 100 and 300 Da, between 300 and 400 Da, between 400 and 500 Da, between 500 and 600 Da, between 600 and 700 Da, between 700 and 1000 Da, including any range between.

In some embodiments, the conjugate comprises a payload. As used herein, the term "payload" refers to any molecule to be delivered into the cytoplasm of a target cell. In some embodiments, the payload binds an intracellular target. In some embodiments, the payload interacts with an intracellular target. In some embodiments, the payload modulates an intracellular target. In some embodiments, intracellular is cytoplasmic. In some embodiments, the payload is devoid of a disulfide bond that when cleaved diminishes interaction with the intracellular target. In some embodiments, the payload is devoid of a disulfide bond. In some embodiments, the payload is a molecule. In some embodiments, the payload is a biological payload. In some embodiments, the payload is a biological molecule. In some embodiments, the payload is organic. In some embodiments, the payload is a therapeutic molecule. In some embodiments, the payload is a detectable molecule. In some embodiments, the payload is a molecule capable of binding to a target. In some embodiments, the payload is a biologic. In some embodiments, the payload is a drug. In some embodiments, the payload is a protein or peptide. In some embodiments, the peptide or protein is an isolated protein or peptide. In some embodiments, the peptide or protein is a peptide or protein moiety. It will be understood that the protein need not be a complete protein but may be a portion or fragment of a protein. In some embodiments, the payload comprises or consists of amino acids. In some embodiments, the payload is a single amino acid chain. In some embodiments, the payload is a plurality of amino acid chains. In some embodiments, the payload is a bioactive molecule. In some embodiments, a bioactive molecule is a bioactive agent.

In some embodiments, the payload is a nucleic acid molecule. In some embodiments, the payload is DNA. In some embodiments, the payload is RNA. In some embodiments, the nucleic acid molecule is an oligonucleotide. In some embodiments, the payload is an aptamer. In some embodiments, the payload is a primer. In some embodiments, the payload is an antisense oligonucleotide. In some embodiments, the payload is a regulatory RNA. In some embodiments, the payload is plasmid. In some embodiments, the payload is an expression vector. In some embodiments, the vector is configured to expresses in a target cell. In some embodiments, the payload is gene therapy. In some embodiments, the nucleic acid molecule comprises an open reading frame. In some embodiments, the open reading frame encodes a therapeutic protein. Methods of conjugating nucleic acid molecules to chemical and amino acid linkers are well known in the art and any such method may be employed. In some embodiments, the nucleic acid molecule comprises a nuclear localization signal (NLS). In some embodiments, the payload is selected from a protein and a nucleic acid molecule.

The term "nucleic acid" is well known in the art. A "nucleic acid" as used herein will generally refer to a molecule (i.e., a strand) of DNA, RNA or a derivative or analog thereof, comprising a nucleobase. A nucleobase includes, for example, a naturally occurring purine or pyrimidine base found in DNA (e.g., an adenine "A," a guanine "G," a thymine "T" or a cytosine "C") or RNA (e.g., an A, a G, an uracil "U" or a C).

The terms "nucleic acid molecule" include but not limited to single-stranded RNA (ssRNA), double-stranded RNA (dsRNA), single-stranded DNA (ssDNA), double-stranded DNA (dsDNA), small RNA such as miRNA, siRNA and other short interfering nucleic acids, snoRNAs, snRNAs, tRNA, piRNA, tnRNA, small rRNA, hnRNA, lncRNA, circulating nucleic acids, fragments of genomic DNA or RNA, degraded nucleic acids, ribozymes, viral RNA or DNA, nucleic acids of infectious origin, amplification products, modified nucleic acids, plasmidical or organellar nucleic acids and artificial nucleic acids such as oligonucleotides.

As used herein, the term "oligonucleotide" refers to a short (e.g., no more than 100 bases), chemically synthesized single-stranded DNA or RNA molecule. In some embodiments, oligonucleotides are attached to the 5' or 3' end of a nucleic acid molecule, such as by means of ligation reaction.

The term "expression" as used herein refers to the biosynthesis of a gene product, including the transcription and/or translation of said gene product. Thus, expression of a nucleic acid molecule may refer to transcription of the nucleic acid fragment (e.g., transcription resulting in mRNA or other functional RNA) and/or translation of RNA into a precursor or mature protein (polypeptide).

Expressing of a gene within a cell is well known to one skilled in the art and herein its delivery may be performed by a method of the invention or using a composition of the invention. In some embodiments, the gene is in an expression vector such as plasmid or viral vector. The vector may be a viral vector. The viral vector may be a retroviral vector, a herpesviral vector, an adenoviral vector, an adeno-associated viral vector or a poxviral vector. The promoters may be active in mammalian cells. The promoters may be a viral promoter.

In some embodiments, the gene or open reading frame is operably linked to a promoter or other regulatory element. The term "operably linked" is intended to mean that the nucleotide sequence of interest is linked to the regulatory element or elements in a manner that allows for expression of the nucleotide sequence (e.g., in an in vitro transcription/translation system or in a host cell when the vector is introduced into the host cell by a method of the invention). In some embodiments, the regulatory element or promoter is active in a target cell.

The term "promoter" as used herein refers to a group of transcriptional control modules that are clustered around the initiation site for an RNA polymerase i.e., RNA polymerase II. Promoters are composed of discrete functional modules, each consisting of approximately 7-20 bp of DNA, and containing one or more recognition sites for transcriptional activator or repressor proteins.

In some embodiments, nucleic acid sequences are transcribed by RNA polymerase II (RNAP II and Pol II). RNAP II is an enzyme found in eukaryotic cells. It catalyzes the transcription of DNA to synthesize precursors of mRNA and most snRNA and microRNA.

In some embodiments, mammalian expression vectors include, but are not limited to, pcDNA3, pcDNA3.1 (±), pGL3, pZeoSV2(±), pSecTag2, pDisplay, pEF/myc/cyto, pCMV/myc/cyto, pCR3.1, pSinRep5, DH26S, DHBB, pNMT1, pNMT41, pNMT81, which are available from Invitrogen, pCI which is available from Promega, pMbac, pPbac, pBK-RSV and pBK-CMV which are available from Strategene, pTRES which is available from Clontech, and their derivatives.

In some embodiments, expression vectors containing regulatory elements from eukaryotic viruses such as retroviruses are used by the present invention. SV40 vectors include pSVT7 and pMT2. In some embodiments, vectors derived from bovine papilloma virus include pBV-1MTHA, and vectors derived from Epstein Bar virus include pHEBO, and p2O5. Other exemplary vectors include pMSG, pAV009/A+, pMTO10/A+, pMAMneo-5, baculovirus pDSVE, and any other vector allowing expression of proteins under the direction of the SV-40 early promoter, SV-40 later promoter, metallothionein promoter, murine mammary tumor virus promoter, Rous sarcoma virus promoter, polyhedrin promoter, or other promoters shown effective for expression in eukaryotic cells.

In some embodiments, recombinant viral vectors, which offer advantages such as lateral infection and targeting specificity, are used for in vivo expression. In one embodiment, lateral infection is inherent in the life cycle of, for example, retrovirus and is the process by which a single infected cell produces many progeny virions that bud off and infect neighboring cells. In one embodiment, the result is that a large area becomes rapidly infected, most of which was not initially infected by the original viral particles. In one embodiment, viral vectors are produced that are unable to spread laterally. In one embodiment, this characteristic can be useful if the desired purpose is to introduce a specified gene into only a localized number of targeted cells.

The term "bioactive" refers to a molecule or agent that exerts an effect on a cell or tissue. Representative examples of types of bioactive agents include therapeutics, vitamins, electrolytes, amino acids, peptides, polypeptides, proteins, enzymes, carbohydrates, lipids, polysaccharides, nucleic acids, nucleotides, polynucleotides, glycoproteins, lipoproteins, glycolipids, glycosaminoglycans, proteoglycans, growth factors, differentiation factors, hormones, neurotransmitters, prostaglandins, immunoglobulins, cytokines, and antigens. Various combinations of these molecules can be used. Examples of cytokines include macrophage derived chemokines, macrophage inflammatory proteins, interleukins, tumor necrosis factors. Examples of proteins include fibrous proteins (e.g., collagen, elastin) and adhesion proteins (e.g., actin, fibrin, fibrinogen, fibronectin, vitronectin, laminin, cadherins, selectins, intracellular adhesion molecules, and integrins). In various cases, the bioactive agent may be selected from fibronectin, laminin, thrombospondin, tenascin C, leptin, leukemia inhibitory factors, RGD peptides, anti-TNFs, endostatin, angiostatin, thrombospondin, osteogenic protein-1, bone morphogenic proteins, osteonectin, somatomedin-like peptide, osteocalcin, interferons, and interleukins. In some embodiments, the bioactive agent includes a growth factor, differentiation factor, or a combination thereof.

As used herein, the term "isolated peptide" refers to a peptide that is essentially free from contaminating cellular components, such as carbohydrate, lipid, or other proteinaceous impurities associated with the peptide in nature. Typically, a preparation of isolated peptide contains the peptide in a highly purified form, i.e., at least about 80% pure, at least about 90% pure, at least about 95% pure, greater than 95% pure, or greater than 99% pure.

As used herein, the terms "peptide", "polypeptide" and "protein" are used interchangeably to refer to a polymer of amino acid residues. In another embodiment, the terms "peptide", "polypeptide" and "protein" as used herein encompass native peptides, peptidomimetics (typically including non-peptide bonds or other synthetic modifications) and the peptide analogues peptoids and semipeptoids or any combination thereof. In another embodiment, the peptides polypeptides and proteins described have modifications rendering them more stable while in the body or more capable of penetrating into cells. In one embodiment, the terms "peptide", "polypeptide" and "protein" apply to naturally occurring amino acid polymers. In another embodiment, the terms "peptide", "polypeptide" and "protein" apply to amino acid polymers in which one or more amino acid residue is an artificial chemical analogue of a corresponding naturally occurring amino acid.

In some embodiments, the payload binds a cytoplasmic target. In some embodiments, the payload is specific to the cytoplasmic target. In some embodiments, specific comprises not significantly binding to any other target. In some embodiments, the payload is a binding molecule. In some embodiments, the payload hybridizes to its target. In some embodiments, the payload is complementary to its target. In some embodiments, the payload comprises complementarity determining regions (CDRs) that bind the target. In some embodiments, the payload is an antibody or antigen binding fragment thereof. The structure of antibodies is well known and though a skilled artisan may not know to what target an antibody binds merely by its CDR sequences, the general structure of an antibody and its antigen binding region can be recognized by a skilled artisan.

As used herein, the term "antibody" refers to a polypeptide or group of polypeptides that include at least one binding domain that is formed from the folding of polypeptide chains having three-dimensional binding spaces with internal surface shapes and charge distributions complementary to the features of an antigenic determinant of an antigen. An antibody typically has a tetrameric form, comprising two identical pairs of polypeptide chains, each pair having one "light" and one "heavy" chain. The variable regions of each light/heavy chain pair form an antibody binding site. An antibody may be oligoclonal, polyclonal, monoclonal, chimeric, camelised, CDR-grafted, multi-specific, bi-specific, catalytic, humanized, fully human, anti-idiotypic and anti-bodies that can be labeled in soluble or bound form as well as fragments, including epitope-binding fragments, variants or derivatives thereof, either alone or in combination with other amino acid sequences. An antibody may be from any species. The term antibody also includes binding fragments, including, but not limited to Fv, Fab, Fab', F(ab')2 single stranded antibody (svFC), dimeric variable region (Diabody) and disulphide-linked variable region (dsFv). In particular, antibodies include immunoglobulin molecules and immunologically active fragments of immunoglobulin molecules, i.e., molecules that contain an antigen binding site. Antibody fragments may or may not be fused to another immunoglobulin domain including but not limited to, an Fc region or fragment thereof. The skilled artisan will further appreciate that other fusion products may be generated including but not limited to, scFv-Fc fusions, variable region (e.g., VL and VH)-Fc fusions and scFv-scFv-Fc fusions.

Immunoglobulin molecules can be of any type (e.g., IgG, IgE, IgM, IgD, IgA and IgY), class (e.g., IgG1, IgG2, IgG3, IgG4, IgA1 and IgA2) or subclass.

In some embodiments, the antibody is a single chain antibody (ScFv). In some embodiments, the antibody is a single domain antibody. In some embodiments, the antibody is a camelid antibody. In some embodiments, the antibody is a shark antibody. In some embodiments, the antibody is a VHH. In some embodiments, the antibody comprises a heavy chain and a light chain. In some embodiments, the antibody is a heavy chain only antibody. In some embodiments, the antibody is an antibody mimetic. In some embodiments, the binding molecule or antibody mimetic is a DARPin. Regardless of the CDRs present antibodies, antibody fragments, ScFvs, nanobodies, VHHs, single domain antibodies, DARPins and the like can be structurally recognized by their non-variable regions. Thus, without being limited to a specific target a composition of the invention can be known to comprise these molecules as payload.

In some embodiments, the payload comprises a C-terminal cysteine amino acid. In some embodiments, the payload comprises a cysteine amino acid proximal to the C-terminus of the payload. In some embodiments, proximal is within 10, 9, 8, 7, 6, 5, 4, 3, 2, or 1 amino acid of the terminus. Each possibility represents a separate embodiment of the invention. In some embodiments, the payload comprises a tag. In some embodiments, the tag is a C-terminal tag. In some embodiments, the tag is C-terminal to the cysteine amino acid. In some embodiments, the tag is N-terminal to the cysteine amino acid. In some embodiments, the tag and cysteine amino acid are adjacent. In some embodiments, the cysteine amino acid is in the tag. In some embodiments, the tag comprises or consists of GGGGSC (SEQ ID NO: 9). In some embodiments, the payload comprises a C-terminal SEQ ID NO: 9.

In some embodiments, the protein conjugate comprises a payload bound to the protein carrier via a linker. In some embodiments, the protein conjugate is not a fusion protein. It will be understood by the skilled artisan that the payload and carrier are conjugated to each other by a separate linker. The linker is not part of the carrier and is also not a part of the payload, but rather is attached (conjugated) to each one and thereby links them.

In some embodiments, the protein conjugate comprises a payload bound to the protein carrier via a linker, wherein the linker is as described herein, and wherein the protein carrier is (e.g. HSA) is covalently bound to a plurality of PEI molecules sufficient for obtaining a protein carrier characterized by a positive zeta potential value of at least 6, at least 7, at least 8, at least 8.5, at least 9, at least 9.5, at least 10, at least 12 mV, or between 8 and 40, between 8.5 and 40, between 8 and 20, between 8.5 and 20, between 10 and 40, between 10 and 20, between 10 and 30 mV, including any range between. A skilled artisan will appreciate that the exact zeta potential value of the conjugate may vary, depending on the MW and/or size of the protein carrier, of the payload or both. In some embodiments, the carrier and cell penetrating moieties are characterized by a positive zeta potential value of at least 6, at least 7, at least 8, at least 8.5, at least 9, at least 9.5, at least 10, at least 12 mV, or between 8 and 40, between 8.5 and 40, between 8 and 20, between 8.5 and 20, between 10 and 40, between 10 and 20, between 10 and 30 mV, including any range between. Each possibility represents a separate embodiment of the invention. In some embodiments, the conjugate is characterized by a positive zeta potential value of at least 6, at least 7, at least 8, at least 8.5, at least 9, at least 9.5, at least 10, at least 12 mV, or between 8 and 40, between 8.5 and 40, between 8 and 20, between 8.5 and 20, between 10 and 40, between 10 and 20, between 10 and 30 mV, including any range between. Each possibility represents a separate embodiment of the invention.

Zeta potential may be measured by any method known in the art. Herein the following protocol is used and can be considered the standard for determining if a molecule comprises a zeta potential in the herein recited range. Zeta potential measurements were preformed using Zeta Sizer Ultra (Malvern Instruments). Samples' buffers were exchanged to 1 mM NaCl at 1 mg/mL protein concentration. 20 μL from each sample was loaded in zeta cells (DTS1070), five repeats for each sample were measured and the mean zeta potential in mV was obtained for each repeat. The average for the five measurements is reported with the standard deviation. The measurements were performed under the following conditions: temperature 25° C.; run numbers for each repeat 10-40; equilibration time: 60 seconds, without pause after sub runs; 60 seconds pause between repeats; voltage was selected automatic and monomodal analysis method was used in the data processing. In some embodiments, the zeta potential is measured in about 1 mM salt. In some embodiments, the salt is NaCl. In some embodiments, the zeta potential is measured at a protein concentration of about 1 mg/mL.

In some embodiments, the protein conjugate of the invention comprises the protein carrier covalently bound to the payload via a linker. In some embodiments, the payload is covalently bonded to the linker. In some embodiments, the carrier is covalently bonded to the linker. In some embodiments, the covalent bond is not a peptide bond. In some embodiments, the at least one of the bond between the linker and the payload and the bond between the linker and the carrier is not a peptide bond. In some embodiments, the carrier, linker and payload are not comprised in a single amino acid chain. In some embodiments, the protein conjugate of the invention comprises the protein carrier covalently bound to the payload via a linker, wherein the linker is a synthetic linker comprising at least one cleavable bond. In some embodiments, the protein conjugate of the invention comprises the protein carrier covalently bound to the payload via a linker, wherein the linker is a synthetic linker devoid of a cleavable bond. In some embodiments, the carrier and payload are not from the same protein. In some embodiments, the linker and the carrier are not from the same protein. In some embodiments, the linker is a peptide linker and comprises a sequence not present in the amino acid sequence of the protein from which the carrier is based. In some embodiments, the linker is a peptide linker and comprises a sequence not present in the amino acid sequence of the protein from which the payload is based. In some embodiments, the linker and the payload are not from the same protein. In some embodiment, the payload is not a naturally occurring molecule. In some embodiments, the payload is manmade. In some embodiments, the linker is not naturally occurring. In some embodiments, the linker is manmade. In some embodiments, the carrier is a naturally occurring protein or fragment thereof.

In some embodiments, the linker is a protein linker. In some embodiments, the linker is a peptide linker. In some embodiments, the linker is an amino acid linker. In some embodiments, the linker is a rigid linker. In some embodiments, the linker is a flexible linker. In some embodiments, the rigid linker is an alpha-helical peptide. In some embodiments, the linker comprises a C-terminal cysteine amino acid. In some embodiments, the linker comprises a cysteine amino acid proximal to the C-terminus of the linker. In some embodiments, proximal is within 10, 9, 8, 7, 6, 5, 4, 3, 2, or 1 amino acid of the terminus. Each possibility represents a separate embodiment of the invention. In some embodiments, the linker comprises an N-terminal cysteine and the payload comprises a C-terminal cysteine. It will be understood by a skilled artisan that the side chain of the cysteine comprises a sulfur atom that can be used to generate a cleavable disulfide bond. For example, the cysteine can form a disulfide bond with cysteine 34 of HSA.

In some embodiments, the alpha-helical peptide comprises or consists of AAASAEAAAKEAAAKEAAAKAAAGSG (SEQ ID NO: 6). In some embodiments, the alpha-helical peptide comprises or consists of AAASAEAAAKEAAAKEAAAKAAAGSGLC (SEQ ID NO: 10). In some embodiments, the alpha-helical peptide comprises or consists of AAASAEAAAKEAAAKEAAAKAAAGSGL (SEQ ID NO: 14). In some embodiments, the flexible linker is a GGGGS linker. In some embodiments, the flexible linker comprises between 1-5 GGGGS repeats. In some embodiments, 1-5 is 1-3. In some embodiments, 1-5 is 1. In some embodiments, 1-5 is 2. In some embodiments, 1-5 is 3. In some embodiments, the linker comprises or consists of GGGGSGGGGSGGGGLC (SEQ ID NO: 4). In some embodiments, the linker comprises or consists of GGGGSGGGGSGGGLGC (SEQ ID NO: 5). In some embodiments, the linker comprises or consists of GGGGSGGGGSGGGLG (SEQ ID NO: 7). In some embodiments, the linker comprises or consists of GGGGSGGGGSGGGSC (SEQ ID NO: 8). In some embodiments, the linker comprises or consists of GGGGSGGGGSGGGGS (SEQ ID NO: 12). In some embodiments, the linker comprises or consists of GGGGSC (SEQ ID NO: 9). In some embodiments, the linker comprises or consists of GGGGS (SEQ ID NO: 13). In some embodiments, the linker comprises or consists of GGGLGC (SEQ ID NO: 11). In some embodiments, the linker comprises or consists of GGGLG (SEQ ID NO: 15). In some embodiments, the linker comprises or consists of an amino acid sequence selected from SEQ ID NO: 4-15.

In some embodiments, the linker of the invention is substantially stable within a biological fluid (e.g., human blood, plasma or serum) for at least 2, at least 10, at least 24, at least 48 hours, including any range between. Each possibility represents a separate embodiment of the invention. In some embodiments, the linker of the invention is substantially stable within blood. In some embodiments, blood is human blood. In some embodiments, the linker of the invention is substantially stable within human blood for at least 1, 2, 3, 4, 5, 6, 7, 8, 9, 10, 11, 12, 18, 24, 36, 48 or 72 hours. Each possibility represents a separate embodiment of the invention.

In some embodiments, the linker of the invention is labile under exposure to cytoplasmic conditions. In some embodiments, cleavable is bio-cleavable. In some embodiments, the linker of the invention is cleavable under exposure to cytoplasmic conditions, so as to release the payload to a cytosol. In some embodiments, the linker and/or the protein conjugate of the invention is substantially stable under cytoplasmic conditions, wherein substantially stable is as described herein.

In some embodiments, the protein conjugate of the invention is substantially devoid of a biocleavable bond (e.g., a bond cleavable under exposure of the protein conjugate to cytoplasmic conditions). In some embodiments, the linker is substantially devoid of a biocleavable bond. In some embodiments, the linker is attached to the protein carrier and/or to the payload via a non-biocleavable bond (e.g., an amide bond, a click reaction product, a thioether bond, etc.).

In some embodiments, the protein conjugate of the invention comprises a bio cleavable bond. In some embodiments, the protein carrier and/or the payload is bound to the linker via the biocleavable bond. In some embodiments, the linker of the invention comprises a bio cleavable bond. In some embodiments, the bio cleavable bond is substantially stable within a biological fluid (e.g., human blood, plasma or serum) for at least 2 h, at least 10 h, at least 24 h, at least 48 h, including any range between. In some embodiments, cleavable is cleavable in the cytoplasm. In some embodiments, cleavable is not cleavable in serum or blood. In some embodiments, not cleavable is not substantially cleavable. In some embodiment, bio cleavable in the cytoplasm is significantly more cleaved in the cytoplasm than in blood.

In some embodiments, the bio cleavable bond is cleavable under exposure to cytoplasmic conditions. In some embodiments, the bio cleavable bond is reducible under exposure to cytoplasmic conditions (e.g., intracellular compartment, comprising inter alia acidic pH conditions and/or reducing agents such as glutathione).

Bio cleavable bonds are well-known in the art, and refer to bonds which are selectively cleaved after entering the cell (intracellular cleavage). The preferred linkages for release of drugs within the cell are cleavable in acidic conditions like those found in lysosomes. One example is a disulfide bond. It is postulated, that the disulfide bond is cleaved upon entering the cell by glutathione.

In some embodiments, the bio cleavable bond is or comprises a disulfide bond. In some embodiments, the bio cleavable bond comprises a plurality of disulfide bonds. In some embodiments, the bio cleavable bond is sterically hindered. In some embodiments, the bio cleavable bond is or comprises a sterically hindered disulfide bond.

In some embodiments, a biological fluid is a bodily fluid. In some embodiments, the biological fluid is selected from at least one of: blood, serum, plasma, gastric fluid, intestinal fluid, saliva, bile, tumor fluid, breast milk, urine, interstitial fluid, cerebral spinal fluid and stool. In some embodiments, the biological fluid is blood. In some embodiments, the biological fluid is serum. In some embodiments, the biological fluid is plasma.

In some embodiments, the sterically hindered disulfide bond comprises a side group or a bulky moiety adjacent thereto. In some embodiments, the side group or the bulky moiety is located in close proximity to at least one sulfur atom of the disulfide bond. In some embodiments, adjacent or in close proximity comprises a distance ranging between 0 and 10, between 0 and 2, between 2 and 5, between 5 and 10 atomic bonds, including any range between. In some embodiments, the term "atomic bond" as used herein, refers to carbon-carbon (C—C) bond length, e.g., a single C—C bond length.

In some embodiments, the sterically hindered disulfide bond comprises a side group or a bulky moiety adjacent thereto (e.g., positioned at a distance ranging from 1 to 15 Å, from 1 to 3 Å, from 3 to 5 Å, from 5 to 10 Å, from 10 to 15 Å from a sulfur atom of the disulfide bond, including any range between).

In some embodiments, the side group or a bulky moiety comprises an alkyl (e.g., a primary, a secondary or a tertiary C1-C10 alkyl, optionally comprising an unsaturated bond and/or a substituent), an aromatic ring, an amino acid comprising a sterically hindered side chain (e.g., leucin, valine, isoleucine, phenylalanine, histidine, tyrosine, and tryptophan), or a protein, or any combination thereof. In some embodiments, the side group or the bulky moiety is covalently bound to a methylene group adjacent to the disulfide bond.

In some embodiments, the disulfide bond is located adjacent to the payload and/or to the protein carrier of the invention, wherein adjacent is as described herein. In some embodiments, the payload and/or the protein carrier of the invention is bound to the linker via a disulfide bond. In some embodiments, the disulfide bond is proximal or adjacent to the protein carrier.

In some embodiments, the protein carrier of the invention (e.g., HSA) is bound to the linker via a disulfide bond. In some embodiments, the HSA comprises the amino acid sequence of DAHKSEVAHRFKDLGEENFKALVLIA-FAQYLQQCPFEDHVKLVNEVTEFAKTCVA DESAE-NCDKSLHTLFGDKLCTVATLRETYGEMADC-CAKQEPERNECFLQHKDDN PNLPRLVRPEVDVMCTAFHDNEETFLKKYLYEIAR-RHPYFYAPELLFFAKRYKAAF TECCQAADKAA-CLLPKLDELRDEGKAS SAKQRLKCASLQKFGER-AFKAWAVARL SQRFPKAEFAEVSKLVTDLTKVHTECCHGDLLEC-ADDRADLAKYICENQDSISSKL KECCEKPLLEKSH-CIAEVENDEMPADLPSLAADFVESKDVCKNY-AEAKDVFLGNIF LYEYARRHPDYSVVLLLRLAKTYETTLEKC-CAAADPHECYAKVFDEFKPLVEEPQ NLIKQNCELF-EQLGEYKFQNALL-VRYTKKVPQVSTPTLVEVSRNLGKVGSKCCKH PEAKRMPCAEDYLSVVLNQLCVLHEKTPVS-DRVTKCCTESLVNRRPCFSALEVDE TYVPKEF-NAETFTFHADICTLSEKERQIK-KQTALVELVKHKPKATKEQLKAVMDD FAAFVEKCCKADDKETCFAEEGKKLVAASQAALGL (SEQ ID NO: 1), or a fragment or homolog thereof. SEQ ID NO: 1 provides the sequence of HSA without a signal peptide. In some embodiments, the HSA comprises a signal peptide. In some embodiments, the signal peptide comprises or consists of MKWVTFISLLFLFSSAYSRGVFRR (SEQ ID NO: 17).

In some embodiments, the HSA is a fragment of HSA. In some embodiments, a fragment comprises at least 50, 60, 70, 80, 90, 95, 99 or 100% of HSA. Each possibility represents a separate embodiment of the invention. In some embodiments, the fragment comprises at least 50, 100, 150, 200, 250, 300, 350, 400, 450, 500, 550 or 600 amino acids from HSA. Each possibility represents a separate embodiment of the invention. In some embodiments, the amino acids are sequential amino acids. In some embodiments, the HSA is a homolog of HSA. In some embodiments, a homolog of HSA comprises an amino acid sequence with at least 70%, 75%, 80%, 85%, 90%, 95%, 97% or 99% homology to SEQ ID NO: 1. Each possibility represents a separate embodiment of the invention. In some embodiments, the HSA comprises an amino acid sequence with at least 70% homology to SEQ ID NO: 1. In some embodiments, the HSA consists of SEQ ID NO: 1 or a fragment or homolog thereof. In some embodiments, homology is sequence identity. In some embodiments, the HSA consists of an amino acid sequence with at least 70% homology to SEQ ID NO: 1. In some embodiments, the HSA consists of SEQ ID NO: 1. In some embodiments, the HSA comprises a free cysteine. In some embodiments, the free cysteine is cysteine C34. In some embodiments, a free cysteine is only a single free cysteine. In some embodiments, the linker of the invention is bound to C34 of HSA via a disulfide bond.

In some embodiments, fibrinogen is fibrinogen alpha chain (FGA) In some embodiments, the FGA comprises the amino acid sequence of ADSGEGDFLAE-GGGVRGPRVVERHQSACKDSDWPFCSD-EDWNYKCPSGCRMKG LIDEVNQDFTNRIN-KLKNSLFEYQKNNKDSHSLTTNIMEILRGDFSSANNR DNTYN RVSEDLRSRIEVLKRKVIEKVQHIQLLQKNVRAQLVD MKRLEVDIDIKIRSCRGSCS RAL-AREVDLKDYEDQQKQLEQVIAKDLLPSRDRQHLP-LIKMKPVPDLVPGNEKSQ LQKVPPEWKA-LTDMPQMIRMELERPGGNEITRGGSTSYGTGSETESP RNPSSAGSW NSGSSGPG-STGNRNPGSSGTGGTATWKPGSSGPG-STGSWNSGSSGTGSTGNQNPG SPRPG-STGTWNPGSSERGSAGHWTSESSVSGSTGQWHSESG SFRPDSPGSGNARPN NPDWGTFEEVSGNVSPGTR-REYHTEKLVTSKGDKELRTGKEKVTSGSTTTTRRSC SKTVTKTVIGPDGHKEVTKEVVT-SEDGSDCPEAMDLGTLSGIGTLDGFRHRHPDE AAF-FDTASTGKTFPGFFSPMLGEFVSETESRGSES-GIFTNTKESSSHHPGIAEFPSRG KSSSYSKQFTSSTSYNRGDSTFESKSYK-MADEAGSEADHEGTHSTKRGHAKSRPV RDCDDVLQTHPSGTQS-GIFNIKLPGSSKIFSVYCDQET-SLGGWLLIQQRMDGSLNE NRTWQDYKRGEGSLN-DEGEGEFWLGNDYLHLLTQRGSVLRVELEDWAGNEA-YA EYHFRVGSEAEGYALQVSSYEGTAGDALIEGSVEE-GAEYTSHNNMQFSTFDRDAD QWEEN-CAEVYGGGWWYN-NCQAANLNGIYYPGGSYDPRNNSPYEIENGVVWVSF RGADYSLRAVRMKIRPLVTQ (SEQ ID NO: 2), or a fragment or homolog thereof. SEQ ID NO: 2 provides the sequence of fibrinogen without a signal peptide. In some embodiments, the fibrinogen comprises a signal peptide. In some embodiments, the signal peptide comprises or consists of MFSMRIVCLVLSVVGTAWT (SEQ ID NO: 3). In some embodiments, the FGA is a fragment of FGA. In some embodiments, a fragment comprises at least 50, 60, 70, 80, 90, 95, 99 or 100% of FGA. Each possibility represents a separate embodiment of the invention. In some embodiments, the fragment comprises at least 50, 100, 150, 200, 250, 300, 350, 400, 450, 500, 550, 600, 650, 700, 750, 800 or 850 amino acids from FGA. Each possibility represents a separate embodiment of the invention. In some embodiments, the amino acids are sequential amino acids. In some embodiments, the FGA is a homolog of FGA. In some embodiments, homology is sequence identity. In some embodiments, a homolog of FGA comprises an amino acid sequence with at least 70%, 75%, 80%, 85%, 90%, 95%, 97% or 99% homology to SEQ ID NO: 2. Each possibility represents a separate embodiment of the invention. In some embodiments, the FGA consists of SEQ ID NO: 2 or a fragment or homolog thereof. In some embodiments, the FGA consists of an amino acid sequence with at least 70% homology to SEQ ID NO: 2. In some embodiments, the FGA consists of SEQ ID NO: 2.

In some embodiments, fibrinogen is fibrinogen beta chain (FGB) In some embodiments, the FGB comprises the amino acid sequence of QGVNDNEEGFFSARGHRPLDKKREE-APSLRPAPPPISGGGYRARPAKAAATQKKV ERKAP-DAGGCLHADPDLGVLCPTGCQLQEALLQQERPIRNS-VDELNNNVEAVSQT SSSSFQYMYLLKDLWQKRQKQVKDNENVVNEYS-SELEKHQLYIDETVNSNIPTNL RVLRSILENLR-SKIQKLESDVSAQMEYCRTPCTVSCNIPVVSGKE-CEEIIRKGGETSE MYLIQPDSSVKPYRVYCDMNTENGGWT-VIQNRQDGSVDFGRKWDPYKQGFGNV ATNTDGKNYCGLPGEYWLGNDKISQLTRMGPTELLI-EMEDWKGDKVKAHYGGF TVQNEANKYQ-ISVNKYRGTAGNALMDGASQLMGENRTM-TIHNGMFFSTYDRDN DGWLTSDPRKQCSKEDGGGWWYNRCHAANPN-GRYYWGGQYTWDMAKHGTDD GVVWMNWKGSWYSMRKMSMKIRPFFPQQ (SEQ ID NO: 19), or a fragment or homolog thereof. SEQ ID NO: 19 provides the sequence of fibrinogen without a signal peptide. In some embodiments, the fibrinogen comprises a signal peptide. In some embodiments, the signal peptide comprises or consists of MKRMVSWSFHKLKTM-KHLLLLLLCVFLVKS (SEQ ID NO: 18). In some embodiments, the FGB is a fragment of FGB. In some embodiments, a fragment comprises at least 50, 60, 70, 80, 90, 95, 99 or 100% of FGB. Each possibility represents a separate embodiment of the invention. In some embodiments, the fragment comprises at least 50, 100, 150, 200, 250, 300, 350, 400, 450, or 480 amino acids from FGB. Each possibility represents a separate embodiment of the invention. In some embodiments, the amino acids are sequential amino acids. In some embodiments, the FGB is a homolog of FGB. In some embodiments, homology is sequence identity. In some embodiments, a homolog of FGB comprises an amino acid sequence with at least 70%, 75%, 80%, 85%, 90%, 95%, 97% or 99% homology to SEQ ID NO: 19. Each possibility represents a separate embodiment of the invention. In some embodiments, the FGB consists of SEQ ID NO: 19 or a fragment or homolog thereof. In some embodiments, the FGB consists of an amino acid sequence with at least 70% homology to SEQ ID NO: 19. In some embodiments, the FGB consists of SEQ ID NO: 19.

In some embodiments, fibrinogen is fibrinogen gamma chain (FGG) In some embodiments, the FGG comprises the amino acid sequence of YVATRDNCCILDER-FGSYCPTTCGIADFL-STYQTKVDKDLQSLEDILHQVENKTSE VKQLIKAI-QLTYNPDESSKPNMIDAATLKSRKMLEEIMKYEASIL THDSSIRYLQEI YNSNNQKIVNLKEKVAQLEA-QCQEPCKDTVQIHDITGKDCQDIANKGAKQSGLYF IKPLKANQQFLVY-CEIDGSGNGWTVFQKRLDGSVDFKKNWIQYKEG-FGHLSPTGT TEFWLGNEKIHLISTQSAIPY-ALRVELEDWNGRTSTADYAMFKVGPEADKYRLTY AYF-AGGDAGDAFDGFDFGDDPSDKFFTSHNGMQF-STWDNDNDKFEGNCAEQDG SGWWMNKCHAGHLNGVYYQGG-TYSKASTPNGYDNGIIWATWKTRWYSMKKTT MKIIPFNRLTIGEGQQHHLGGAKQVRPEHPAETEYD-SLYPEDDL (SEQ ID NO: 21), or a fragment or homolog thereof. SEQ ID NO: 21 provides the sequence of fibrinogen without a signal peptide. In some embodiments, the fibrinogen comprises a signal peptide. In some embodiments, the signal peptide comprises or consists of MSWSLHPRN-LILYFYALLFLSSTCVA (SEQ ID NO: 20). In some embodiments, the FGG is a fragment of FGG. In some embodiments, a fragment comprises at least 50, 60, 70, 80, 90, 95, 99 or 100% of FGG. Each possibility represents a separate embodiment of the invention. In some embodiments, the fragment comprises at least 50, 100, 150, 200, 250, 300, 350, 400, 450, or 480 amino acids from FGG. Each possibility represents a separate embodiment of the invention. In some embodiments, the amino acids are sequential amino acids. In some embodiments, the FGG is a homolog of FGG. In some embodiments, homology is sequence identity. In some embodiments, a homolog of FGG comprises an amino acid sequence with at least 70%, 75%, 80%, 85%, 90%, 95%, 97% or 99% homology to SEQ ID NO: 21. Each possibility represents a separate embodiment of the invention. In some embodiments, the FGG consists of SEQ ID NO: 21 or a fragment or homolog thereof. In some embodiments, the FGG consists of an amino acid sequence with at least 70% homology to SEQ ID NO: 21. In some embodiments, the FGG consists of SEQ ID NO: 21.

In some embodiments, fibrinogen is a mix of fibrinogen. In some embodiments, a mix is a mix of at least two of FGA, FGB and FGG. In some embodiments, a mix is a mix of all three of FGA, FGB and FGG. In some embodiments, the FGA, FGB and FGG are in a ratio such as is found in human blood. In some embodiments, blood is plasma. Fibrinogen from human plasma is commercially available such as from Sigma-Aldrich Cat. Number 341578. In some embodiments, the fibrinogen comprises a free cysteine. In some embodiments, the fibrinogen comprises a free lysine. Conjugation to fibrinogen can be performed as described herein or by any means known in the art. Conjugation can be random or site specific as described herein.

In some embodiments, the IgG is the Fc portion of IgG. In some embodiments, IgG is selected from IgG1, IgG2, IgG3 and IgG4. In some embodiments, IgG is IgG1. In some embodiments, IgG is mammalian IgG. In some embodiments, IgG is human IgG. In some embodiments, IgG is mouse IgG. In some embodiments, IgG is the constant region of the heavy chain of IgG. In some embodiments, IgG comprises a heavy chain and a light chain. In some embodiments, IgG comprises two heavy chains and two light chains. In some embodiments, IgG is a protein complex. In some embodiments, IgG is polyclonal. In some embodiments, IgG is monoclonal. In some embodiments, IgG is IgG raised against a non-human species. In some embodiments, the species is goat or sheep. In some embodiments, the IgG is against the heavy chain of IgG of the non-human species. Commercial mouse IgG can be purchased, such as Sigma-Aldrich's Anti-Goat/sheep IgG antibody, mouse monoclonal (Clone GT-34). In some embodiments, the IgG comprises a free cysteine. In some embodiments, the IgG comprises a free lysine. In some embodiments, the IgG comprises a C-terminal cysteine. Conjugation to IgG can be performed as described herein or by any means known in the art. Conjugation can be random or site specific as described herein.

In some embodiments, the linker of the invention is or comprises a linear or a branched chain. In some embodiments, the linker of the invention is or comprises a backbone optionally comprising one or more said chain.

In some embodiments, the linker of the invention is a spacer (e.g., a natural and/or unnatural amino acid, alkyl, an amide bond, an ester bond, a thioester bond, a urea bond, including any derivative or a combination thereof). In some embodiments, the linker of the invention comprises a biocompatible polymer or a biocompatible moiety. In some embodiments, the biocompatible polymer is at least partially biodegradable. In some embodiments, the biocompatible polymer is or comprises a polyglycol ether, a polyester, a polyamide, a polyamino acid, a peptide and/or a derivative thereof or any combination thereof. In some embodiments, the polyglycol ether is or comprises polyethylene glycol (PEG). In some embodiments, the linker of the invention comprises PEG. In some embodiments, the linker of the invention comprises PEG characterized by Mn of between 100 and 5000 Da including any range between.

In some embodiments, the biocompatible moiety is or comprises an amide, an ester, a glycol, an amino acid, or any combination thereof.

In some embodiments, the polyamino acid or a derivative thereof comprises between 2 and 50 amino acids, between 4 and 50, between 5 and 50, between 5 and 50, between 4 and 20, between 4 and 30, between 4 and 40, between 5 and 20, between 5 and 30, between 5 and 40, between 6 and 50, between 6 and 30, between 6 and 40, between 6 and 20, between 8 and 50, between 8 and 30, between 8 and 20, between 8 and 40, including any range between.

The terms "peptide", "polypeptide" and "protein" as used herein encompass native peptides, peptide derivatives such as beta peptides, peptidomimetics (typically including non-peptide bonds or other synthetic modifications,) and the peptide analogs peptoids and semi-peptoids or any combination thereof. In another embodiment, the terms "peptide", "polypeptide" and "protein" apply to amino acid polymers in which at least one amino acid residue is an artificial chemical analog of a corresponding naturally occurring amino acid.

The term "derivative" or "chemical derivative" includes any chemical derivative of the polypeptide having one or more residues chemically derivatized by reaction on the side chain or on any functional group within the peptide. Such derivatized molecules include, for example, peptides bearing one or more protecting groups (e.g., side chain protecting group(s) and/or N-terminus protecting groups), and/or peptides in which free amino groups have been derivatized to form amine hydrochlorides, p-toluene sulfonyl groups, carbobenzoxy groups, t-butyloxycarbonyl groups, acetyl groups or formyl groups. Free carboxyl groups may be derivatized to form amides thereof, salts, methyl and ethyl esters or other types of esters or hydrazides. Free hydroxyl groups may be derivatized to form O-acyl or O-alkyl derivatives. The imidazole nitrogen of histidine may be derivatized to form N-im-benzylhistidine. Also included as chemical derivatives are those peptides, which contain one or more naturally occurring amino acid derivatives of the twenty standard amino acid residues. For example: 4-hydroxyproline may be substituted for proline; 5-hydroxylysine may be substituted for lysine; 3-methylhistidine may be substituted for histidine; homoserine may be substituted or serine; and Dab, Daa, and/or ornithine (O) may be substituted for lysine.

In addition, a peptide derivative can differ from the natural sequence of the peptide of the invention by chemical modifications including, but are not limited to, terminal-$NH_2$ acylation, acetylation, or thioglycolic acid amidation, and by amidation of the terminal and/or side-chain carboxy group, e.g., with ammonia, methylamine, and the like. Peptides can be either linear, cyclic, or branched and the like, having any conformation, which can be achieved using methods known in the art.

In some embodiments, the linker of the invention further comprises a spacer (e.g., a natural and/or unnatural amino acid, alkyl, an amide bond, an ester bond, a disulfide bond, a thioester bond, a urea bond, including any derivative or a combination thereof). In some embodiments, the linker of the invention further comprises a disulfide bond. In some embodiments, the linker of the invention comprises a click reaction product (e.g., a covalent linkage such as a cyclization reaction product, and/or a succinimide-thioether moiety formed via a click reaction).

Click reactions are well-known in the art and comprise inter alia Michael addition of maleimide and thiol (resulting in the formation of a succinimide-thioether); azide alkyne cycloaddition; Diels-Alder reaction (e.g., direct and/or inverse electron demand Diels Alder); dibenzyl cyclooctyne 1,3-nitrone (or azide) cycloaddition; alkene tetrazole photoclick reaction etc.

In some embodiments, the protein conjugate of the invention is represented by Formula A:

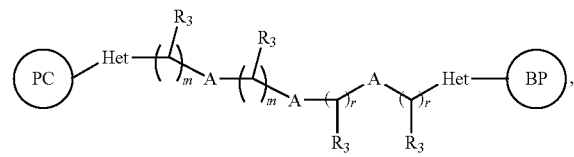

wherein PC represents the protein carrier of the invention; BP represents the biological payload (i.e., the payload) of the invention; each r, and m independently represents an integer ranging from 0 to 10 including any range between; each $R_3$ independently represents a substituent or H; Het represents a heteroatom, each independently selected from O, N, NH, and S; each A independently represent (i) a biocompatible moiety or a biocompatible polymer; and/or (ii) one or more linkers, wherein each linker independently comprises any of: a heteroatom (e.g., O, N, NH, or S), a carbonyl derivative (e.g., —C(O)NH—, —C(O)O—, —C(O)—, —C(O)S—, —C(NH)NH—, —C(NH)O—, —C(NH)S—), a C1-C10 alkyl, a C1-C10 aminoalkyl, a C1-C10 alkoxy, a C1-C10 mercaptoalkyl, or a click reaction product including any combination thereof, or A is absent. In some embodiments, at least one r or m is between 1 and 10, 1 and 3, 1 and 5, or 1, 2, 3, 4, 5, 6, or 10, including any range between.

In some embodiments, the protein conjugate of the invention is represented by Formula B:

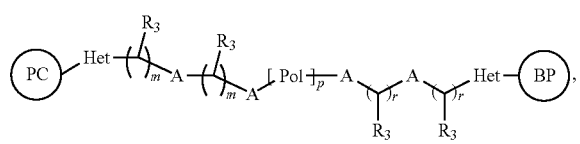

or by Formula C:

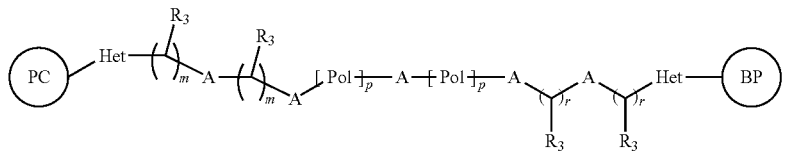

wherein PC represents the protein carrier of the invention; BP represents the biological payload of the invention; each r, and m independently represents an integer ranging from 0 to 10 including any range between; and p represents an integer ranging from 0 to 100 including any range between; Pol represent a biocompatible moiety or a biocompatible polymer; each R3 independently represents a substituent or H; Het represents a heteroatom, each independently selected from O, N, NH, and S; each A independently represents one or more linkers, wherein each linker independently comprises any of: a heteroatom (e.g., O, N, NH, or S), a carbonyl derivative (e.g., —C(O)NH—, —C(O)O—, —C(O)—, —C(O)S—, —C(NH)NH—, —C(NH)O—, —C(NH)S—), a C1-C10 alkyl, a C1-C10 aminoalkyl, a C1-C10 alkoxy, a C1-C10 mercaptoalkyl, or a click reaction product including any combination thereof, or A is absent. In some embodiments, the protein conjugate of the invention is represented by any one of Formulae A-C wherein the linker has a length of at least 5, at least 10, at least 15, at least 20, at least 30, at least 5, at least 100, at least 300, at least 500 between 5 and 500, between 5 and 100, between 10 and 100, between 5 and 50, between 50 and 100, between 100 and 500 atomic bonds, including any range between. In some embodiments, at least one p is between 1 and 100, 1 and 20, 10 and 100, 2 and 20, 3 and 20, 3 and 15, 10 and 20, 20 and 50, 50 and 100, or 1, 2, 3, 4, 5, 6, 10, 11, 12, 15, or 20 including any range between.

In some embodiments, the protein conjugate of the invention is represented by Formula 1:

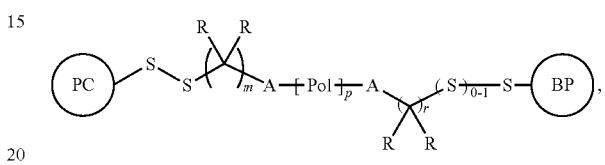

wherein PC, BP and Pol are as described herein; each r, and m independently represents an integer ranging from 0 to 10 including any range between; l represents an integer ranging from 1 to 10 including any range between; and p represents an integer ranging from 2 to 100 including any range between; each R independently represents the bulky moiety or H; each A independently represents one or more linkers, wherein each linker independently comprises any of: a heteroatom (e.g., O, N, $NR_3$, or S), a carbonyl derivative (e.g., —C(O)NH—, —C(O)O—, —C(O)—, —C(O)S—, —C($NR_3$)$NR_3$—, —C($NR_3$)O—, —C($NR_3$)S—), a C1-C10 alkyl, a C1-C10 aminoalkyl, a C1-C10 alkoxy, a C1-C10 mercaptoalkyl, or a click reaction product including any combination thereof, or A is absent.

In some embodiments, the protein conjugate of the invention is represented by Formula:

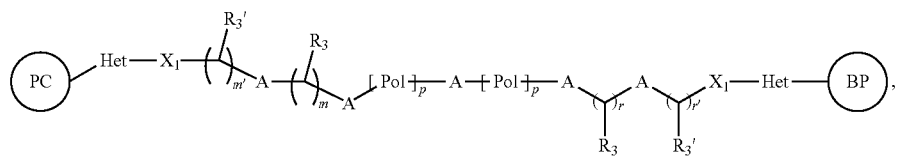

wherein PC, BP, Het, A, Pol, and p are as described herein; each r, r', m and m' independently represents an integer ranging from 0 to 10 including any range between; each R3 and R3' independently represents one or more bulky moiety, one or more substituents, or H; and X1 represents a heteroatom (e.g., O, N, $NR_3$, or S), a carbonyl derivative (e.g., —C(O)NH—, —C(O)O—, —C(O)—, —C(O)S—, —C($NR_3$)$NR_3$—, —C($NR_3$)O—, —C($NR_3$)S—), or a click reaction product including any combination thereof, and if Het is S, then at least one $X_1$ is S. In some embodiments, if Het and $X_1$ are both S, then at least one $R_3$ is one or more bulky moiety; and at least one of m' and r' is not 0.

In some embodiments, the protein conjugate of the invention is represented by Formula:

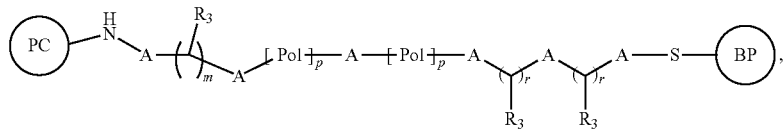

wherein PC, BP, Het, A, Pol, $R_3$, r, m, and p are as described herein, as allowed by valency. In some embodiments, if Het and $X_1$ are both S, then at least one $R_3$ is one or more bulky moiety; and at least one of m' and r' is not 0.

In some embodiments, the protein conjugate of the invention is represented by Formula:

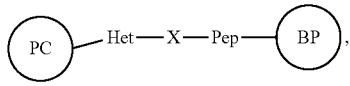

wherein Het comprises S or NH, wherein X represents a carbonyl derivative, a click reaction product, or is a bond; and wherein Pep represents a peptide. In some embodiments, the peptide is bound to the C-terminus of BP. In some embodiments, Het is S, and the peptide is bound to PC via cysteine (e.g., a C-terminal cysteine).

In some embodiments, the protein conjugate of the invention is represented by any one of Formulae:

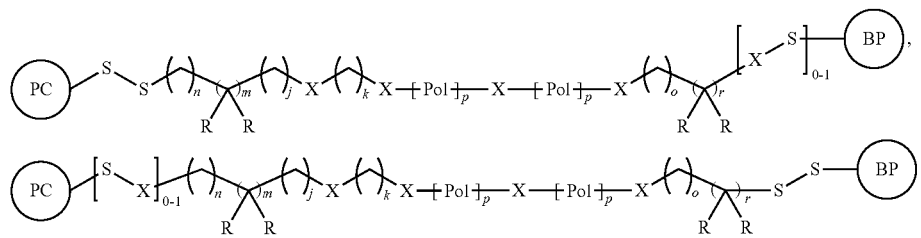

wherein PC, BP, and Pol, are as described herein; each j, k, r, o, n and m independently represents an integer ranging from 0 to 10 including any range between; l represents an integer ranging from 1 to 10 including any range between; and p represents an integer ranging from 2 to 100 including any range between; each R independently represents the bulky moiety or H; each X independently represents a heteroatom (e.g., O, N, NH, or S), a carbonyl derivative (e.g., —C(O)NH—, —C(O)O—, —C(O)—, —C(O)S—, —C(NH)NH—, —C(NH)O—, —C(NH)S—), a spacer (e.g., a C1-C10 alkyl, a C1-C10 aminoalkyl, a C1-C10 alkoxy, a C1-C10 mercaptoalkyl, or a click reaction product) or a combination thereof, or X is absent. In some embodiments, at least one R is methyl. In some embodiments, Pol represents a peptide, an amino acid or a dehydrated derivative thereof, PEG, or —CH$_2$—CH$_2$—O—. In some embodiments, a dehydrated derivative of the amino acid encompasses:

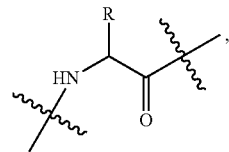

wherein the wavy bonds represent an attachment point to the linker or to the subsequent monomer, and wherein R presents an amino acid side chain.

In some embodiments, the click reaction product comprises a moiety formed via a click reaction, wherein the click reaction is as described hereinabove. In some embodiments, the click reaction product comprises a product formed by any of: Michael addition of maleimide and thiol (resulting in the formation of a succinimide-thioether); azide alkyne cycloaddition; Diels-Alder reaction (e.g., direct and/or inverse electron demand Diels Alder); dibenzyl cyclooctyne 1,3-nitrone (or azide) cycloaddition; alkene tetrazole photoclick reaction, or any combination thereof.

In some embodiments, the protein conjugate of the invention is represented by Formula 1A:

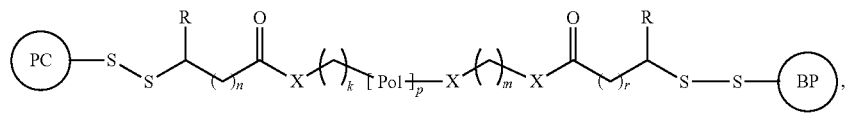

wherein R, n, k, l, p, m, Pol, and r are as described herein, and wherein each X independently represents a heteroatom (e.g., O, N, NH, or S), a spacer (e.g., a C1-C10 alkyl, a C1-C10 aminoalkyl, a C1-C10 alkoxy, a C1-C10 mercaptoalkyl, or a click reaction product) or a combination thereof, or X is absent. In some embodiments, Pol represents an amino acid or a dehydrated derivative thereof, or —CH$_2$—CH$_2$—O—.

In some embodiments, the linker of the invention is bound to the HSA via a disulfide bond. In some embodiments, the linker of the invention is covalently bound to an amino group, or to a thiol group of the payload of the invention. In some embodiments, each HSA is bound to a single biological payload. In some embodiments, each HSA is bound to a plurality of payloads. Exemplary protein conjugates of the invention are represented by FIGS. 4A-4B and 13A-13D, and Table 1 below.

TABLE 1 chemical structures of the synthesized conjugates

| Entry | Formula |
|---|---|
| C1 | |
| C2 | |
| S1 | |
| S2 | |

TABLE 1-continued chemical structures of the synthesized conjugates

| Entry | Formula |
|---|---|
| S3A | VHH—GGGGSGGGGSGGGGLC—S—S—HSA (SEQ ID NO: 4) |
| S3B | VHH—GGGGSGGGGSGGGLGC—S—S—HSA (SEQ ID NO: 5) |
| S3C | VHH—GGGGSGGGGSGGGGSC—S—S—HSA (SEQ ID NO: 6) |
| S4 | HSA-S-succinimide-CH2CH2-C(O)-NH-(CH2CH2O)n-CH2CH2-NH-C(O)-CH2CH2-succinimide-S-VHH |
| S1-PEI | PEI-HSA-S-S-C(CH3)2-CH2CH2-C(O)-NH-(CH2CH2O)n-CH2CH2-NH—VHH |

TABLE 1-continued chemical structures of the synthesized conjugates

| Entry | Formula |
|---|---|
| S2-PEI | (structure showing HSA-PEI linked via S-S to a chain with methyl, amide, PEG (O)$_n$, amide, PEG (O)$_m$, amide, succinimide-S-VHH, with a dibenzocyclooctyne-triazole moiety) |
| S3A-PEI | HSA(PEI)–S–S–GGGGSGGGGSGGGLC–VHH (SEQ ID NO: 4) |
| S3B-PEI | HSA(PEI)–S–S–GGGGSGGGGSGGGLGC–VHH (SEQ ID NO: 5) |
| S4-PEI | (structure showing HSA-PEI linked via S to succinimide, amide, PEG (O)$_n$, amide, succinimide-S-VHH) |

TABLE 1-continued chemical structures of the synthesized conjugates

| Entry | Formula |
|---|---|
| S5A | VHH—GGGGSC—S—[succinimide]—C(O)NH—CH₂CH₂—(O-CH₂CH₂)ₙ—O—CH₂CH₂—NH—C(O)—[succinimide]—S—HSA—PEI |
| S5B | VHH—GGGGSGGGGSGGGGLC—S—S—HSA—PEI (SEQ ID NO: 9) |
| S5C | VHH—AAASAEAAAKEAAAKEAAAKAAAGSGLC—S—S—HSA—PEI-Xn (SEQ ID NO: 4) |
| S5D | VHH—SEQ ID NO: 10—S—[succinimide]—C(O)NH—CH₂CH₂—(O-CH₂CH₂)ₙ—O—CH₂CH₂—NH—C(O)—[succinimide]—S—HSA—PEI (SEQ ID NO: 10) |

TABLE 1-continued chemical structures of the synthesized conjugates

| Entry | Formula |
|---|---|
| S6 | VHH—SEQ ID NO: 10 —S—S—CH₂CH₂—C(=O)—NH—CH₂CH₂—(O—CH₂CH₂)₁₂—O—CH₂CH₂—C(=O)—NH—PEI-1800 |
| S6A | VHH—SEQ ID NO: 10 —S—S—CH₂CH₂—C(=O)—NH—CH₂CH₂—(O—CH₂CH₂)₁₂—O—CH₂CH₂—C(=O)—NH—PEI-600 |
| S7 | VHH—SEQ ID NO: 10 —S—(succinimide)—N—CH₂CH₂—C(=O)—NH—CH₂CH₂—(O—CH₂CH₂)₈—O—CH₂CH₂—C(=O)—NH—PEI-1800 |
| S7A | VHH—SEQ ID NO: 10 —S—(succinimide)—N—CH₂CH₂—C(=O)—NH—CH₂CH₂—(O—CH₂CH₂)₈—O—CH₂CH₂—C(=O)—NH—PEI-600 |
| S8 | VHH—SEQ ID NO: 10 —C(=O)—NH—PEI-1800 |

In some embodiments, the protein conjugate of the invention is substantially stable in a biological fluid for at least 2 h, at least 10 h, at least 24 h, at least 48 h, including any range between.

In some embodiments, at least 25%, at least 50%, at least 75%, at least 90% of the protein conjugate of the invention is substantially stable, including any range between.

As used herein, the term "stable" refers to the ability of the protein conjugate or linker of the invention to maintain its chemical integrity (e.g., devoid of cleavage).

In some embodiments, at least 25%, at least 50%, at least 75%, at least 90% of the protein conjugate of the invention is characterized by a positive zeta potential. In some embodiments, at least 25%, at least 50%, at least 75%, at least 90% of the protein conjugate of the invention is characterized by a negative zeta potential. In some embodiments, the protein carrier of the invention is characterized by an average positive zeta potential of at least 1 mV, at least 5 mV, at least 10 mV, at least 15 mV, at least 20 mV, at least 30 mV, including any range between. In some embodiments, the protein carrier of the invention is characterized by an average positive zeta potential of at least 5 mV, at least 6 mV, at least 7 mV, at least 8 mV, at least 9 mV, at least 10 mV, at least 15 mV, including any range between. In some embodiments, the protein conjugate of the invention is characterized by an average positive zeta potential of between 5 and 50 mV, between 6 and 50 mV, between 7 and 50 mV, between 8 and 50 mV, between 8 and 40 mV, between 8 and 30 mV, between 8 and 20 mV, between 10 and 50 mV, between 10 and 40 mV, between 10 and 30 mV, between 10 and 20 mV, between 20 and 50 mV, between 30 and 50 mV, including any range between.

In some embodiments, the substituent comprises one or more substituents, each independently selected from the group consisting of: C1-C6 alkyl, halo, $-NO_2$, $-CN$, $-OH$, $-NH_2$, carbonyl, $-CONH_2$, $-CONR'_2$, $-CNNR_2$, $-CSNR_2$, $-CONH-OH$, $-CONH-NH_2$, $-NHCOR'$, $-NHCSR'$, $-NHCNR'$, $-NC(=O)OR'$, $-NC(=O)NR'$, $-NC(=S)OR'$, $-NC(=S)NR'$, $-SO_2R'$, $-SOR'$, $-SR'$, $-SO_2OR'$, $-SO_2N(R')_2$, $-NHNR'_2$, $-NNR'$, $-NH(C_1-C_6$ alkyl), $-N(C_1-C_6$ alkyl)$_2$, $C_1-C_6$ alkoxy, $C_1-C_6$ haloalkoxy, hydroxy($C_1-C_6$ alkyl), hydroxy ($C_1-C_6$ alkoxy), alkoxy($C_1-C_6$ alkyl), alkoxy($C_1-C_6$ alkoxy), amino($C_1-C_6$ alkyl), $-CONH(C_1-C_6$ alkyl), $-CON(C_1-C_6$ alkyl)$_2$, $-CO_2H$, $-CO_2R'$, $-OCOR'$, $-OCOR'$, $-OC(=O)OR'$, $-OC(=O)NR'$, $-OC(=S)OR'$, $-OC(=S)NR'$, wherein each R' is independently selected from hydrogen, alkyl, alkenyl, aryl, heteroaryl a heteroatom, an optionally substituted cycloalkyl, an optionally substituted heterocyclyl, or any combination thereof.

Kit

In another aspect, there is provided a kit comprising the protein carrier covalently bound to a first moiety and the payload, wherein the first moiety is characterized by a reactivity to the payload. In some embodiments, the payload is covalently bound to a second moiety, wherein the first moiety and the second moiety have a reactivity to each other (e.g., via a click reaction).

In some embodiments, the protein carrier covalently bound to a first moiety is represented by Formula 2:

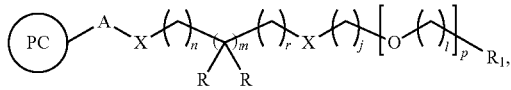

or by Formula 2A:

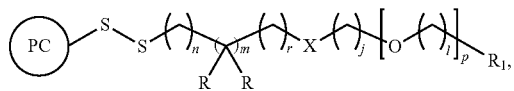

wherein R, n, j, 1, p, m, and r are as described herein, wherein A is or comprises a heteroatom selected from O, NR, and S, and wherein $R_1$ represents the first moiety.

In some embodiments, the payload covalently bound to a second moiety is represented by Formula 3:

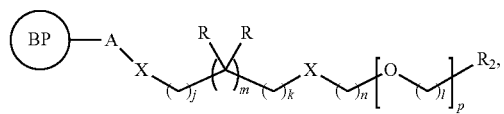

or by Formula 4:

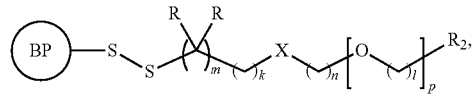

wherein R, X, j, k, l, n, m, and p are as described hereinabove, wherein A is or comprises a heteroatom selected from O, NR, and S, and wherein $R_2$ represents the second moiety.

In some embodiments, the first moiety or the second moiety is or comprises 1,3-nitrone, azide, a diene, tetrazine, an active ester (e.g., thio-ester, a pentofluorophenyl ester, a N-hydroxysuccinimide ester), an acyl halide, a chloroformate, an anhydride, an aldehyde, an epoxide, an isocyanate, an isothiocyanate, a maleimide, a carbonate, a sulfonyl chloride, iodoacetamide, an acyl azide, an imidoester, a vinyl sulfone, ortho-pyridyl-disulfide, or any combination thereof.

In some embodiments, the first moiety or the second moiety is or comprises a nucleophilic group (e.g., an amine, a thiol, a phosphine, a hydroxyl), a dienophile, an alkene, and an alkyne (e.g., acetylene, dibenzyl cyclooctyne, etc.), or any combination thereof.

In some embodiments, the kit of the invention comprises the payload covalently bound to a linker comprising a functional group having reactivity to the HSA (e.g., to a cysteine or to a lysine thereof); and HSA. In some embodiments, the kit of the invention comprises the HSA covalently bound to a linker comprising a functional group having reactivity to the payload (e.g., to a cysteine or to a lysine thereof); and the payload. In some embodiments, the functional group is or comprises any of iodoacetamide, an active ester, ortho-pyridyldisulfide, a maleimide, or a combination thereof.

In some embodiments, the conjugate is a blood-stable conjugate. In some embodiments, the conjugate is a cell-penetrating conjugate. In some embodiments, the conjugate is a cell membrane crossing conjugate. In some embodiments, the conjugate is able to enter cells. In some embodiments, the conjugate is capable of endosome escape. In some embodiments, the conjugate is capable of intracellular delivery of a payload. In some embodiments, intracellular delivery is cytoplasmic delivery. In some embodiments, intracellular delivery comprises dissociation of the carrier from the payload. In some embodiments, the conjugate is configured to dissociate in the cytoplasm. In some embodiments, the dissociation is dissociation of the carrier from the payload. In some embodiments, the conjugate is for use in modulating an intracellular target. In some embodiments, the conjugate is for use in effecting an intracellular target. In some embodiments, the conjugate is for use in interacting with an intracellular target.

Method

In another aspect, there is provided a method of producing a protein conjugate, the method comprising: providing a biological agent that binds an intracellular target; providing a protein carrier covalently bound to a cell penetrating moiety; covalently linking said selected biological agent to said selected protein carrier via a linker to produce a protein conjugate; determining stability of said linker in human blood, plasma or serum; and selecting a protein conjugate comprising a linker that is stable in said human blood, plasma or serum; thereby producing a protein conjugate capable of binding an intracellular target.

In some embodiments, the protein conjugate is capable of binding to an intracellular target. In some embodiments, the protein conjugate is able to enter a cytoplasm of a cell. In some embodiments, the protein conjugate is capable of intracellular delivery of a biological agent. In some embodiments, the protein conjugate enables intracellular delivery of a biological agent. In some embodiments, the protein conjugate is capable of modulating an intracellular target. In some embodiments, the protein conjugate is configured to modulate an intracellular target. In some embodiments, the biological agent is devoid of a disulfide bond. In some embodiments, the biological agent is devoid of a disulfide bond that is required for the structure of the biological agent. In some embodiments, the biological agent is devoid of a disulfide bond that is required for the function of the biological agent. In some embodiments, the biological agent is devoid of a disulfide bond that is required for the binding of the biological agent. In some embodiments, the biological agent is devoid of a disulfide bond that when cleaved diminishes binding. In some embodiments, binding is binding to the intracellular target.

In some embodiments, the payload is known to bind to the intracellular target. In some embodiments, the payload is demonstrated to bind to the intracellular target. In some embodiments, the payload is confirmed to bind to the intracellular target. In some embodiments, the method further comprises confirming the payload binds the intracellular target. In some embodiments, the payload is a biological agent.

In some embodiments, the method further comprises confirming delivery into a cell. In some embodiments, into a cell is into the cytoplasm of a cell. In some embodiments, the method further comprises confirming function of the biological agent inside a cell. In some embodiments, inside a cell is in the cytoplasm of a cell. In some embodiments, the function is binding. In some embodiments, the function is modulating.

In some embodiments, the linker comprises a cleavable bond. In some embodiments, the bond is biocleavable. In some embodiments, the method further comprises selecting a protein conjugate that is unstable in cytoplasmic conditions. In some embodiments, the method comprises determining stability of the linker in cytoplasmic conditions. In some embodiments, cytoplasmic conditions are in a cell. In some embodiments, cytoplasmic conditions are in the presence of glutathione (GSH). In some embodiments, unstable is less stable than in blood, plasma or serum.

In some embodiments, stable comprises less than 1, 2, 3, 5, 7, 9, 10, 12, 15, 17, 20, 25, 30, 35, 40, 45 or 50% dissociation. Each possibility represents a separate embodiment of the invention. In some embodiments, stable is stable for at least 4, 6, 12, 18, 24, 48, 72 or 96 hours. Each possibility represents a separate embodiment of the invention. In some embodiments, stable comprises less than 20% dissociation after 96 hours. In some embodiments, dissociation is dissociation of the carrier from the payload (e.g., biological agent). In some embodiments, unstable is any situation which is not stable. In some embodiments, unstable comprises greater dissociation than in a stable condition.

In some embodiments, the linker is linked away from an active site of said payload (e.g., biological agent). In some embodiments, away is distal to. In some embodiments, away is not proximal to. In some embodiments, away is at least 5, 10, 15, 20, 30, 35, 40, 45, 50, 60, 70, 80, 90 or 100 amino acids away. Each possibility represents a separate embodiment of the invention. In some embodiments, away is at least 15, 20, 25, 30, 35, 40, 45, 50, 55, 60, 65 or 70 angstroms. Each possibility represents a separate embodiment of the invention. It will be known by a skilled artisan that the C-terminus of a VHH is about 40-50 angstroms from the end of the last CDR. In some embodiments, away is at least 40 angstroms. In some embodiments, away is at least 50 angstroms. In some embodiments, the linkage is at a terminus of the agent. In some embodiments, the terminus is the N-terminus. In some embodiments, the terminus is a C-terminus.

In some embodiments, the protein conjugate is a therapeutic agent. In some embodiments, the therapeutic agent is a biological therapeutic agent. In some embodiments, the therapeutic agent is a biologic. In some embodiments, the therapeutic agent is an agent against the intracellular target. In some embodiments, the therapeutic agent targets the intracellular target. In some embodiments, the therapeutic agent modulates the intracellular target.

In some embodiments, there is a method of synthesizing the protein conjugate of the invention. In some embodiments, the method comprises providing the kit of the invention and reacting the first moiety and the second moiety (e.g., under suitable conditions, optionally comprising a metal-based catalyst and/or a UV-, thermal-irradiation).

In some embodiments, the method of synthesizing the protein conjugate of the invention comprises: (i) providing the protein carrier covalently bound to the first moiety, and the payload covalently bound to the second moiety, wherein the first moiety and the second moiety have a reactivity to each other (e.g. via a click reaction, via thiol-maleimide linkage formation, via amine to active ester coupling, via S—S bond formation such as by reacting SPDP or a nitro-SPDP with a thiol); and (ii) providing the protein carrier and the payload under conditions suitable for a reaction between the first moiety and the second moieties, thereby synthesizing the protein conjugate of the invention. In some embodiments, the first moiety and the second moiety are as described herein. In some embodiments, reaction comprises click reaction.

In some embodiments, the method comprises: (i) providing the protein carrier covalently bound to a linker comprising a functional group having reactivity to the payload (e.g., to a cysteine or to a lysine thereof) and the payload; and (ii) reacting the functional group with the payload, thereby synthesizing the protein conjugate of the invention.

In some embodiments, the method comprises: (i) providing the payload covalently bound to a linker comprising a functional group having reactivity to the protein carrier (e.g., to a cysteine or to a lysine thereof) and the protein carrier; and (ii) reacting the functional group with the protein carrier, thereby synthesizing the protein conjugate of the invention. An exemplary synthetic scheme is presented in FIG. 36.

In another aspect, there is provided a protein conjugate produced by a method of the invention.

Compositions

In another aspect, there is provided a pharmaceutical composition comprising a protein conjugate of the invention.

In some embodiments, the pharmaceutical composition comprises a pharmaceutically acceptable carrier, excipient or adjuvant. As used herein, the term "carrier," "excipient," or "adjuvant" refers to any component of a pharmaceutical composition that is not the active agent. As used herein, the term "pharmaceutically acceptable carrier" refers to non-toxic, inert solid, semi-solid liquid filler, diluent, encapsulating material, formulation auxiliary of any type, or simply a sterile aqueous medium, such as saline. Some examples of the materials that can serve as pharmaceutically acceptable carriers are sugars, such as lactose, glucose and sucrose, glycols, such as propylene glycol, polyols such as glycerin, sorbitol, mannitol and polyethylene glycol; esters such as ethyl oleate and ethyl laurate, pyrogen-free water; isotonic saline, Ringer's solution; ethyl alcohol and phosphate buffer solutions, as well as other non-toxic compatible substances used in pharmaceutical formulations. Some non-limiting examples of substances which can serve as a carrier herein include sugar, stearic acid, magnesium stearate, calcium sulfate, polyols, pyrogen-free water, isotonic saline, phosphate buffer solutions, as well as other non-toxic pharmaceutically compatible substances used in other pharmaceutical formulations. Wetting agents and lubricants such as sodium lauryl sulfate, as well excipients, stabilizers, antioxidants, and preservatives may also be present. Any non-toxic, inert, and effective carrier may be used to formulate the compositions contemplated herein.

The carrier may comprise, in total, from about 0.1% to about 99.99999% by weight of the pharmaceutical compositions presented herein.

In some embodiments, the pharmaceutical composition comprises a therapeutically effective amount of the protein conjugate of the invention. The term "therapeutically effective amount" refers to an amount of a drug effective to treat a disease or disorder in a mammal. The term "a therapeutically effective amount" refers to an amount effective, at dosages and for periods of time necessary, to achieve the desired therapeutic or prophylactic result. The exact dosage form and regimen would be determined by the physician according to the patient's condition.

In some embodiments, the pharmaceutical composition is formulated for systemic administration. In some embodiments, the pharmaceutical composition is formulated for local administration. In some embodiments, the pharmaceutical composition is formulated for intravenous administration. In some embodiments, the pharmaceutical composition is formulated for administration to a subject.

In some embodiments, the compounds of the present invention can exist in free form for treatment, or as a pharmaceutically acceptable salt.

As used herein, the term "pharmaceutically acceptable salt" refers to any non-toxic salt of a compound of the present invention that, upon administration to a subject, e.g., a human, is capable of providing, either directly or indirectly, a compound of this invention or an inhibitorily active metabolite or residue thereof. For example, the term "pharmaceutically acceptable" can mean approved by a regulatory agency of the Federal or a state government or listed in the U. S. Pharmacopeia or other generally recognized pharmacopeia for use in animals, and more particularly in humans.

Pharmaceutically acceptable salts are well known in the art. For example, S. M. Berge et al., describe pharmaceutically acceptable salts in detail in J. Pharmaceutical Sciences, 1977, 66, 1-19. Pharmaceutically acceptable salts of the compounds of this invention include those derived from suitable inorganic and organic acids and bases. These salts can be prepared in situ during the final isolation and purification of the compounds. Acid addition salts can be prepared by 1) reacting the purified compound in its free-based form with a suitable organic or inorganic acid and 2) isolating the salt thus formed.

Non-limiting examples of pharmaceutically acceptable salts include but are not limited to: acetate, aspartate, benzenesulfonate, benzoate, bicarbonate, carbonate, halide (such as bromide, chloride, iodide, fluoride), bitartrate, citrate, salicylate, stearate, succinate, sulfate, tartrate, decanoate, edetate, fumarate, gluconate, and lactate or any combination thereof.

Additional examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange.

Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, glycolate, gluconate, glycolate, hemisulfate, heptanoate, hexanoate, hydrochloride, hydrobromide, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, palmoate, pectinate, persulfate, 3-phenylpropionate, phosphate, picrate, pivalate, propionate, salicylate, stearate, succinate, sulfate, tartrate, thiocyanate, p-toluenesulfonate, undecanoate, valerate salts, and the like.

Base addition salts can be prepared by 1) reacting the purified compound in its acid form with a suitable organic or inorganic base and 2) isolating the salt thus formed. Salts derived from appropriate bases include alkali metal (e.g., sodium, lithium, and potassium), alkaline earth metal (e.g., magnesium and calcium), ammonium and $N^+(C1\text{-}4alkyl)_4$ salts. This invention also envisions the quaternization of any basic nitrogen-containing groups of the compounds disclosed herein. Water or oil-soluble or dispersible products may be obtained by such quaternization.

Further pharmaceutically acceptable salts include, when appropriate, nontoxic ammonium, quaternary ammonium, and amine cations formed using counterions such as halide, hydroxide, carboxylate, sulfate, phosphate, nitrate, loweralkyl sulfonate and aryl sulfonate. Other acids and bases, while not in themselves pharmaceutically acceptable, may be employed in the preparation of salts useful as intermediates in obtaining the compounds of the invention and their pharmaceutically acceptable acid or base addition salts.

In some embodiments, the term "one or more" refers to any numerical value selected form of 1, 2, 3, 4, 5, or 6. In some embodiments, the heteroatom comprises any of N, O, NH, or S.

In some embodiments, the compounds described herein are chiral compounds (i.e. possess an asymmetric carbon atom). In some embodiments, diastereomers, geometric isomers and individual isomers are encompassed within the scope of the present invention. In some embodiments, a chiral compound described herein is in form of a racemic mixture. In some embodiments, a chiral compound is in form of a single enantiomer, with an asymmetric carbon atom having the R configuration. In some embodiments, a chiral compound is in form of a single enantiomer, with an asymmetric carbon atom having the S configuration as described hereinabove.

In some embodiments, a chiral compound is in form of a single enantiomer with enantiomeric purity of more than 70%. In some embodiments, a chiral compound is in form of a single enantiomer with enantiomeric purity of more than 80%. In some embodiments, a chiral compound is in form of a single enantiomer with enantiomeric purity of more than 90%. In some embodiments, a chiral compound is in form of a single enantiomer with enantiomeric purity of more than 95%.

In some embodiments, the compound of the invention comprising an unsaturated bond is in a form of a trans-, or cis-isomer. In some embodiments, the composition of the invention comprises a mixture of cis- and trans-isomers, as described hereinabove.

In some embodiments, the compounds described herein can exist in unsolvated form as well as in solvated form, including hydrated form. In general, the solvated form is equivalent to the unsolvated form and is encompassed within the scope of the present invention. Certain compounds of the present invention may exist in multiple crystalline or amorphous forms. In general, all physical forms are equivalent for the uses contemplated by the present invention and are intended to be within the scope of the present invention.

The term "solvate" refers to a complex of variable stoichiometry (e.g., di-, tri-, tetra-, penta-, hexa-, and so on), which is formed by a solute (the conjugate described herein) and a solvent, whereby the solvent does not interfere with the biological activity of the solute. Suitable solvents include, for example, ethanol, acetic acid and the like.

The term "hydrate" refers to a solvate, as defined hereinabove, where the solvent is water.

Unless otherwise indicated, structures depicted herein are also meant to include all isomeric (e.g., enantiomeric, diastereomeric, geometric, conformational, and rotational) forms of the structure. For example, the R and S configurations for each asymmetric center, (Z) and (E) double bond isomers, and (Z) and (E) conformational isomers are included in this invention. As would be understood to one skilled in the art, a substituent can freely rotate around any rotatable bonds. Therefore, single stereochemical isomers as well as enantiomeric, diastereomeric, geometric, conformational, and rotational mixtures of the present compounds are within the scope of the invention.

Unless otherwise indicated, all tautomeric forms of the compounds of the invention are within the scope of the invention.

Additionally, unless otherwise indicated, structures depicted herein are also meant to include compounds that differ only in the presence of one or more isotopically enriched atoms. For example, compounds having the present structures except for the replacement of hydrogen by deuterium or tritium, or the replacement of a hydrogen by 18F, or the replacement of a carbon by a 13C- or 14C-enriched carbon are within the scope of this invention. Such compounds are useful, for example, as imaging probes.

Method of Use

In another aspect, there is provided a method of binding an intracellular target, the method comprising contacting a cell expressing the intracellular target with a protein conjugate of the invention or a pharmaceutical composition of the invention, thereby binding the intracellular target.

In some embodiments, the method is a method of modulating the intracellular target. In some embodiments, the payload binds the intracellular target. In some embodiments, the payload modulates the intracellular target. In some embodiments, modifying is agonizing. In some embodiments, the payload is an agonist of the intracellular target. In some embodiments, modifying is antagonizing. In some embodiments, the payload is an antagonist. Molecules that modulate, (i.e., antagonize or agonize) are well known in the art and any such molecule may be employed. In some embodiments, the biological target is specific to the intracellular target.

In some embodiments, the method is a method of detecting the intracellular target. In some embodiments, the protein conjugate comprises a detectable tag. In some embodiments, the tag is a detectable moiety. In some embodiments, the method further comprises detecting the protein conjugate. In some embodiments, the method further comprises detecting the detectable tag. In some embodiments, the detectable tag is a fluorescent tag. Detectable tags and moieties are well known in the art and include, for non-limiting example, a fluorophore (e.g., GFP, RFP, YFP, luciferase and the like), a radioactive tag, and a colored tag). Any such known tag may be employed.

In some embodiments, the cell is within a subject. In some embodiments, the subject is a mammal. In some embodiments, the subject is a human. In some embodiments, the subject suffers from a disease or condition. In some embodiments, the disease or condition is treatable by contacting the intracellular target. In some embodiments, the disease or condition is treatable by modulating the intracellular target. In some embodiments, the disease or condition is treatable by agonizing the intracellular target. In some embodiments, the disease or condition is treatable by antagonizing the intracellular target. In some embodiments, the subject is in need of modulating the intracellular target. In some embodiments, the subject is in need of treatment. In some embodiments, the subject is a subject in need thereof.

In some embodiments, the method comprises administering to the subject a protein conjugate of the invention. In some embodiments, the method comprises administering to the subject a pharmaceutical composition of the invention.

As used herein, the terms "administering," "administration," and like terms refer to any method which, in sound medical practice, delivers a composition containing an active agent to a subject in such a manner as to provide a therapeutic effect. One aspect of the present subject matter provides for intravenous administration of a therapeutically effective amount of a composition of the present subject matter to a patient in need thereof. Other suitable routes of administration can include parenteral, subcutaneous, oral, intramuscular, intratumoral or intraperitoneal.

The dosage administered will be dependent upon the age, health, and weight of the recipient, kind of concurrent treatment, if any, frequency of treatment, and the nature of the effect desired.

In some embodiments, the disease or condition is cancer. In some embodiments, the intracellular target is an oncogene and the payload is an antagonist. In some embodiments, the intracellular target is a tumor suppressor and the payload is an agonist.

In some embodiments, the contacting is not in the presence of an agent designed to induce penetration of the protein conjugate into a cell. In some embodiments, the agent designed to induce penetration is an agent other than the carrier protein. In some embodiments, another method of inducting cell penetration other the method of the invention is not employed.

As used herein, the term "alkyl" describes an aliphatic hydrocarbon including straight chain and branched chain groups and usually comprising between 1 and 30, or between 1 and 10 carbon atoms. The term "alkyl", as used herein, also encompasses saturated or unsaturated hydrocarbon, hence this term further encompasses alkenyl and alkynyl.

The term "alkenyl" describes an unsaturated alkyl, as defined herein, having at least two carbon atoms and at least one carbon-carbon double bond. The alkenyl may be substituted or unsubstituted by one or more substituents, as described hereinabove.

The term "alkynyl", as defined herein, is an unsaturated alkyl having at least two carbon atoms and at least one carbon-carbon triple bond. The alkynyl may be substituted or unsubstituted by one or more substituents, as described hereinabove.

The term "cycloalkyl" describes an all-carbon monocyclic or fused ring (i.e. rings which share an adjacent pair of carbon atoms) group where one or more of the rings does not have a completely conjugated pi-electron system. The cycloalkyl group may be substituted or unsubstituted, as indicated herein.

The term "aryl" describes an all-carbon monocyclic or fused-ring polycyclic (i.e. rings which share adjacent pairs of carbon atoms) groups having a completely conjugated pi-electron system. The aryl group may be substituted or unsubstituted, as indicated herein.

The term "alkoxy" describes both an O-alkyl and an —O-cycloalkyl group, as defined herein. The term "aryloxy" describes an —O-aryl, as defined herein.

Each of the alkyl, cycloalkyl and aryl groups in the general formulas herein may be substituted by one or more substituents, whereby each substituent group can independently be, for example, halide, alkyl, alkoxy, cycloalkyl, nitro, amino, hydroxyl, thiol, thioalkoxy, carboxy, amide, aryl and aryloxy, depending on the substituted group and its position in the molecule. Additional substituents are also contemplated.

The term "halide", "halogen" or "halo" describes fluorine, chlorine, bromine or iodine. The term "haloalkyl" describes an alkyl group as defined herein, further substituted by one or more halide(s). The term "haloalkoxy" describes an alkoxy group as defined herein, further substituted by one or more halide(s). The term "hydroxyl" or "hydroxy" describes a —OH group. The term "mercapto" or "thiol" describes a —SH group. The term "thioalkoxy" describes both an —S-alkyl group, and a —S-cycloalkyl group, as defined herein. The term "thioaryloxy" describes both an —S-aryl and a —S-heteroaryl group, as defined herein. The term "amino" describes a —NR'R" group, or a salt thereof, with R' and R" as described herein.

The term "heterocyclyl" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofuran, tetrahydropyran, morpholino and the like.

The term "carboxy" describes a —C(O)OR' group, or a carboxylate salt thereof, where R' is hydrogen, alkyl, cycloalkyl, alkenyl, aryl, heteroaryl (bonded through a ring carbon) or heterocyclyl (bonded through a ring carbon) as defined herein. or "carboxylate"

The term "carbonyl" describes a —C(O)R' group, where R' is as defined hereinabove. The above-terms also encompass thio-derivatives thereof (thiocarboxy and thiocarbonyl).

The term "thiocarbonyl" describes a —C(S)R' group, where R' is as defined hereinabove. A "thiocarboxy" group describes a —C(S)OR' group, where R' is as defined herein. A "sulfinyl" group describes an —S(O)R' group, where R' is as defined herein. A "sulfonyl" or "sulfonate" group describes an —S(O)$_2$R' group, where R' is as defined herein.

A "carbamyl" or "carbamate" group describes an —OC(O)NR'R" group, where R' is as defined herein and R" is as defined for R'. A "nitro" group refers to a —NO$_2$ group. The term "amide" as used herein encompasses C-amide and N-amide. The term "C-amide" describes a —C(O)NR'R" end group or a —C(O)NR'-linking group, as these phrases are defined hereinabove, where R' and R" are as defined herein. The term "N-amide" describes a —NR"C(O)R' end group or a —NR'C(O)— linking group, as these phrases are defined hereinabove, where R' and R" are as defined herein.

A "cyano" or "nitrile" group refers to a —CN group. The term "azo" or "diazo" describes an —N=NR' end group or an —N=N— linking group, as these phrases are defined hereinabove, with R' as defined hereinabove. The term "guanidine" describes a —R'NC(N)NR"R'" end group or a —R'NC(N) NR"— linking group, as these phrases are defined hereinabove, where R', R" and R'" are as defined herein. As used herein, the term "azide" refers to a —N3 group. The term "sulfonamide" refers to a —S(O)$_2$NR'R" group, with R' and R" as defined herein.

The term "phosphonyl" or "phosphonate" describes an —OP(O)—(OR')2 group, with R' as defined hereinabove. The term "phosphinyl" describes a —PR'R" group, with R' and R" as defined hereinabove. The term "alkylaryl" describes an alkyl, as defined herein, which substituted by an aryl, as described herein. An exemplary alkylaryl is benzyl.

The term "heteroaryl" describes a monocyclic or fused ring (i.e. rings which share an adjacent pair of atoms) group having in the ring(s) one or more atoms, such as, for example, nitrogen, oxygen and sulfur and, in addition, having a completely conjugated pi-electron system. As used herein, the term "heteroaryl" refers to an aromatic ring in which at least one atom forming the aromatic ring is a heteroatom. Heteroaryl rings can be foamed by three, four, five, six, seven, eight, nine and more than nine atoms. Heteroaryl groups can be optionally substituted. Examples of heteroaryl groups include, but are not limited to, aromatic C3-8 heterocyclic groups containing one oxygen or sulfur atom, or two oxygen atoms, or two sulfur atoms or up to four nitrogen atoms, or a combination of one oxygen or sulfur atom and up to two nitrogen atoms, and their substituted as well as benzo- and pyrido-fused derivatives, for example, connected via one of the ring-forming carbon atoms. In certain embodiments, heteroaryl is selected from among oxazolyl, isoxazolyl, oxadiazolyl, thiazolyl, isothiazolyl, pyridinyl, pyridazinyl, pyrimidinal, pyrazinyl, indolyl, benzimidazolyl, quinolinyl, isoquinolinyl, quinazolinyl or quinoxalinyl.

In some embodiments, a heteroaryl group is selected from among pyrrolyl, furanyl (furyl), thiophenyl (thienyl), imidazolyl, pyrazolyl, 1,2,3-triazolyl, 1,2,4-triazolyl, 1,3-oxazolyl (oxazolyl), 1,2-oxazolyl (isoxazolyl), oxadiazolyl, 1,3-thiazolyl (thiazolyl), 1,2-thiazolyl (isothiazolyl), tetrazolyl, pyridinyl (pyridyl)pyridazinyl, pyrimidinyl, pyrazinyl, 1,2,3-tri azinyl, 1,2,4-triazinyl, 1,3,5-triazinyl, 1,2,4,5-tetrazinyl, indazolyl, indolyl, benzothiophenyl, benzofuranyl, benzothiazolyl, benzimidazolyl, benzodioxolyl, acridinyl, quinolinyl, isoquinolinyl, quinazolinyl, quinoxalinyl, phthalazinyl, thienothiophenyl, 1,8-naphthyridinyl, other naphthyridinyls, pteridinyl or phenothiazinyl. Where the heteroaryl group includes more than one ring, each additional ring is the saturated form (perhydro form) or the partially unsaturated form (e.g., the dihydro form or tetrahydro form) or the maximally unsaturated (nonaromatic) form. The term heteroaryl thus includes bicyclic radicals in which the two rings are aromatic and bicyclic radicals in which only one ring is aromatic. Such examples of heteroaryl are include 3H-indolinyl, 2(1H)-quinolinonyl, 4-oxo-1,4-dihydroquinolinyl, 2H-1-oxoisoquinolyl, 1,2-dihydroquinolinyl, (2H)quinolinyl N-oxide, 3,4-dihydroquinolinyl, 1,2-dihydroisoquinolinyl, 3,4-dihydro-isoquinolinyl, chromonyl, 3,4-dihydroiso-quinoxalinyl, 4-(3H)quinazolinonyl, 4H-chromenyl, 4-chromanonyl, oxindolyl, 1,2,3,4-tetrahydroisoquinolinyl, 1,2,3,4-tetrahydro-quinolinyl, 1H-2,3-dihydroisoindolyl, 2,3-dihydrobenzo[f]isoindolyl, 1,2,3,4-tetrahydrobenzo-[g]isoquinolinyl, 1,2,3,4-tetrahydro-benzo[g]isoquinolinyl, chromanyl, isochromanonyl, 2,3-dihydrochromonyl, 1,4-benzo-dioxanyl, 1,2,3,4-tetrahydroquinoxalinyl, 5,6-dihydro-quinolyl, 5,6-dihydroisoquinolyl, 5,6-dihydroquinoxalinyl, 5,6-dihydroquinazolinyl, 4,5-dihydro-1H-benzimidazolyl, 4,5-dihydro-benzoxazolyl, 1,4-naphthoquinolyl, 5,6,7,8-tetrahydro-quinolinyl, 5,6,7,8-tetrahydro-isoquinolyl, 5,6,7,8-tetrahydroquinoxalinyl, 5,6,7,8-tetrahydroquinazolyl, 4,5,6,7-tetrahydro-1H-benzimidazolyl, 4,5,6,7-tetrahydro-benzoxazolyl, 1H-4-oxa-1,5-diazanaphthalen-2-onyl, 1,3-dihydroimidizolo-[4,5]-pyridin-2-onyl, 2,3-dihydro-1,4-dinaphtho-quinonyl, 2,3-dihydro-1H-pyrrol[3,4-b]quinolinyl, 1,2,3,4-tetrahydrobenzo[b]-[1,7]naphthyridinyl, 1,2,3,4-tetra-hydrobenz[b][1,6]-naphthyridinyl, 1,2,3,4-tetrahydro-9H-pyrido[3,4-b]indolyl, 1,2,3,4-tetrahydro-9H-pyrido[4,3-b]indolyl, 2,3-dihydro-1H-pyrrolo-[3,4-b]indolyl, 1H-2,3,4,5-tetrahydroazepino[3,4-b]indolyl, 1H-2,3,4,5-tetrahydroazepino-[4,3-b]indolyl, 1H-2,3,4,5-tetrahydroazepino[4,5-b]indolyl, 5,6,7,8-tetrahydro[1,7]napthyridinyl, 1,2,3,4-tetrahydro-[2,7]-naphthyridyl, 2,3-dihydro[1,4]dioxino[2,3-b]pyridyl, 2,3-dihydro[1,4]-dioxino[2,3-b]pryidyl, 3,4-dihydro-2H-1-oxa[4,6]diazanaphthalenyl, 4,5,6,7-tetrahydro-3H-imidazo-[4,5-c]pyridyl, 6,7-dihydro[5,8]diazanaphthalenyl, 1,2,3,4-tetrahydro[1,5]-napthyridinyl, 1,2,3,4-tetrahydro[1,6]napthyridinyl, 1,2,3,4-tetrahydro[1,7]napthyridinyl, 1,2,3,4-tetrahydro-[1,8]napthyridinyl or 1,2,3,4-tetrahydro[2,6]napthyridinyl. In some embodiments, heteroaryl groups are optionally substituted. In one embodiment, the one or more substituents are each independently selected from among halo, hydroxy, amino, cyano, nitro, alkylamido, acyl, C1-6-alkyl, C1-6-haloalkyl, C1-6-hydroxyalkyl, C1-6-aminoalkyl, C1-6-alkylamino, alkylsulfenyl, alkylsulfinyl, alkyl sulfonyl, sulfamoyl, or trifluoromethyl.

Examples of heteroaryl groups include, but are not limited to, unsubstituted and mono- or di-substituted derivatives of furan, benzofuran, thiophene, benzothiophene, pyrrole, pyridine, indole, oxazole, benzoxazole, isoxazole, benzisoxazole, thiazole, benzothiazole, isothiazole, imidazole, benzimidazole, pyrazole, indazole, tetrazole, quinoline, isoquinoline, pyridazine, pyrimidine, purine and pyrazine, furazan, 1,2,3-oxadiazole, 1,2,3-thiadiazole, 1,2,4-thiadiazole, triazole, benzotriazole, pteridine, phenoxazole, oxadiazole, benzopyrazole, quinolizine, cinnoline, phthalazine, quinazoline and quinoxaline. In some embodiments, the substituents are halo, hydroxy, cyano, O—C1-6-alkyl, C1-6-alkyl, hydroxy-C1-6-alkyl and amino-C1-6-alkyl.

As used herein, the terms "halo" and "halide", which are referred to herein interchangeably, describe an atom of a halogen, that is fluorine, chlorine, bromine or iodine, also referred to herein as fluoride, chloride, bromide and iodide.

As used herein, the term "about" when combined with a value refers to plus and minus 10% of the reference value. For example, a length of about 1000 nanometers (nm) refers to a length of 1000 nm+−100 nm.

It is noted that as used herein and in the appended claims, the singular forms "a," "an," and "the" include plural referents unless the context clearly dictates otherwise. Thus, for example, reference to "a polynucleotide" includes a plurality of such polynucleotides and reference to "the polypeptide" includes reference to one or more polypeptides and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

Various embodiments and aspects of the present invention as delineated hereinabove and as claimed in the claims section below find experimental support in the following examples.

EXAMPLES

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells—A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, C T (1994); Mishell and Shiigi (eds), "Strategies for Protein Purification and Characterization—A Laboratory Course Manual" CSHL Press (1996); all of which are incorporated by reference. Other general references are provided throughout this document.

Example 1: Direct Chemical Modification

As positive charges facilitate intracellular delivery via the endocytosis pathway, several small polyamine derivatives were tested. GFP/IgGs were directly conjugated with either Tetraethylenepentamine (TEPA), triethylenetetramine (TETA) or polyethylenimine (PEI) and the uptake of the protein into the cell was monitored. As PEI was found to be by far superior (data not shown), all further experiments were performed with PEI.

PEIs are long polymers, either linear or branched, with molecular weights usually spanning above 10 KDa, characterized as having the highest cationic charge density among existing polymers. This led to their use as transfection agents, where their high positive charge is used for complexation of negatively charged DNA or RNA and further for internalizing these nucleic acids into cells. While these high molecular weight transfection agents are efficient in in vitro applications, they are less useful in in vivo applications. Thus, ultra-low molecular weight PEI moieties, namely branched PEI molecules of molecular weights ranging from 600 to 1800 Da (as measured my mass spectrometry) were employed. These ultra-low molecular weight PEIs can be chemically and covalently conjugated to a protein payload to be internalized.

Ultra-low molecular weight PEIs, mainly of 600 Da, were conjugated to IgGs and GFP. As PEI contains many primary amines, conjugation to the protein's carboxylic acid residues of Glutamic and Aspartic acids, as well as to the C-terminal carboxy group, was carried out using carbodiimide conjugation chemistry. Reactions were carried out at an excess of PEI, namely 3500 molar excess, and control of the level of modification was achieved by modulating the level of the carbodiimide agent (N-(3-Dimethylaminopropyl)-N'-ethylcarbodiimide hydrochloride (EDC)) in the reaction. The level of modification was determined by MALDI-ToF mass spectrometry (FIG. 1). In the case of IgG based proteins, the mean level of modification ranged from 1 to 8.5 molecules of PEI (600 Da) per IgG molecule, which was achieved with excess levels of EDC ranging from 25 to 400 molar equivalents, respectively. Since the PEI modification is not site selective, it results in a broad distribution of molecular weight moieties, as observed in the MALDI-ToF spectra (FIG. 1). The average modification level was calculated based on the molecular weight value at the measured peak top, minus the molecular weight value at measured peak top of the non-modified protein which gives the weight of added PEI. Dividing this value by the molecular weight of a single PEI molecule used for the modification gives the number of molecules added on average.

Figure 2:
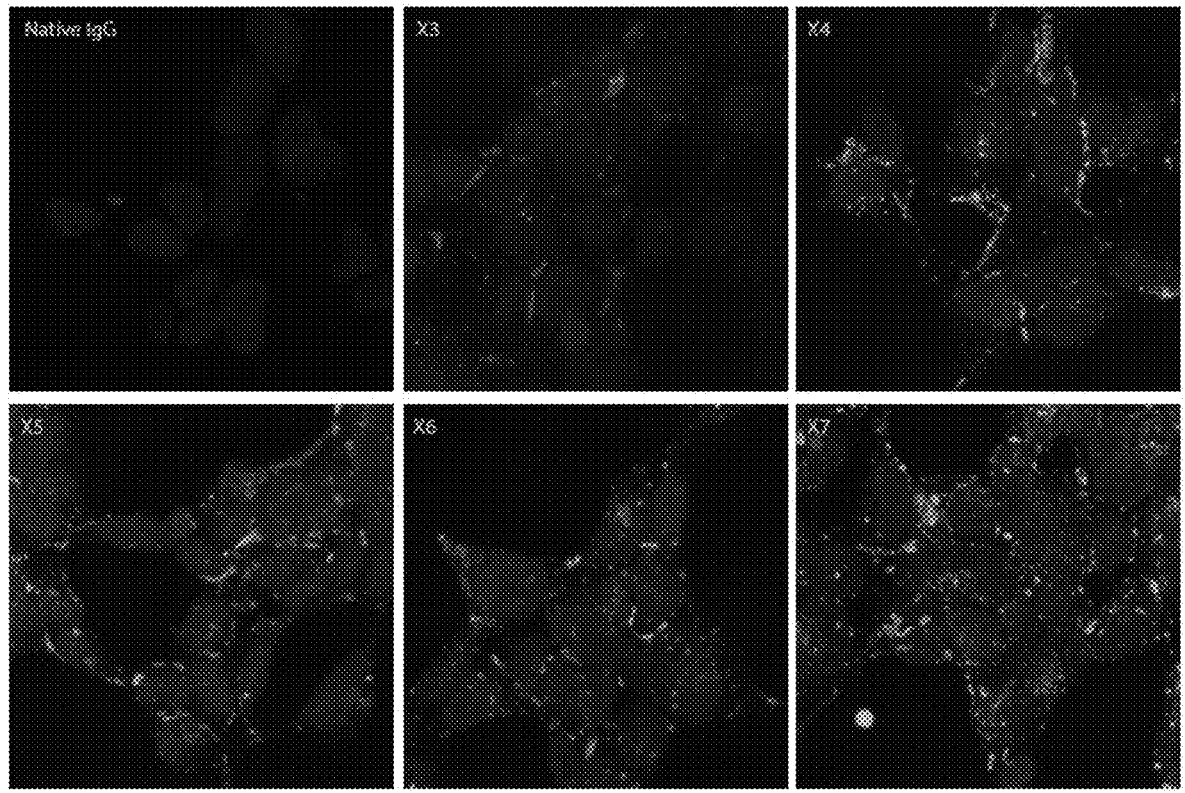
FIG. 2: Micrographs of internalization of PEI-modified or unmodified mouse IgG into A375 cells (Blue—nuclei, Green—stained mouse IgG). Native IgG is not modified, and all other panels show ascending levels of modification with PEI. The numbers in the corner of each panel denote the average number of PEI molecules per IgG molecule.

Next, PEI-modified and unmodified mouse IgG was incubated with A375 cells for two hours. No additional inducement for transfection/internalization was added. As can be seen in FIG. 2, the non-modified mouse IgG did not enter the A375 cells. In contrast, even low levels of PEI-modification (average of 3 PEI molecules per IgG molecule, X3) enables internalization, while increasing the average level of modification increased the level of IgG observed inside the cells proportionally. Similar results were observed when flow cytometry was used to measure the internalization (data not shown).

Figure 3:
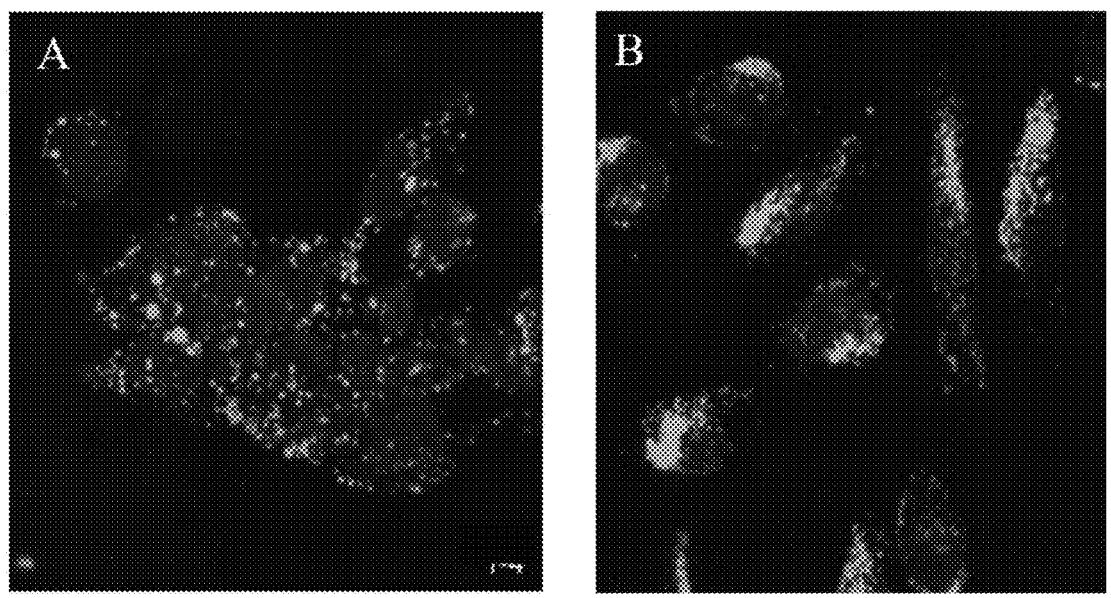
FIGS. 3A-3B: Micrographs of internalization of PEI-modified GFP (average of 6.5 PEIs per GFP molecule) into (3A) HEK cells (60 µg/mL) and (3B) A375 cells (5 µg/mL).

Similar internalization efficiency and dependence of modification level were observed for other payloads, including other IgGs (data not shown) and Green Fluorescence Protein (GFP) (FIG. 3A-3B).

Single domain antibodies and other smaller payloads are ideal for intracellular activity as their size is also an advantage for higher and easier dispersibility in the crowded cytoplasm. Small protein payloads may encounter functional issues if directly modified with PEI molecules. In small proteins the chance that such chemical modifications would interfere with the functional domains of the protein is extremely high. By using a selective conjugation chemistry for the linker to the therapeutic agent at a specific site or domain, one can control the exact location of linker conjugation, diverting it away from the active domains of the therapeutic agent.

Even better, the use of a carrier protein that carries the chemical modification eliminates this risk altogether. Additionally, small proteins in general and single domain antibodies in particular will certainly face pharmacokinetic challenges rendering them unfit for therapeutic application due to very low plasma half-life and high clearance. Hence the inventors have preferred the delivery of protein payloads using the described carrier protein system.

Figure 4A:
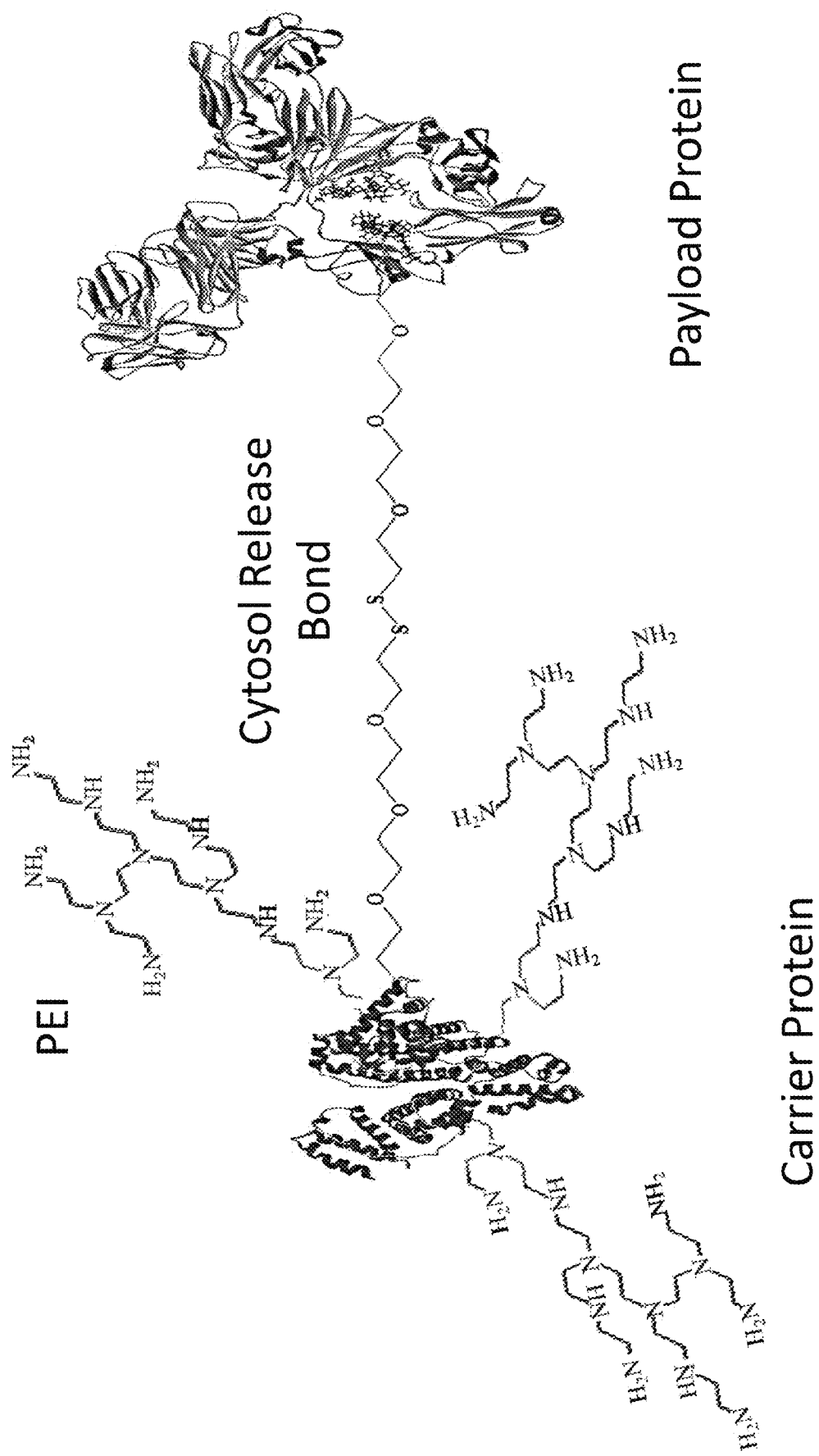
FIGS. 4A-4B: Schematic representations of the carrier and payload methodology in which a PEI-cationized carrier protein is chemically linked to a therapeutic agent, an antibody in this example, where the linker is ideally conjugated to the Fc region of the antibody, away from its CDRs. The linker may include (4A) a disulfide bond that can be reduced and cleaved in the cytoplasm, releasing the therapeutic payload from the cationized carrier enabling free cytosolic trafficking or (4B) can lack a cleavable moiety.
Figure 4B:
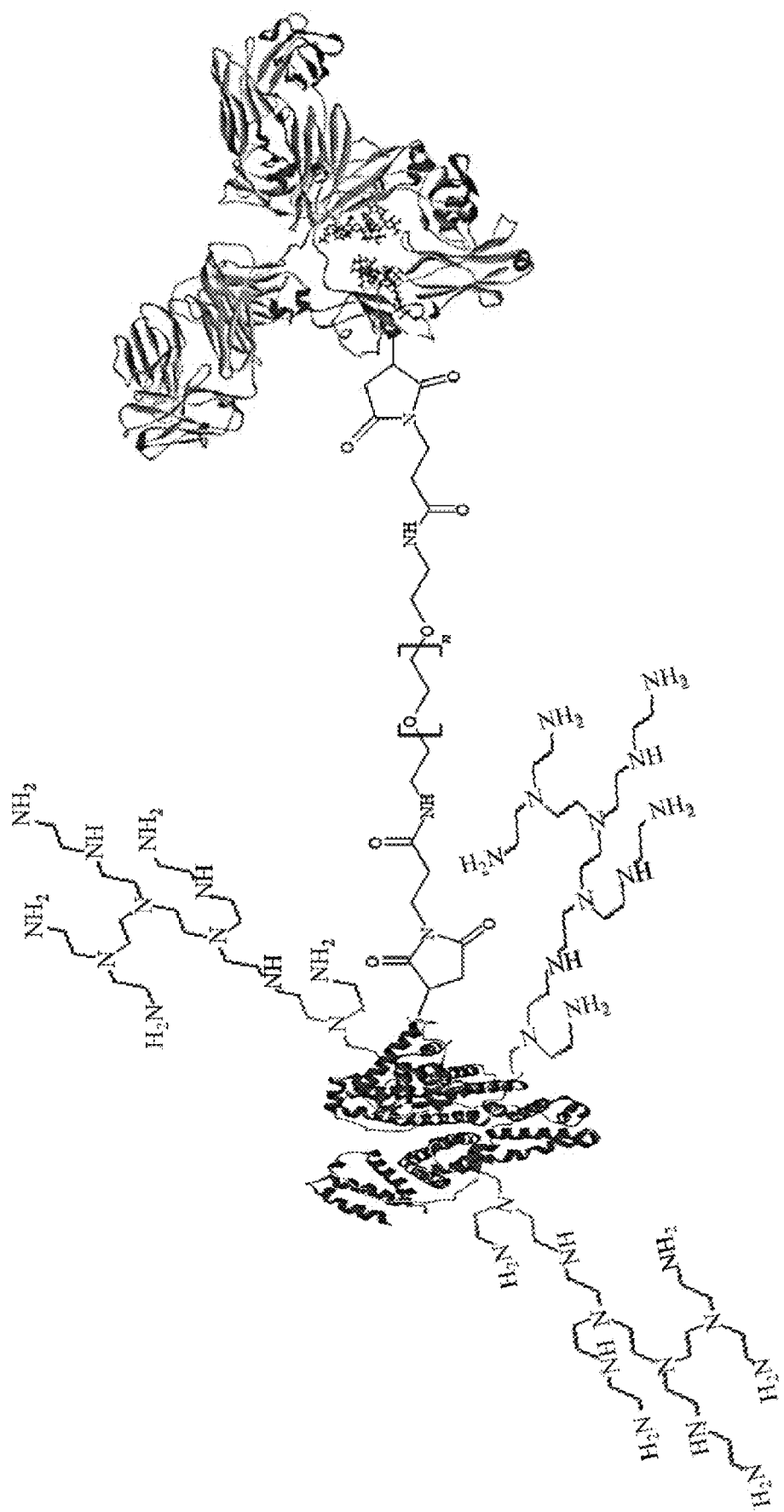

Two schematic representations of this carrier and payload methodology are depicted in FIGS. 4A-4B. As can be seen, the carrier protein bears the PEI groups and is responsible for membrane crossing and endosomal escape. These groups can be conjugated to the carrier protein either randomly or site-selectively. In the case of random conjugation, the level of conjugation can be controlled by choosing specific reaction conditions as described hereinabove. FIG. 4A shows a configuration with a cytosolic cleavable S—S bond. It will be understood that this bond can be simply replaced with a C—C bond or an O—C bond to produce a non-cleavable linker. An alternative configuration of a conjugate with a non-cleavable linker is shown in FIG. 4B.

The carrier protein itself is preferably selected from a list of human endogenous proteins to avoid immunogenicity issues. Further, a protein which is commonly found in the blood, and which has a naturally long circulatory half-life, is preferable. Lastly, a protein that is able to deliver its payload to areas in the body where the therapeutic agent is desired would be advantageous. Examples for such areas in the body can include tumors and their microenvironment, as well as sites of inflammation that are important for autoimmune disease and many other pathological conditions. Human Serum Albumin (HSA) was therefore selected. HSA is a circulatory protein, with a long half-life and has been shown to traffic to tumors and sites of inflammation, and even to deliver payloads to those sites, though only to the extracellular milieu (see Liu et al. BMC Biotechnology 2012, 12:68; Kratz, F., Journal of Controlled Release 132 (2008) 171-183; Um et al., Bioconjugate Chem., 2019, 10.1021/acs.bioconjchem.9b00760, Wunder A. et al., J Immunol 2003; 170:4793-4801; and Yazaki P. J. et al., Nuclear Medicine and Biology, 35 (2008) 151-158, hereby incorporated by reference in their entirety).

The therapeutic agent is conjugated to a single linker at a single conjugation site along the polypeptide chain of the biologic agent. This conjugation site is located in a position where it will not interference with the agent's activity. The linker can be selected from a peptide linker, a chemical linker or a combination. A polymer-based linker, PEG, was selected. As discussed above, a labile bond, sensitive to the specific conditions in a cell's cytoplasm, may also be incorporated.

In order to demonstrate the importance of the carrier, single domain antibody payloads were directly conjugated to PEI molecules without a carrier. In order to minimize interference with the CDRs of single domain antibodies the PEI should be attached at a specific site in the single domain antibody, preferably as far as possible from these CDRs. A good location is the C-terminus of such payloads. In the case of utilizing a C-terminal cysteine of VHHs or DARPins, as described above, for PEI modification, only one unit of PEI is conjugated to the payload. Therefore, to reach a significant positive charge with just one PEI unit, a branched PEI with a molecular weight of 1800 Da was also used, in addition to the 600 Da PEI described in this invention for carrier modification.

The conjugation of the PEI was performed at a selective site, the C terminus of the payload, with either reversible or non-reversible, disulfide bonds. In addition, a random (not site-specific), non-reversible PEI modification on the single domain antibody was also performed. It should be noted that the inventors always obtained multiply PEI modified payloads. Furthermore, the crude reaction mixture always comprises multiple products which are tedious to separate. Accordingly, it has been postulated that in order to obtain a specific PEI modification (e.g., with a predetermined location of PEI modifications, and/or a conjugate having a predetermined number of PEI moieties), there is a need to synthesize the conjugates of the invention by linking a PEI modified carrier to the payload via a linker, as described herein.

For this purpose, PEIs (1800 or 600 Da) were modified with NHS-$PEG_{12}$-SPDP or NHS-$PEG_8$-MAL, to yield thiol reactive PEIs for payload conjugation, in a reversible or non-reversible manner, respectively. The activated PEIs were reacted with anti-BRAF VHH, 1C5-Hel20-LC, to achieve the following constructs:

1. 1C5-Hel20-LC-S—S-$PEG_{12}$-C(O)—NH-PEI1800 (S6)
2. 1C5-Hel20-LC-$PEG_8$-C(O)—NH-PEI1800 (S7)
3. 1C5-Hel20-LC-S—S-$PEG_{12}$-C(O)—NH-PEI600 (S6A)
4. 1C5-Hel20-LC-$PEG_8$-C(O)—NH-PEI600 (S7A)

Random modification was achieved by reaction of 1C5-Hel20-LC with PEI1800 in the presence of EDC, to give 1C5-Hel20-LC-r-C(O)—NH-PEI1800 (S8). The different constructs of payload conjugated directly to PEI were evaluated for their ability to penetrate A375 cells and induce apoptosis following BRAF inhibition. These constructs were compared to the payload conjugated to the carrier of the invention, via a reversible bond, named: 1C5-Hel20-LC—S—S-HSA-PEI×4.5 (S5C) and via a non-reversible bond: 1C5-Hel20-LC-HSA-PEI×4.5 (S5D).

The chemical structures of the conjugates (S5D, S6-S7A) are presented in Table 1, above.

As can be seen in FIGS. 5A-5D, when treated with 1 μM of all agents (FIG. 5A-5B) or with 3 μM (FIG. 5C-5D), only the anti-BRAF VHH conjugated to the carrier, either via a reversible or non-reversible linkage, exhibited efficient BRAF inhibition leading to an unmistakable apoptotic signal while all VHHs directly modified with PEI, whether site directed (FIG. 5A-5B) or by random modification (FIG. 5C-5D) exhibited no, or very limited apoptosis. The inactivity of the directly modified VHHs can be explained by lower levels of membrane crossing and even more so much lower efficiency of endosomal escape as evidenced by limited intracellular staining with an anti-VHH in all cases that lacked a carrier protein (FIG. 5E-5L). The lower escape is due to the low level of PEI molecules, as even the use of a larger PEI modifier (1800 Da) was not sufficient to compensate. The Zeta potential of one of those VHHs, modified with an 1800 Da PEI non-reversibly at its C-terminal was measured to be only below about +5 mV, which seems to be too low for efficient internalization and endosomal escape. Furthermore, as mentioned above, lack of activity could have also been caused due to interference of the closely conjugated PEI to the active domains of the VHH, or by folding of the linker back upon itself thereby obscuring the PEI, CDRs or both.

In a parallel experiment A375 cells were plated in a black/clear bottom 96-well plates at 1500 cells per well. After 24 hr, PBS diluted, anti BRAF 105 VHH conjugated to HSA-PEI×3.5 (using non-reversible, maleimide-based linker) was added to the cells (3.2 μM final concentration). 2A1 VHH (anti-CD28 VHH, here as irrelevant VHH) conjugated to HSA-PEI×3.5 (using non-reversible, maleimide-based linker), as well as PEI modified HSA were used as negative controls (at final concentration of 2404). PF-04880594 (selective RAF inhibitor, Sigma, Cat. No. PZ0294) was used as positive control (at final concentration of 10 μM). Caspase reagent was added to the cells at the beginning of the uptake period (final dilution 1:1000). The kinetic profile of Caspase-3/7 activation was monitored and quantified using live cell imaging, using the IncuCyte® analyzer every 2 hr for 4 days. At the end of the assay, the medium was removed and CellTiter-Glo® Luminescent reagent (Promega) was added for cell viability assessment. The CellTiter-Glo® Luminescent Cell Viability Assay is a method of determining the number of viable cells in the culture based on quantitation of the ATP present, an indicator of metabolically active cells.

Figure 5A:
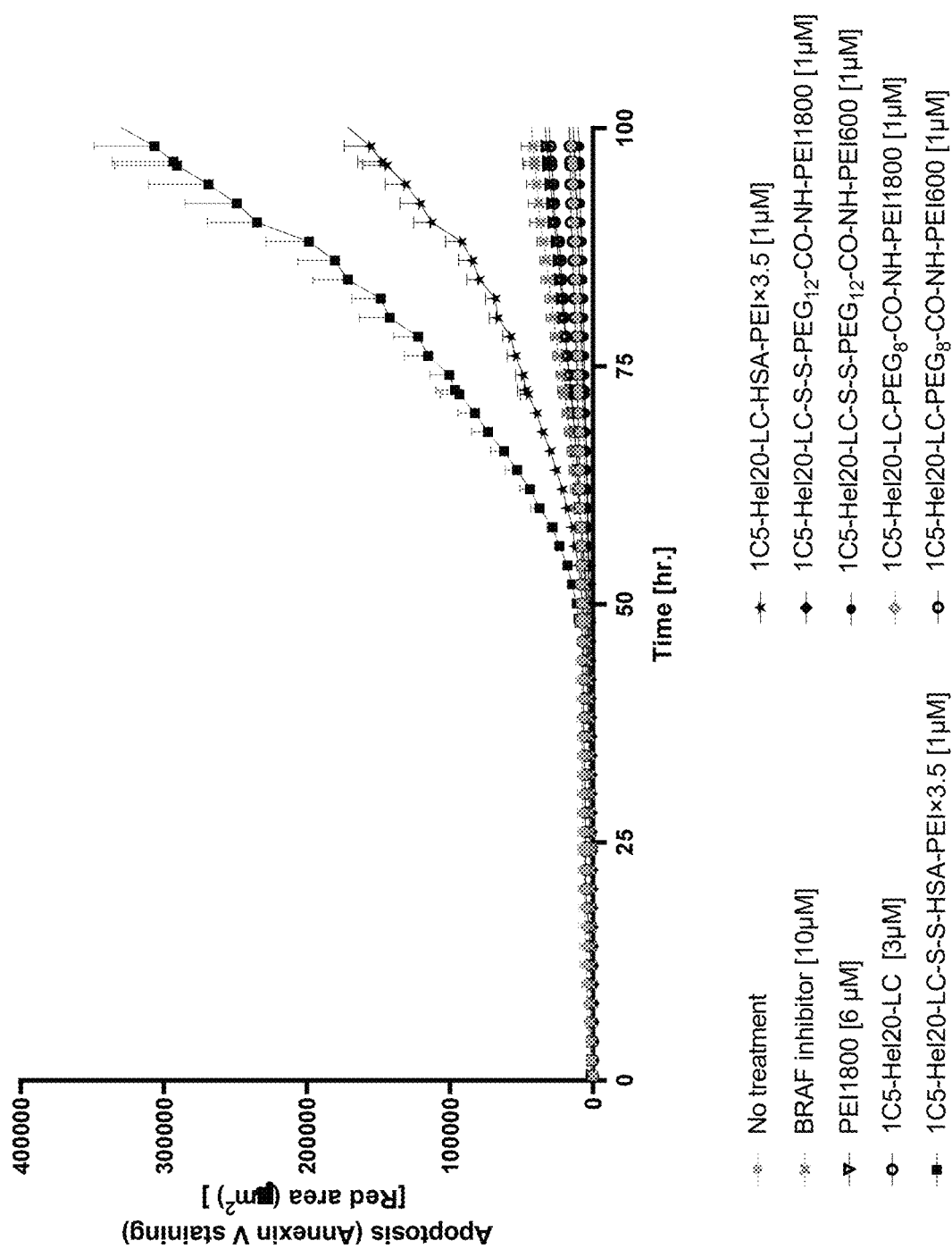
Figure 5B:
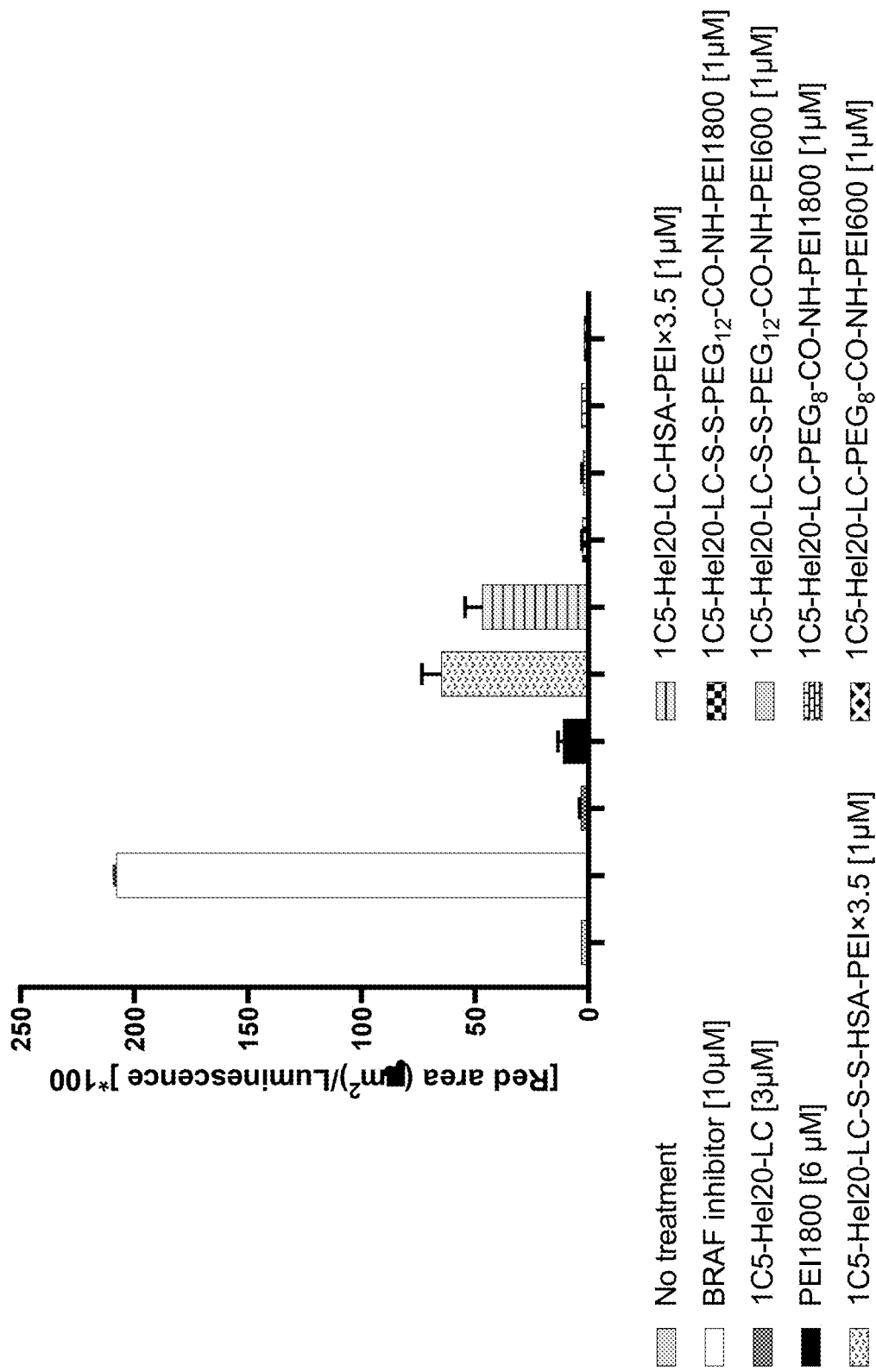
Figure 5C:
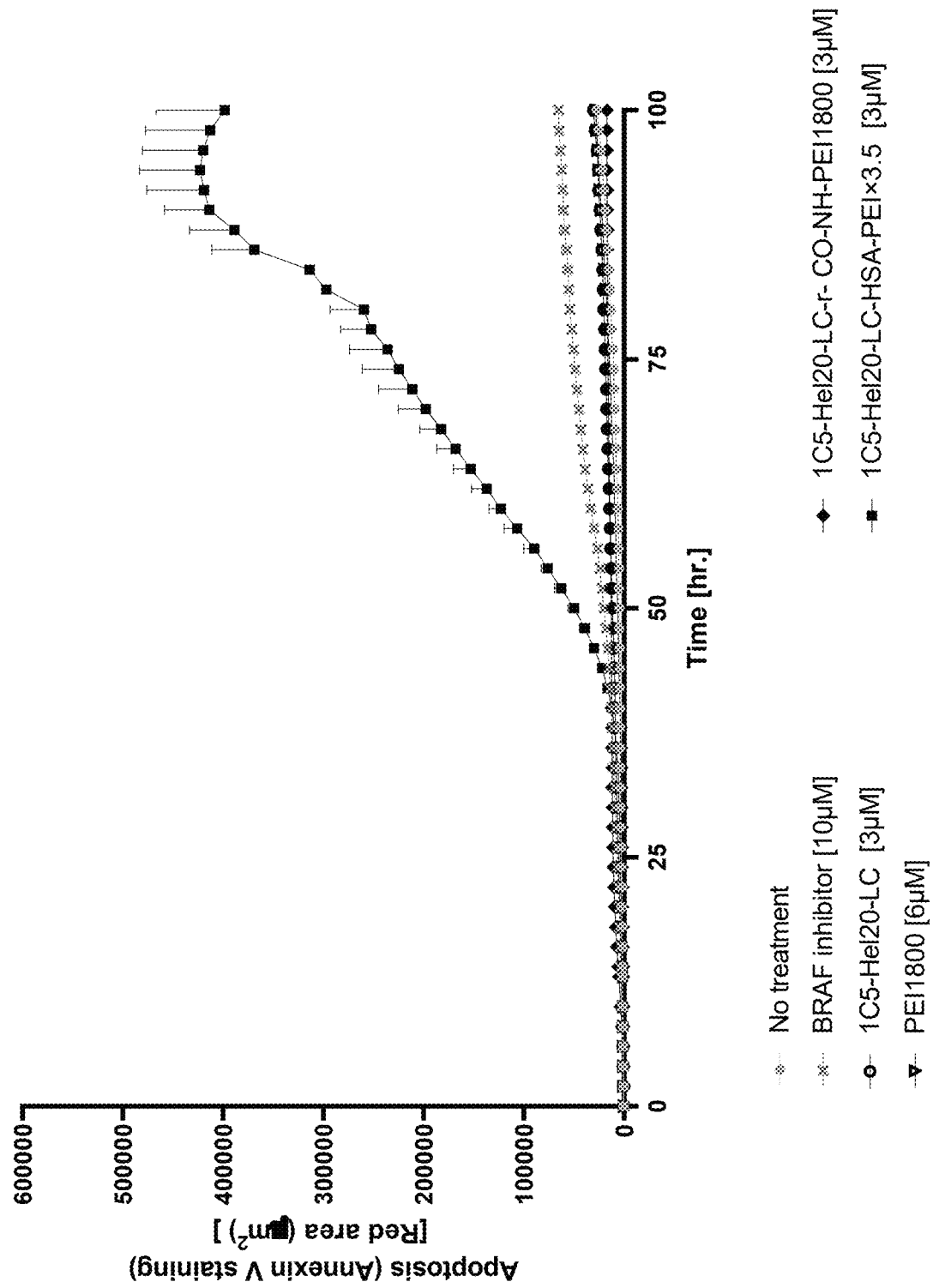
Figure 5D:
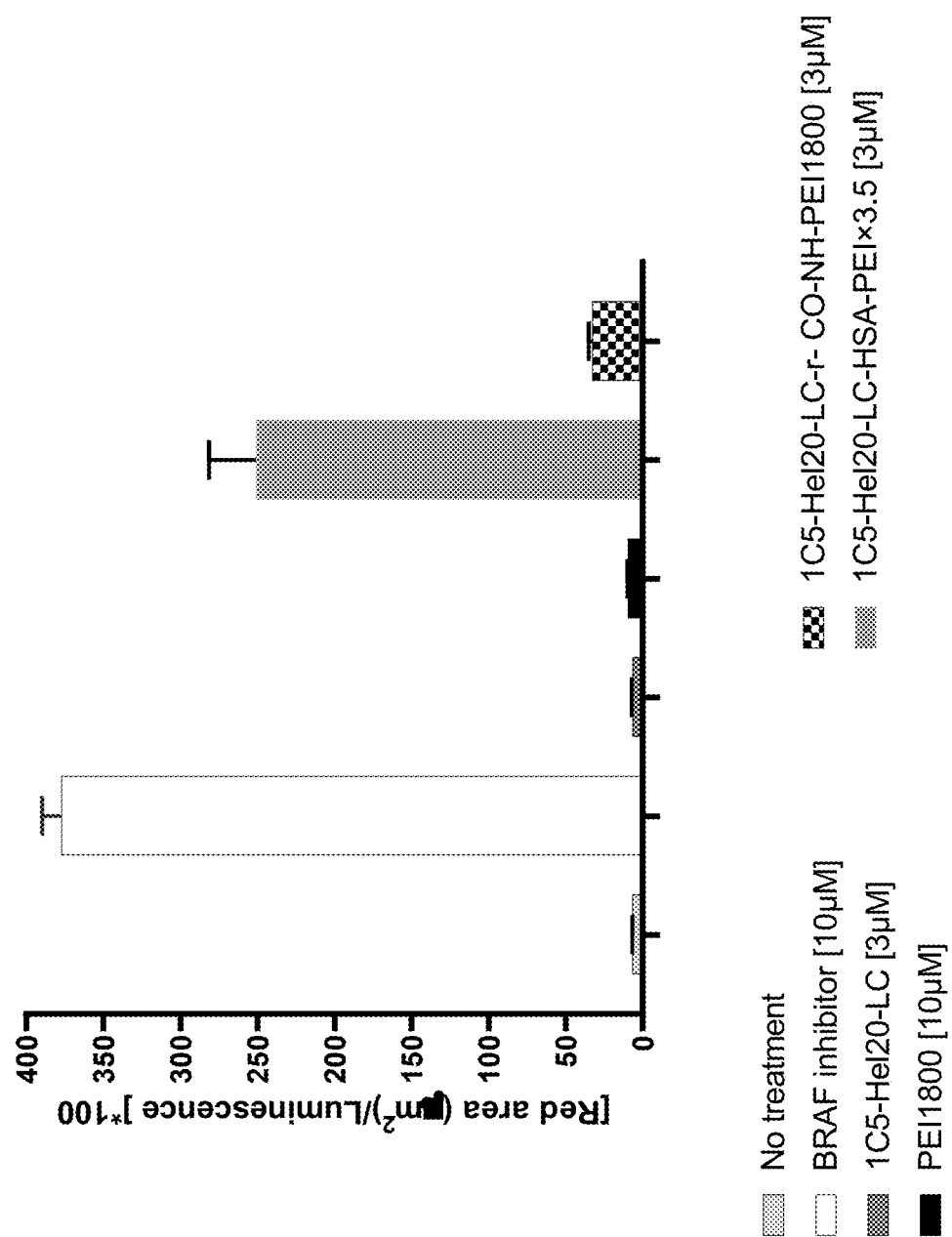
Figure 5M:
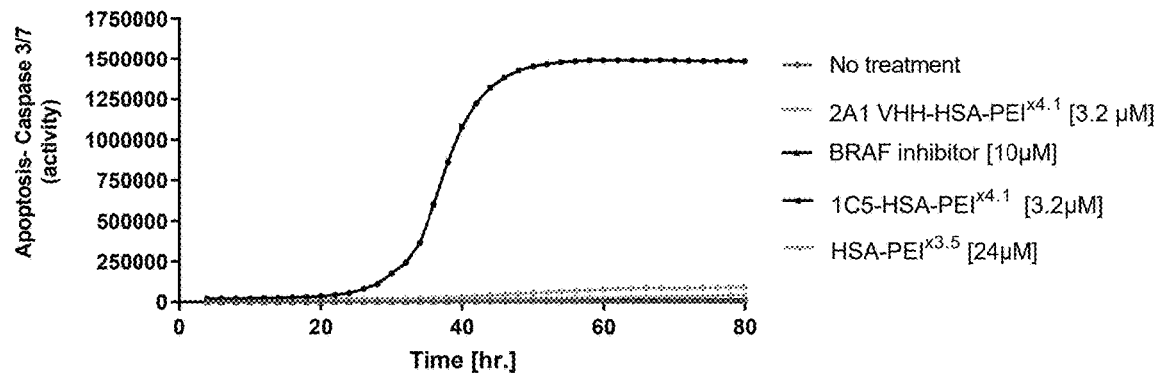

As can be seen in FIG. 5M, only the 105 VHH conjugated to HSA-PEI led to a dramatic increase in Caspase 3/7 activity, suggesting successful and efficient inhibition of BRAF in these cells, leading to apoptosis. Irrelevant VHH, and no VHH controls did not lead to substantial apoptosis of the cells. It should be noted that the BRAF inhibitor was a highly potent cell killer. So much so, that most cells were completely dead before fluorescent signal could be detected (FIG. 5A, 5C, 5M). However, when the signal was normalized to cell titer, it was clear that the inhibitor was highly effective (FIG. 5B, 5D).

Example 2: Membrane Crossing Efficiency

Figure 6:
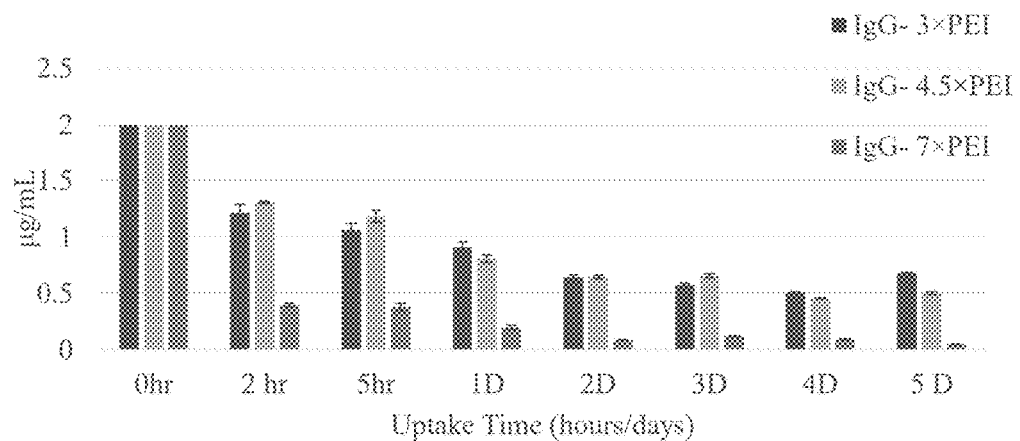
FIG. 6: Bar chart of cellular uptake efficiency of PEI-modified IgG (initial media concentration of 2 µg/mL) at various levels of modification, as measured by a specific ELISA of IgG levels in the media.

Though numerous works with cell penetrating peptides (CPPs) have shown some level of cell internalization, in most cases the efficiency of the initial uptake to the cells was quite low, as high levels of payload in the media were required to produce only a low fraction of molecules actually internalized into the cells. In order to evaluate the efficiency of the initial internalization step, a specific ELISA was used to measure the level of the payload, PEI-modified mouse IgG, in the media as a function of time. As can be seen in FIG. 6, at a high level of PEI-modification (approx. 7) almost all modified IgG is internalized (95%) and most of the internalization occurs during the initial 24 hours of incubation (grey bars). Even at lower levels of modifications (approx. 4.5 and 3), the internalization step is quite efficient, exhibiting an overall uptake of about 75% of the total payload after 5 days of incubation (FIG. 6, darkest grey and lightest grey bars) and follows similar kinetics as the highly modified IgG. The incomplete and slower uptake is likely related to IgGs that are much less modified than the average modification level. The PEI-modification results in a somewhat broad distribution of modified moieties (see FIG. 1) and those molecules that are unmodified or lowly modified (less than 3) are likely still present in the media even after 5 days. This cell-membrane crossing efficiency was observed at various initial media concentrations, ranging from 0.2 to 40 µg/mL of IgG.

Example 3: Endocytosis Pathway Exploited by PEI-Modified Proteins

Figure 7:
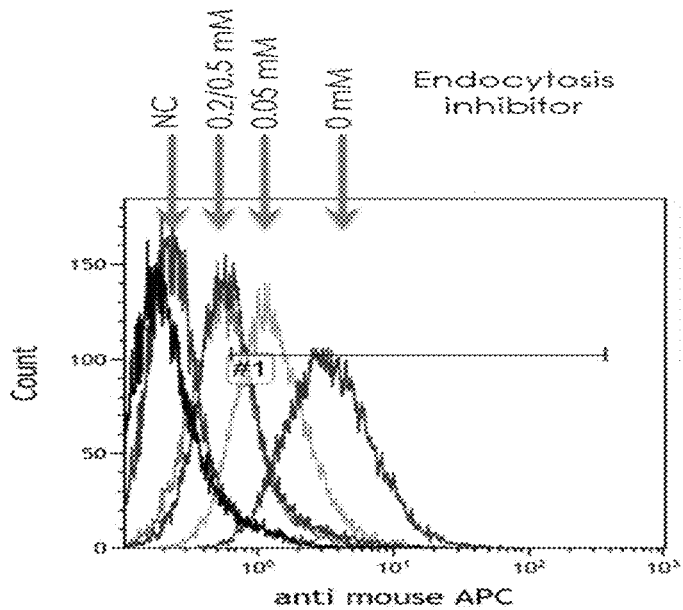
FIG. 7: Histograms showing specific inhibition of Caveolin-mediated endocytic internalization of PEI-modified IgG (4.5 PEIs). NC—non-modified IgG.

Cationized moieties are thought to internalize using a natural endocytosis mechanism. The two relevant endocytosis mechanisms are caveolin- and clathrin-mediated endocytosis. The exact mechanism of internalization was elucidated by performing the internalization of PEI-modified IgG in the presence of known specific endocytosis inhibitors. A375 cells were incubated overnight with PEI-modified mouse IgG (4.5 PEIs) in the presence of Clathrin inhibitors (Amantadine or Chlorpromazine) or a Caveolin inhibitor (Genistein). Genistein, a known Caveolin inhibitor, indeed inhibited the internalization of PEI-modified IgG (FIG. 7). Quite interestingly, addition of Chlorpromazine, a known Clathrin inhibitor, resulted in increased internalization. This corroborates that Caveolin-mediated endocytosis is exploited by the PEI-modified payloads for internalization as inhibition of Clathrin-mediated endocytosis caused a compensatory increase in Caveolin-mediated endocytosis in the cells.

Example 4: Endosomal Escape

Figure 8:
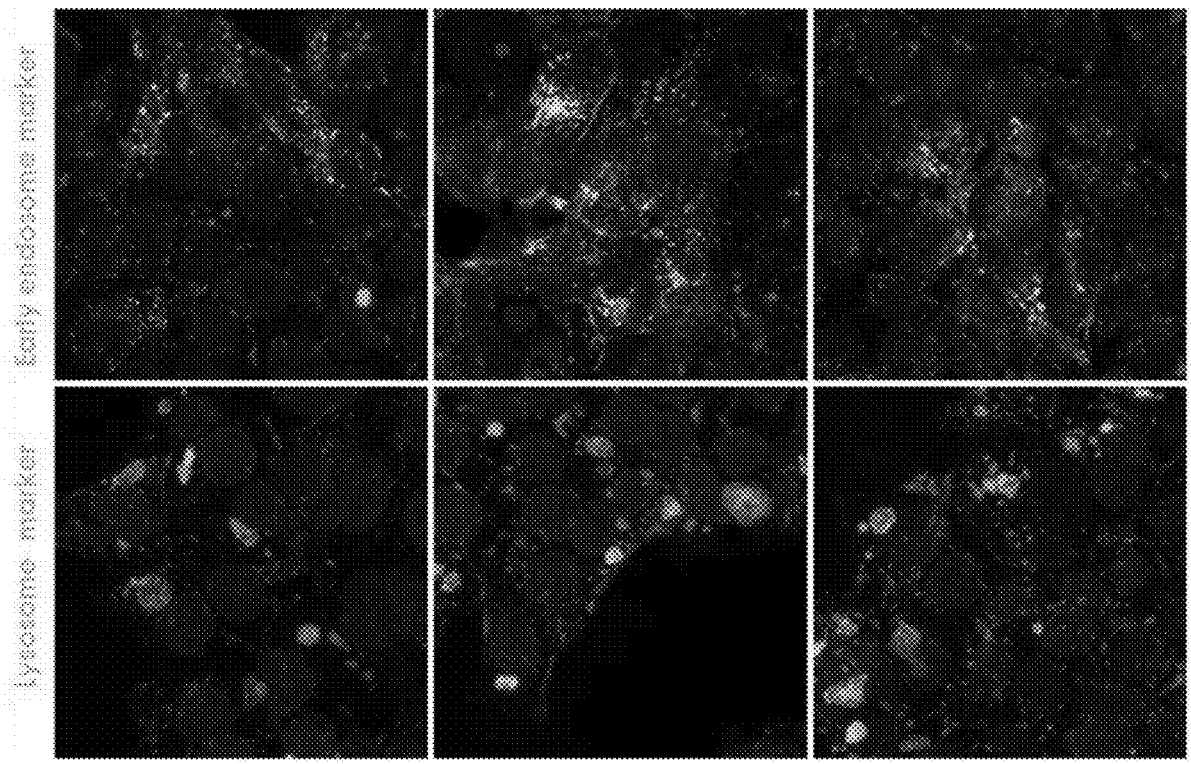
FIG. 8: Micrographs of staining of an endosomal marker (upper panels) or a lysosomal marker (lower panels) expressed in HEK293 cells, following their incubation (5 hours) with 5 µg/mL PEI-modified IgG (3×PEI, left panels; 4.5×PEI, middle panels and 7×PEI, right panels). Endosomal and lysosomal markers appear in Green, PEI-modified IgG in Red and nuclei are stained in Blue.

As described above, perhaps the most challenging hurdle in intracellular delivery of biologic therapeutics is their endosomal escape in order to avoid catabolism of the therapeutic. In order to evaluate whether PEI-modified proteins can escape from endosomes, their internalization was followed using confocal microscopy and counter staining of endosomal and lysosomal markers. PEI-modified IgGs were incubated for 5 hours with HEK293 cells expressing fluorescent endosomal/lysosomal markers. The cells were analyzed by confocal microscopy. Endosomes and lysosomes were transfected with Green fluorescent markers (Cell light Endosome, Molecular Probes, Cat. No. C10586 or Cell light Lysosome, Molecular Probes, Cat. No. C10596) while IgGs were stained with Red-fluorescent anti-mouse antibody. As can be seen in FIG. 8, no major co-localization between the internalized IgG and the early endosomal or lysosomal vesicles was observed. This demonstrated that indeed the PEI-modified payload has successfully escaped the endosomes. These experiments were repeated with the endosomal/lysosomal markers EEA1, transferrin and Calcein. and the same results were observed (data not shown). It must be noted that co-localization is not observed even with early endosomes, suggesting that endosomal escape of PEI-modified proteins occurs rapidly, at the very beginning of the endosomal pathway.

Figure 9:
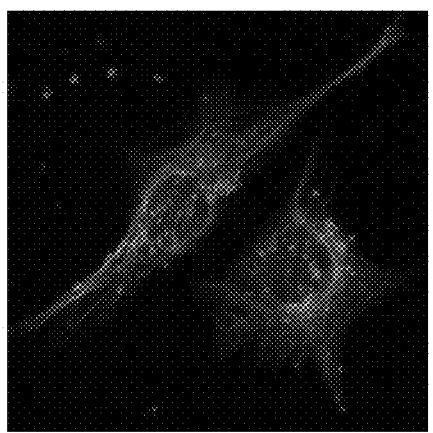
FIG. 9: Micrograph of endosomal escape monitoring using live imaging confocal microscopy of PEI-modified IgGs (4.5×PEI) labeled with a pH sensitive dye (5(6)-carboxynaphthofluorescein, Red) following overnight incubation of the PEI-modified IgG at 10 µg/mL with 2×10⁴ HeLa cells. Green—Tubulin staining, Blue—nuclei staining.

While no co-localization is observed between the PEI-modified IgGs and various endosomal and lysosomal markers, the staining of these IgGs appear punctate in nature. A punctate profile may suggest the inclusion of the internalized IgGs in some sort of vesicles. In order to further corroborate the endosomal escape of PEI-modified proteins, the proteins were labeled with a pH sensitive fluorescent dye, 5(6)-carboxynaphthofluorescein. This dye only fluoresces at pH values above 7. All vesicles of the endosomal pathways are acidic, as the pH of early endosomes is already below 7 and only decreases as the endosomes mature into lysosomes. PEI-modified, pH-sensitive labeled IgGs were incubated with HeLa cells and the cells were analyzed by confocal microscopy. The cells clearly show the unique Red fluorescence of the pH-sensitive dye, indicating the PEI-modified proteins are in a non-acidic compartment (FIG. 9), such as in the cytoplasm. This is further evidence that PEI-modified proteins do efficiently escape the endosomal pathway.

Finally, a functional assay was employed to validate that PEI-modified proteins efficiently escape the endosomes following their internalization. To this end, a monoclonal antibody against CD247, also known as CD3-zeta chain, was modified with PEI and internalized into CD3+ primary cells. The intracellular domain of the CD3 receptor is responsible for T cells activation through its Immunoreceptor Tyrosine-based Activation Motifs (ITAM). The chosen monoclonal anti-CD3 zeta chain antibody (Sigma, Clone ZT-10, Cat. No. SAB4200446) binds one of the ITAMs in the CD3 zeta chain.

Internalization of the PEI-modified anti-CD247 and a PEI-modified mouse IgG as negative control was carried out into CD3+ cells that were pre-stimulated with beads coated with anti-CD3/CD28 antibodies. The media was monitored for Interferon gamma (IFNγ) secretion as a marker for changes in cell's activation level. Although a full antibody would not be expected to be stable in the cytoplasm due to the presence of structurally essential disulfide bonds, the binding of this antibody would activate a signaling cascade that would culminate in IFNγ secretion. Thus, even a small amount of initial activation would produce a quantifiable increase in cytokine levels. As such, even with its expected cytoplasmic instability, internalization of the antibody would be expected to produce an observable IFNγ response.

Figure 10:
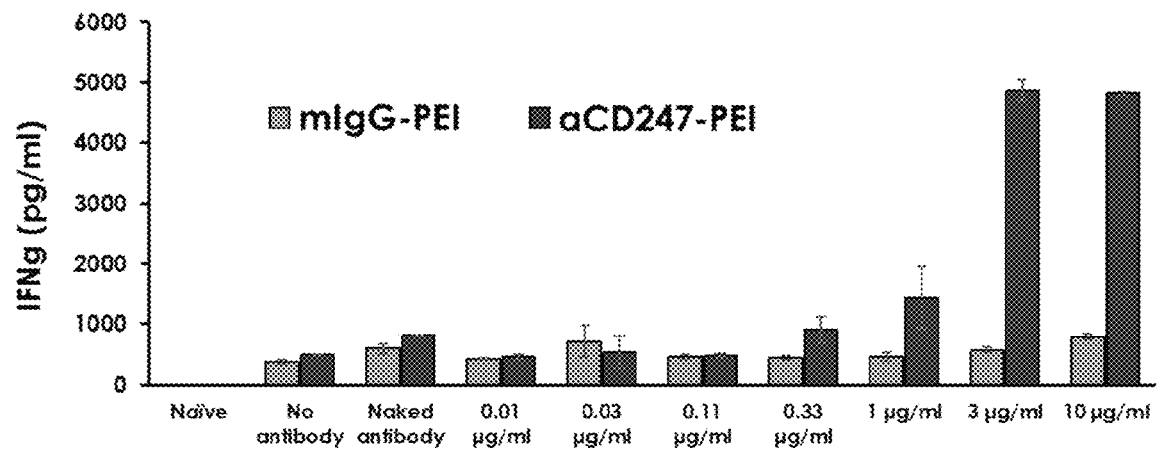
FIG. 10: Bar chart of CD3 cells activation as reflected by dose dependent increase in IFNγ secretion following internalization of anti-CD247 PEI-modified mAb (4.5×PEI). No changes in IFNγ levels were observed for internalized PEI-modified mouse IgG at the evaluated concentration range.

Internalization of the modified antibodies to the CD3+ cells was verified by intracellular FACS analysis (data not shown). Internalization of the anti-CD247 PEI-modified mAb (4.5×PEI) resulted in a dose dependent activation of the CD3 cells as measured by elevation of IFNγ secretion (FIG. 10). PEI-modified mouse IgG did not cause any CD3 cell activation at the range of antibody concentrations used in this experiment. This result further corroborates endosomal escape of the PEI-modified proteins and their ability to exert biological and clinical effects in target cells.

Example 5: Cytosolic Dispersibility and Payload-Carrier Solution

Although endosomal escape of the PEI-modified proteins clearly occurs based on functionality, microscopy images of various internalized proteins exhibit a punctate profile (FIGS. 2, 3, 8 and 9). It was hypothesized that while the PEI modification is highly efficient in cell membrane crossing and endosomal escape, the same modification impedes the PEI-modified proteins from dispersing efficiently in the cytoplasm. This dispersibility problem may be the result of a strong electrostatic interaction between the strongly cationized internalized protein and various cytoplasmic proteins, mainly cytoskeletal proteins, most of which are negatively charged. Low cytoplasmic dispersibility may negatively affect the efficacy of any intracellular biologic agent as the agent may not be able to reach its intracellular target, whether in the cytoplasm or in other intracellular compartments or organelles.

In order to overcome this intracellular dispersibility hurdle, disulfide bonds were incorporated into a linker between the therapeutic agent and a universal carrier pre-modified with PEI. The linkage selected was a chemical linker, with a disulfide bond incorporated. This labile disulfide bond will be cleaved upon endosomal escape due to the high reducing potential of the cytoplasm, mainly due to its high concentration of glutathione, thus releasing the therapeutic agent from its cationized carrier and enabling the free movement of the therapeutic agent in the cell's cytoplasm. In order to evaluate the efficiency of the carrier-payload methodology, GFP was conjugated to a PEI-cationized HSA via a PEG-based linker incorporating a disulfide bond. eGFP (Biorbyt, Cat. No. orb84840) was modified with NETS-PEG$_4$-SPDP. PEI-modified HSA (11×PEI) was also further reacted with NHS-PEG$_4$-SPDP following reduction of this SPDP to a free thiol using DTT. The SPDP-activated eGFP was reacted with the HSA-PEI-free thiol to create the GFP-HSA conjugate with the labile disulfide bond incorporated in the linker.

Figure 11:
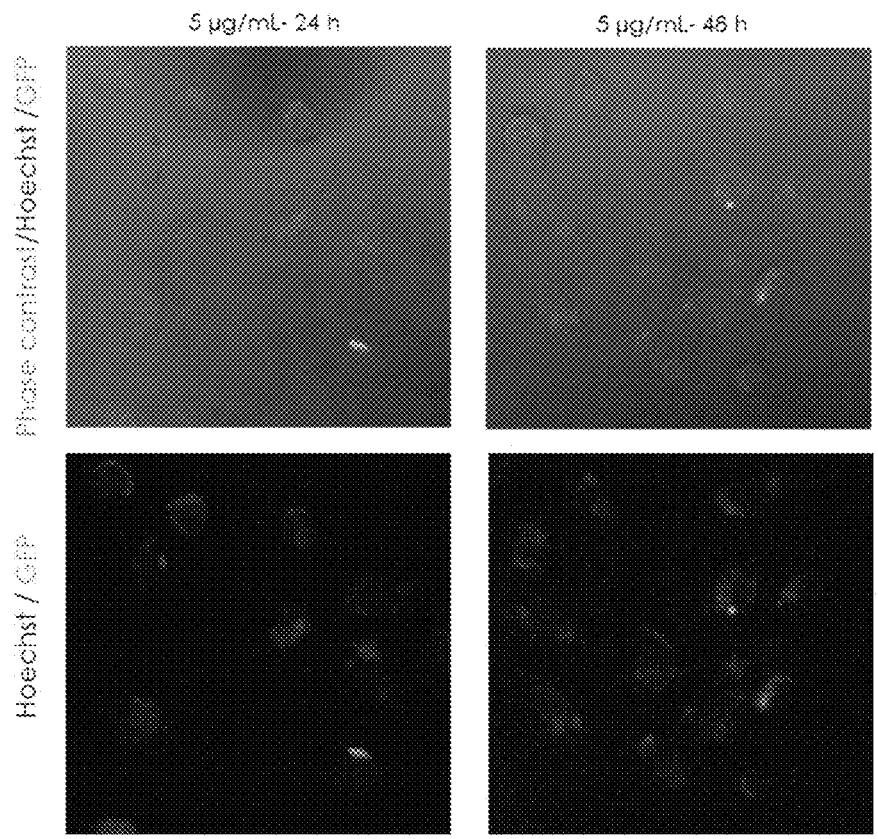
FIG. 11: Micrographs showing the intracellular profile of GFP following the incubation of A375 cells with GFP conjugated by PEG-based disulfide containing linker to PEI-modified HSA (7×PEI). Cells exhibit a dispersed GFP profile at 24 (left) and 48 (right) hours post incubation as observed by confocal microscopy (Green—GFP; Blue—nuclei).
Figure 12:
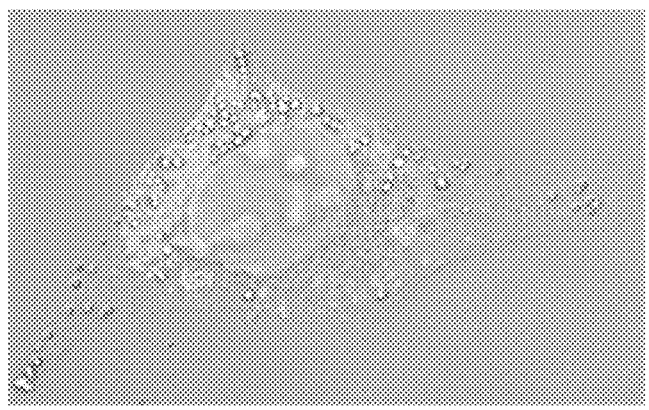
FIG. 12: Micrographs of anti-TNFα antibody conjugated to PEI-modified HSA (11×PEI) via a disulfide-bond containing PEG linker following overnight incubation with A375 cells and as detected by confocal microscopy using a fluorescent labeled (AlexaFluor 647) anti-human IgG antibody.
Figure 12:
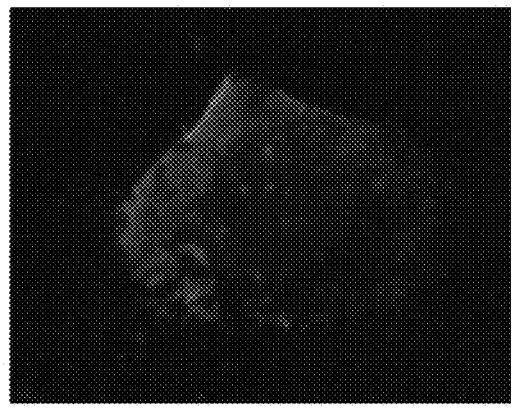

As opposed to the punctate profile of internalized PEI-modified GFP (FIG. 3), when the GFP disulfide-linked to PEI-cationized HSA was internalized to cells it yielded a fully dispersed profile without puncta (FIG. 11). To verify the efficient dispersal of the internalized therapeutic payload, a full therapeutic anti-TNFα monoclonal antibody (Humira®, Abbvie) was linked to PEI-modified HSA via a PEG-based linker incorporating a disulfide bond. Similar to GFP, the antibody was modified with NHS-PEG$_4$-SPDP. PEI-modified HSA (11×PEI) was also further reacted with NHS-PEG$_4$-SPDP following reduction of the SPDP to a free thiol using DTT. The SPDP-activated antibody was reacted with the HSA-PEI-free thiol to create the antibody-HSA conjugate with the labile disulfide bond incorporated in the linker. As can be seen in FIG. 12, the internalized monoclonal antibody disperses throughout the cytoplasm, again corroborating the hypothesis that direct cationization impeded free dispersion in the cytoplasm and demonstrating the effectiveness of the solution of separating the payload from its cationized carrier.

This dispersibility can also be seen in FIGS. 5F-5G and by comparing FIG. 3 to FIG. 11. The payload conjugated with the linker containing a S—S cleavable bond was more evenly dispersed throughout the cells. However, this does not mean that the construct without the cleavable linker did not distribute at all or was non-functional. FIG. 5G clearly shows distribution of the VHH with a non-cleavable linker in the cell and FIGS. 4A-D clearly show that the conjugate with a non-cleavable linker could still bind target and function, though it is notable that the construct with the cleavable linker was superior at inducing apoptosis (FIG. 5A-5B). Thus, while dispersibility is beneficial and while there may be some hard to reach/bind target for which it is indispensable, a non-cleavable linker can still be fully functional.

Example 6: Cytosolic Stability

The therapeutic agents need to not only enter the cytoplasm of target cells but also exert their biological activity. Even molecules that are transported to other subcellular locations (nucleus, ER, mitochondria, etc.), still would pass through the cytoplasm. Many biological therapeutic agents are based on an antibody scaffold or its derivatives. Often these therapeutic agents bind a specific target and either antagonize or agonize that target. The binding activity of these agents is totally dependent on their tertiary and quaternary structures. In antibody-based molecules, either full IgGs or their truncated derivatives (Fabs, scFvs, etc. . . . ), these structures are based on, and stabilized by, disulfide bonds, either intra- or inter-chain. However, as mentioned above, the cytoplasm, as well as other subcellular organelles and compartments, is characterized by a highly reducing environment. The major reducing agent, Glutathione, has a cytosolic concentration ranging from 1 to 11 mM. In contrast, its plasma level is in the low micromolar values. This characteristic of the cytoplasm has hampered the use of antibody-based agents, as well as other biological agents which utilize disulfide bonds in their structure, as an efficient intracellular route of treatment.

An in vitro experiment showed that exposure of an antibody to cytosolic levels of Glutathione (GSH) leads to the reduction of disulfide bonds after only a few hours, as seen by the appearance of multiple bands on an SDS-PAGE Western blot as detected by an anti-light chain antibody. Overnight exposure leads to lack of detection of the antibody in Western blot, probably due to loss of 3D structure or even aggregation and sedimentation. The latter are known phenomena of intracellularly expressed antibodies and their derivatives (Kabayama, H. et al., Nature Communications 2020, (11), 336, herein incorporated by reference in its entirety). Any such effect on an intracellular biological agent would be detrimental to its ability to bind a biological target and to exert a therapeutic effect.

In light of these intracellular stability issues, single-domain antibodies were selected as the therapeutic payload. Such single-domain antibodies are single-chain protein-based molecules with the ability to bind other proteins. Their structure lacks any essential disulfide-bonds, making them resistant to the cytosol's reducing environment. Such single-domain binding proteins include truncated forms of heavy chain antibodies (HcAbs), either Camelid-based variable heavy homodimers (VHH), also known as nanobodies, or Shark-based immunoglobulin novel antigen receptors (Ig-NAR). Other examples of such single-domain binding proteins include the designed ankyrin repeat proteins (DARPins), and genetically engineered antibody mimetic proteins.

Single domain binding proteins, and VHHs in particular, are well suited as payloads. Their lack of structurally-essential disulfide-bonds makes them resistant to the cytoplasmic conditions. They are extremely small, about 15 KDa for VHHs or 20 KDa for DARPins, a fact that assists in their cytosolic dispersibility. Their single domain characteristic dictates that they would not cause any accidental intracellular cross-linking effects. They are easily engineered to include 2 or more moieties in different architectures to enable more complex binding profiles. They are not considered immunogenic and have a good safety profile. A major feature is their compatibility to site-selective conjugation to the carrier. For example, in both VHHs and DARPins, their C-terminus is located away from their antigen binding regions (CDRs), enabling the utilization of this site for conjugation without affecting antigen-binding. Further, the C-terminus can be easily engineered to include a single cysteine amino acid with a free sulfhydryl group for conjugation. This group can be conjugated to a carrier equipped with a thiol-reactive group. The C-terminal free sulfhydryl can be conjugated directly to the carrier or alternatively via a linker.

A commercial anti-vimentin VHH (Q60c, QVQ) comprising a single cysteine amino acid in its C-terminal was conjugated to a PEI-modified HSA carrier further modified by thiol reactive groups. The PEI-modified HSA was coupled to NETS-activated PEG linkers carrying a 2-pyridyldithio group (NHS-PEG$_n$-SPDP, n=4). The SPDP readily reacts with the free-thiol of the VHH generating the VHH-HSA moiety, where the connection between the VHH payload and the HSA carrier includes a disulfide bond. A general scheme of this construct can be seen in FIG. 13A, where a conjugate comprising two VHHs is shown to exemplify the fact that this conjugation methodology may create conjugates in which the carrier is conjugated to more than one payload. The bond between the carrier and the payload could be cleaved under reducing conditions, and the conjugation to the VHH was similar regardless of the level of PEI. Additionally, in all reactions, the payload was efficiently cleaved following treatment with 5 mM of GSH, mimicking cytosolic reducing conditions.

The cell internalization efficiency of the anti-vimentin-PEI-modified HSA conjugate was evaluated by the disappearance of the conjugate from the culture media upon incubation of A375 cells with the conjugate. The VHH was conjugated to HSA modified with PEI at two levels, an average of 3.5 PEI molecules and 8 PEI molecules per HSA. As already seen for PEI-modified IgGs (FIG. 6), the VHH-carrier conjugate was efficiently internalized by the cells (FIG. 14), with almost 80% of the conjugate internalized during the first 24 hours of incubation. The level of conjugate was measured using an in-house developed two-sided ELISA measuring only VHHs conjugated to HSA, utilizing an anti-VHH antibody as capture and an anti-HSA antibody for detection. Surprisingly, both PEI-modification levels exhibited very similar internalization efficiency and kinetics, with only a very slight advantage to the 8-PEI modification. The level of these VHH-HSA conjugates in cell media without cells was evaluated in order to make sure that the observed reduction in their level is not due to degradation. Only a slight drop was observed when the cells were absent (FIG. 14), suggesting that indeed the dramatic reductions in VHH levels in the presence of cells was due to VHH internalization.

Figures 15A, 15B, 15C:
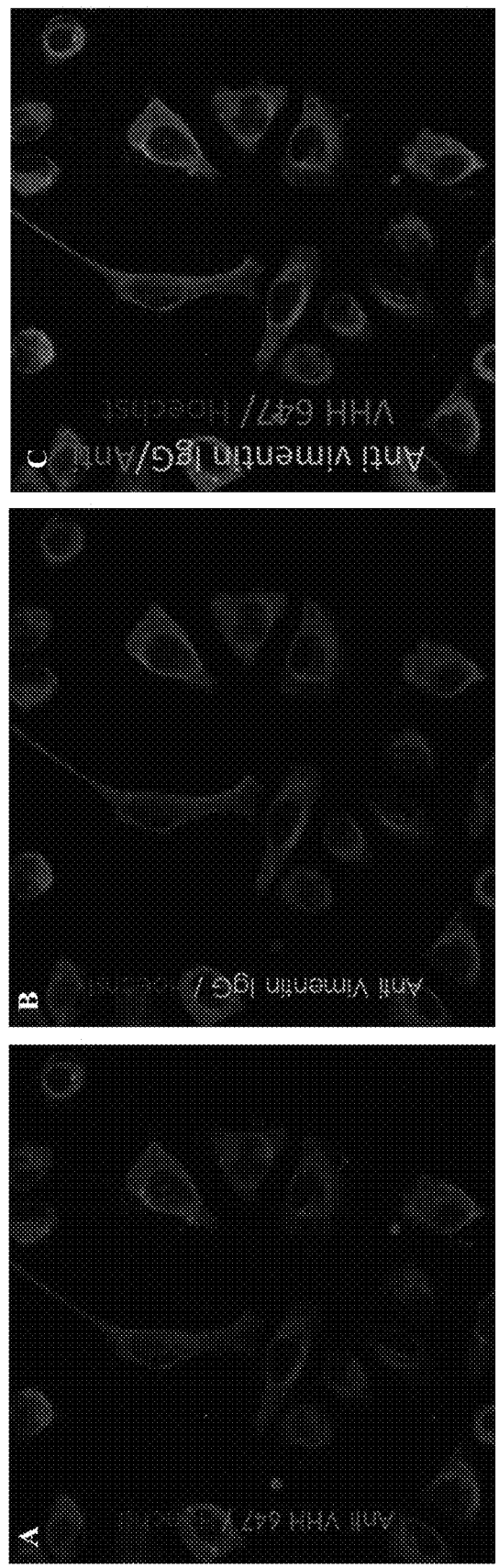
FIGS. 15A-15C: Micrographs of confocal microscopy imaging of A375 cells stained for (15A) VHH, (15B) Vimentin and (15C) a merge of both following 24 hours of incubation with anti-Vimentin VHH reversibly conjugated to PEI-modified HSA. Nuclei are stained in blue.
Figure 16A:
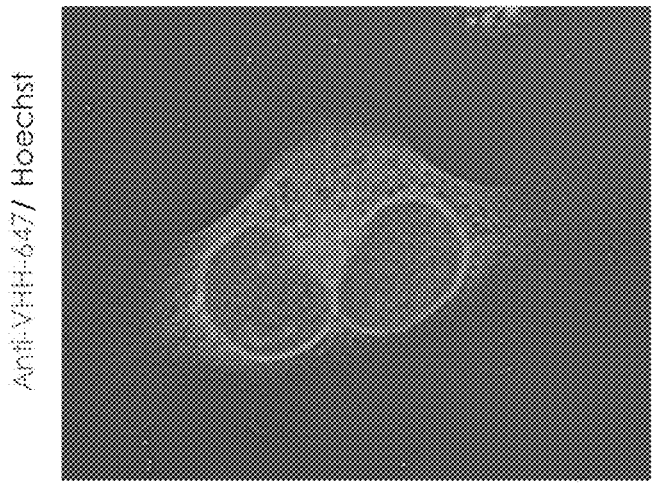
FIGS. 16A-16B: Micrographs of confocal microscopy imaging of A375 cells stained for VHH (Green) following 24 hours of incubation with (16A) anti-Vimentin VHH reversibly conjugated to PEI-modified HSA or (16B) unconjugated anti-Vimentin VHH. Nuclei are stained in blue.
Figure 16B:
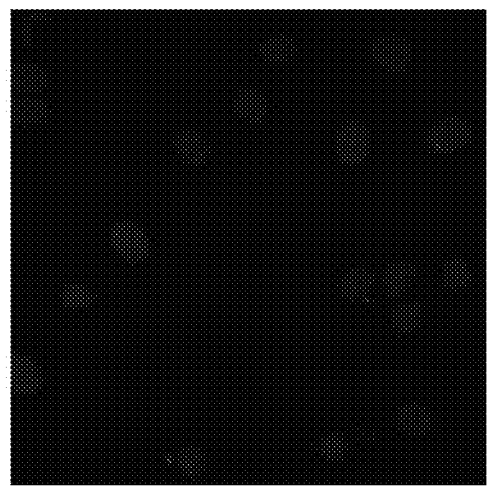

In order to further evaluate the efficiency of endosomal escape, as well as the dispersibility of the payload VHH in the cytoplasm, the anti-Vimentin-VHH conjugated to PEI-modified HSA (average of 11 PEIs per HSA molecule) was incubated with A375 cells for 24 hours and the cells were analyzed by confocal microscopy (FIG. 15A-15B). An anti-VHH antibody conjugated to AlexaFluor 647 was used to show the presence of the VHH inside the cells in a defuse profile (FIG. 15A). The cells were co-stained for vimentin using a standard fluorescently labeled anti-vimentin antibody (FIG. 15B). Careful examination of the two images clearly shows that the profile obtained by the anti-VHH staining is practically identical to the vimentin staining, suggesting that the anti-vimentin VHH was successfully delivered to the cells' cytoplasm where it was released from its carrier and was able to find and bind its target (FIG. 15C). Further evidence to this binding can be seen in FIG. 16A, where a close up of one of the cells exposed to the anti-vimentin VHH conjugated to the PEI-modified HSA clearly shows a vimentin cytoskeleton pattern as visualized by anti-VHH antibody staining. FIG. 16B shows that cells exposed to just the anti-vimentin VHH, with no carrier conjugation, exhibit no intracellular VHH staining.

The binding of the internalized anti-vimentin VHH to its vimentin target (FIG. 15A, FIG. 16A) also demonstrates that the VHH agent has maintained its structural stability inside the cytoplasm. The ability to bind to targets, as is the case with all binding biological agents, is crucially dependent on its structure and the stability of this structure. This data therefore supports the choice of single domain binding proteins as the payload agents of the invention.

Another important characteristic of the presented delivery system is the efficiency and uniformity of internalization, in that all cells in the media exhibit internalization. This can be seen throughout the different microscopy images, including the images in FIG. 15A-15C in particular. Many attempts at intracellular delivery of proteins known in the literature exhibit results where only part of the cells exhibit protein internalization, suggesting very low efficiency.

Example 7: In Vitro Functional PoCs

A further assessment of the functionality of intracellular delivered biologics, was performed using a VHH against the E7 protein of Human Papilloma Virus (HPV). Nearly all cervical cancers are associated with human papillomaviruses (HPV) infection, with two types, HPV16 and HPV18, accounting for 70% of cases. One of the primary oncoproteins of HPV is the E7 protein. E7 induces and maintains the malignant phenotype through its interaction with the retinoblastoma protein (RB1). E7 disrupts the function of host RB1 protein leading to stimulation of uncontrolled cell proliferation. E7 can also interfere with host histone deacetylation mediated by HDAC1 and HDAC2, leading to transcription activation. Prior research suggested that inhibition of E7 function inhibits the growth of HPV-positive cervical cancer cells. Li et al (*Molecular Immunology*, 2019, 109, 12-19) showed that transfection of a plasmid encoding a VHH against the E7 protein in HPV positive cells, which was used due to lack of an efficient intracellular delivery system for the protein itself, can interfere with E7 activity (disrupting the E7-RB1 interaction), leading to a reduction in the proliferation of HPV positive cells. The inventors have expressed and purified the same anti-E7 VHH with the addition of a C-terminal cysteine and conjugated it to the intracellular carrier of the invention.

Figure 17:
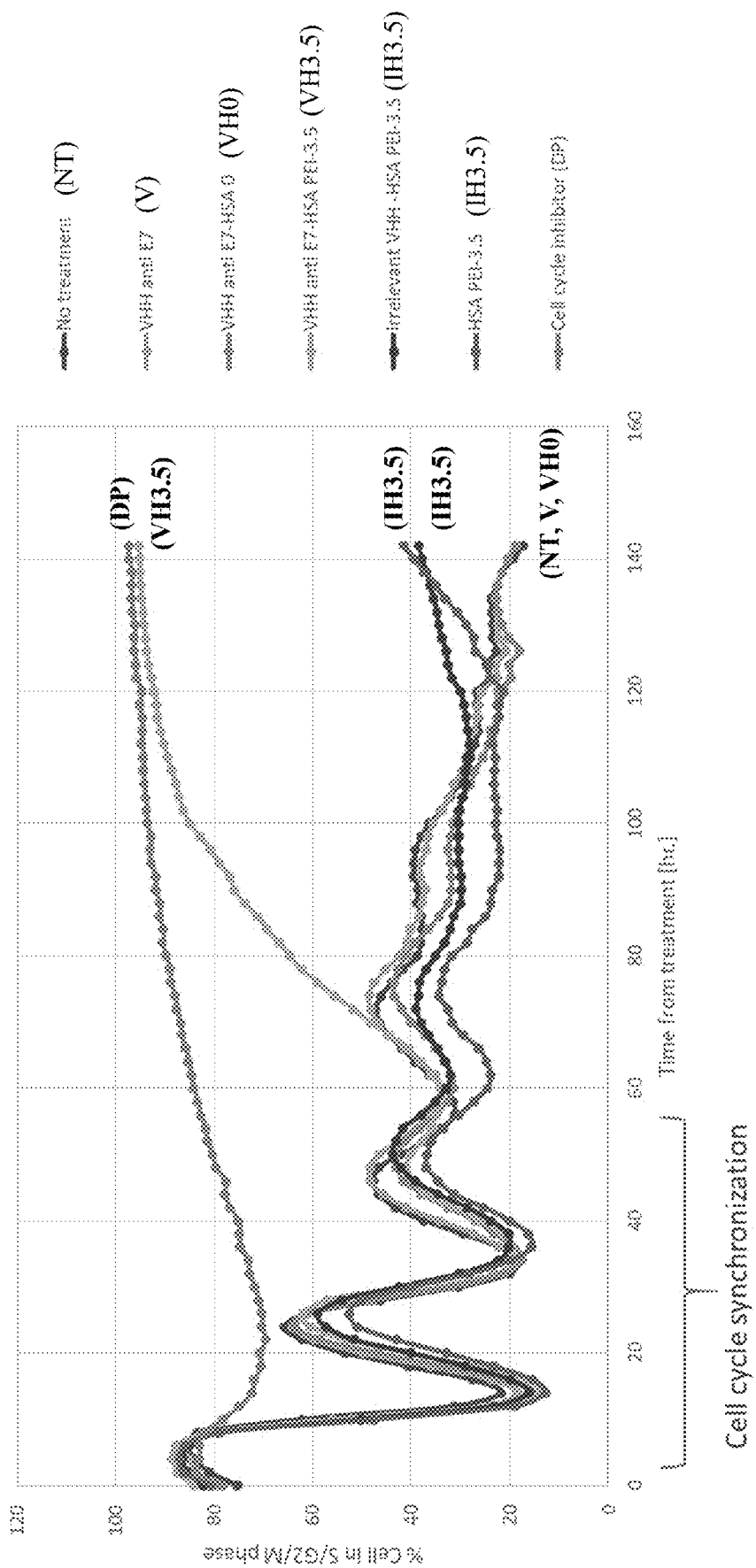
FIG. 17: Line graph showing the percent of HPV-positive HeLa FUCCI cells in the S, G2 and M cell cycle stages following Thymidine cell cycle synchronization. Cells were treated with anti-E7 VHH conjugated to HSA modified with an average of 3.5 PEIs, and various control treatments. The controls were: no treatment (wo), the unmodified VHH anti-E7, anti-E7 VHH conjugated to unmodified HSA, modified HSA conjugated to an irrelevant VHH (anti-Vimentin), the modified HSA carrier alone, and a cell cycle inhibitor (DP, CDK4/6 inhibitor).
Figure 18:
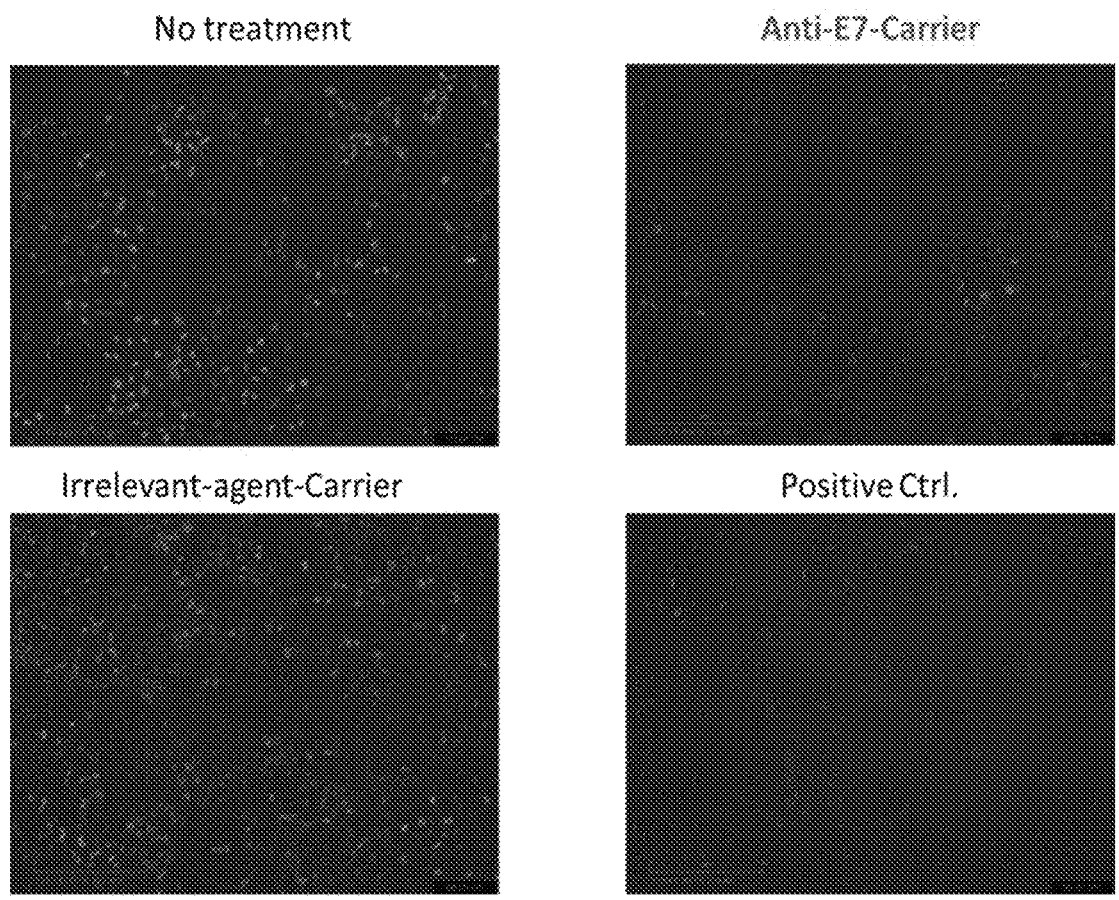
FIG. 18: Micrographs of the effect of different treatments on HPV-positive HeLa FUCCI cells. Cells treated with an irrelevant VHH (anti-Vimentin) conjugated to HSA modified with an average of 3.5 PEIs show the same profile as untreated cells (left images) while an anti-E7 VHH conjugated to the same HSA carrier caused dramatic cell death, similar to that observed following treatment of the CDK4/6 inhibitor (right images).

In order to ascertain the amplitude of the intracellular effect of E7 inhibition in HPV-positive cell lines, live cell analysis systems, such as Incucyte®, were employed. As E7 affects cell cycle control, a specific HPV-positive HeLa cell line was used, termed Fluorescent Ubiquitination-based Cell Cycle Indicator (FUCCI). The FUCCI reporter system allows the following of the different cell cycle stages of the cell. Cells in G1 fluoresce in Red and cells in S or G2 or M fluoresce in Green. Cells were synchronized with Thymidine for 24 hours prior to introduction of the different treatments into the cells' media. The cells were treated with the anti-E7 VHH conjugated by a cleavable linker to the PEI modified HSA and with the following controls: no treatment, the modified HSA, the modified HSA conjugated to an irrelevant VHH (anti-Vimentin), the unmodified anti-E7 VHH, anti-E7 VHH conjugated to unmodified HSA and a cell cycle inhibitor (DP, CDK4/6 inhibitor). As can be seen in FIG. 17, while all the controls have no effect on the cell cycle which remains similar to the non-treated cells, the anti-E7 VHH conjugated to the PEI-modified HSA (3.5 PEIs) had a dramatic effect, leading to a cell cycle arrest similar to the use of the direct cell cycle inhibitor. As no commercial E7 inhibitor exists, a CDK4/6 inhibitor, Palbociclib isethionate (PD0332991, Sigma, Cat. No. PZ0199), known to cause cell cycle arrest, was used as positive control. The anti-E7 VHH conjugated to modified HSA led to a similar effect as the inhibitor, only at different kinetics. Further, as can be seen in FIG. 18, this arrest led to the death of the HPV-positive cells.

Both the anti-vimentin and anti-E7 VHHs have shown their durability in the cytoplasm's reducing environment. In order to further exemplify the compatibility of single domain binding proteins, that do not rely on disulfide bonds to stabilize and maintain their structure, to the current invention, the inventors have used a designed ankyrin repeat protein (DARPin) as a binding agent. DARPins are genetically engineered antibody mimetic proteins typically exhibiting highly specific and high-affinity target protein binding. They are derived from natural ankyrin proteins, one of the most common classes of binding proteins in nature, which are responsible for diverse functions such as cell signaling, regulation and structural integrity of the cell. DARPins consist of several repeat motifs and their molecular mass is about 14 to 18 KDa (kilodaltons). They are also characterized by not being dependent on disulfide bonds for their structural integrity, similarly to VHHs.

To this end, a DARPin against K-RAS was selected. RAS proteins play key roles in signal transduction as molecular switches. RAS is the most important target in cell transformation, involved in cell proliferation and differentiation through the RAF-MEK-ERK cascade and cell survival through activation of PI3K. Mutations of the RAS proteins (K-, H- or N-RAS) create constitutively activated GTP-bound forms that promote cell transformation in a signal-independent manner. Activating RAS gene mutations are found in as many as 30% of cancers in humans, with the highest frequencies in pancreas, colon and lung adenocarcinoma. Oncogenic RAS has been shown to be essential for early onset of tumors and necessary for maintenance of tumor viability. The most central position of RAS mutations is in Glycine 12, such as G12D and G12V.

Guillard et al. (Guillard, S. et al. Nat. Commun. 2017, 8, 16111, herein incorporated by reference in its entirety) have generated an antibody mimetic, DARPin K27, which inhibits nucleotide exchange of Ras. K27 binds preferentially to the inactive Ras GDP form with a Kd of 4 nM and structural studies support its selectivity for inactive Ras. Intracellular expression of K27 by transfection of a DARPin encoding vector was shown to significantly reduce the amount of active Ras, to inhibit downstream signaling, in particular the levels of phosphorylated ERK, and to slow the growth in soft agar of HCT116 cells. This group states that a " . . . barrier arises from the fact that Ras is intracellular. DARPin K27 has no intrinsic ability to enter cells and therefore cannot access Ras when the DARPin is added extracellularly. Although there have been reports of delivery of DARPins to the cytoplasm of the cell . . . substantial increases in efficiency would be required to make the approach viable therapeutically. It may be challenging to develop a small molecule inhibitor binding at the same site as DARPin K27, since the scaffold binds across a broad surface, rather than defining a pocket."

Figure 19:
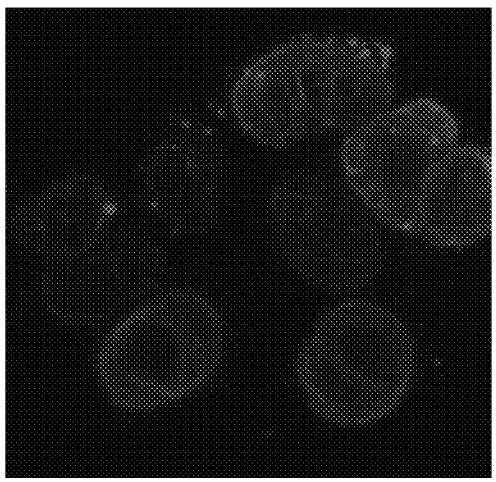
FIG. 19: Representative micrograph of anti-K-RAS His-tagged DARPin K27 protein conjugated to a PEI-modified HSA carrier internalized into lung adenocarcinoma cells. The DARPin localizes to K-RAS sites (inner-side of cell membrane) following staining with anti-His tag antibody.

DARPin K27 was expressed based on the published sequence, and was conjugated to an HSA carrier, modified with an average of 3.5 PEI molecules. Internalization and KRAS binding were evaluated by confocal microscopy (FIG. 19). The K27 DARPin was not dispersed in the cytoplasm but rather localized to the inner side of the plasma membrane, the major location of KRAS. Interestingly, some cells exhibited both a punctate profile and an inner membrane localization in regard to the internalized DARPin. The puncta may be a result of DARPin that still has not escaped the endosomes or did not yet separate from the carrier to freely find its target.

Figure 20:
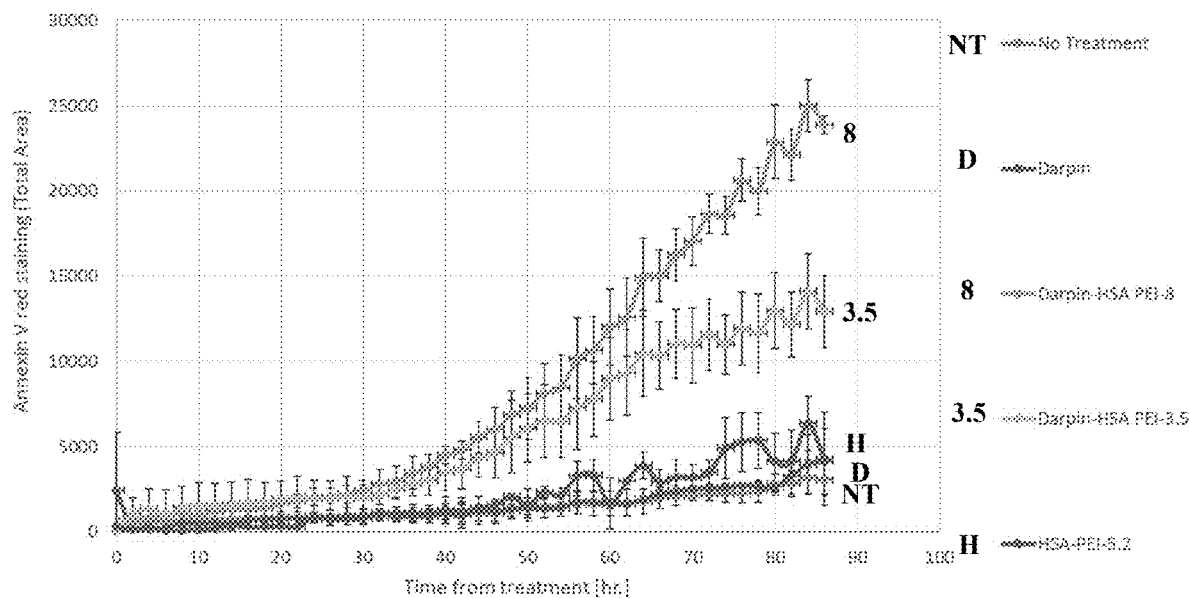
FIG. 20: Line graph of apoptosis. Anti-KRAS DARPin K27, conjugated to the PEI-modified HSA carrier was internalized to SU8686 cells and their apoptotic state was evaluated using Annexin V using the continuous Incucyte system. Cells exposed to the DARPin conjugated to a carrier modified with 8 PEI molecules (Carrier-I) exhibit a high level of apoptosis while cells exposed to the DARPin conjugated to the carrier with 3.5 PEI molecules (Carrier II) also exhibit clear apoptosis but to a lesser degree. Untreated cells, cells exposed to the unmodified DARPin and cells exposed to the HSA carrier with 8 PEIs all exhibit baseline apoptosis.

In a further test, pancreatic ductal carcinoma cells (SU8686) were incubated with the anti-KRAS DARPin K27 which was conjugated to the HSA carrier. The carrier was modified with either 8 or 3.5 PEI molecules. The apoptotic state of the cells was monitored using the classical Annexin V assay and was visualized using the Incucyte® continuous cell monitoring system. Cells exposed to the DARPin conjugated via a cleavable linker to the PEI modified HSA exhibit dramatic elevation in apoptosis (FIG. 20), especially for the DARPin conjugated to the carrier with the high level of PEI modification. This is likely due to enhanced internalization and quicker kinetics, especially of the endosomal escape process. In contrast, cells that were untreated, treated with unmodified DARPin or treated with the PEI-modified HSA (8 molecule) alone exhibited baseline levels of apoptosis emphasizing the intracellular effect of the DARPin.

Figure 21A:
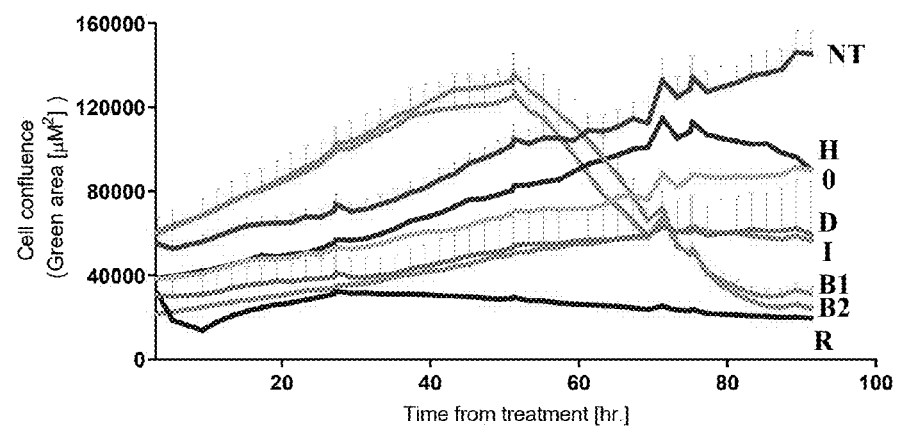
FIGS. 21A-21B: Line graphs showing the effect of anti-KRAS DARPin K27 conjugated to PEI-modified HSA carrier on (21A) proliferation and (21B) apoptosis of HeLa cells constitutively expressing GFP in their nuclei. A pan-RAS inhibitor was used as a positive control and no treatment was used as a negative control. Cells were also treated with the unmodified DARPin K27, the PEI-modified HSA carrier alone, DARPin K27 conjugated to an unmodified HSA carrier and an anti-vimentin VHH (irrelevant VHH) conjugated to PEI-modified HSA carrier.
Figure 21B:
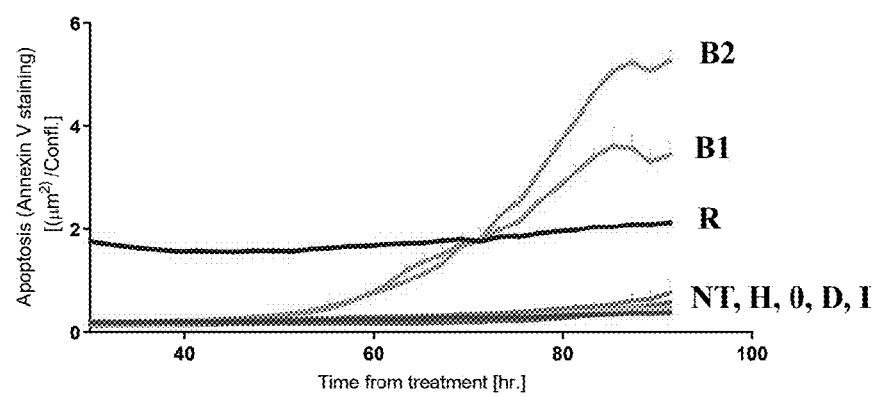
Figure 22:
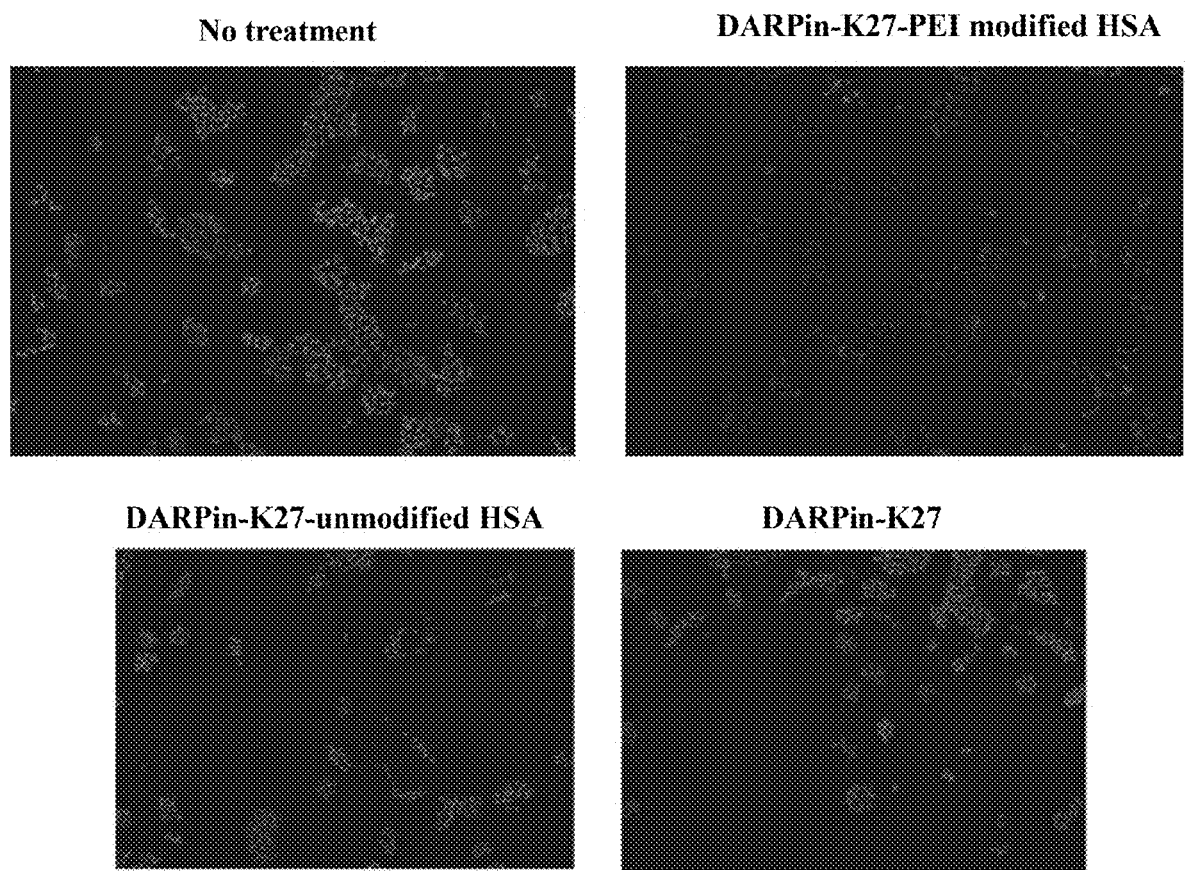
FIG. 22: Micrographs showing the effect of anti-KRAS DARPin K27 conjugated to PEI-modified HSA carrier on apoptosis of HeLa cells constitutively expressing GFP in their nuclei.

Guillard et al. have shown that the anti-KRAS DARPin K27 binds to native, non-mutant inactive KRAS and to KRAS with different mutations, mostly in the G12 position. Thus, anti-KRAS DARPin K27 was evaluated for its intracellular effect on proliferation and apoptosis of a HeLa cell line. This cell line is characterized by a constitutive expression of GFP in its nuclei, enabling easy following of these cells using continuous image monitoring methods, such as Incucyte®. Two different preparations of the anti-KRAS DARPin were conjugated to HSA carrying 8 PEI molecules and its effect on the HeLa-GFP cells was compared to the following control treatments: no treatment as negative control, treatment with a small molecule Pan-Ras inhibitor as positive control, treatment with the unmodified DARPin, treatment with the DARPin conjugated to non-modified HSA, HSA carrier modified with 8 PEI molecules, and an anti-Vimentin VHH, irrelevant VHH, conjugated to HSA modified with 8 PEI molecules. As can be seen in FIGS. 21A-21B, both preparations of the anti-KRAS DARPin conjugated to HSA carrying 8 PEI molecules dramatically affected both the proliferation (FIG. 21A) and apoptosis (FIG. 21B) of the HeLa-GFP cells. None of the control treatments had any effect on these parameters. The effect on apoptosis can also be seen in FIG. 22, where the red staining of cells (apoptotic cells) treated with the anti-KRAS DARPin conjugated to PEI-modified HSA and the loss of GFP as the cells die is clearly observed.

Example 8: Pharmacokinetics and Biodistribution (PK & BD)

The PEI modification confers a concentrated and strong positive charge on the carrier protein. In contrast, plasma components and cellular membranes generally are negatively charged. Positively charged proteins are known to be "sticky" due to electrostatic bonds with these negatively charged components. This "stickiness" can lead to short half-lives and to issues with biodistribution. This phenomenon is known in proteins which are naturally positively charged and characterized by somewhat basic isoelectric points (pI). The pharmacokinetic and biodistribution profiles of a PEI modified protein may be affected by its strong positive charge. Furthermore, such adherence can also lead to "trapping" of the administered positively charged protein in the injection site. In order to avoid, or at least minimize, these effects the effect of the level of PEI modification was examined.

Figure 23:
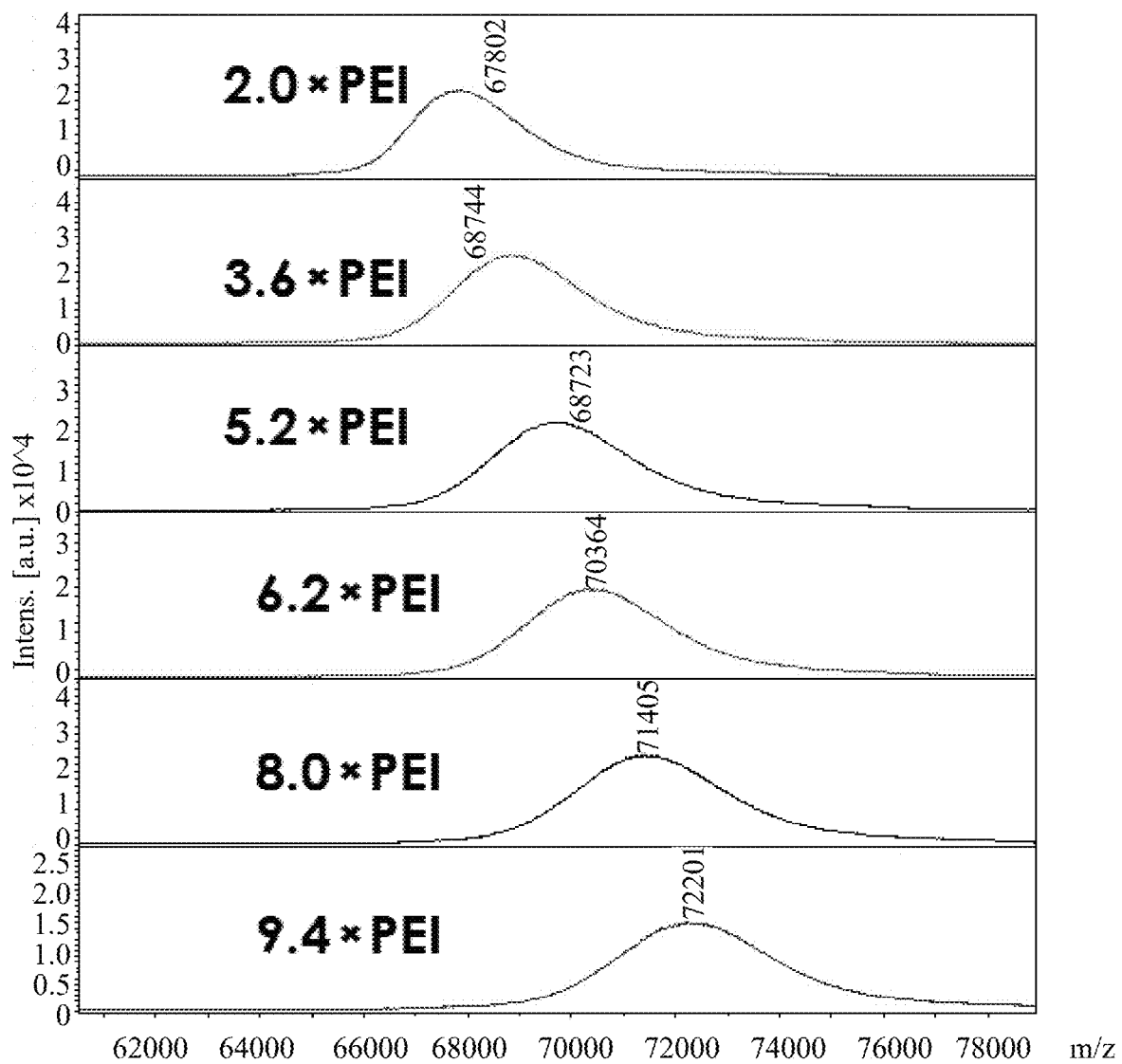
FIG. 23: Mass spectrometry (MALDI-ToF) spectra of HSA modified with various levels of PEI (600 Da) using a constant molar excess of the PEI in the reaction and controlling the level of modification by adjusting the levels of the carbodiimide coupling agent, EDC. The average level of PEI molecules on the HSA is provided in black.
Figure 24:
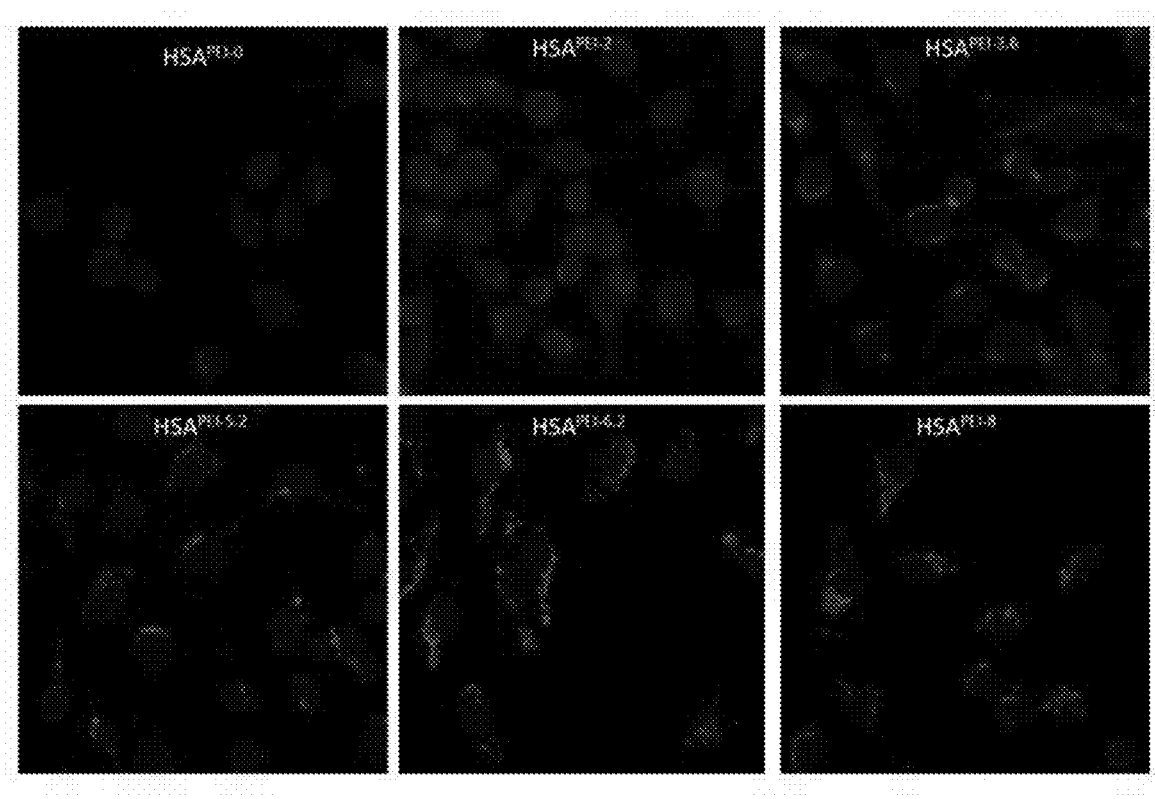
FIG. 24: Confocal microscopy images of anti-Vimentin VHH inside A375 cells following 48 hours of incubation of the VHH conjugated to the HSA carrier with various levels of PEI modification. The average number of PEI molecules on the HSA carrier is denoted in each box. Intracellular VHH is visualized using an anti-VHH antibody.

By identifying and utilizing the lowest level of PEI modification that is still effective in crossing the cell membrane and in enabling endosomal escape the PK and biodistribution of the proteins of the invention can be improved. In order to identify this modification level, HSA carriers were produced with the following average levels of PEI modifications: 2.0, 3.6, 5.2, 6.2, 8.0 and 9.4. These levels were ascertained by the analysis of the resulting modified HSAs using MALDI-ToF mass spectrometry (FIG. 23). These carriers were further conjugated to the anti-Vimentin VHH and the internalization of these conjugates was evaluated using confocal microscopy (FIG. 24). As can be seen in the confocal microscopy results, even VHH conjugated to HSA with 2.0 and 3.6 PEI molecules exhibits a clear presence inside the cells. While the use of a carrier modified with higher levels of PEI seems to lead to apparent higher levels of VHH inside the cells, the profile of the internalized VHH in those cases is more punctate and less dispersed, probably due to slower detachment of the VHH from the carrier due to the higher positive charge. The stronger staining of VHH inside the cells in the case of HSA modified with more than 3.6 PEIs/HSA may be the result of stronger imaging due to the concentrated punctate profile and may not necessarily point to absolute higher levels.

Figure 14:
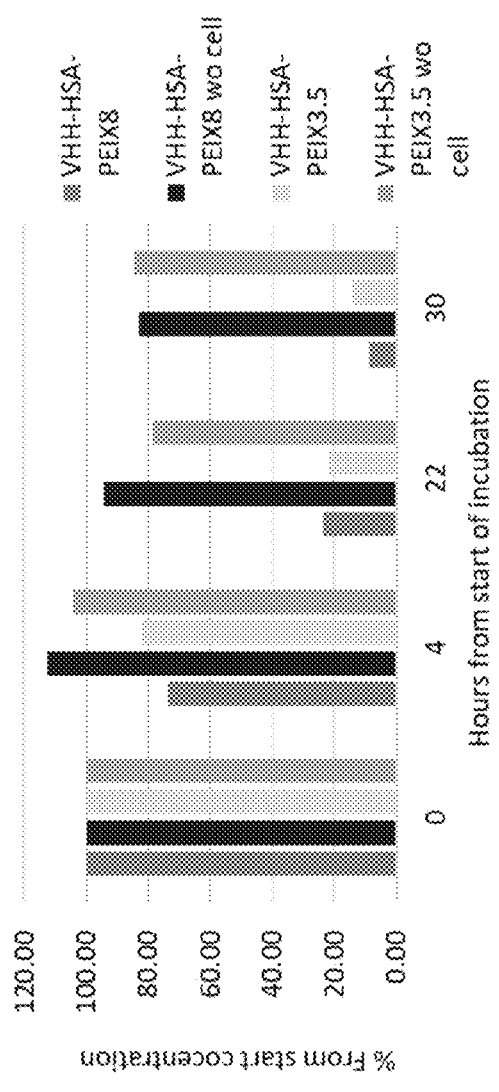
FIG. 14: Bar chart of media levels of anti-Vimentin VHH conjugated to PEI modified HSA with an average of 3.5 or 8 PEI molecules per HSA in the presence of A375 cells or in their absence.

The results of the confocal microscopy were also correlated with the internalization levels of these conjugates by measuring the residual levels of the conjugates in the cells' media using a specific ELISA (FIG. 14). Unlike the results observed with IgGs directly modified with PEI (FIG. 6), the level and kinetics of the HSA carrier (with VHH conjugated) are less affected by the level of modification. With both 3.5 and 8 molecules of PEI the internalization is efficient, and its magnitude and rate are very similar.

These results suggest that indeed the HSA to be used as carrier can be modified with just 3.5, or even fewer, PEI molecules, a fact that will reduce the stickiness of the HSA carrier in circulation. The effect of this decrease in PEI modification is examined in in vivo PK and biodistribution studies. HSA modified by different levels of PEI, ranging from 2 to 8, were further labeled with a Near-IR fluorescent dye, e.g., Vivo-Tag-750 (PerkinElmer). The labeled proteins were administered IV to Balb-C mice. Following administration, the injected animals were monitored using a live imaging system, such as the IVIS in vivo imaging system (PerkinElmer). The distribution profile of the different PEI-modified HSA derivatives was monitored at various time points post administration. Animals were sacrificed at different time points, perfused and the different organs were harvested and the level of fluorescence in each organ was examined using the IVIS system. A similar protocol may be used with animals engrafted with tumors.

The PK and biodistribution of HSA modified with PEI at two different levels (3.5 or 8 PEI units) was examined. The PEI-modified HSA was injected to mice with B-16 melanoma cancer tumors (S.C. tumors). The carriers were IV injected at a dose of 250 nmol/Kg. PK and biodistribution of the tested carriers were evaluated using anti-HSA ELISA.

Figure 25A:
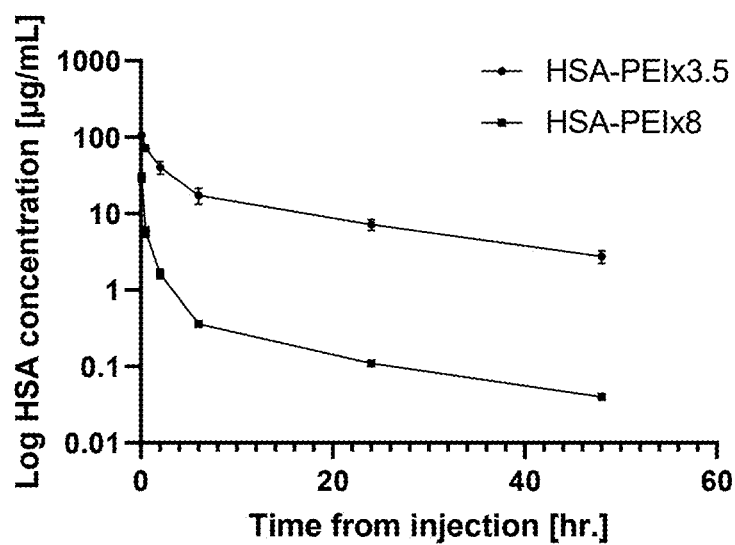
FIGS. 25A-25D: (25A-25B) Line graphs of agent concentration over time for (25A) agent containing PEI modified carrier and (25B) PEI modified VHH without a carrier. (25C) Bar graph of carrier plasma exposure. (25D) Box plot of carrier levels in urine.
Figures 25B, 25C, 25D:
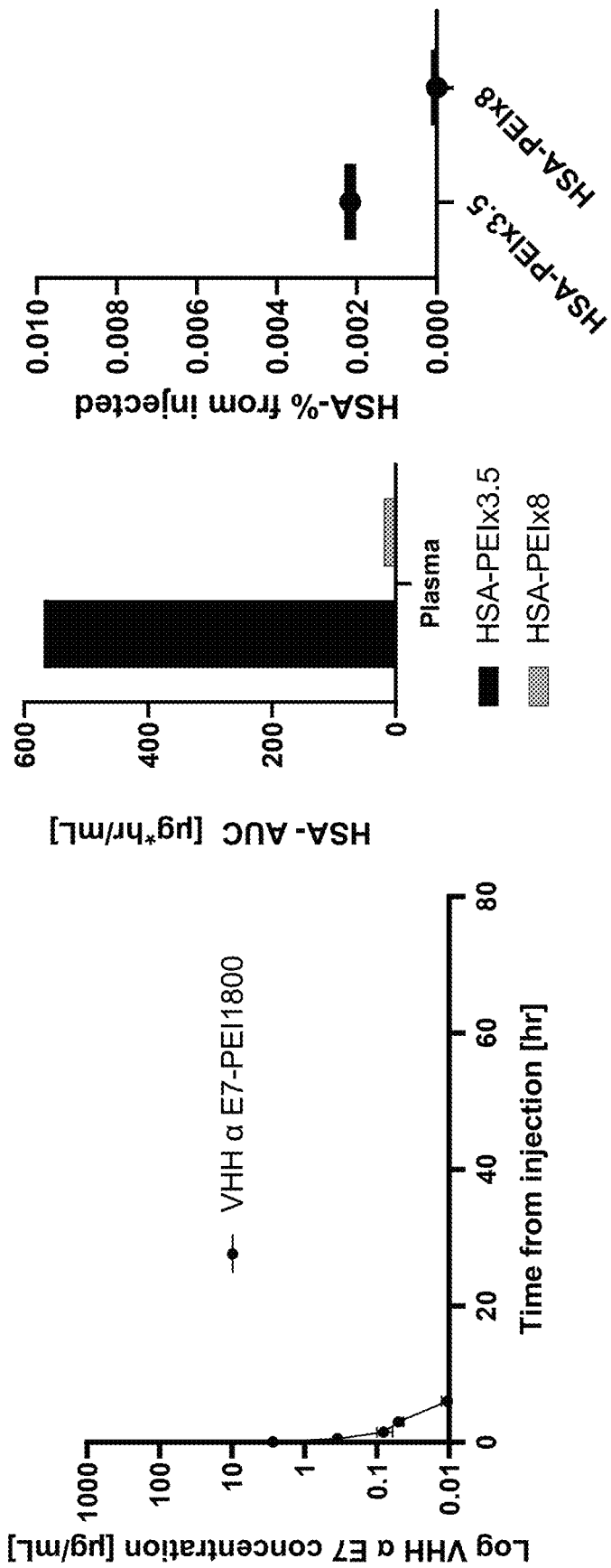

As can be seen in FIG. 25A and Table 2, the carrier with 8 PEI modifications exhibited a very low AUC level and high clearance, characteristic of strongly cationized proteins. The carrier with 3.5 PEI modification exhibited somewhat better PK values with higher AUC and lower clearance values, probably due to its lower positive charge. In contrast, when the VHH was directly conjugated with PEI1800 at its C-terminus the clearance from blood was very rapid (FIG. 25B, Table 2). The plasma exposure levels of both carriers can be seen in FIG. 25C. As can be seen in FIG. 25D, the high clearance of the carriers and low AUC values is not due to renal clearance, as can be seen by the very low levels of carriers found in the urine of the treated mice. This is one of the major reasons for using a carrier in general and HSA in particular, to avoid such clearance due to low size.

TABLE 2

| PK of 3.5 and 8 PEI modified HSA | | | |
|---|---|---|---|
| | VHH-PEI1800* | HSA-PEI × 3.5 | HSA-PEI × 8 |
| AUC-0-t [µg/mL * h]] | 1.5 | 578 | 22 |
| Clearance [mL/kg/h] | 933 | 25.9 | 732 |

*Performed in a separate experimental run.

Example 9: Linker Stability

Figure 13A:
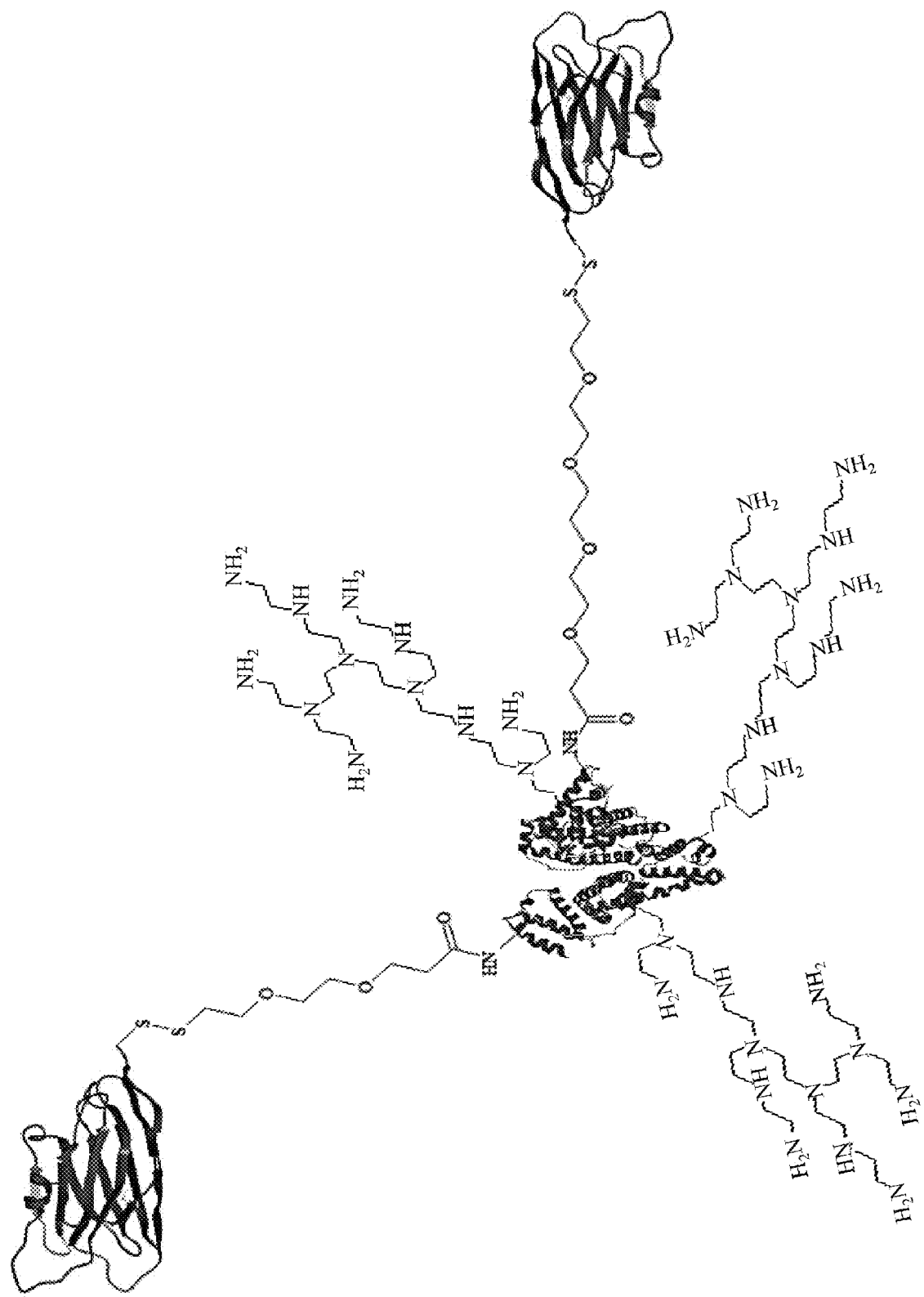
FIGS. 13A-13D: Schematic representation of exemplary protein conjugates of the invention.
Figure 13B:
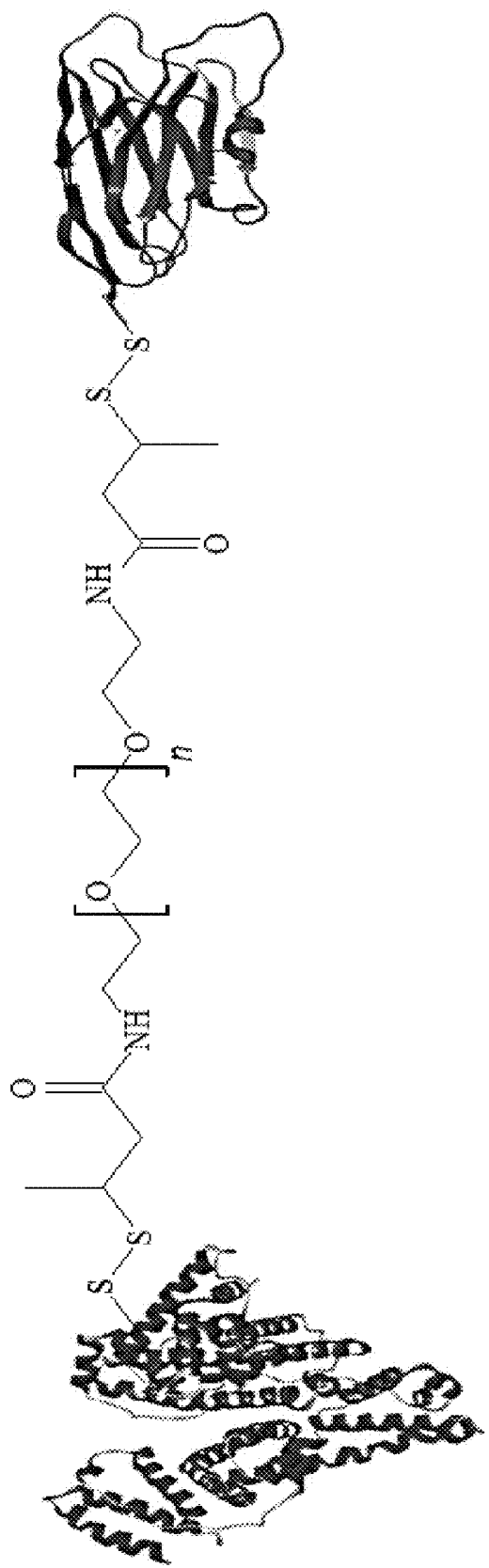
Figure 13C:
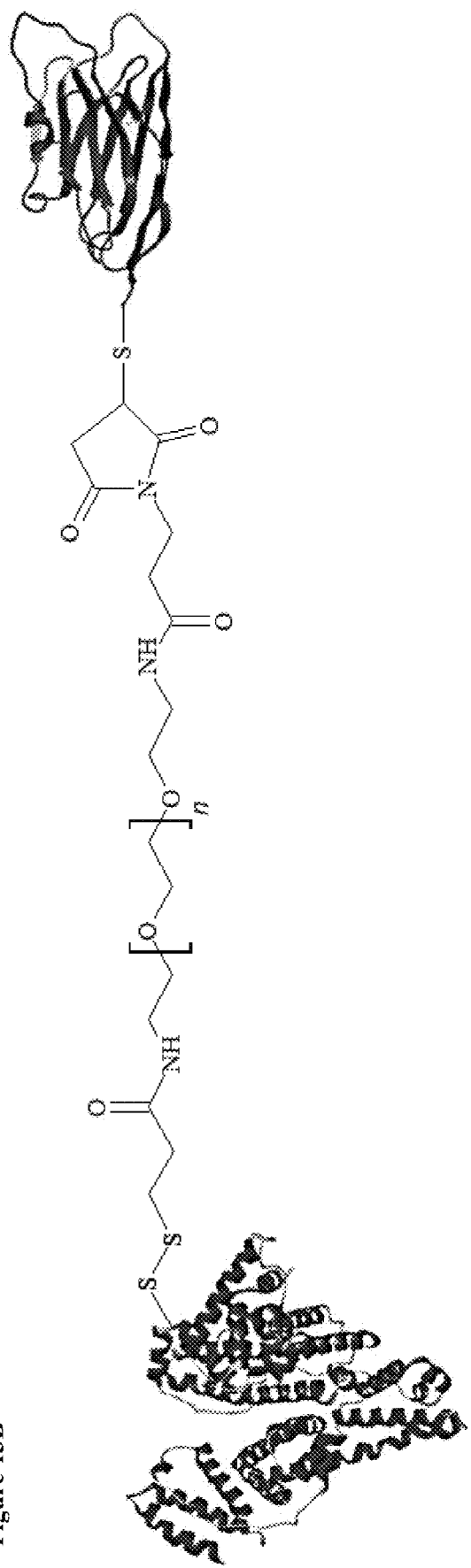
Figure 13D:
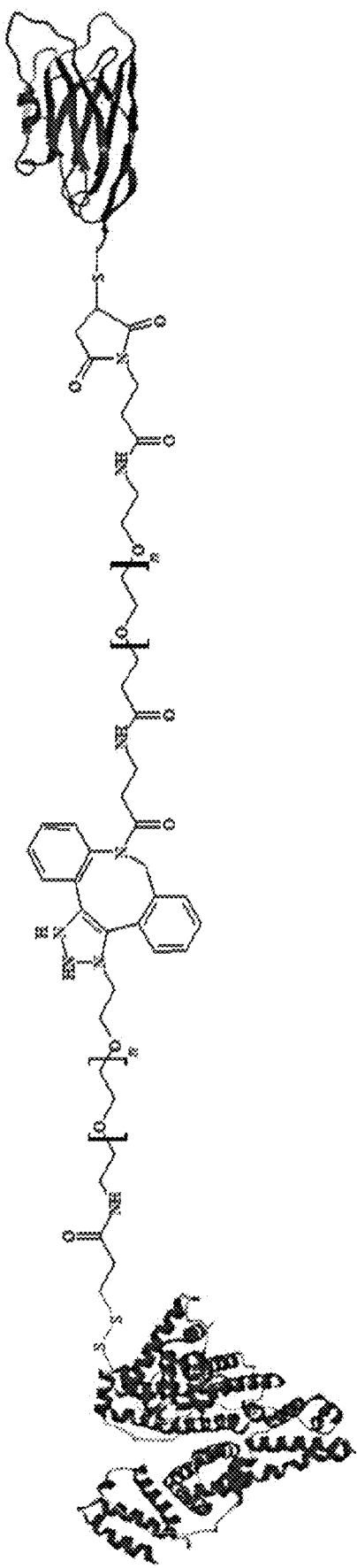

The linker's design and exact structure is crucial for the in vivo performance (PK and biodistribution) of the final conjugate product. Initial design of the linker was based on a PEG chain which is connected to the HSA carrier by a stable amide bond and to the payload via a disulfide bond. This disulfide bond was designed to be cleaved under the reducing environment of the cytoplasm. FIG. 13A depicts a schematic representation of the initial design of PEI-modified HSA coupled to two VHHs. The VHHs of course could be substituted with any biologic. This design was used in the functional in vitro studies using the anti-E7 VHH and anti-KRAS DARPin. In this design, the PEI-modified HSA is further modified with NHS-PEG$_n$-SPDP. The NHS group reacts with primary amino groups on the HSA or on its PEI modification creating a stable amide bond. The linker employed included a PEG$_4$ chain. Reaction conditions were selected to yield a modification level close to a single modification. In practice, most of the PEI-modified HSA had a single modification but some had 2-3 modifications. These moieties were further reacted with a VHH or DARPin which had a free Cysteine at their C-terminal. In some cases, a pre-treatment with a reducing agent, such as TCEP, to release this Cysteine's thiol from a dimeric state or from its bond to other thiol-containing molecules, was necessary. The final conjugate was characterized by having a labile disulfide bond close to the active payload.

This initial design was shown to undergo cleavage at conditions mimicking the cytoplasm, i.e., in the presence of around 10 mM of GSH, but to be stable in cell culture media, where it was used for functional in vitro studies.

An anti-Vimentin VHH (QVQ, Cat. No. Q60C) conjugated to PEI-modified HSA (3.5 and 8 molecules), in accordance with the structure depicted in FIG. 13A, or with only a single VHH, was evaluated for its PK and biodistribution in mice. 10 mg/Kg (VHH basis of weight) of the unmodified VHH, the VHH conjugated to unmodified HSA and the VHH conjugated to the PEI-modified HSA were all injected into mice tail veins and plasma was drawn at 5 minutes and 24 hours post injection. Additionally, various tissues were harvested from the mice at 24 hours post injection to evaluate biodistribution. Tissues included liver, spleen, kidneys, lungs, heart and brain.

Figure 26:
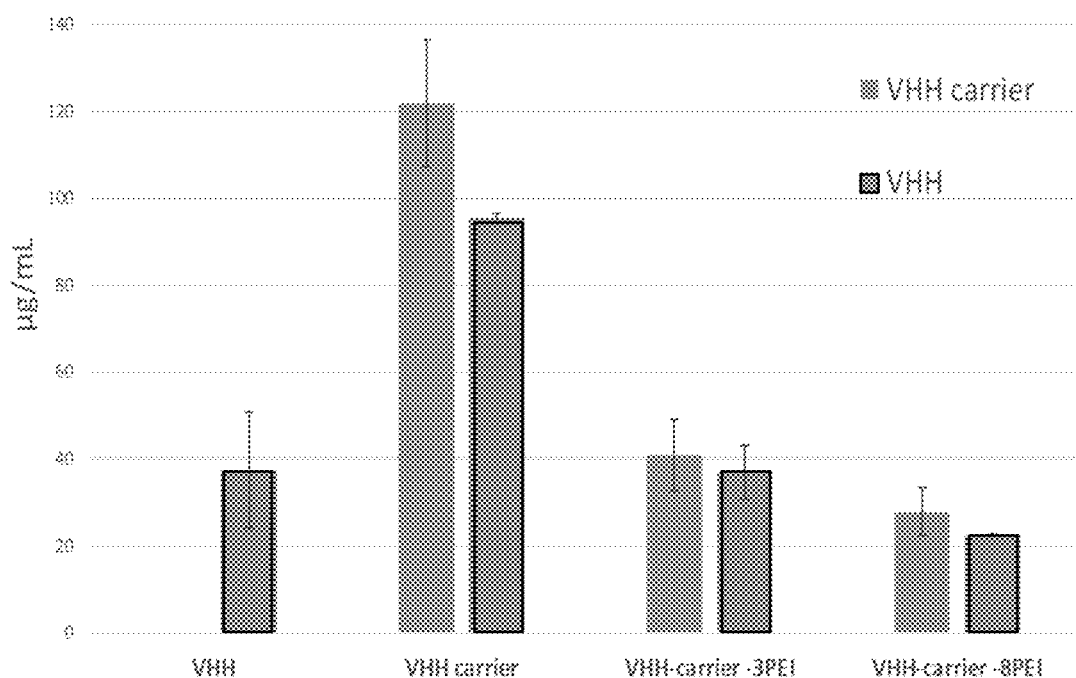
FIG. 26: Bar graph of VHH (dark grey and boxed) and VHH-carrier (light grey) levels in mice plasma 5 minutes post injection of 10 mg/Kg (VHH weight basis) of free VHH and VHH conjugated to carrier with and without PEI modification at two levels (3.5 and 8 molecules).
Figure 27:
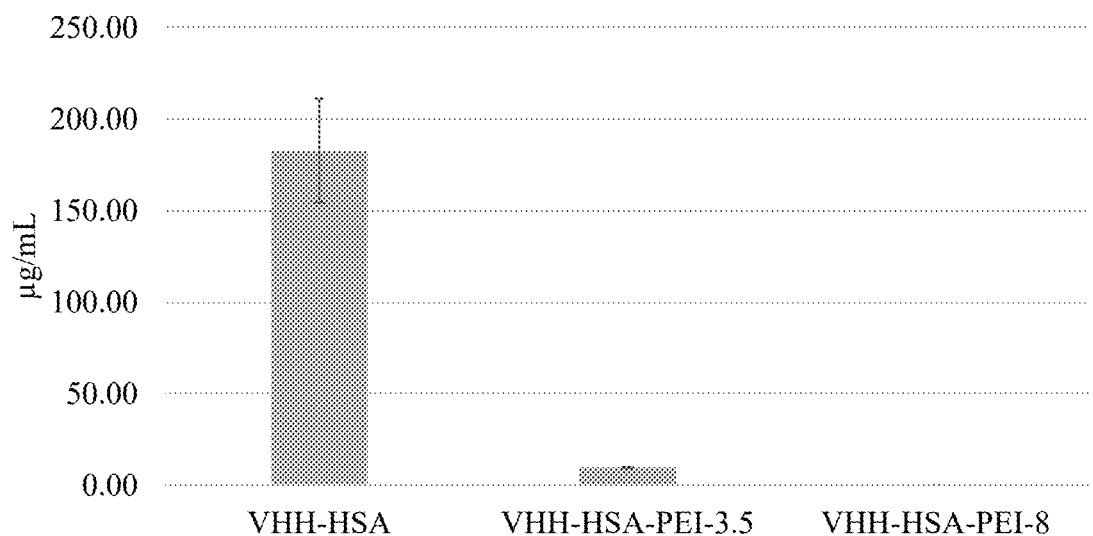
FIG. 27: Bar graph of HSA plasma levels at 24 hours post injection as measured by an HSA-specific ELISA.
Figure 28:
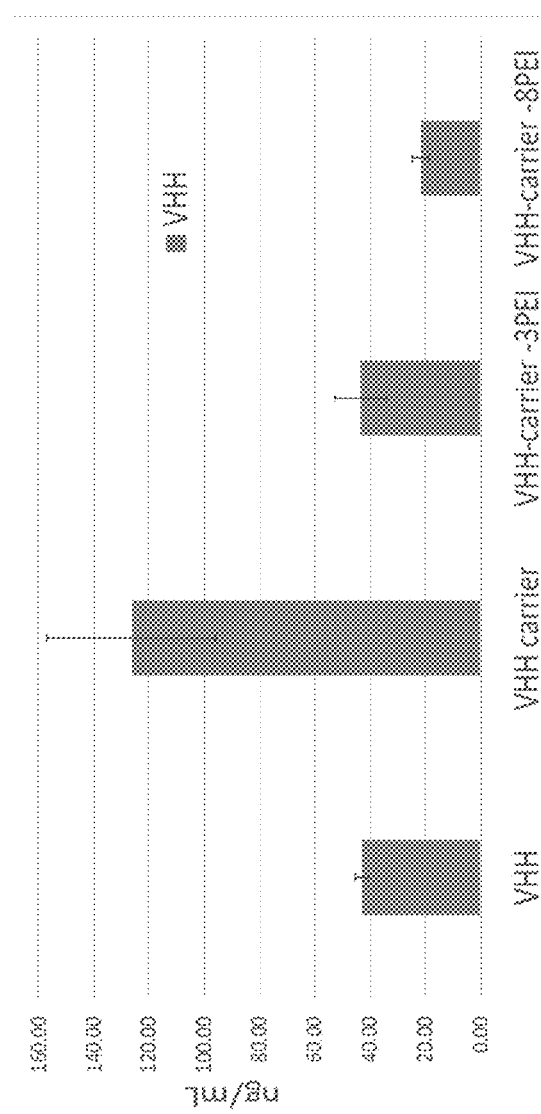
FIG. 28: Bar graph of VHH levels in livers of mice treated with 10 mg/Kg of unmodified VHH, or VHH conjugated to carrier with no PEI, with 3.5 molecules of PEI and with 8 molecules of PEI, 24 hours post injection. VHH levels were quantified by ELISA.
Figure 29:
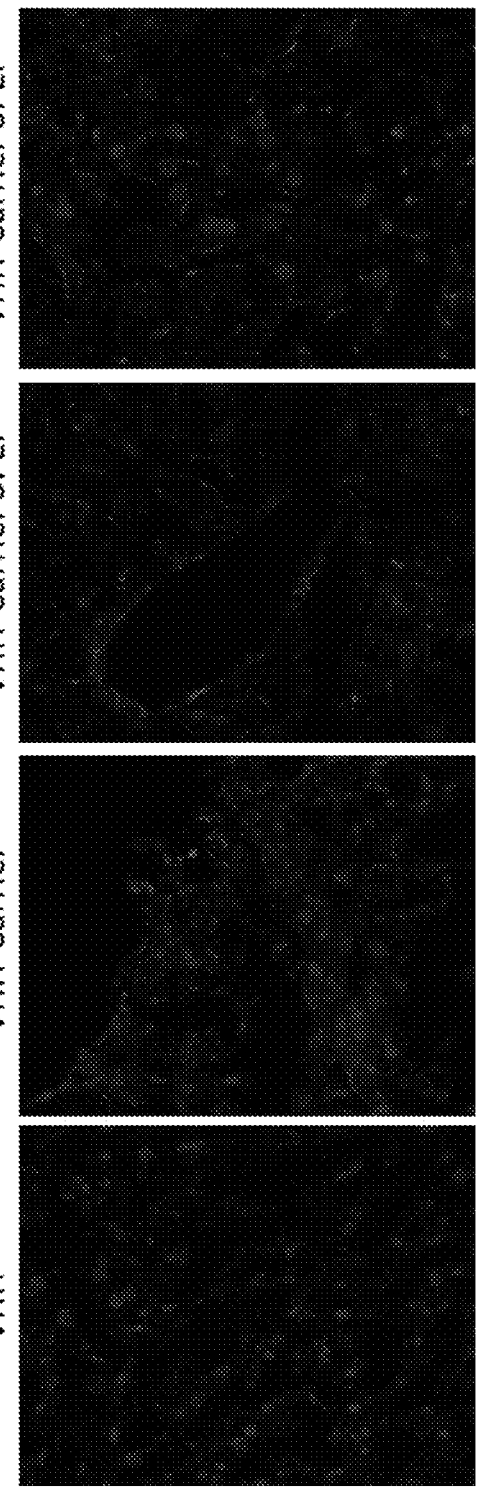
FIG. 29: Micrographs of immunofluorescence analysis of VHH in cryosections of livers from animals injected with unmodified VHH (VHH), VHH conjugated to unmodified HSA (VHH-Carrier), VHH conjugated to PEI (×3.5)-modified HSA (VHH-Carrier 3PEI) and VHH conjugated to PEI (×8)-modified HSA (VHH-Carrier 8PEI). Staining was carried out using a rabbit anti-VHH antibody followed by a fluorescent anti-rabbit antibody.

Initial analysis focused on the detection and measurement of the payload, i.e., the VHH. Samples were analyzed by an ELISA used for detection of VHH as well as by an ELISA designed to measure the intact carrier-VHH conjugate. Analysis of mice plasma at 5 minutes post injection using both methods revealed the presence of VHH in the plasma in all groups with good correlation between the levels of VHH and intact conjugate (FIG. 26). This suggests that the VHH remains conjugated to its carrier at this time point. Analysis of VHH levels in plasma samples taken at 24 hours post injection could not detect any VHH regardless of whether it was unmodified or part of the conjugate. Analysis of carrier (HSA) levels, regardless of its being conjugated to a VHH, did detect significant levels of the unmodified carrier (FIG. 27). These results suggest that the VHH was cleaved prematurely from the carrier. This hypothesis was further supported by results of ELISA (FIG. 28) and immunofluorescence analysis (FIG. 29) of VHH in the various tissues. These analyses showed that levels and distribution profiles of VHH in the different organs analyzed were quite similar, regardless of the PEI level on the carrier or even if the VHH was unconjugated.

Figure 30:
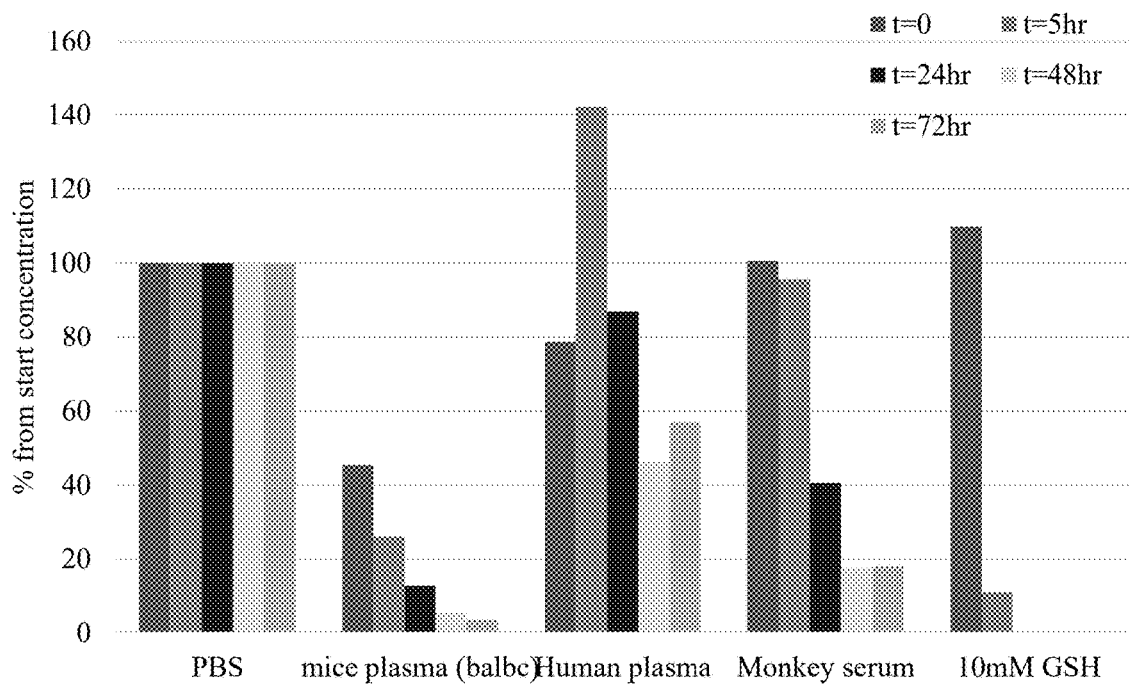
FIG. 30: Bar graph of the relative stability of VHH-HSA conjugate in plasma of mice, and humans and monkey serum, as measured by ELISA. Glutathione treatment was used as a positive control.

These results led to the hypothesis that the linker between the VHH payload and the HSA carrier was not sufficiently stable in the plasma of mice. Thus, ex vivo stability analysis of this linker was performed in the plasma of mice, monkeys and humans. The stability of a VHH conjugated to HSA (with no PEI modification), according to the general structure in FIG. 13A, was analyzed by incubating the conjugate in the plasma of mice (Balb-C mice, Bioreclamation, $K_2EDTA$, Cat. No. MSEO2PLK2YNN, Lot No. MSE347339), humans (Bioreclamation, $Na_2EDTA$, Lot No. HMN21123) and monkey serum (Bioreclamation, Cat. No. CYN262432). The level of the conjugate was measured over time using an ELISA that measures only intact conjugate and was standardized to conjugate levels when incubated in PBS. As can be seen in FIG. 30, the conjugate was indeed unstable in mice plasma and to a lesser extent in monkey serum. The stability in human plasma is also less than ideal for efficient biodistribution, although the reduction in conjugate levels in human plasma over time was not as steep as in mice plasma. The stability of the conjugate was also evaluated in a solution of 10 mM GSH, mimicking the GSH levels in the cytoplasm of cells. As expected, and as designed, the disulfide bond conjugating the VHH to the carrier is unstable in the presence of GSH and practically all the conjugate was cleaved within 5 hours.

Figure 31:
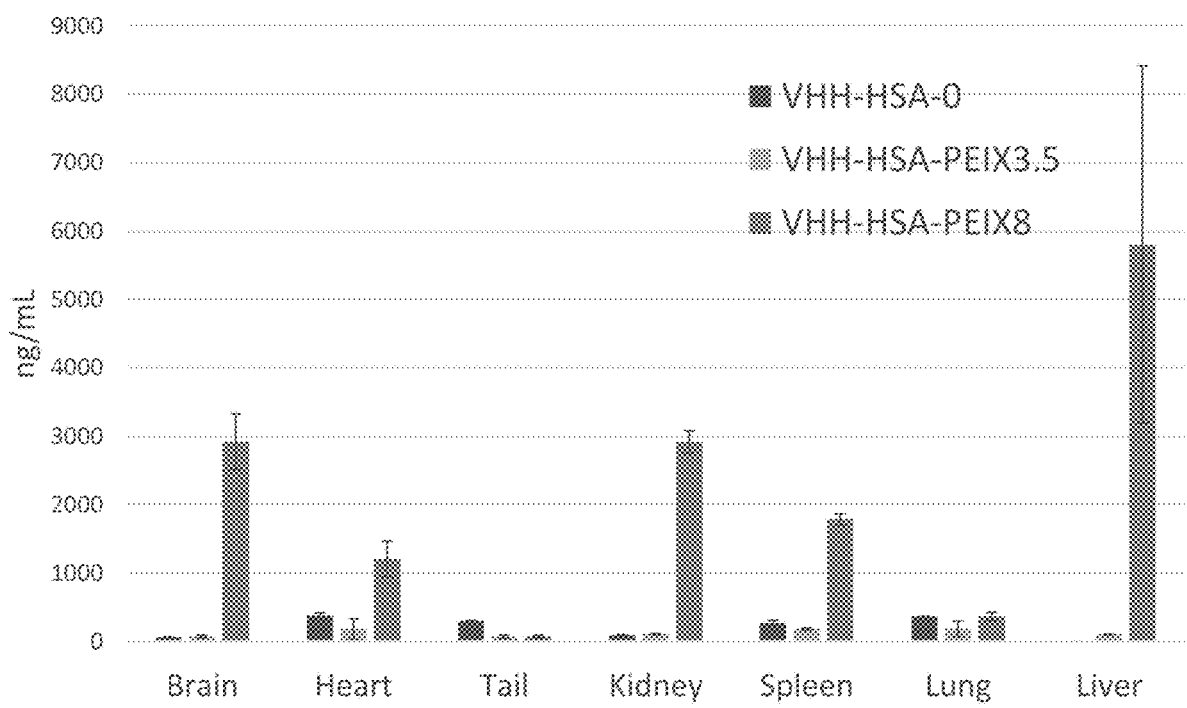
FIG. 31: Bar graph of HSA levels in organs of animals injected with VHH conjugated to non-modified HSA, and VHH conjugated to HSA-PEI×3.5 and HSA-PEI×8 as analyzed by an HSA-specific ELISA.
Figure 32A:
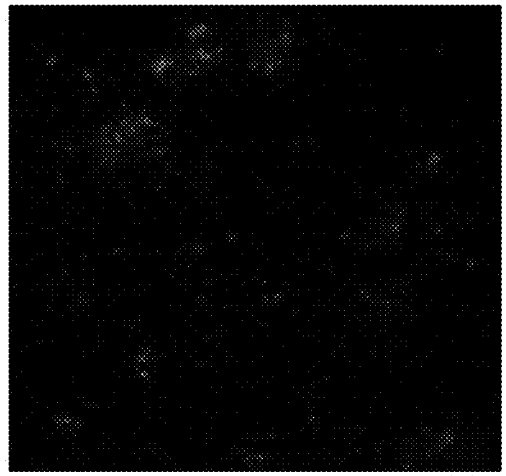
FIGS. 32A-32C: Micrographs of cryosections of spleen from mice injected with either (32A) unmodified VHH, (32B) VHH conjugated to non-modified HSA and (32C) VHH conjugated to HSA-PEI×8, stained with anti-HSA-FITC antibody.
Figure 32B:
Figure 32C:
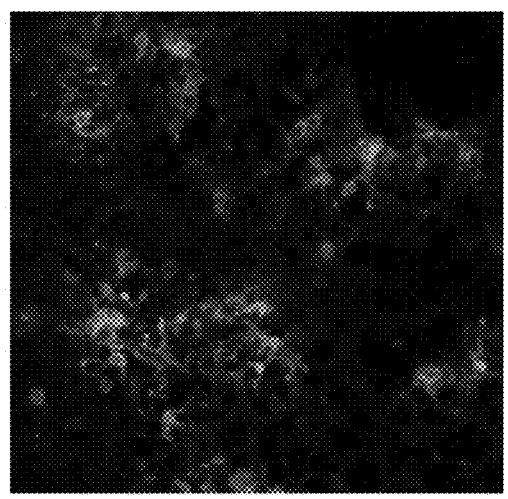

Understanding that the payload VHH was prematurely cleaved in the plasma, the levels of the carrier itself were analyzed in the various collected organs. An ELISA directed only at the HSA protein was used to analyze extracts of brain, heart, spleen, lung, tail and liver from the injected animals. Both unmodified HSA and HSA-PEIx3.5 were detected at very low levels in all organs (FIG. 31). HSA-PEIx8 however was detected at very high levels in all organs, except lungs and tail (the site of injection). These ELISA results were corroborated by immunofluorescence results showing high levels of the HSA-PEIx8 protein in spleen cryosections stained with an anti-HSA-FITC antibody (FIG. 32C). While PEI modified HSA was found at high levels in the spleen, unmodified HSA was observed at much lower levels (FIG. 32B), indeed at levels resembling the background signal observed following injection of unmodified VHH (FIG. 32A). Both ELISA and immunofluorescence results show that the PEI modification can indeed deliver the carrier, and its cargo when stably conjugated, to cells in different organs following IV injection.

Example 10: New Conjugate and Linker

Figure 33:
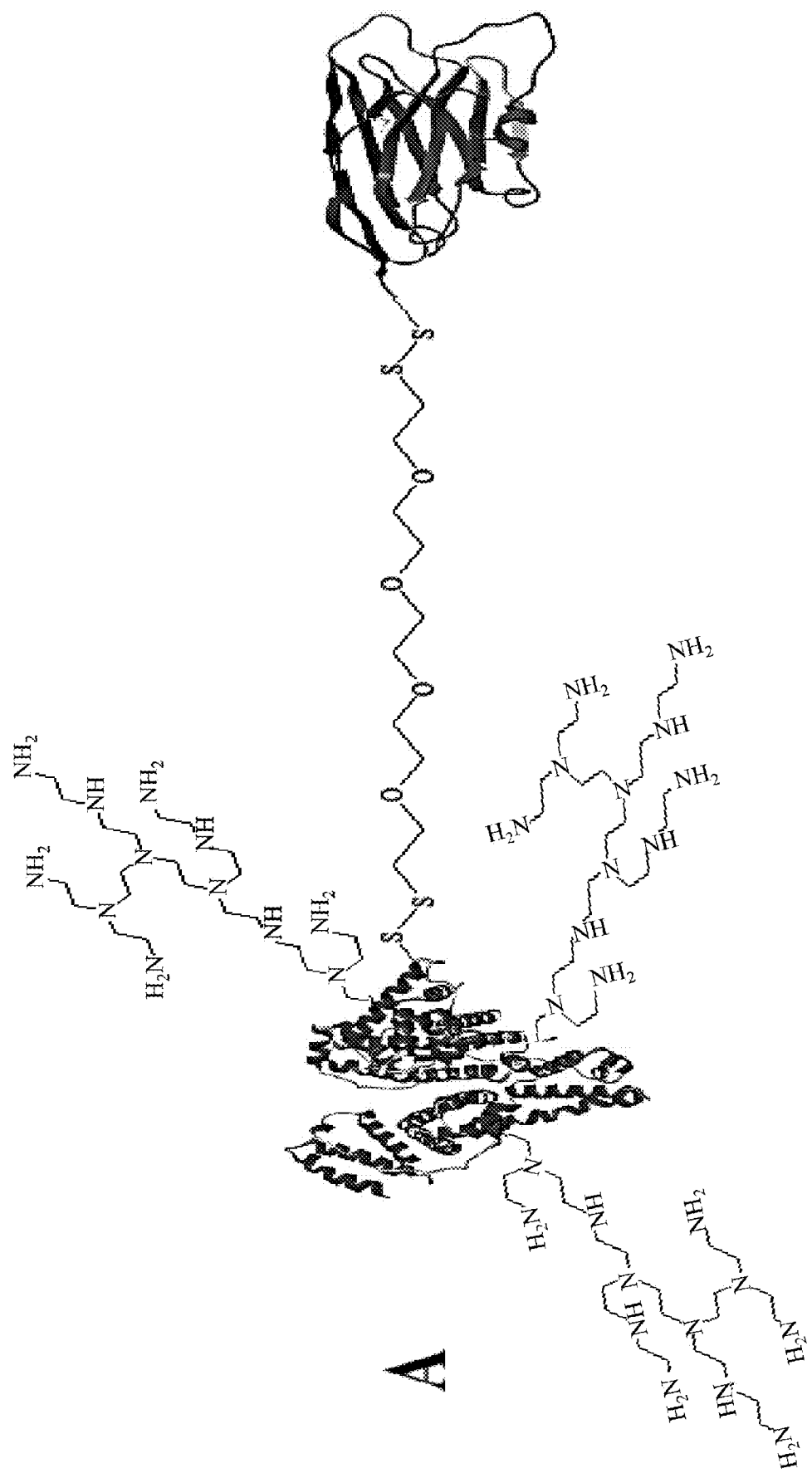
FIG. 33: Schematic representation of two different payload-carrier conjugate designs. Conjugates A and B differ in the location of the disulfide bond. PEG is schematically represented and may be longer than depicted.
Figure 33:
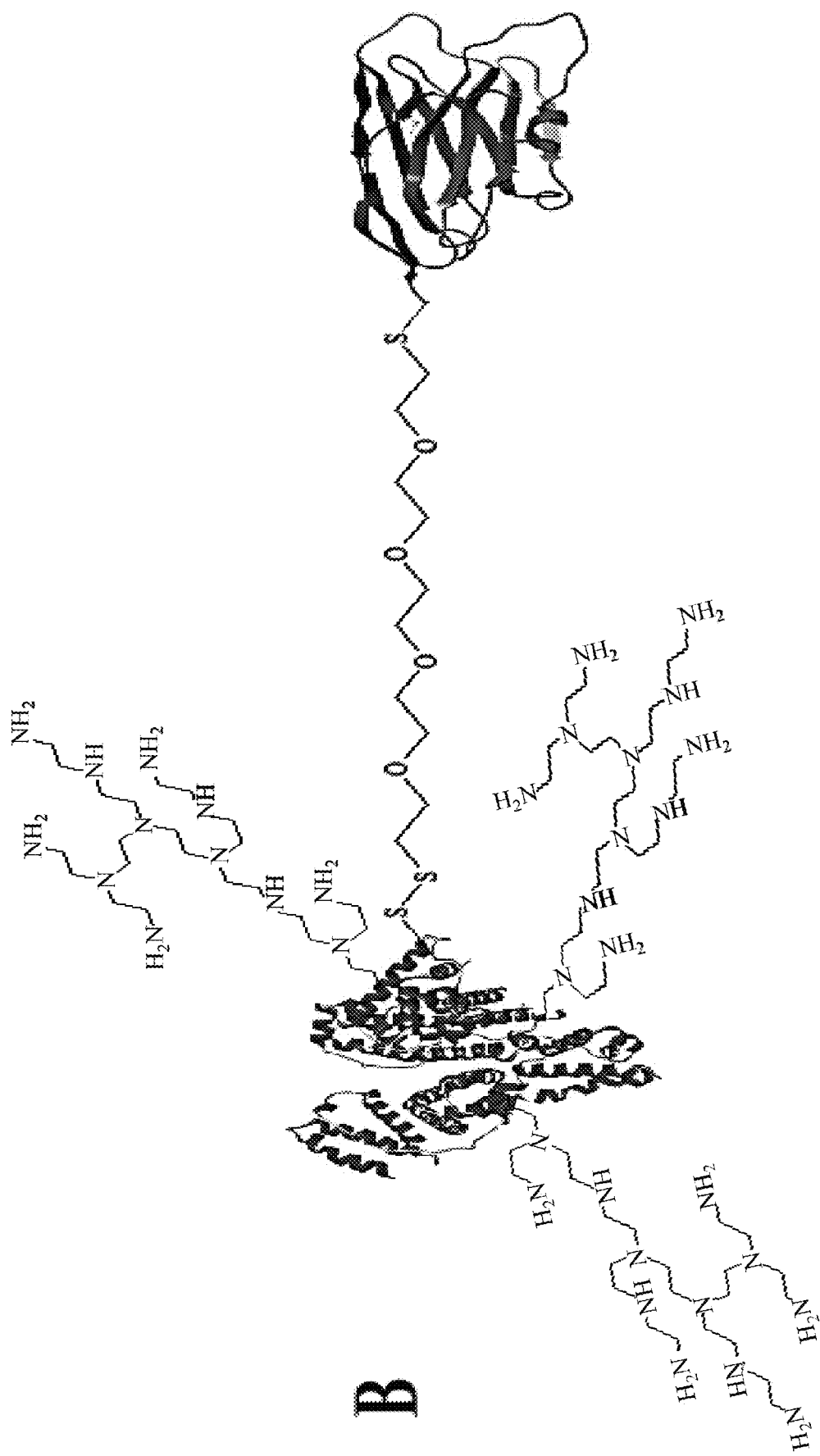

Based on these results, the conjugate was redesigned (FIG. 33). This design aimed to create a conjugate in which one payload protein is conjugated to one HSA carrier. The previous methodology utilizing an NETS-activated ester for linker conjugation to the carrier is not compatible with this requirement and so instead the Cysteine amino acid at position 34 of the HSA protein was utilized. This is the only free thiol present in HSA and hence conjugation of a payload to this position would yield a one-on-one conjugate.

Figure 34:
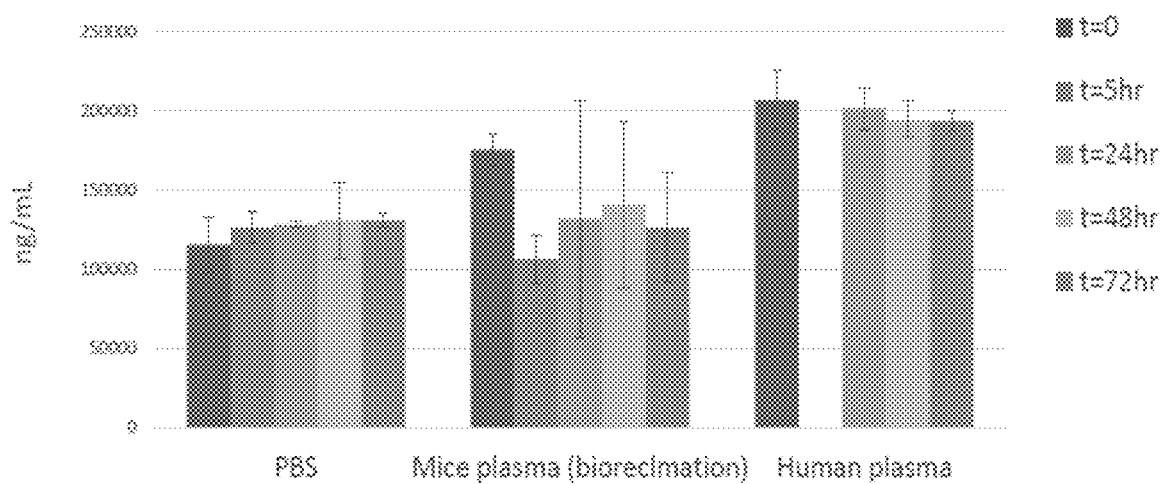
FIG. 34: Bar chart of the stability of HSA-PEG-Biotin conjugate connected to Cys34 of HSA using a disulfide bond in PBS, and mouse and human plasma.

As can be seen in FIG. 34, a biotin-PEG-HSA conjugate in which the biotin is connected to the HSA via a disulfide bond directly on Cys34 is highly stable, both in mice plasma and human plasma.

Figure 35:
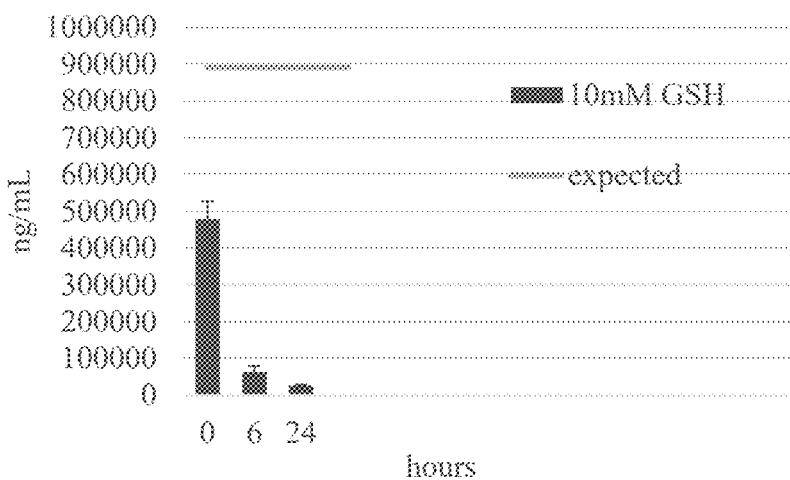
FIG. 35: Bar graph of the stability of HSA-PEG-Biotin conjugate connected to Cys34 of HSA via a disulfide bond under cytoplasmic-like conditions (10 mM GSH).

However, an overly protected cleavage site would be inoperable as cytoplasmic cleavage is beneficial for payload dispersal in the cytoplasm. Therefore, the stability of the biotin-PEG-HSA conjugate was evaluated in cytoplasmic-like conditions, characterized by the presence of glutathione (10 mM). Surprisingly, the biotin-PEG-HSA is highly cleavable under these conditions and even at the initial measurement point, referred to as t=0, about 50% of the conjugate is cleaved (FIG. 35), probably in the few minutes that pass between the addition of the conjugate to the GSH solution and its sampling and freezing prior to its analysis. By 6 hours, most of the conjugate is cleaved, suggesting that the Cys34 disulfide bond is stable in plasma but highly susceptible to reductive cleavage, such as found in a cytoplasmic environment, making it ideal for use in the conjugate of the invention.

Accordingly, different payload-carrier conjugates (C1-C2, see Table 1) were designed and prepared (FIGS. 13B-13D and 36) utilizing payload-carrier conjugation via a disulfide bond (e.g., between the linker and Cys34), or via a click chemistry (e.g., Michael addition, or azide-DBCO cycloaddition).

As mentioned hereinabove, in order to conjugate payloads to the carrier in a site-selective manner that will also not interfere with active domains, the preferred methodology involves using conjugation to a single free cysteine, preferably at the C-terminal of the payload. As conjugation of both the carrier and the payload to the linker are via free thiols, this requires that the linker would have two thiol reactive groups at both its termini, one based on SPDP to yield the labile Cys34 disulfide bond and one based on a thiol reactive group leading to a stable bond near the VHH payload. In order to avoid reaction of the second site with the Cys34 thiol one would usually use a protected group that would not react with the Cys34 and would require deprotection, and/or activation, prior to its reaction with the payload free thiol.

Additional optimizations have been evaluated for the presented linker. One such optimization includes the use of linkers comprising sterically protected disulfide bond on Cys34. This is achieved by using a linker in which the carbon in the alpha position of the activated thiol is substituted by one or two alkyl groups, preferably methyl groups.

Nevertheless, a protective group on the free thiol for binding the payload can be employed. For example, a commonly used thiol protective group is the S-acetyl group, also known as SATA.

Figure 36:
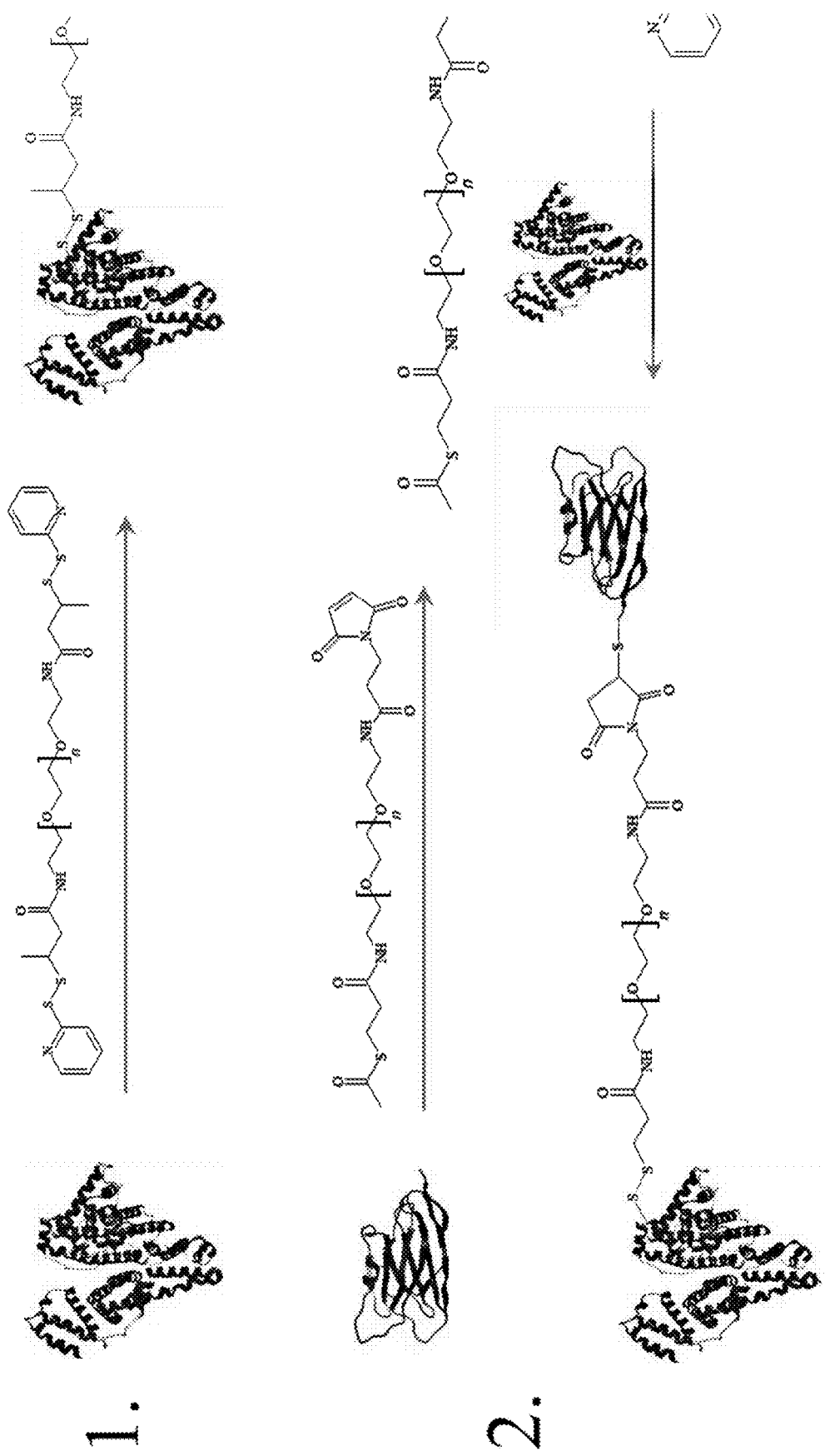
FIG. 36: Schematic representation of exemplary conjugations strategies utilized for the synthesis of exemplary protein conjugates of the invention.
Figure 36:
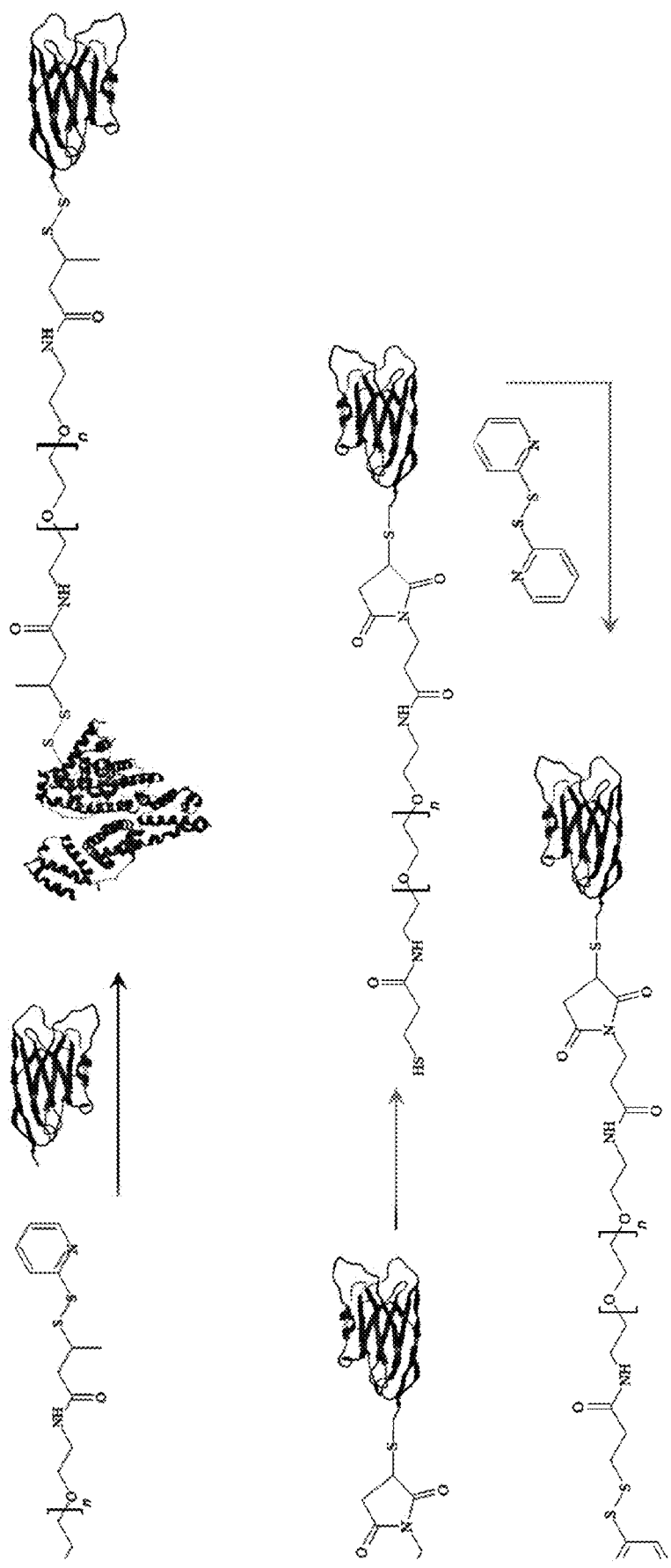

The deprotected thiol is then further activated to enable an efficient reaction with the free thiol of Cys34 of the HSA. Such activation can be achieved by reacting the deprotected free thiol with 2,2'-dipyridyldisulfide (Aldrithiol), yielding an SPDP activated thiol, already shown to efficiently react with Cys34 of HSA. An exemplary conjugation scheme is represented in FIG. 36. Additional Exemplary synthetic pathways are presented in Table 3 below.

TABLE 3
exemplary synthetic schemes
| Entry | Synthetic scheme |
|---|---|
| S1 | 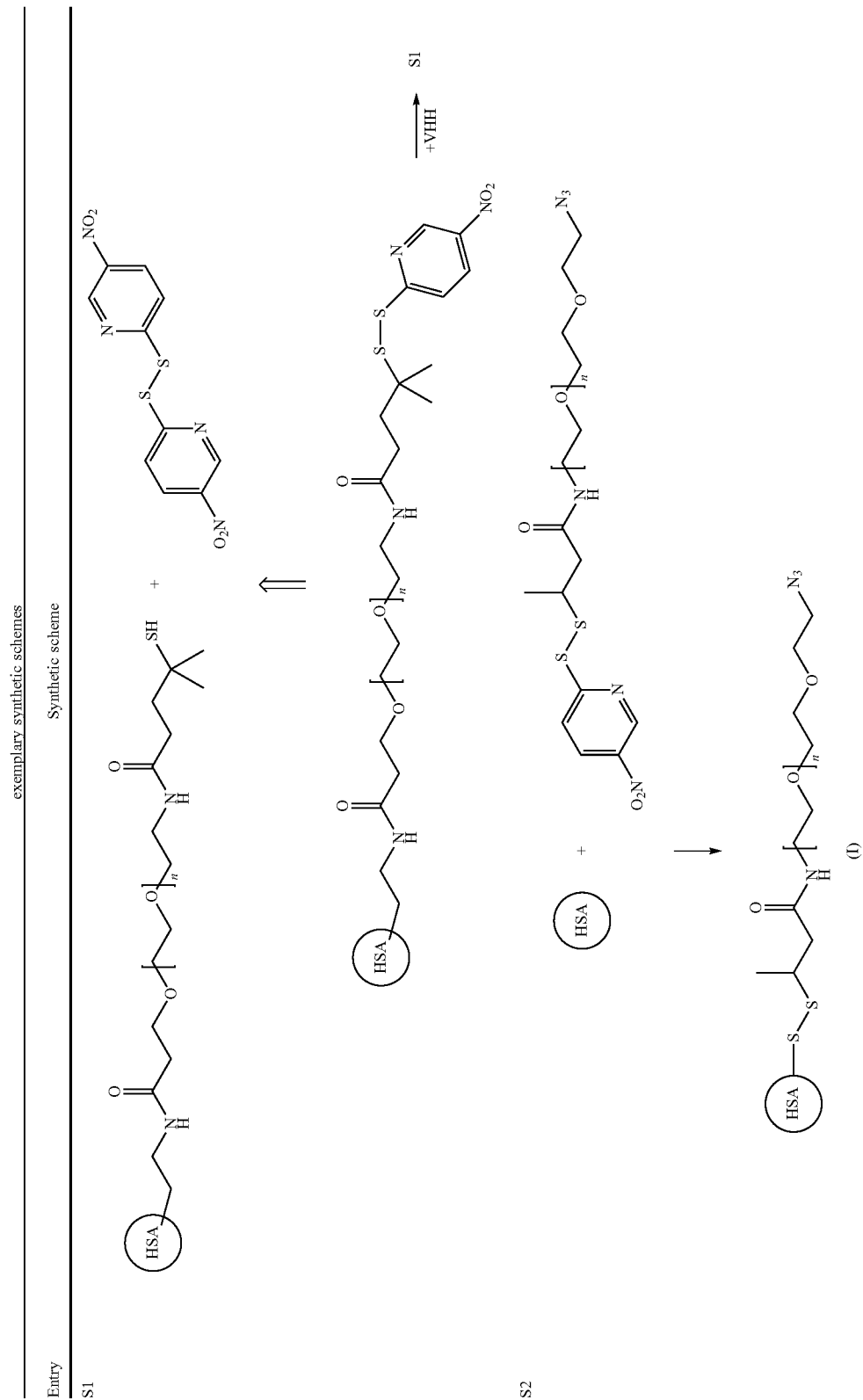 |
| S2 | |

TABLE 3-continued exemplary synthetic schemes

| Entry | Synthetic scheme |
|---|---|
| S3A | (structures showing DBCO-PEG-maleimide + VHH → intermediate (II) with VHH-S linkage; then (I) + (II) → S2; separately, nitropyridyl-disulfide-GGGGSGGGSGGGGLC-VHH reacts to give HSA-S-S-GGGGSGGGSGGGGLC-VHH, S3A (SEQ ID NO: 4)) |

TABLE 3-continued exemplary synthetic schemes

| Entry | Synthetic scheme |
|---|---|
| S5C | VHH—AAASAEAAAKEAAKEAAAKAAAGSGLC—S—S—(2-pyridyl-5-NO$_2$) + HSA—PEI-Xn → VHH—AAASAEAAAKEAAKEAAAKAAAGSGLC—S—S—HSA—PEI-Xn (SEQ ID NO: 10) |

TABLE 3-continued exemplary synthetic schemes

| Entry | Synthetic scheme |
|---|---|
| S6 | |
| S8 | |

In one design, HSA-PEG$_4$-di-methyl(dm)-S—S-VHH (S1) was prepared (of note, the molar ratio between HSA and VHH may be greater than 1, since the conjugation to HSA is not selective, and hence more than one modification may occur). For this purpose, HSA is modified with NHS-PEG$_4$-dm-SPDP. The NHS group reacts with primary amino groups on the HSA creating a stable amide bond. The linker employed included a PEG$_4$ chain. This reaction of the dm-SPDP on the modified HSA with VHH which had a free Cysteine at its C-terminal resulted in low reaction yield. To improve the reaction yield, the dm-SPDP moiety on the HSA converted to dm-SPDP-NO$_2$ to yield a significantly more activated group. For this purpose, the modified HSA with NHS-PEG$_4$-SPDP was reduced with TCEP to receive HSA with a PEG$_4$-dm-SH moiety, the latter was further activated with 2,2'-Dithiobis(5-nitropyridine) to give the desired HSA modified with PEG$_4$-dm-SPDP-NO$_2$ moieties. These moieties were further reacted with a VHH or DARPin which had a free Cysteine at their C-terminal. In some cases, a pre-treatment with a reducing agent, such as TCEP, to release this Cysteine's thiol from a dimeric state or from its bond to other thiol-containing molecules, was necessary.

Another design, HSA-S—S-α-methyl-PEG$_{11}$-triazole-PEG$_4$-VHH (S2), was prepared. For this purpose, HSA was modified with N$_3$-PEG$_{11}$-α-methyl-SPDP-NO$_2$, to receive mono PEG modification on Cysteine 34. In parallel, VHH was modified with MAL-PEG$_4$-DBCO, to give mono PEG modified on the VHH C terminal cysteine. The two proteins were conjugated by click reaction to receive the desired, HSA-S—S-α-methyl-PEG$_{11}$-triazol-PEG$_4$-VHH construct.

Peptide-Based Linkers

In this design, a VHH payload was expressed with an additional peptide linker at the C-terminal end. The inventors synthesized various conjugates with a peptide-based linker (S3A-B) having a labile disulfide bond on the HSA cysteine at position 34. In brief, VHH expressed at its C-terminus with GIS-based peptides and terminated with a Cysteine have been activated by SPDP or nitro-SPDP to react with C34 thiol group of HSA. S3A-B are schematically presented in Table 1.

In order to increase the stability of the S—S bond inventors added a sterically hindered amino acid, Leucine, that was positioned α or β to the C terminal cysteine, as in the following sequence respectively; GGGGSGGGGSGGG-GLC (SEQ ID NO: 4) (named "pep1") or GGGGSGGGGSGGGLGC (SEQ ID NO: 5) (named "pep2"). These conjugates were prepared by VHH activation on the C terminal cysteine, with Aldrithiol or 2,2'-Dithiobis (5-nitropyridine) followed by conjugation to HSA. In some cases, a pre-treatment of the C terminal VHH, with a reducing agent, such as TCEP, to release this Cysteine's thiol from a dimeric state or from its bond to other thiol-containing molecules, was necessary.

In order to understand whether the Leucine amino acid in the peptide contributes to the stability of these peptide linkers an additional construct of VHH αE7-(G$_4$S)$_3$—C was expressed, and conjugated to HSA, resulting in an additional peptide linker-based conjugate, VHH αE7-(G$_4$S)$_3$—C-HSA (S3C).

Example 11: Stability of the New Conjugates Comprising Biocleavable (Reversible) and Non-Biocleavable (Non-Reversible) Linkers (S1-S3C)

Figure 37A:
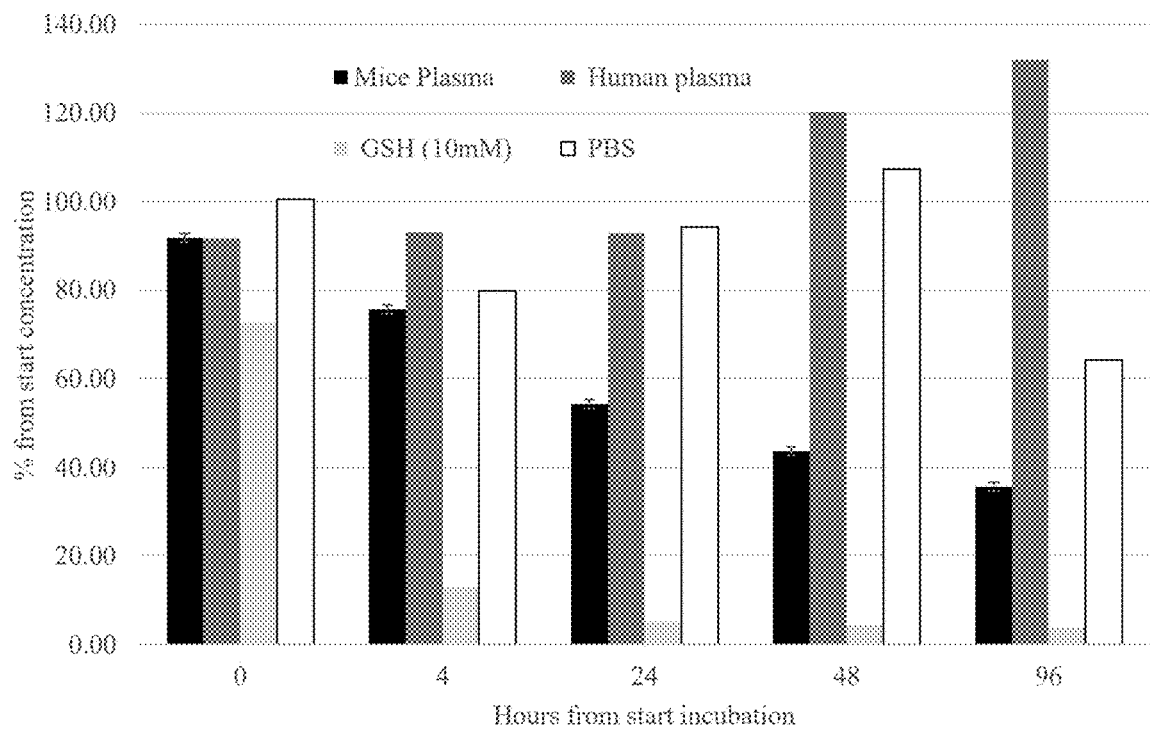
FIGS. 37A-37F: Bar graphs of the stability of (37A) HSA-PEG$_4$-dm-S—S-VHH, (37C) HSA-S—S-α-methyl-PEG$_{11}$-triazol-PEG$_4$-VHH (S2), (37D) VHH-GGGGSGGGGSGGGGLC (SEQ ID NO: 4)-S—S-HSA, (37E) VHH-GGGGSGGGGSGGGLGC (SEQ ID NO: 5)-S—S-HSA and (37F) a comparison of VHH-GGGGSGGGGSGGGGLC (SEQ ID NO: 4)-S—S-HSA, VHH-GGGGSGGGGSGGGLGC (SEQ ID NO: 5)-S—S-HSA, and the irreversible linker construct HSA-PEG$_{11}$-VHH under cytoplasmic-like conditions (10 mM GSH), in mice plasma, in human plasma and in PBS. (37B) Bar graph of the stability of HSA-PEG$_4$-dm-S—S-VHH as compared to the irreversible linker construct HSA-PEG$_{11}$-VHH in mice plasma.
Figure 37B:
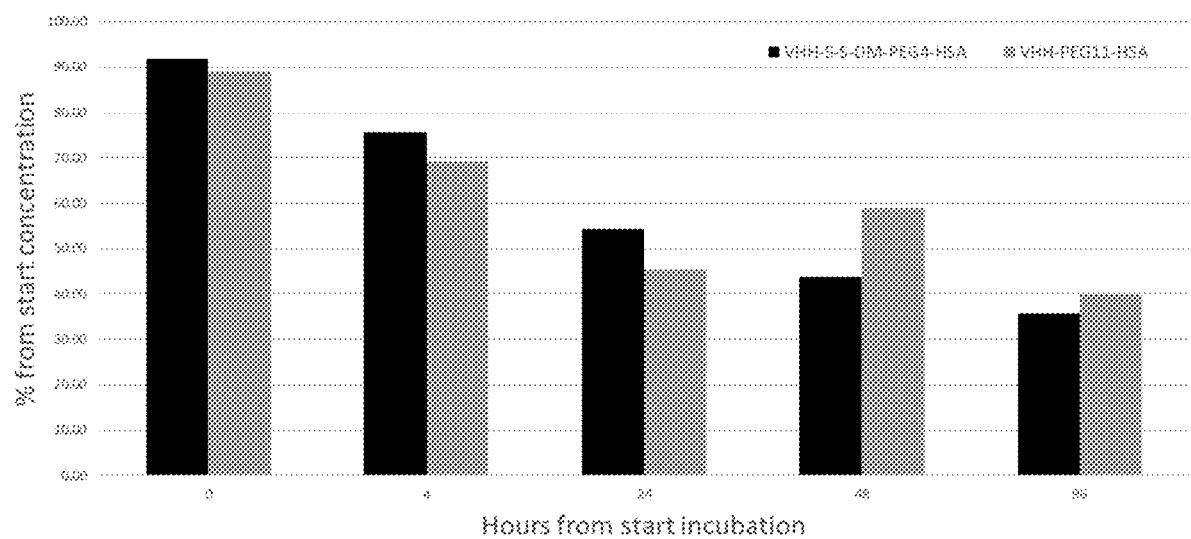

The S1 conjugate was characterized by having a labile disulfide bond close to the active payload. In vitro study in the following media: PBS/human plasma/mice plasma and GSH (10 mM) (FIG. 37A) revealed that this conjugate is stable in PBS. In human plasma the conjugate concentration was not decreased even after 96 h. In GSH (10 mM) the conjugate concentration was decreased rapidly with time as expected and in mice plasma some decrease in the conjugate concentration was observed (FIG. 37A). This reduction in concentration over time is likely the result of physical processes, e.g., adsorption, and not chemical degradation of the disulfide bond in light of the similar behavior of a non-reversible linker (FIG. 37B), and the in vivo PK results (see FIG. 38A-38B).

Figure 37C:
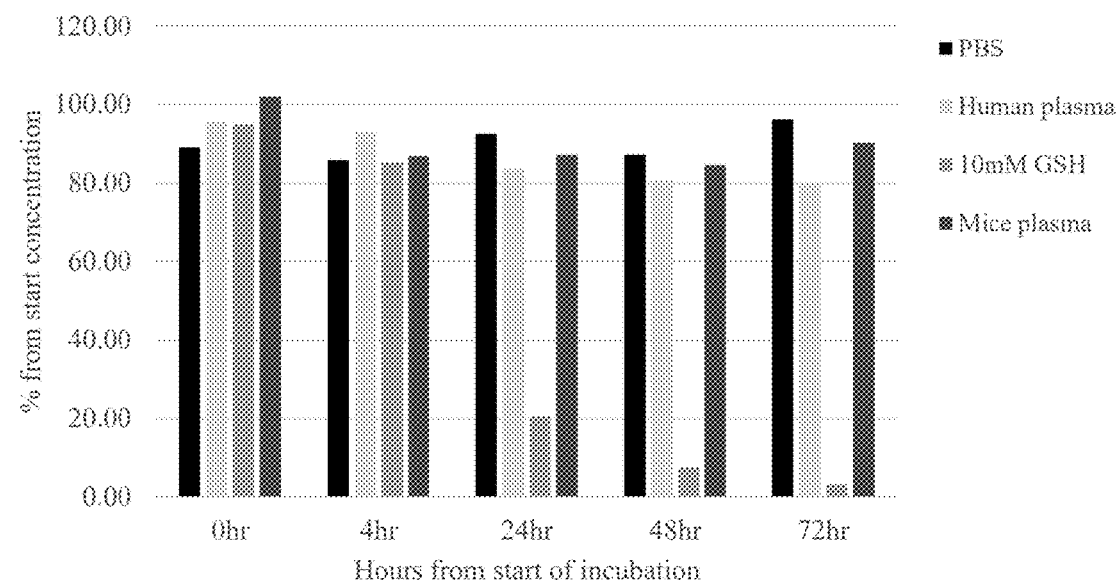

In vitro stability analysis of S2 showed that the conjugate is highly stable at PBS/mice plasma and human plasma. Contrary to other HSA conjugates, this linker was also more stable under GSH (10 mM) conditions and its reduction to the separate VHH and HSA was not as rapid as with the other linkers used. After 4 hours most of the conjugate was still at the HSA-VHH conjugated form (above 80%) while after 24 h only 20% of the sample was detected as HSA-VHH form and the reduction process continued with time (FIG. 37C). These results correlate with the PK results that showed superior stability for this conjugate compared to all other conjugates tested (see FIG. 38A-38B).

Figure 37D:
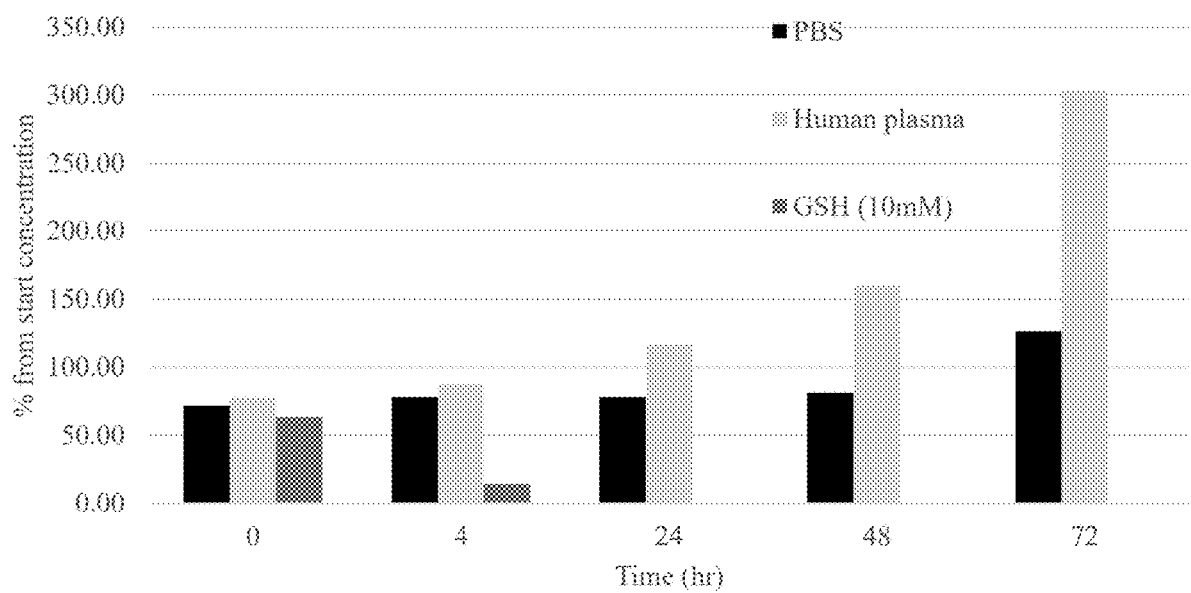
Figure 37E:
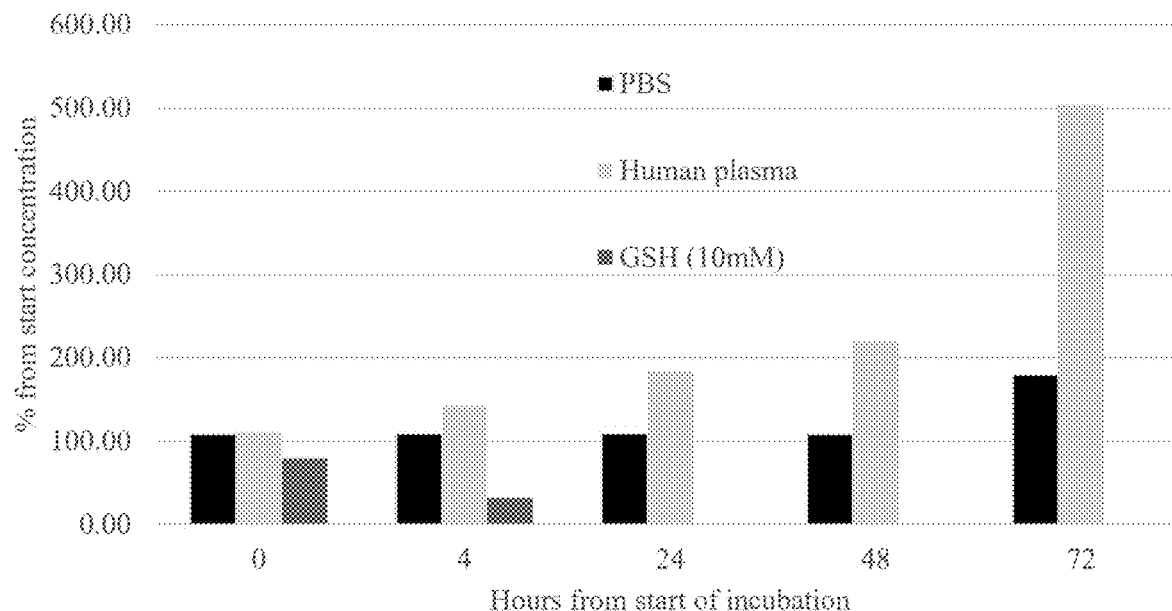
Figure 37F:
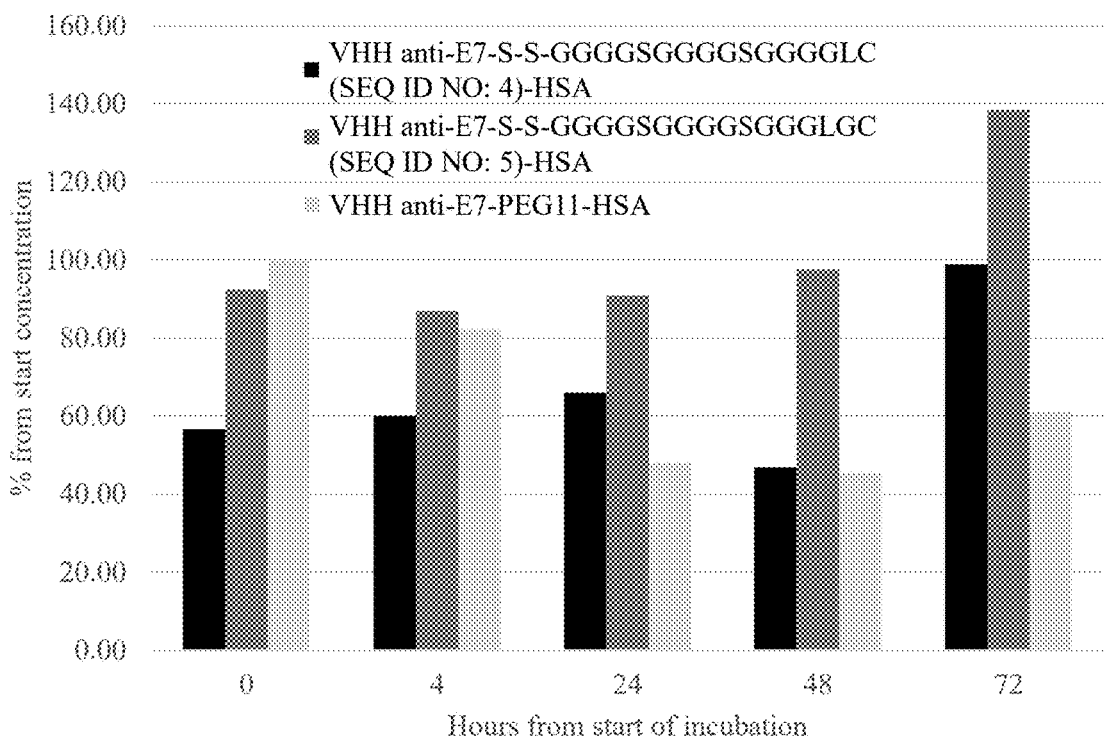

In vitro stability of the peptide-based linkers was also studied. Results revealed that these conjugates are stable in PBS/human plasma and mice plasma, as no decrease in the conjugate concentration was observed for 96 h of incubation at any of those conditions. In GSH (10 mM) the conjugates' concentrations quickly decreased with time as expected (FIG. 37D-37F). The stability of the conjugates in mice plasma was further compared to the non-reversible conjugate (VHH anti E7-HSA), to show that the new constructs (S3A-B) are as stable as a non-reversible construct in mice plasma (FIG. 37F).

Figure 38A:
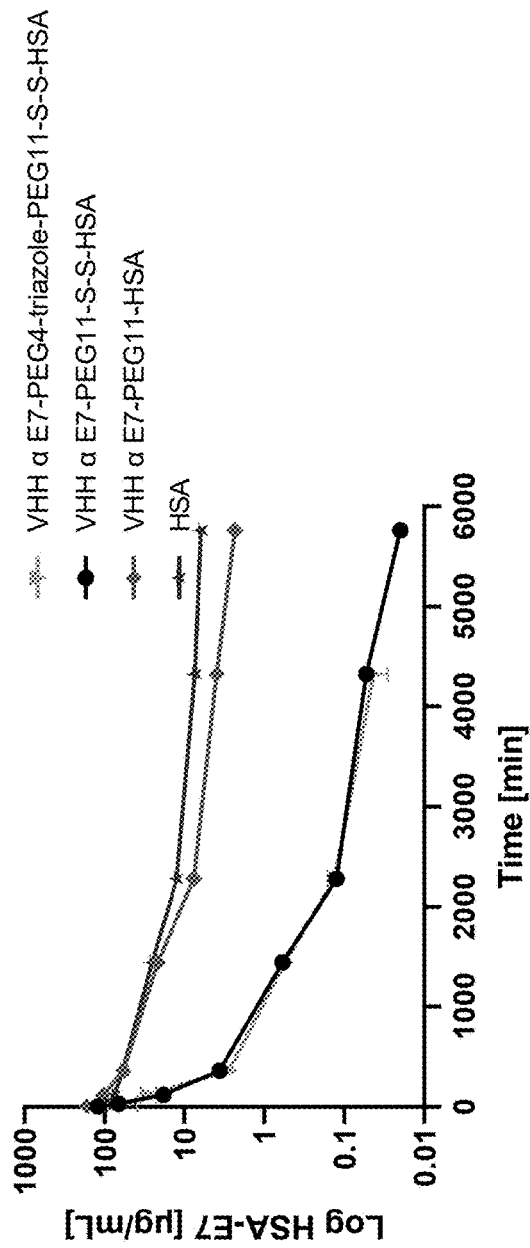
FIGS. 38A-38C. PK results of: (38A) 2nd generation linkers (C1 and C2); (38B) 3rd generation linkers (S1, S2, S3A-B). In all reversible conjugates the S—S bond is on the HSA C34 cysteine, except VHH αE7-S—S-dm-PEG4-NH-HSA (S1) in which the S—S bond is on the C terminal cysteine of the VHH. Balb-c mice were injected with 60 nmol/Kg of the tested conjugate. Plasma samples were collected 0.08/0.5/2/6/24/48/72/96 hours after injection. The amount of the tested conjugate in the plasma was determined by two side ELISA (anti VHH/anti HSA). (38C) PK of S3A as determined by 2 side ELISA vs HSA ELISA. The PK of all conjugates was determined by both ELISA methods and gave the same results (data not shown).

The conjugates C1 and C2 having a labile disulfide bond at HSA's C34 Cysteine, were evaluated in an in vivo PK study to determine their real stability in mice plasma (FIG. 38A). The following Table 4 summarizes the kinetic parameters of the different conjugates with the different linkers and their comparison to HSA alone and to the non-reversible conjugate (VHH αE7-PEG$_{11}$-HSA, S4). As expected, these two have a very similar PK profile and parameters, including their half-life and AUC. The conjugates C1 and C2 had a lower half life than the HSA and the non-reversible conjugate although the half-life, which corresponds to the stability of the disulfide bond, was dramatically improved when compared to the initial construct in which the disulfide bond was at the payload's C-terminal and without any hindrance or natural protection, as provided by the C34 cavity in HSA. In the latter case the conjugates were reduced in a matter of minutes and hours and at 24 hours post injection a very small amount of the original injected dose could be detected in the blood of these animals. This further shows that indeed the location of the disulfide bond at C34 offers protection from reducing agents in the plasma.

TABLE 4

| Parameter | Unit | C2, n = 11 | C3, m = 4 and n = 11 | S4 | HSA |
|---|---|---|---|---|---|
| $C_0$ | μg/mL | 137.6 | 101.0 | 179.9 | 118.7 |
| $C_{max}$ | μg/mL | 122.3 | 91.7 | 167.2 | 113.0 |
| $AUC_{0-t}$ | μg * h/mL | 209.4 | 206.7 | 1856.0 | 2084.3 |
| $AUC_{0-inf}$ | μg * h/mL | 210.0 | 207.5 | 1950.5 | 2300.5 |
| $t_{1/2}$ | h | 18.2 | 13.1 | 28.1 | 24.1 |

Figure 38B:
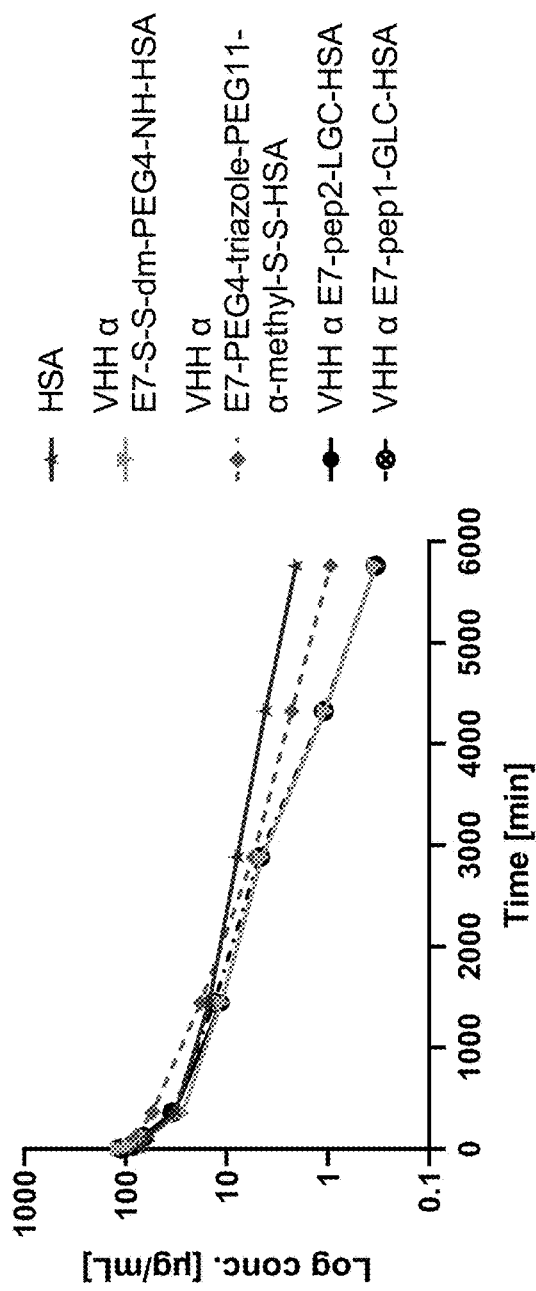

In order to further evaluate the stability of the different new linkers, hindered PEGs and peptide linkers, under real mice plasma conditions, a PK study was carried out with the following conjugates: (1) S3A; (2) S3B; (3) VHH S2; (4) S1; (5) HSA. As can be seen in FIG. 38B and in the table below, the peptide linkers of S3A and S3B as well as the dimethyl hindered PEG linker of S1 gave very similar PK profiles and PK parameters. All those linkers gave higher half-life values than the values obtained for the simpler PEG linkers used for the previous PK study (FIG. 38A), suggesting that these linkers do offer better plasma stability of the labile disulfide bond. The disulfide bond on C34 which was further hindered with a methyl group (S2) gave an even better stability profile as evident by its higher half-life, even closer to the half-life of the HSA. This improvement in stability is also evident in other PK parameters, especially the Clearance and AUC (see Table 5 below).

TABLE 5

| Parameter | Unit | S3A | S3B | (S2) | (S1) | HSA |
|---|---|---|---|---|---|---|
| $C_0$ | µg/mL | 118.3 | 103.4 | 125.2 | 124.4 | 75.6 |
| $C_{max}$ | µg/mL | 112.4 | 101.0 | 119.1 | 118.2 | 74.1 |
| $AUC_{0-t}$ | µg * h/mL | 1098.4 | 1041.4 | 1513.2 | 963.1 | 1226.9 |
| CL | mL/kg/d | 108.6 | 114.5 | 78.0 | 123.7 | 92.1 |
| $t_{1/2}$ | h | 13.5 | 13.7 | 19.0 | 14.2 | 25.4 |

Figure 38C:
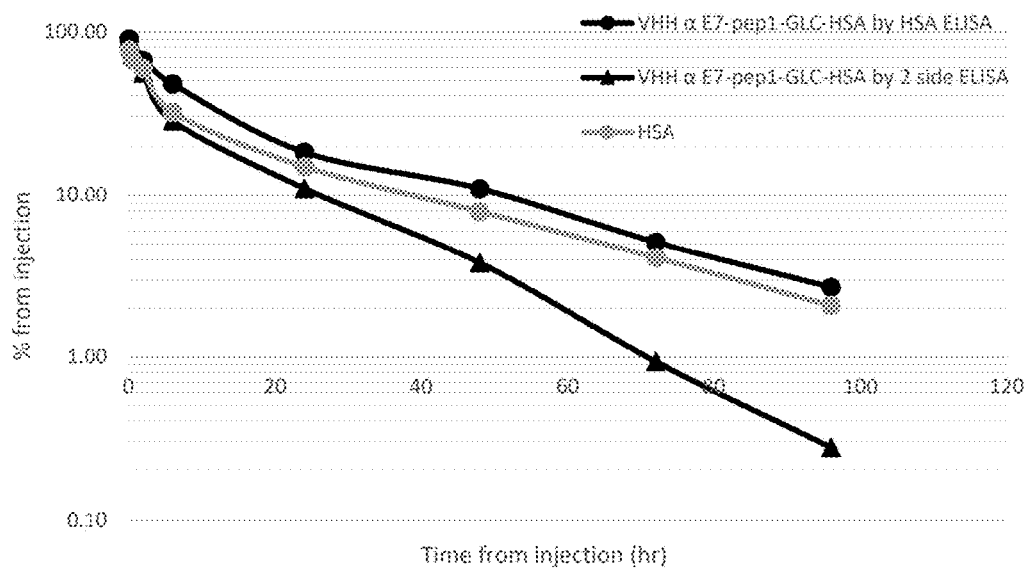

The plasma half-lives of the conjugates with the new linkers (S1, S2, S3A-B) are slightly lower than the half-life of HSA. To determine if the decrease in plasma conjugate concentration compared to that of HSA is indeed the result of linker cleavage, an additional ELISA was performed. In this ELISA the concentrations in the plasma of the four new conjugates were evaluated by anti HSA ELISA (that quantifies the amount of HSA, even if the linker is cleaved). The conjugates' concentrations by HSA were compared to the conjugates' concentrations by 2 side ELISA (that quantifies only the bound VHH αE7 to HSA form). The PK profile of S3A as measured by the ELISA method compared to the PK profile of HSA is exhibited in FIG. 38C. The quantification of S3A by HSA ELISA gave a very similar conjugate concentration as observed for HSA alone. This result indicates that the reduction in S3A concentration as compared to HSA is indeed the result of linker cleavage. Similar results were obtained for the other conjugates with the different linkers (data not shown).

Figure 39:
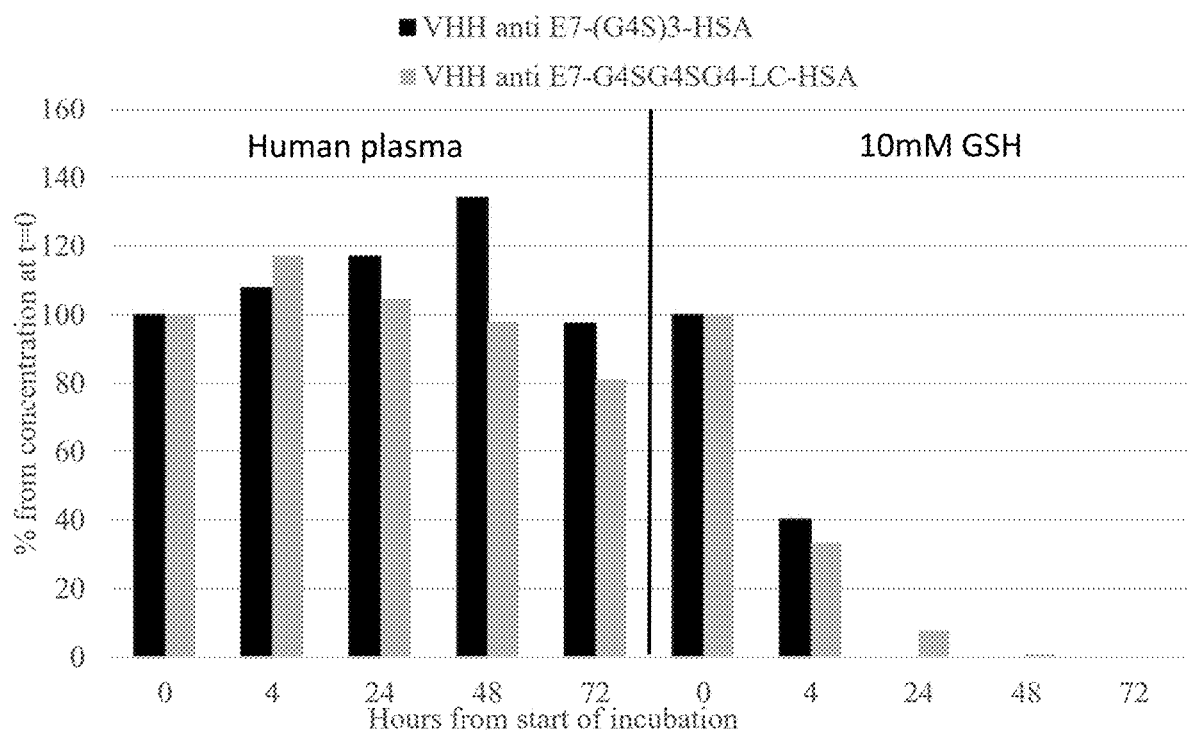
FIG. 39: Bar graph of the stability of VHH αE7-(G$_4$S)$_3$-C-HSA (S3C) vs. VHH αE7-G$_4$S-G$_4$S-G$_4$L-C-HSA (S3A) under cytoplasmic-like conditions (10 mM GSH) and in human plasma.
Figure 40:
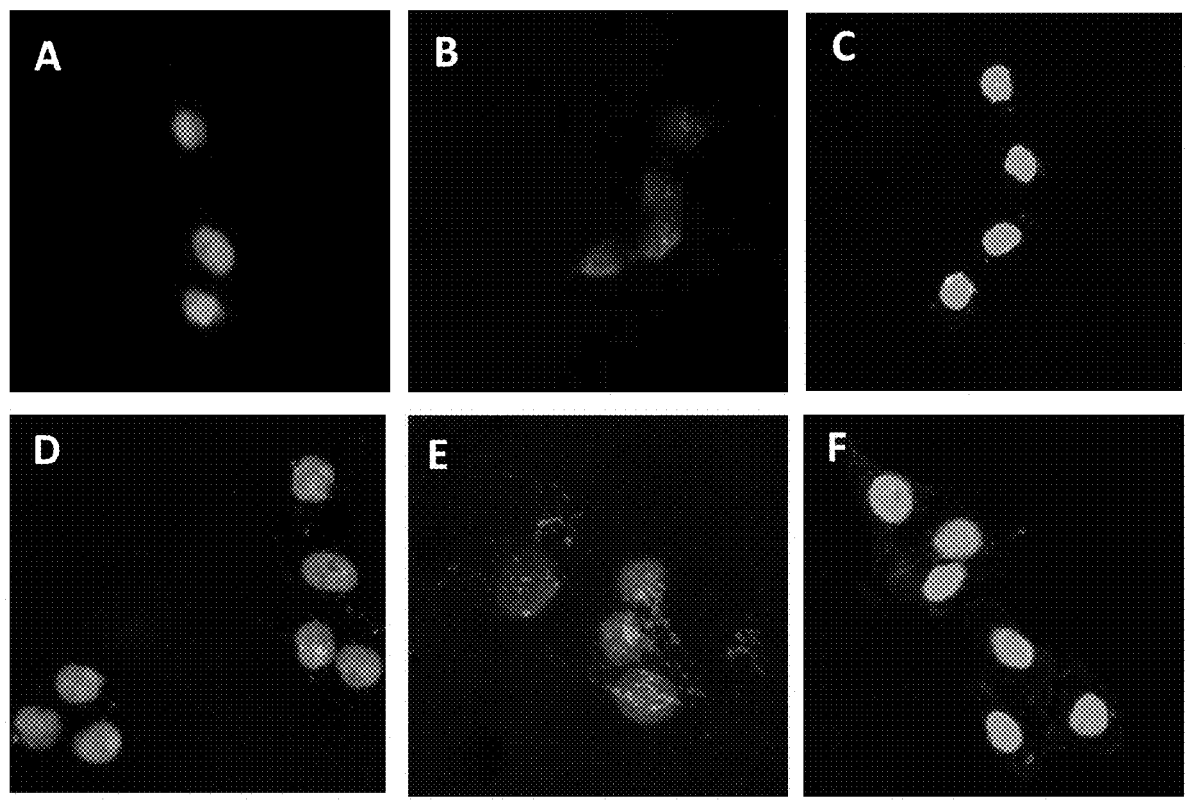
FIGS. 40A-40F. Confocal microscopy images of Hela-GFP cells following 24 hr. incubation with VHH-αE7. VHH was conjugated to the HSA carrier using different linker strategies. (40A) without treatment; (40B) S4-PEI×3.5; (40C) S2-PEI×3.5; (40D) S1-PEI×3.5 (40E) S3A-PEI×3.5 (40F) S3B-PEI×3.5. Anti VHH immunofluorescence staining (red). Nuclear staining (green).

Two constructs with peptide linkers differing only in the location of the leucine amino acid near the disulfide bond (VHH αE7-$G_4$S-$G_4$S-$G_4$L-C(SEQ ID NO: 4), S3A and VHH αE7-$G_4$S-$G_4$S-GGGLG-C(SEQ ID NO: 5), S3B) were evaluated for their in vitro and in vivo stability. The two conjugates exhibited both in vitro and in vivo (PK) stability similar to each other and also similar to a conjugate with a non-cleavable linker (S4). The new construct, VHH αE7-$(G_4S)_3$—C-HSA (S3C), stability was tested in vitro in human plasma and in 10 mM GSH vs. S3A. As can be seen in FIG. 39, both constructs exhibit very similar stability profiles in both human plasma and a glutathione solution, suggesting the leucine amino acid does not contribute much to the stability of the conjugate. It should be noted that in 10 mM GSH the leucine containing linker did survive somewhat better as about 8% of the initial level of the conjugate could still be detected after 24 hours while no residual levels of the conjugate without leucine could be detected at this time point. The conjugate with the leucine-containing linker could even be detected after 48 hours (approx. 1%).

This suggests that the Leucine does confer some advantage in terms of stability and that perhaps further testing should be required to ascertain this contribution. In any case, the inventors will continue using linkers containing leucine close to the disulfide bond with the carrier.

All four conjugates of VHH αE7 linked to HSA (S1-53B), were further modified with PEI by conjugating the VHH αE7 to HSA-PEI×3.5 using the different linkers and chemistries and their uptake ability was verified by confocal microscopy. Hela GFP cells were seeded, and the tested samples were incubated with the cells for 16 h, followed by a fixation and immunostaining process and evaluation of the uptake level in Confocal microscopy. As can be seen in FIG. 40A-40F, the non-treated cells (FIG. 40A) showed no presence of VHH while treatments with the VHH conjugated to HSA-PEI×3.5 via the new linkers (S1-PEI-S3B-PEI) showed clear presence of VHHs inside the cells (FIG. 40B-40F).

Linker Length (Peptide Linker at Different Length; $(G_4S)n$, n=0, 1, 2, 3)

Different VHH and DARPin agents were expressed with a flexible peptide, based on $G_4S$ units, and followed by a terminal Cysteine amino acid. The length of the peptide linker was determined by the number of $(G_4S)n$ units, with n=0, 1, 2, 3. The proteins were activated with 2,2'-dithiobis (5-nitropyridine) and conjugated to HSA.

For n=1, we observed different conjugation reaction yields for the different proteins. While VHH αE7-$G_4$S-1C resulted in an efficient conjugation reaction to the carrier, K27 anti-KRAS DARPin gave medium reaction yield, whereas, in the conjugation of VHH anti-BRAF to HSA/HSA-PEI, no conjugation product was observed. It should be noted that in the case of non-reversible conjugation, that demands the use of bis-MAL-PEG. which leads to some extension of the linker, the VHH anti-BRAF-$G_4$S—C construct can be used to successfully yield VHH anti-BRAF-$G_4$S—C-HSA-PEI (S5A).

VHH anti-BRAF (1C5) was expressed with different peptide linker lengths, (presented in Table 6 below). The different 1C5 constructs with different linker lengths were treated with TCEP and the resulting free thiol of the C-terminal cysteine was activated with 2,2'-Dithiobis(5-nitropyridine) followed by conjugation to the carrier, HSA-PEI. All activated conjugates of 1C5 ending with Leucine-Cysteine at the C terminal exhibited efficient conjugations to HSA-PEI×4.5, regardless of the peptide linker length (n=0, 1, 2, 3). These results are surprising in light of the result obtained from conjugation reaction of 1C5-$G_4$S—C(without leucine) with HSA-PEI×4.5, that failed to give a conjugation product.

The conjugation reactions' yields of the different payload constructs were evaluated by SDS gel, and the results are summarized in the Table 6 below.

TABLE 6

Conjugation reaction evaluation for different payload with different peptide linkers at the C terminal. The conjugation yield was ranked from 1-5 while 1 is no reaction yield and 5 is high reaction yield.

| | α E7 | α BRAF (1C5) | α K27 DARPin |
|---|---|---|---|
| Payload-$G_4$S-C | ++++ | + | +++ |
| Payload-$(G_4S)_3$-C | +++++ | N.T | N.T |
| Payload-L-C | N.T | +++++ | N.T |
| Payload-$G_4$L-C | N.T | +++++ | N.T |
| Payload-$G_4$S-$G_4$L-C | N.T | +++++ | N.T |

TABLE 6-continued

Conjugation reaction evaluation for different payload with different peptide linkers at the C terminal. The conjugation yield was ranked from 1-5 while 1 is no reaction yield and 5 is high reaction yield.

|  | α E7 | α BRAF (1C5) | α K27 DARPin |
|---|---|---|---|
| Payload-G$_4$S-G$_4$S-G$_4$L-C | +++++ | +++++ | +++++ |
| Payload-Hel20-L-C | N.T | ++++ | N.T |

N.T. = Not Tested

Without being bound to any particular theory, it is postulated that if a peptide linker is implemented for covalent attachment of the protein carrier to the payload of the invention, it might be beneficial to have a linker comprising at least 4, at least 5, at least 6, at least 8 amino acids. As shown in Table 6, the linker length required for an efficient conjugation of the protein carrier to the payload of the invention may vary depending on a specific size and/or sequence of the payload.

Peptide Linkers of Different Lengths and with and without a Sterically Hindered Amino Acid VHH anti BRAF (1C5) was expressed with the following C terminal sequences:

```
Construct 1:
                                        (SEQ ID NO: 9)
Anti BRAF (1C5)-G4S-C (1C5)

Construct 2:
                                        (SEQ ID NO: 4)
Anti BRAF (1C5)-GGGGSGGGGSGGGGLC (1C5-flex-pep-LC)

Construct 3:
                                        (SEQ ID NO: 10)
Anti BRAF (1C5)-AAASAEAAAKEAAAKEAAAKAAAGSGLC (1C5-
Hel20-LC)
```

Construct 2 is similar to the above-described construct with a peptide linker with an anti-E7 VHH (S3A). Construct 3 has a linker which is alpha-helical in nature, regarded as a rigid linker that is supposed to avoid or minimize interaction of the VHH payload with the carrier. The 1C5 VHH was observed to lose its affinity to Protein-A based resins when conjugated using a flexible GIS-based linker to HSA-PEI, probably due to specific electrostatic interaction. The rigid linker indeed restored this interaction with Protein-A resins suggesting the rigid linker reduced this interaction with the carrier and maintaining the VHH exposed. The rigid linker is also terminated with a leucine near the terminal Cysteine used for carrier conjugation.

Figure 41:
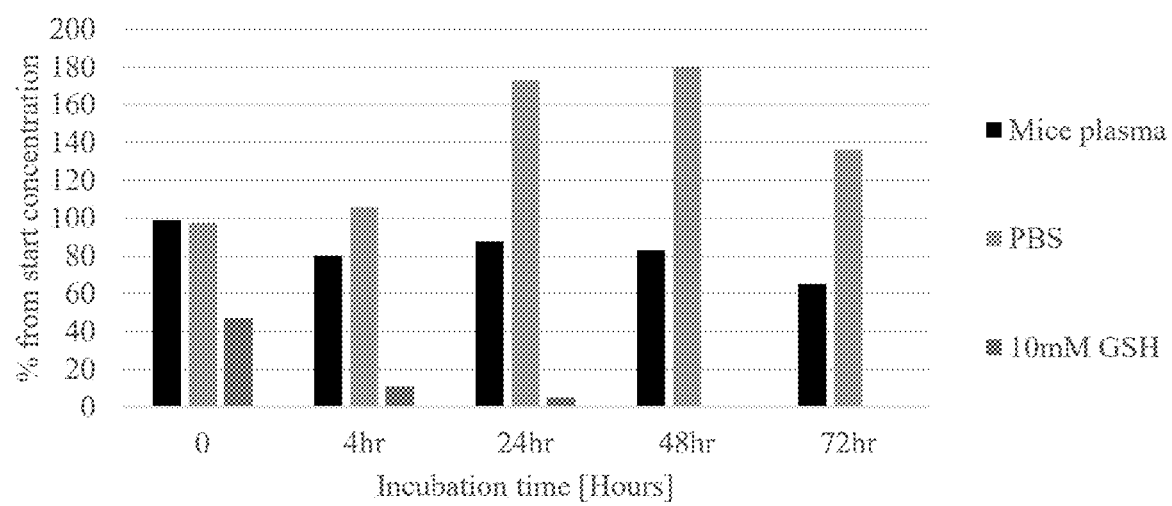
FIG. 41: Bar graph of the stability of VHH anti BRAF 1C5-Hel20-LC-HSA-PEI×3.5 (SSC) under cytoplasmic-like conditions (10 mM GSH), mice plasma and PBS.

Construct 1 (1C5) was conjugated to HSA-PEI×3.5 with a non-reversible PEG linker (bis MAL-PEG$_{11}$), to give 1C5-HSA-PEI×3.5 (S5A). Both construct 2 (1C5-flex-pep-LC) and 3 (1C5-Hel20-LC) were conjugated to HSA-PEI× 3.5 to give reversible conjugates; 1C5-flex-pep-LC-HSA-PEI×3.5 (S5B) and 1C5-Hel20-LC-HSA-PEI×3.5 (S5C) respectively. 1C5-flex-pep-LC-HSA-PEI×3.5 (S5B) is an analog construct to the E7-pep1-LC-HSA (S3A) that exhibited good stability in mice plasma (in vivo FIG. 38B and in vitro FIG. 37F). S5C is a construct of anti BRAF VHH through a rigid peptide linker. This construct was tested for its in vitro stability (FIG. 41) and showed good stability under mice plasma conditions.

Example 12: PEI Modification

The PEI modification, conferring highly strong and concentrated positive charge to the carrier protein, is responsible for the initial adhesion of the carrier to the membranes of cells leading to crossing of the cell membrane. The same PEI modification is then responsible for the efficient escape of the PEI-modified carrier, and its payload, from the endosomal pathway. There has been presented here various carriers modified by different levels of PEI. Specifically for HSA as carrier we have mainly described internalization, functional and in vivo results focusing on two levels of modification, a lower-level ranging from 3.5 to 4.5 of PEI molecules per HSA molecule, and a higher-level ranging from 7.5 to 9.5. Previously we have shown that both PEI ranges, both high and low, efficiently enable internalization and endosomal escape as well as functionality in cells. Both ranges have comparable PK and biodistribution profiles though the lower range was superior. The inventors sought to establish what would be the effect of even lower levels of PEI, especially on functionality of a payload-carrier conjugate in cells.

An anti-BRAF VHH with a rigid peptide linker, 1C5-Hel20-LC, was conjugated to HSA-PEI×n (S5C), with n=4.5, 3, 2, 1. As described above, level of PEI is controlled by the level and ratios of reagents used in the PEI modification reaction and the final level is determined by analyzing the modification products for their intact mass by MALDI-ToF mass spectrometry. It should be noted and emphasized that the reported PEI level represents the average number of PEI molecules added to the HSA. The level of PEI modification on HSA protein at each reaction was evaluated by mass spectrometry and the different carriers were characterized for their Zeta potential (Table 7).

Zeta potential measurements were preformed using Zeta Sizer Ultra (Malvern Instruments), samples buffer was exchanged to 1 mM NaCl at 1 mg/mL protein concentration. 20 μL from each sample were loaded in zeta cells (DTS1070), five repeats for each sample were measured and the mean zeta potential in mV was obtained.

TABLE 7

MS and Zeta potential data for HSA with different levels of PEI

| Carrier | PEI units by MS | Zeta potential (mV) |
|---|---|---|
| HSA | — | −20.7 ± 2 |
| HSA-PEI × 4.5 | 4.5 | 13 ± 4.5 |
| HSA-PEI × 3 | 3 | 8.6 ± 1 |
| HSA-PEI × 2 | 2 | 4 ± 3 |
| HSA-PEI × 1 | 1 | −6.5 ± 1 |

Figure 42A:
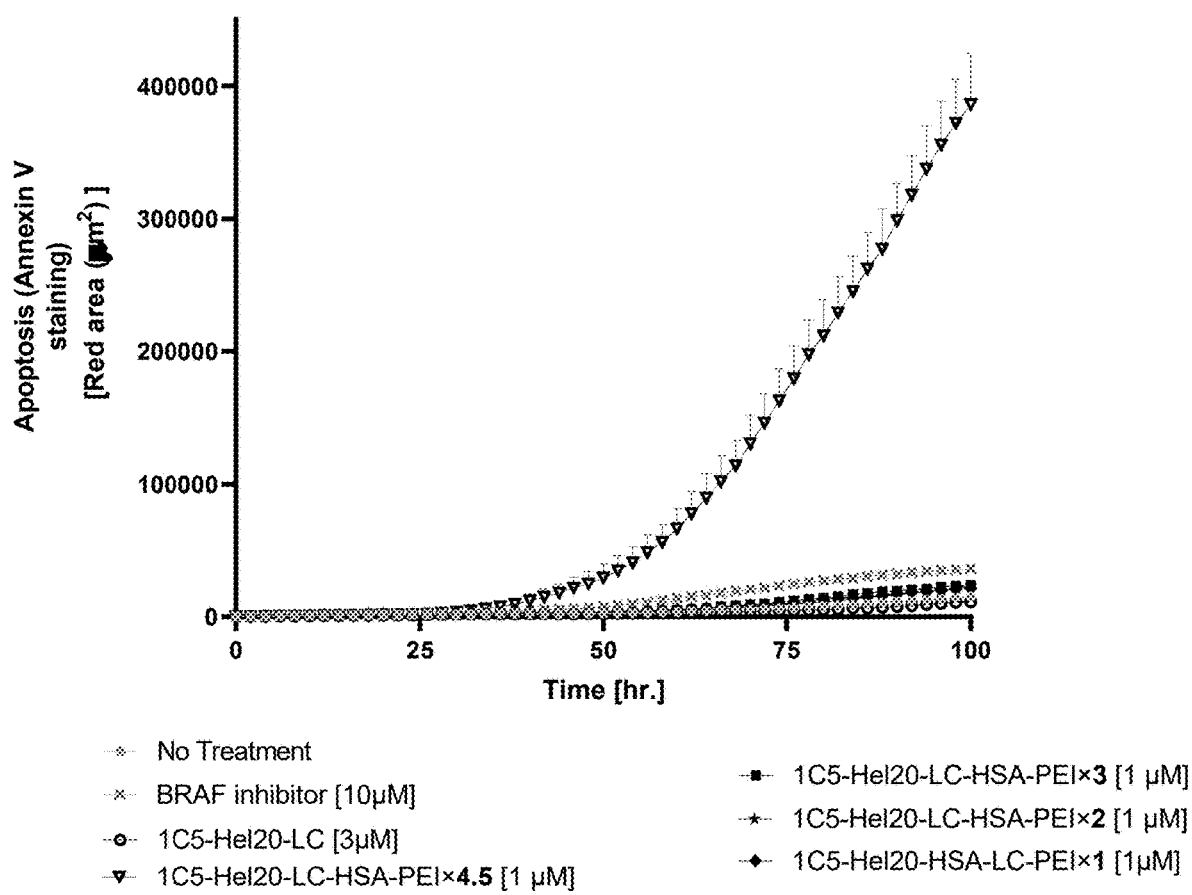
FIGS. 42A-42D. A375 cells were seeded in 96 plate wells for 24 h to allow cells adherence (1500 cells/well). To each well a sample of the tested agent was added at the desired concentration (42A-42B) 1 μM; (42C-42D) 304, except BRAF inhibitor, PF-04880594 that was added at 10 μM. (42A, 42C) Red area obtained from the Annexin V red reagent, a commonly used fluorescent dye identifying apoptotic cells, monitored in IncuCyte®. (42B, 42D) Red area normalized to the value obtained by CellTiter-Glo corresponding to intact cells.
Figure 42B:
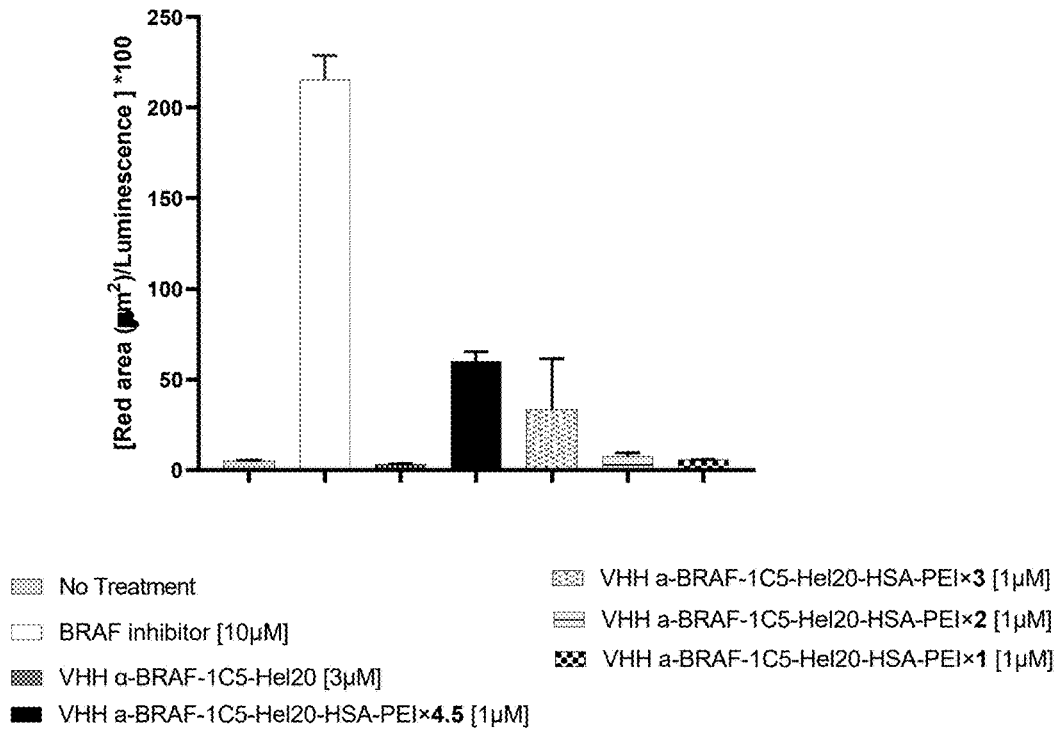
Figure 42C:
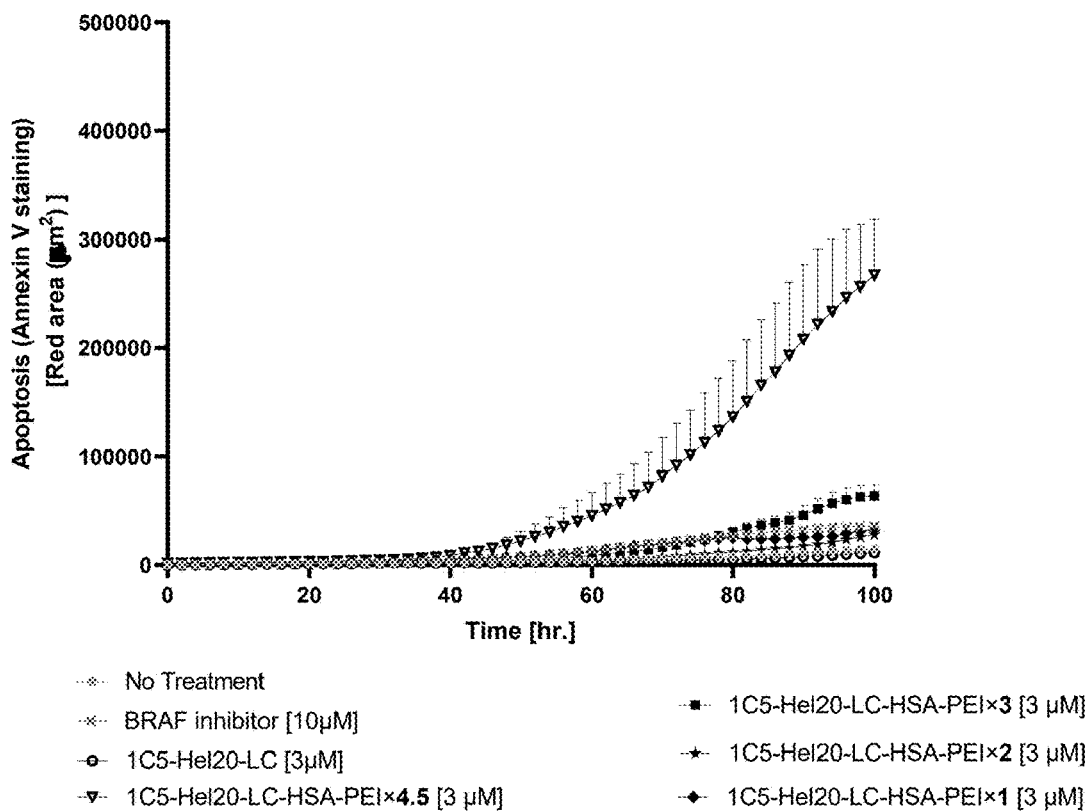
Figure 42D:
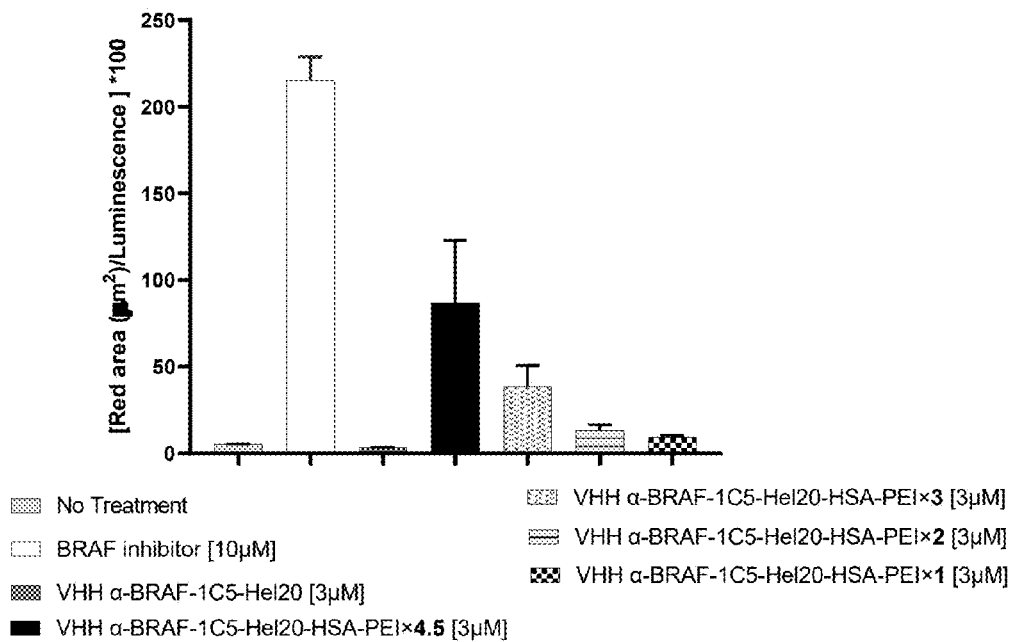
Figure 43:
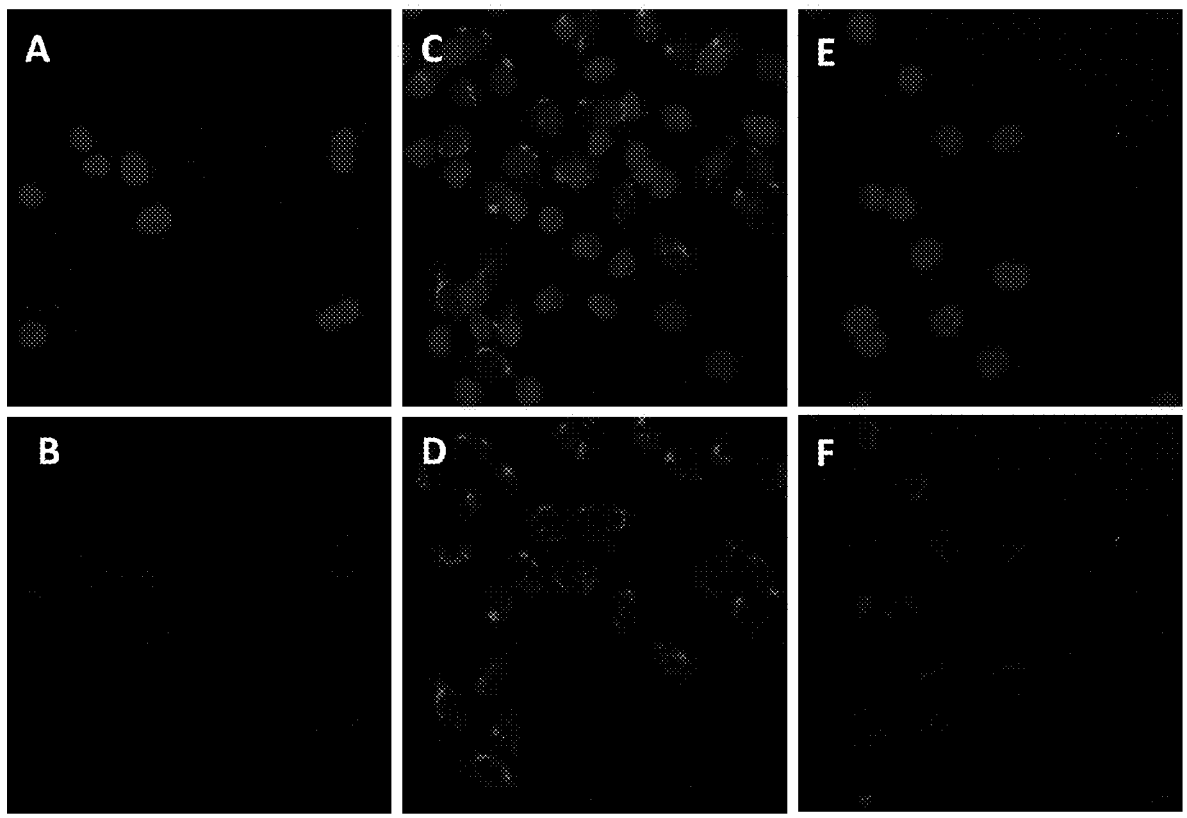
FIGS. 43A-43L: Confocal microscopy images of A375 cells following 24 hr. incubation with VHH anti-E7 conjugated to different carriers. (43A-43B) without treatment; (43C-43D) VHH-αE7-S—S-PEG$_4$-C(O)—NH-HSA-PEI×3.5; (43E-43F) VHH-αE7-S—S-PEG$_4$-C(O)—NH-Darpin-PEI×2.4; (43G-43H) VHH-αE7-S—S-PEG$_4$-C(O)—NH-IgG-PEI×27; (43I-43J) VHH-αE7-S—S-PEG$_4$-C(O)—NH-Fibrinogen-PEI×90; (43K-43L) VHH-αE7-S—S-PEG$_4$-C(O)—NH-GFP-PEI×1.6. Immunofluorescence staining for VHH using anti-VHH antibodies—Red; Nuclear staining—Blue.
Figure 43:
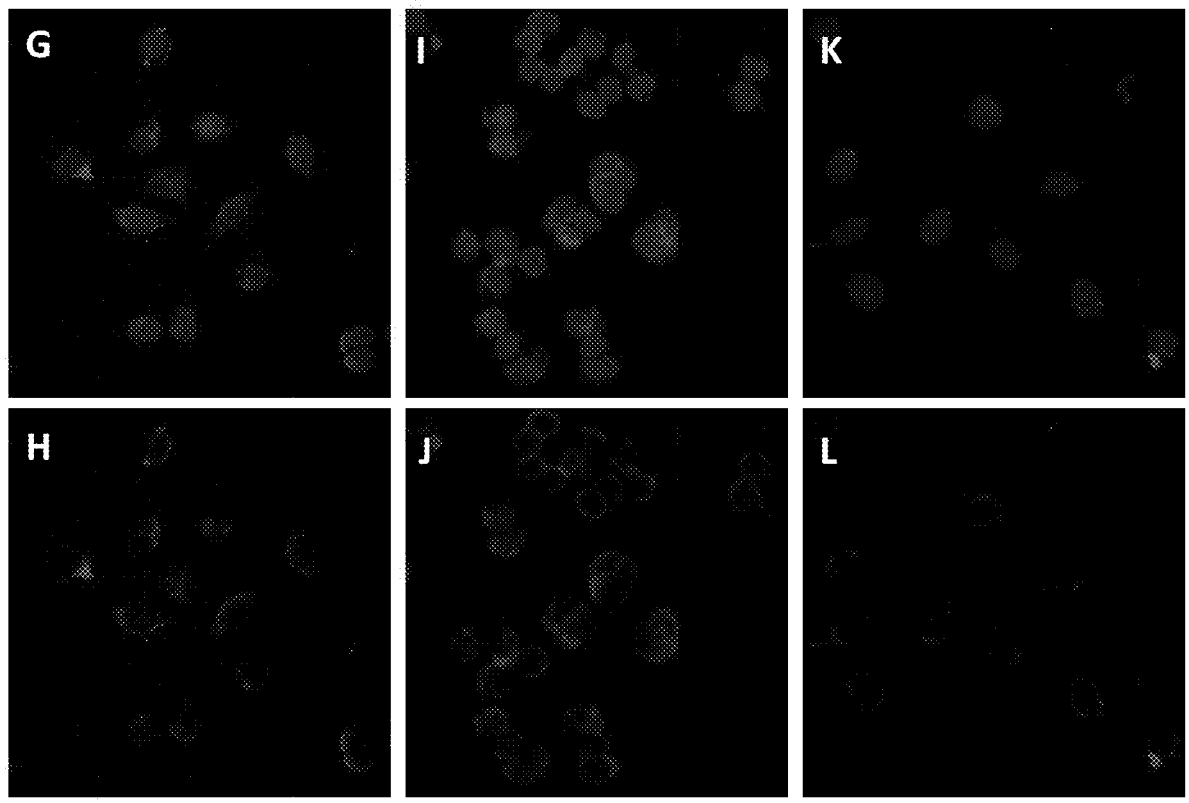

1C5-Hel20-LC-HSA-PEI (S5C)×n conjugates were prepared by reduction of 1C5-Hel20-LC and activation with 2,2'-Dithiobis(5-nitropyridine) followed by conjugation to HSA-PEI×n. Intracellular BRAF inhibition by the different constructs was evaluated by a functional assay in A375 cells. The different conjugates were incubated with A375 cells in the presence of Annexin V red reagent, for 6 days, while monitoring fluorescence in IncuCyte® to identify apoptotic cells (FIG. 42A, C). At the end of the 6 days, a CellTiter-Glo assay was preformed to evaluate the amount of live cells in each of the tested wells. After 6 days the red area at the same time point, indicating level of apoptosis, can be normalized to the amount of live cells in each tested well. This normalized value was used to compare between the different tested agents (FIG. 42B, D).

When looking at direct apoptosis evaluation (FIG. 42A, C), at both concentration levels, the S5C-PEI×4.5 provided a significant inhibition of the intracellular BRAF and led to high apoptotic signals in the treated cells. However, when apoptotic signal is normalized to cell number it is apparent that there is a dose-dependency relative to the level of PEI (FIG. 42B, D). S5C-PEI×3 also exhibited activity, though it was decreased and even PEI×2 and PEI×1 showed a limited effect especially at the 3 µM concentration. In total, the activity level corresponded nicely to the level of PEI.

As can be seen in these results, the level of PEI is crucial for obtaining intracellular activity and it appears for HSA that significant activity can be achieved when the carrier is modified by more than 2 PEI molecules and even better activity is obtained when the carrier is modified by more than 3 PEI molecules.

Furthermore, as represented in FIG. 5A, the conjugate S5D (mentioned in Example 1) exhibited efficient BRAF inhibition leading to an unmistakable apoptotic signal. Accordingly, it is postulated that conjugates with or without a biocleavable bond can be utilized for an efficient cellular delivery and function of payloads, as described herein.

Example 13: Additional Carriers

Four different proteins with different molecular weights were evaluated for their ability to serve as carriers: K27 DARPin (20 KDa; Guillard, S. et al. Nat. Commun. 8, 16111 doi: 10.1038/ncomms16111 (2017)), GFP (30 KDa; biorbyt, Cat. No. orb84840), IgG (150 KDa; monoclonal antibody, mouse anti goat/sheep, Clone GT-34, Sigma) and Fibrinogen (300 KDa; Sigma, Cat. No. 341578). The latter two proteins are proteins that are endogenous to the blood, similar to the HSA used as the main carrier of the invention. For this purpose, the different proteins were modified with PEI. Modification was performed in IVIES buffer pH 5, in the presence of EDC and PEI. The PEI modified proteins, were purified from excess of reagents using size exclusion chromatography. The modification level was evaluated by mass spectrometry and the modified carriers were further evaluated for their Zeta potential. While the level of PEI modification for each potential carrier can be optimized and controlled, as can be seen in Table 8, the larger carrier proteins, i.e., IgG and fibrinogen, are more easily modified as they have more accessible PEI-modification sites. In contrast, the smaller carriers, such as the DARPin, are modified by lower levels of PEI as they have less potential modification sites and these sites are more crowded. Though GFP was relatively lowly modified, its size would suggest that in the future it could be much more highly modified.

TABLE 8

Alternative carriers and their level of PEI modification as measured by mass spectrometry.

| Protein | Number of PEI units |
| --- | --- |
| DARPin | 2.4 |
| GFP | 1.6 |
| IgG | 27 |
| Fibrinogen | 90 |
| HSA | 4.5 |
| HSA | 8 |

The change in the charge of each carrier protein following its modification with PEI was measured by Zeta potential (Table 9). Preferred carriers, HSA with 4.5 or 8 PEI modifications are also presented for comparison.

TABLE 9

Zeta potential values of alternative carriers and HSA before and after their modification by PEI.

|  | Zeta potential (mV) | STD |
| --- | --- | --- |
| DARPin | −28.4 | 1.6 |
| DARPin-PEI × 2.4 | 9.8 | 3 |
| IgG | 3 | 1 |
| IgG-PEI × 27 | 21.1 | 5.2 |
| Fibrinogen | −1.4 | 1.7 |
| Fibrinogen-PEI × 90 | 15.5 | 4.5 |
| HSA | −20.7 | 2 |
| HSA-PEI × 3.5 | 13 | 4.5 |
| HSA-PEI × 8 | 17.6 | 2 |

The different carriers were tested for their ability to internalize into cells. The PEI modified carriers were incubated with A375 cells for 24 h and their presence in the cells was evaluated by confocal microscopy using anti HSA-PEI Antibodies (produced in-house following immunization of animals with HSA-PEI and shown to selectively identify HSA-PEI as well as other PEI-modified proteins).

As no attempt was done to locate conjugation hot-spots in these alternative carriers, in order to conjugate them to payloads the different proteins modified with PEI were activated with NHS-PEG$_4$-SPDP followed by conjugation reaction with the C terminal cysteine of VHH anti-E7, to give VHH anti-E7 conjugated to the alternative PEI-modified carriers described above. The anti-E7 VHH payload was conjugated using a reversible disulfide bond, sensitive to the reducing environment of the cytoplasm. The different carriers' ability to deliver the payload into the cells, was evaluated by incubation of the conjugates with A375 cells for 24 h followed by immunofluorescence staining with anti VHH antibodies.

Figure 44:
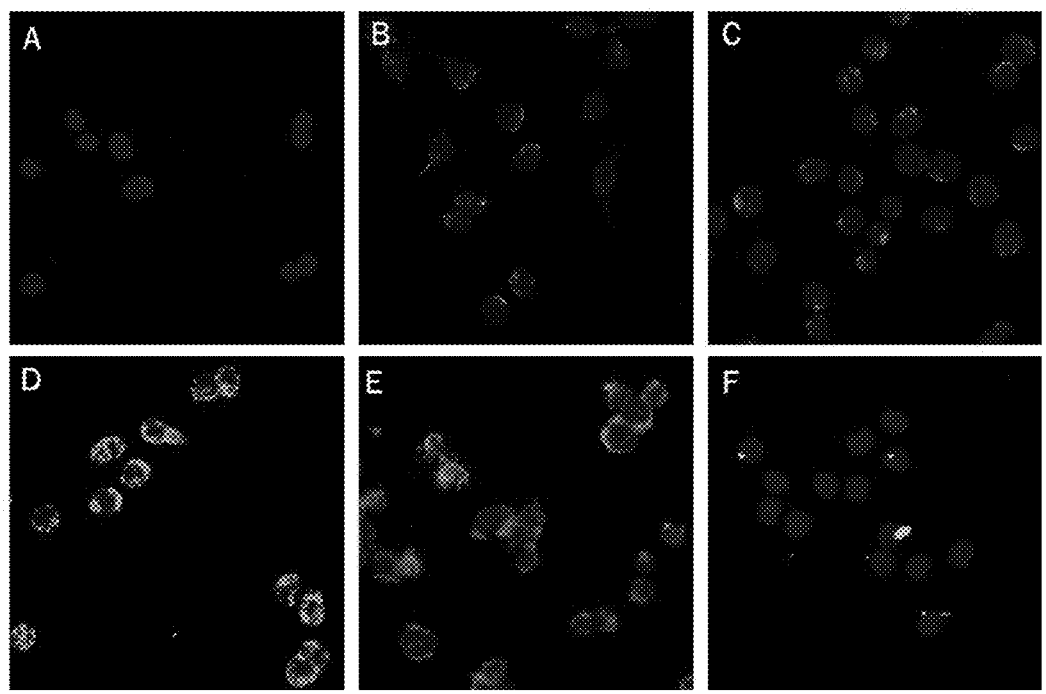
FIGS. 44A-44F. Confocal microscopy images of A375 cells following 24 hr. incubation with different PEI modified carriers. (44A) without treatment; (44B) HSA-PEI×4.5; (44C) K-27 DARPin-PEI×2.4; (44D) IgG-PEI×27, (44E) Fibrinogen-PEI×90, (44F) GFP-PEI×1.6. Immunofluorescence staining using anti-HSA-PEI antibodies—Green; Nuclear staining—Blue.

As can be seen in FIGS. 43A-43L, all alternative carriers successfully delivered their VHH cargo to the A375 cells. As also discussed above, the carriers with the higher levels of PEI modification, namely IgG, fibrinogen, and the HSA, were able to deliver more VHH. As the carriers here were conjugated via a reversible linker the VHH is released in the cytoplasm and as there is no target in the cytoplasm for the specific VHH used, the VHH is diffused throughout the cytoplasm making its detection harder as opposed to the carrier detection (FIG. 44) which is stronger due the already discussed phenomenon of appearing in a punctate profile due to electrostatic interactions with the cytoplasm proteins. For that reason, it is somewhat harder to observe the VHH delivered by the DARPin carrier which with its lower level of PEI managed to deliver lower levels of VHH.

While these results clearly show that other proteins, including other human blood endogenous proteins, can serve as intracellular carriers, it might be beneficial using HSA as the protein carrier of the conjugate of the invention due to its high abundance in the blood, low immunogenicity, favorable physico-chemical traits also responsible to favorable PK profiles and its unique conjugation site at C34 that, as shown above, is able to offer high site-selectivity and enhanced stability for the conjugate in case a reversible bond is added so to release the payload inside the cells.

Example 14: Functional Assays

The three constructs, S5A-C, were tested for their functional ability to inhibit intracellular BRAF and induce cell death in various cell lines: Hela-GFP, B16, Renca and A375.

As positive control, PLX 4032, Vemurafenib, was tested as well. As negative control, 2A1, a non-relevant VHH, was conjugated to HSA-PEIx3.5 with a non-reversible PEG linker. The cell death was monitored throughout the experiment (FIG. 45A) and at the end point of the experiment (140 h) was quantified by cell titer (FIG. 45B).

Figure 45A:
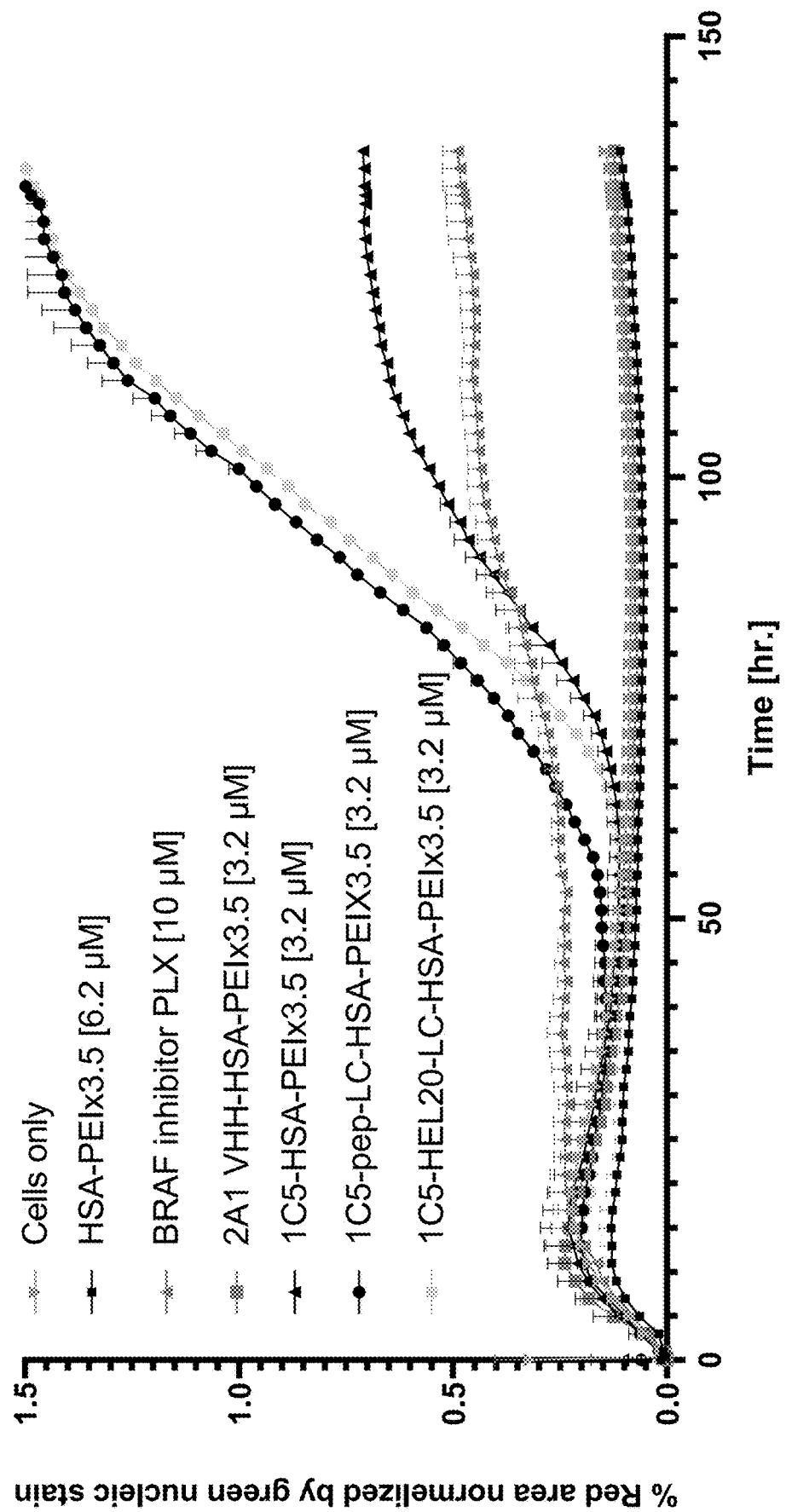
FIGS. 45A-45B. Hela-GFP cells were seeded in 96 plate wells for 24 h to produce attached cells, 1500 cells/well. To each well a sample of the tested agent was added at the desired concentration, followed by addition of Annexin V red reagent to identify apoptotic cells. Cells apoptosis was monitored in IncuCyte®. Additional control samples were tested and not shown as all gave the same signal which was equivalent to the signal without treatment (cell only). The additional control samples are: 1C5, 1C5-flex-pep-LC; 1C5-Hel20-LC, all not conjugated to carrier. (45A) Line graph of cell death over time. (45B) Bar graph of cell viability at the final time point of 140 hours.
Figure 45B:
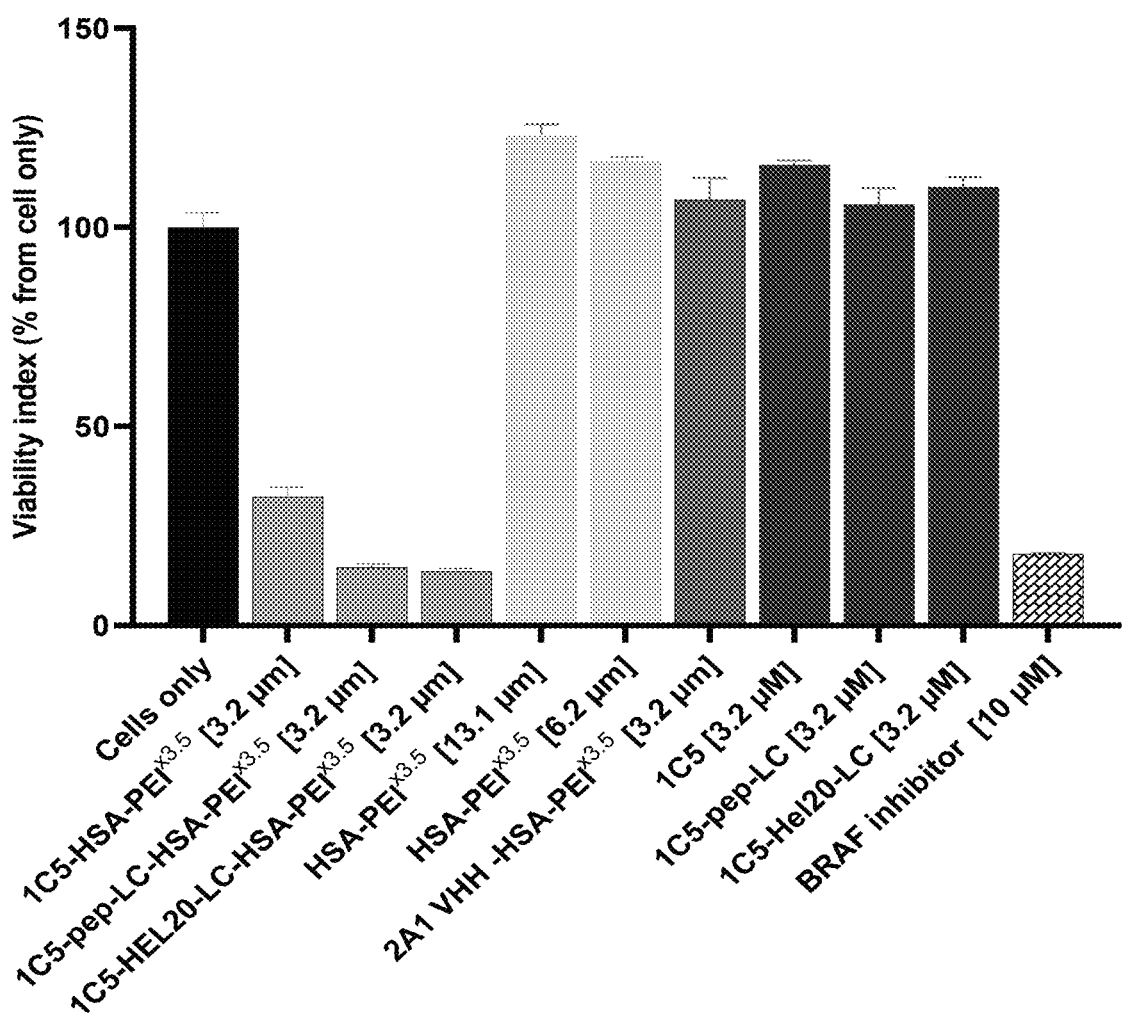

As can be seen in FIG. 45A-45B, the anti-BRAF VHH conjugated via the new peptide linkers exhibited high activity in cells suggesting that these linkers are compatible with the generation of conjugates that effectively enter the cells and release their payload against intracellular targets. The anti-BRAF VHH (1C5) conjugated irreversibly to the HSA-PEIx3.5 (S5A) also afflicted apoptosis on the cells although at lower level than the reversibly-conjugated constructs and the effect started at a later time point than the reversibly-conjugates constructs.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

---

```
SEQUENCE LISTING

Sequence total quantity: 21
SEQ ID NO: 1              moltype = AA  length = 585
FEATURE                   Location/Qualifiers
source                    1..585
                          mol_type = protein
                          organism = Homo sapiens
SEQUENCE: 1
DAHKSEVAHR FKDLGEENFK ALVLIAFAQY LQQCPFEDHV KLVNEVTEFA KTCVADESAE   60
NCDKSLHTLF GDKLCTVATL RETYGEMADC CAKQEPERNE CFLQHKDDNP NLPRLVRPEV  120
DVMCTAFHDN EETFLKKYLY EIARRHPYFY APELLFFAKR YKAAFTECCQ AADKAACLLP  180
KLDELRDEGK ASSAKQRLKC ASLQKFGERA FKAWAVARLS QRFPKAEFAE VSKLVTDLTK  240
VHTECCHGDL LECADDRADL AKYICENQDS ISSKLKECCE KPLLEKSHCI AEVENDEMPA  300
DLPSLAADFV ESKDVCKNYA EAKDVFLGMF LYEYARRHPD YSVVLLLRLA KTYETTLEKC  360
CAAADPHECY AKVFDEFKPL VEEPQNLIKQ NCELFEQLGE YKFQNALLVR YTKKVPQVST  420
PTLVEVSRNL GKVGSKCCKH PEAKRMPCAE DYLSVVLNQL CVLHEKTPVS DRVTKCCTES  480
LVNRRPCFSA LEVDETYVPK EFNAETFTFH ADICTLSEKE RQIKKQTALV ELVKHKPKAT  540
KEQLKAVMDD FAAFVEKCCK ADDKETCFAE EGKKLVAASQ AALGL                 585

SEQ ID NO: 2              moltype = AA  length = 866
FEATURE                   Location/Qualifiers
source                    1..866
                          mol_type = protein
                          organism = Homo sapiens
SEQUENCE: 2
MFSMRIVCLV LSVVGTAWTA DSGEGDFLAE GGGVRGPRVV ERHQSACKDS DWPFCSDEDW   60
NYKCPSGCRM KGLIDEVNQD FTNRINKLKN SLFEYQKNNK DSHSLTTNIM EILRGDFSSA  120
NNRDNTYNRV SEDLRSRIEV LKRKVIEKVQ HIQLLQKNVR AQLVDMKRLE VDIDIKIRSC  180
RGSCSRALAR EVDLKDYEDQ QKQLEQVIAK DLLPSRDRQH LPLIKMKPVP DLVPGNFKSQ  240
LQKVPPEWKA LTDMPQMRME LERPGGNEIT RGGSTSYGTG SETESPRNPS SAGSWNSGSS  300
GPGSTGNRNP GSSGTGGTAT WKPGSSGPGS TGSWNSGSSG TGSTGNQNPG SPRPGSTGTW  360
NPGSSERGSA GHWTSESSVS GSTGQWHSES GSFRPDSPGS GNARPNNPDW GTFEEVSGNV  420
SPGTRREYHT EKLVTSKGDK ELRTGKEKVT SGSTTTTRRS CSKTVTKTVI GPDGHKEVTK  480
EVVTSEDGSD CPEAMDLGTL SGIGTLDGFR HRHPDEAAFF DTASTGKTFP GFFSPMLGEF  540
VSETESRGSE SGIFTNTKES SSHHPGIAEF PSRGKSSSYS KQFTSSTSYN RGDSTFESKS  600
YKMADEAGSE ADHEGTHSTK RGHAKSRPVR DCDDVLQTHP SGTQSGIFNI KLPGSSKIFS  660
VYCDQETSLG GWLLIQQRMD GSLNFNRTWQ DYKRGFGSLN DEGEGEFWLG NDYLHLLTQR  720
GSVLRVELED WAGNEAYAEY HFRVGSEAEG YALQVSSYEG TAGDALIEGS VEEGAEYTSH  780
NNMQFSTFDR DADQWEENCA EVYGGGWWYN NCQAANLNGI YYPGGSYDPR NNSPYEIENG  840
VVWVSFRGAD YSLRAVRMKI RPLVTQ                                      866

SEQ ID NO: 3              moltype = AA  length = 19
FEATURE                   Location/Qualifiers
source                    1..19
                          mol_type = protein
                          organism = Homo sapiens
SEQUENCE: 3
MFSMRIVCLV LSVVGTAWT                                               19

SEQ ID NO: 4              moltype = AA  length = 16
FEATURE                   Location/Qualifiers
REGION                    1..16
                          note = Synthetic
source                    1..16
                          mol_type = protein
                          organism = synthetic construct
SEQUENCE: 4
GGGGSGGGGS GGGGLC                                                  16

SEQ ID NO: 5              moltype = AA  length = 16
FEATURE                   Location/Qualifiers
REGION                    1..16
                          note = Synthetic
```

```
source                  1..16
                        mol_type = protein
                        organism = synthetic construct
SEQUENCE: 5
GGGGSGGGGS GGGLGC                                                         16

SEQ ID NO: 6            moltype = AA  length = 26
FEATURE                 Location/Qualifiers
REGION                  1..26
                        note = Synthetic
source                  1..26
                        mol_type = protein
                        organism = synthetic construct
SEQUENCE: 6
AAASAEAAAK EAAAKEAAAK AAAGSG                                              26

SEQ ID NO: 7            moltype = AA  length = 15
FEATURE                 Location/Qualifiers
REGION                  1..15
                        note = Synthetic
source                  1..15
                        mol_type = protein
                        organism = synthetic construct
SEQUENCE: 7
GGGGSGGGGS GGGLG                                                          15

SEQ ID NO: 8            moltype = AA  length = 16
FEATURE                 Location/Qualifiers
REGION                  1..16
                        note = Synthetic
source                  1..16
                        mol_type = protein
                        organism = synthetic construct
SEQUENCE: 8
GGGGSGGGGS GGGGSC                                                         16

SEQ ID NO: 9            moltype = AA  length = 6
FEATURE                 Location/Qualifiers
REGION                  1..6
                        note = Synthetic
source                  1..6
                        mol_type = protein
                        organism = synthetic construct
SEQUENCE: 9
GGGGSC                                                                     6

SEQ ID NO: 10           moltype = AA  length = 28
FEATURE                 Location/Qualifiers
REGION                  1..28
                        note = Synthetic
source                  1..28
                        mol_type = protein
                        organism = synthetic construct
SEQUENCE: 10
AAASAEAAAK EAAAKEAAAK AAAGSGLC                                            28

SEQ ID NO: 11           moltype = AA  length = 6
FEATURE                 Location/Qualifiers
REGION                  1..6
                        note = Synthetic
source                  1..6
                        mol_type = protein
                        organism = synthetic construct
SEQUENCE: 11
GGGLGC                                                                     6

SEQ ID NO: 12           moltype = AA  length = 15
FEATURE                 Location/Qualifiers
REGION                  1..15
                        note = Synthetic
source                  1..15
                        mol_type = protein
                        organism = synthetic construct
SEQUENCE: 12
GGGGSGGGGS GGGGS                                                          15

SEQ ID NO: 13           moltype = AA  length = 5
FEATURE                 Location/Qualifiers
REGION                  1..5
```

```
                           note = Synthetic
source                     1..5
                           mol_type = protein
                           organism = synthetic construct
SEQUENCE: 13
GGGGS                                                                        5

SEQ ID NO: 14              moltype = AA   length = 27
FEATURE                    Location/Qualifiers
REGION                     1..27
                           note = Synthetic
source                     1..27
                           mol_type = protein
                           organism = synthetic construct
SEQUENCE: 14
AAASAEAAAK EAAAKEAAAK AAAGSGL                                                27

SEQ ID NO: 15              moltype = AA   length = 5
FEATURE                    Location/Qualifiers
REGION                     1..5
                           note = Synthetic
source                     1..5
                           mol_type = protein
                           organism = synthetic construct
SEQUENCE: 15
GGGLG                                                                        5

SEQ ID NO: 16              moltype = AA   length = 9
FEATURE                    Location/Qualifiers
REGION                     1..9
                           note = Synthetic
source                     1..9
                           mol_type = protein
                           organism = synthetic construct
SEQUENCE: 16
RKKRRQRRR                                                                    9

SEQ ID NO: 17              moltype = AA   length = 24
FEATURE                    Location/Qualifiers
source                     1..24
                           mol_type = protein
                           organism = Homo sapiens
SEQUENCE: 17
MKWVTFISLL FLFSSAYSRG VFRR                                                  24

SEQ ID NO: 18              moltype = AA   length = 30
FEATURE                    Location/Qualifiers
source                     1..30
                           mol_type = protein
                           organism = Homo sapiens
SEQUENCE: 18
MKRMVSWSFH KLKTMKHLLL LLLCVFLVKS                                            30

SEQ ID NO: 19              moltype = AA   length = 461
FEATURE                    Location/Qualifiers
source                     1..461
                           mol_type = protein
                           organism = Homo sapiens
SEQUENCE: 19
QGVNDNEEGF FSARGHRPLD KKREEAPSLR PAPPPISGGG YRARPAKAAA TQKKVERKAP           60
DAGGCLHADP DLGVLCPTGC QLQEALLQQE RPIRNSVDEL NNNVEAVSQT SSSSFQYMYL          120
LKDLWQKRQK QVKDNENVVN EYSSELEKHQ LYIDETVNSN IPTNLRVLRS ILENLRSKIQ          180
KLESDVSAQM EYCRTPCTVS CNIPVVSGKE CEEIIRKGGE TSEMYLIQPD SSVKPYRVYC          240
DMNTENGGWT VIQNRQDGSV DFGRKWDPYK QGFGNVATNT DGKNYCGLPG EYWLGNDKIS          300
QLTRMGPTEL LIEMEDWKGD KVKAHYGGFT VQNEANKYQI SVNKYRGTAG NALMDGASQL          360
MGENRTMTIH NGMFFSTYDR DNDGWLTSDP RKQCSKEDGG GWWYNRCHAA NPNGRYYWGG          420
QYTWDMAKHG TDDGVVWMNW KGSWYSMRKM SMKIRPFFPQ Q                              461

SEQ ID NO: 20              moltype = AA   length = 26
FEATURE                    Location/Qualifiers
source                     1..26
                           mol_type = protein
                           organism = Homo sapiens
SEQUENCE: 20
MSWSLHPRNL ILYFYALLFL SSTCVA                                                26

SEQ ID NO: 21              moltype = AA   length = 427
FEATURE                    Location/Qualifiers
source                     1..427
```

```
                mol_type = protein
                organism = Homo sapiens
SEQUENCE: 21
YVATRDNCCI LDERFGSYCP TTCGIADFLS TYQTKVDKDL QSLEDILHQV ENKTSEVKQL    60
IKAIQLTYNP DESSKPNMID AATLKSRKML EEIMKYEASI LTHDSSIRYL QEIYNSNNQK   120
IVNLKEKVAQ LEAQCQEPCK DTVQIHDITG KDCQDIANKG AKQSGLYFIK PLKANQQFLV   180
YCEIDGSGNG WTVFQKRLDG SVDFKKNWIQ YKEGFGHLSP TGTTEFWLGN EKIHLISTQS   240
AIPYALRVEL EDWNGRTSTA DYAMFKVGPE ADKYRLTYAY FAGGDAGDAF DGFDFGDDPS   300
DKFFTSHNGM QFSTWDNDND KFEGNCAEQD GSGWWMNKCH AGHLNGVYYQ GGTYSKASTP   360
NGYDNGIIWA TWKTRWYSMK KTTMKIIPFN RLTIGEGQQH HLGGAKQVRP EHPAETEYDS   420
LYPEDDL                                                            427
```

The invention claimed is:

1. A protein conjugate, comprising:
   a. human serum albumin (HSA) covalently bound to 3 to 90 polyethyleneimine (PEI) moieties,
      wherein said HSA comprises the amino acid sequence of SEQ ID NO: 1 or a fragment of SEQ ID NO: 1 comprising Cysteine 34 (C34) and having at least 400 amino acids in length,
      wherein the HSA fragment is characterized by an isoelectric point at most 7, and
      wherein said HSA covalently bound to said PEI moieties is characterized by a positive zeta potential at least 8 mV;
   b. a single domain antibody; and
   c. a linker bound to said HSA to said single domain antibody via a covalent bond.

2. The protein conjugate of claim 1, wherein said HSA is covalently bound to between 3 and 10 PEI molecules.

3. The protein conjugate of claim 1, wherein said protein conjugate is a blood-stable conjugate that undergoes less than 25% cleavage in blood after 24 hours, and a cell-penetrating conjugate.

4. The protein conjugate of claim 1, being devoid of DNA.

5. The protein conjugate of claim 1, wherein at least one of:
   a. said linker comprises a biocompatible polymer;
   b. said linker comprises polyethylene glycol (PEG); and
   c. said linker comprises a bio-cleavable bond.

6. The protein conjugate of claim 5 wherein said linker comprises a sterically hindered bio-cleavable bond.

7. The protein conjugate of claim 6, wherein said bio-cleavable bond is a disulfide bond.

8. The protein conjugate of claim 1, wherein said linker is a peptide linker.

9. The protein conjugate of claim 8, wherein said peptide linker is selected from SEQ ID NO: 4-15.

10. The protein conjugate of claim 1, wherein said linker is bound to said HSA via a disulfide bond which is at a distance of from 5 to 15 angstroms from said C34.

11. A pharmaceutical composition, comprising a protein conjugate of claim 1 and a pharmaceutically acceptable carrier, excipient or adjuvant, optionally wherein said pharmaceutical composition is formulated for systemic administration.

12. A method of producing a protein conjugate of claim 1 capable of binding an intracellular target, the method comprising:
   a. providing a single domain antibody that binds said intracellular target;
   b. providing said HSA covalently bound to 3 to 90 PEI moieties;
   c. covalently linking said selected single domain antibody to said HSA via a linker to produce a protein conjugate;
   d. determining stability of said linker in human blood, plasma or serum; and
   e. selecting a protein conjugate comprising a linker that is stable in said human blood, plasma or serum;
   thereby producing a protein conjugate capable of binding an intracellular target.

* * * * *